United States Patent
Sato et al.

(10) Patent No.: US 7,948,514 B2
(45) Date of Patent: May 24, 2011

(54) IMAGE PROCESSING APPARATUS, METHOD AND COMPUTER PROGRAM FOR GENERATING NORMAL INFORMATION, AND VIEWPOINT-CONVERTED IMAGE GENERATING APPARATUS

(75) Inventors: Satoshi Sato, Osaka (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/672,637

(22) PCT Filed: Jun. 1, 2009

(86) PCT No.: PCT/JP2009/002416
§ 371 (c)(1),
(2), (4) Date: Feb. 8, 2010

(87) PCT Pub. No.: WO2009/147814
PCT Pub. Date: Dec. 10, 2009

(65) Prior Publication Data
US 2010/0289878 A1    Nov. 18, 2010

(30) Foreign Application Priority Data
Jun. 2, 2008    (JP) .................. 2008-145141

(51) Int. Cl.
*H04N 13/02*    (2006.01)
*G01J 4/00*    (2006.01)

(52) U.S. Cl. .......................... 348/46; 356/369
(58) Field of Classification Search .......... 348/43, 348/46, 54, 57, 254, 58; 356/369
See application file for complete search history.

(56) References Cited

U.S. PATENT DOCUMENTS

| | | | |
|---|---|---|---|
| 5,028,138 A | 7/1991 | Wolff | |
| 6,118,475 A * | 9/2000 | Iijima et al. | 348/42 |
| 6,603,504 B1 * | 8/2003 | Son et al. | 348/54 |
| 7,092,093 B2 * | 8/2006 | Ishihara | 356/369 |
| 7,136,217 B2 | 11/2006 | Kawakami et al. | |
| 7,742,169 B2 * | 6/2010 | Morita | 356/369 |
| 2007/0222781 A1 | 9/2007 | Kondo et al. | |
| 2010/0013965 A1 * | 1/2010 | Pugh et al. | 348/254 |

FOREIGN PATENT DOCUMENTS

JP    11-211433    8/1999
(Continued)

OTHER PUBLICATIONS

International Search Report for corresponding application No. PCT/JP2009/002416 dated Jul. 21, 2009.

(Continued)

*Primary Examiner* — Gims S Philippe
(74) *Attorney, Agent, or Firm* — Renner, Otto, Boisselle & Sklar, LLP

(57) ABSTRACT

High-precision normal information on the surface of a subject is generated by capturing an image of the subject. A normal information generating device captures the image of the subject and thereby passively generates normal information on the surface of the subject. The normal information generating device includes: a stereo polarization image capturing section for receiving a plurality of polarized light beams of different polarization directions at different viewpoint positions and obtaining a plurality of polarization images of different viewpoint positions; and a normal information generating section for estimating a normal direction vector of the subject based on the plurality of polarization images of different viewpoint positions.

41 Claims, 78 Drawing Sheets

FOREIGN PATENT DOCUMENTS

| JP | 2006-140553 | 6/2006 |
|---|---|---|
| WO | 2007/029446 A1 | 3/2007 |

OTHER PUBLICATIONS

H. Hoppe et al., "Surface Reconstruction from Unorganized Points", Computer Graphics 26, 2 (SIGGRAPH '92 Proceedings), Jul. 1992, pp. 71-78.

Tomoaki Higo et al., "Simultaneous Determination of Shape and Reflection Parameters from Shading", Meeting on Image Recognition and Understanding (MIRU2007/Proceedings), 2007, pp. 1093-1098.

Ondrej Drbohlav and Radim Sara, "Using Polarization to Determine Intrinsic Surface Properties", Proc. SPIE vol. 3826, 1999, pp. 253-263.

G.A. Atkinson and E.R. Hancock, "Recovery of Surface Orientation From Diffuse Polarization", IEEE Transactions on Image Processing, vol. 15, No. 6, 2006, pp. 1653-1664.

Gary A. Atkinson and Edwin R. Hancock, "Shape Estimation Using Polarization and Shading from Two Views", IEEE Transactions on Pattern Analysis and Machine Intelligence, vol. 29, No. 11, 2007, pp. 2001-2017.

Y Sato et al., "Object Shape and Reflectance Modeling from Observation", Computer Graphics Proceedings, Annual Conference Series 1997 (SIGGRAPH 97), pp. 379-387.

Roger Y. Tsai, An Efficient and Accurate Camera Calibration Technique for 3D Machine Vision, Proceedings of IEEE Conference on Computer Vision and Pattern Recognition, Miami Beach, FL, 1986, pp. 364-374.

Takayuki Kawashima et al., "Development of polarization imaging device and applications by using patterned polarizer", Proceedings of the IEICE General Conference 2006, No. D-11-52, p. 52 and concise explanation.

David G. Lowe., "Distinctive Image Features from Scale-Invariant Keypoints", International Journal of Computer Vision, vol. 60, No. 2, 2004, pp. 91-110.

Hironobu Fujiyoshi, "Gradient-Based Feature Extraction-SIFT and HOG-", IPSJ SIG Technical Report, CVIM 160, 2007, pp. 211-224.

L.B. Wolff and T.E. Boult, "Constraining Object Features Using a Polarization Reflectance Model", IEEE Transactions on Pattern Analysis and Machine Intelligence, vol. 13, No. 7, 1991, pp. 635-657.

Shree K. Nayar et al., "Separation of Reflection Components Using Color and Polarization", International Joural of Computer Vision (IJCV), vol. 21, No. 3, 1997, pp. 163-186.

Megumi Saito et al., Measurement of Surface Orientations of Transparent Objects Using Polarization in Highlight, Trans. of IEICE, D-II, vol. J82-D-II, No. 9, 1999, pp. 1383-1390 and concise explanation.

Mark W. Powell et al., "A Simple Strategy for Calibrating the Geometry of Light Sources", IEEE Transactions on Pattern Analysis and Machine Intelligence, vol. 23, No. 9, Sep. 2001, pp. 1022-1027.

Itsik Horovitz and Nahum Kiryati, "Depth from gradient fields and control points: bias correction in photometric stereo", Image and Vision Computing, vol. 22, 2004, pp. 681-694.

* cited by examiner

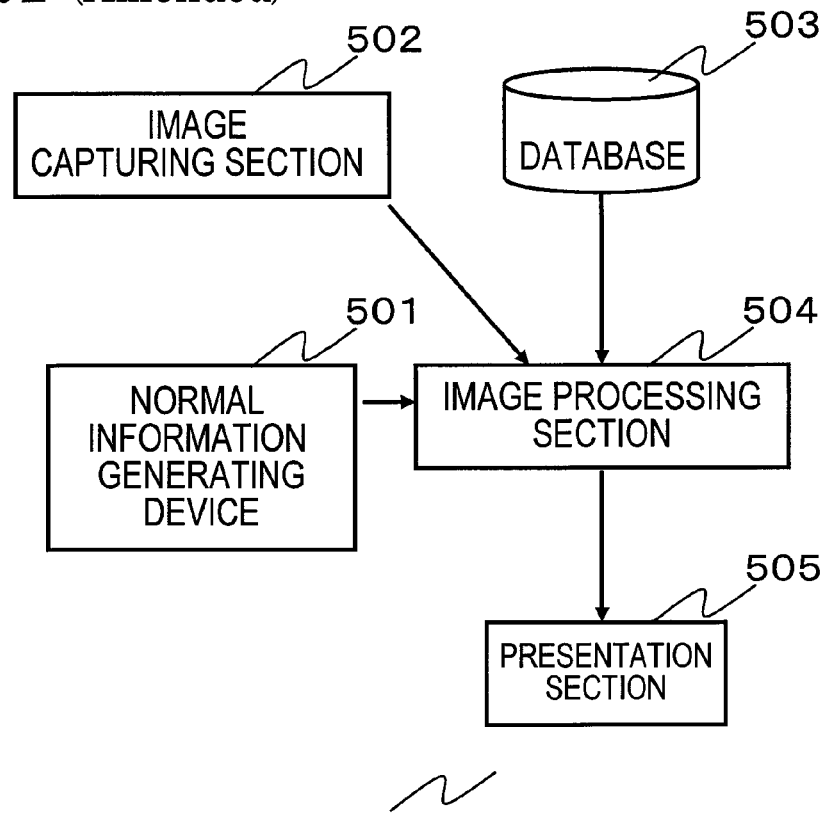

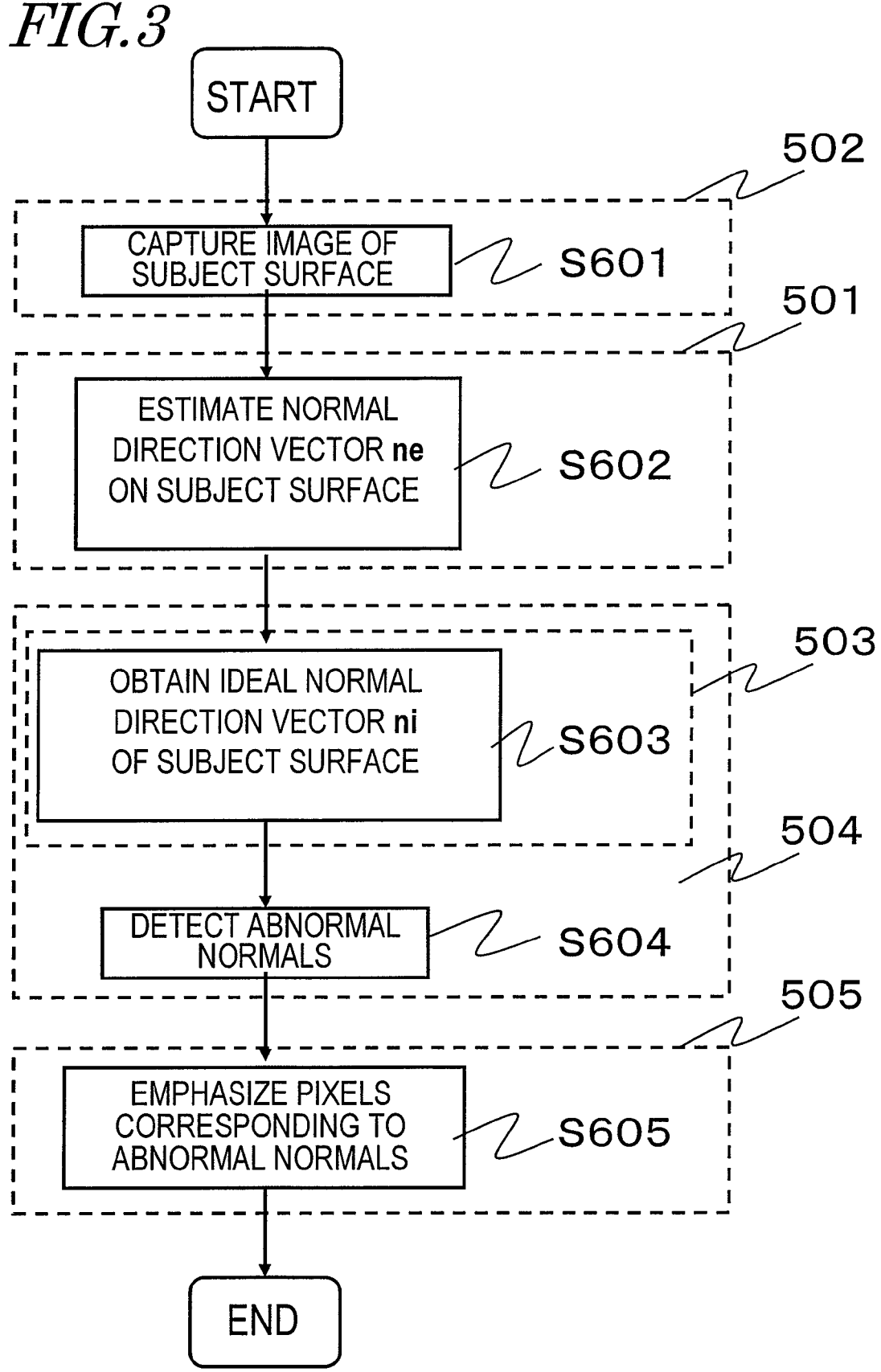

FIG.11
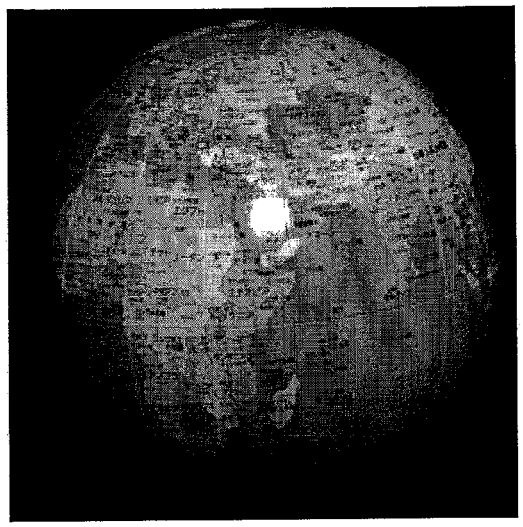
(a) SUBJECT (SPHERE)
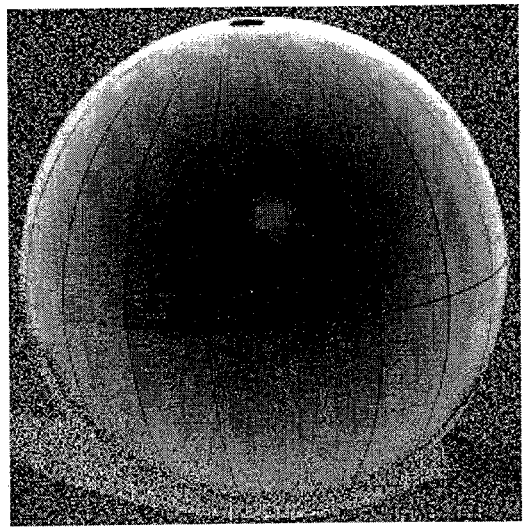
(b) DEGREE OF POLARIZATION $\rho 1$
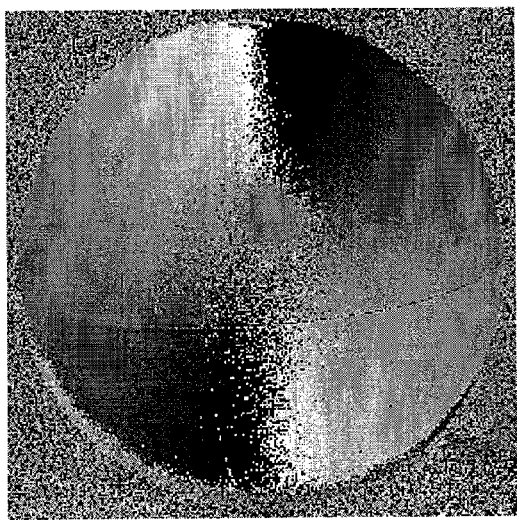
(c) POLARIZATION PHASE $\phi\max 1$
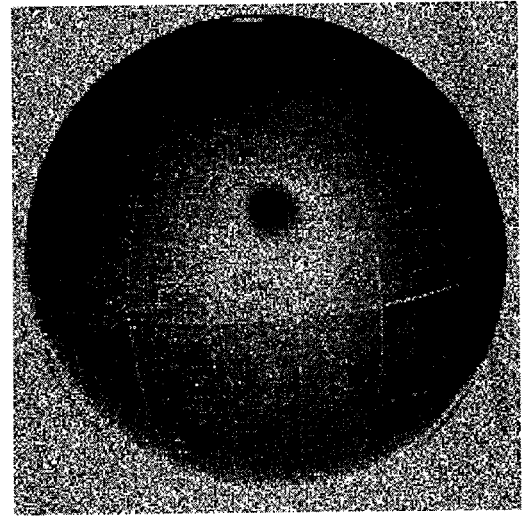
(d) POLARIZATION ESTIMATION ERROR E1

FIG.12
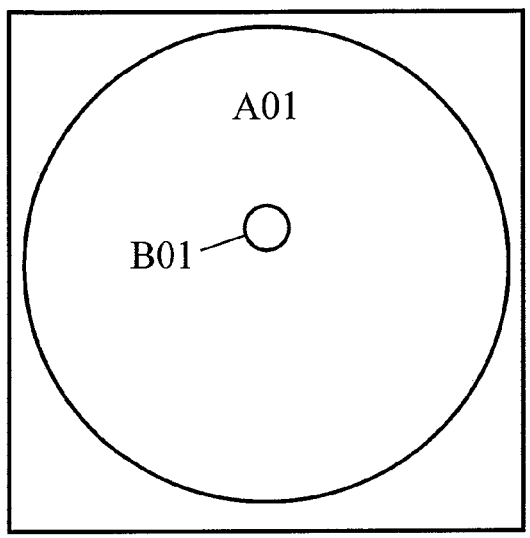
(a) SUBJECT (SPHERE)
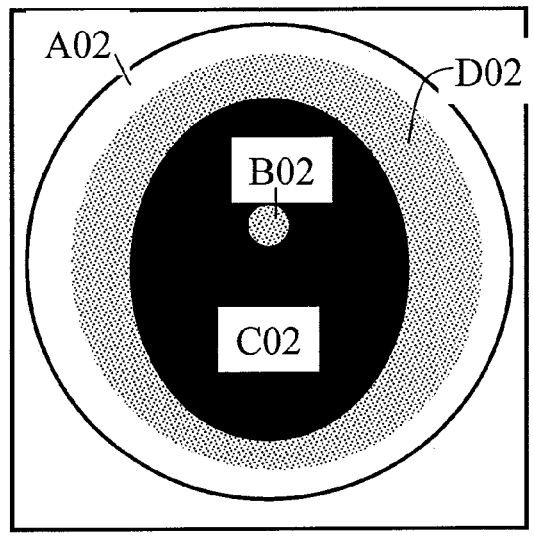
(b) DEGREE OF POLARIZATION $\rho 1$
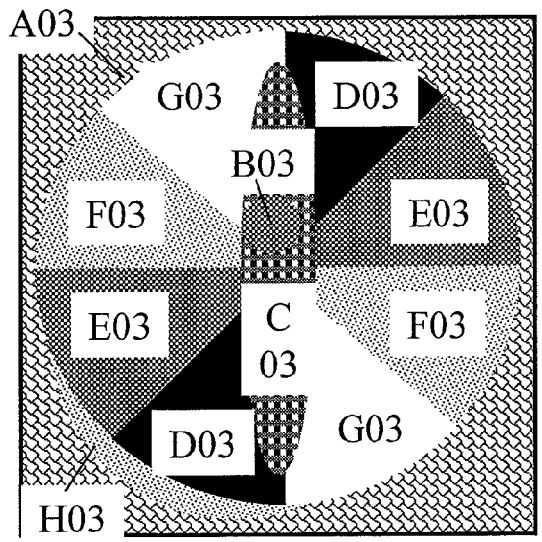
(c) POLARIZATION PHASE $\phi \max 1$
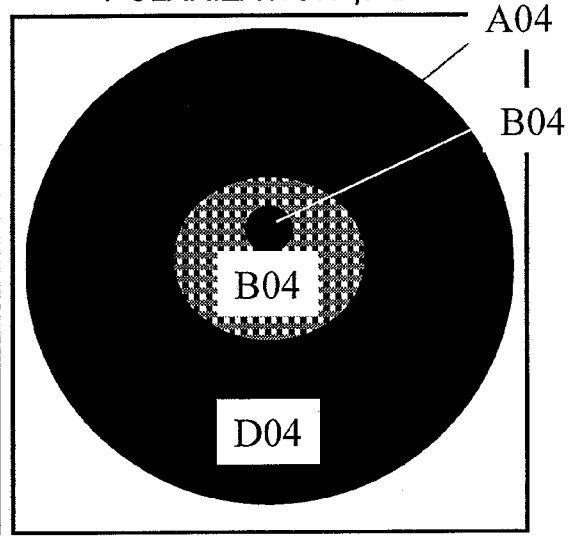
(d) POLARIZATION ESTIMATION ERROR E1

FIG.13
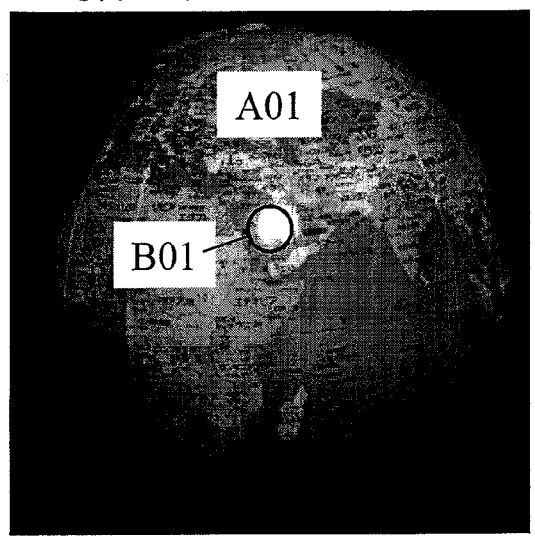
(a) SUBJECT (SPHERE)
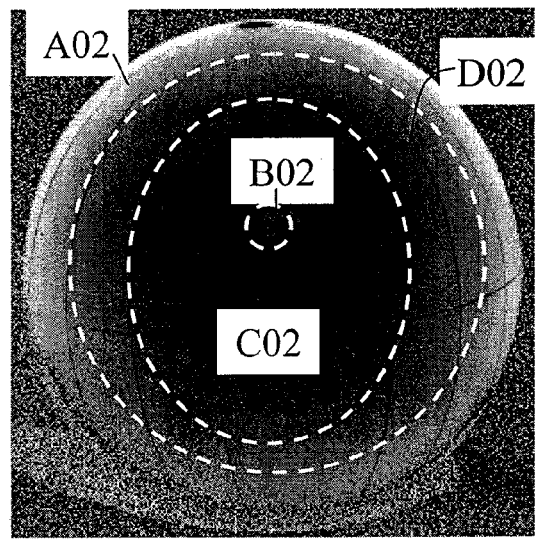
(b) DEGREE OF POLARIZATION $\rho 1$
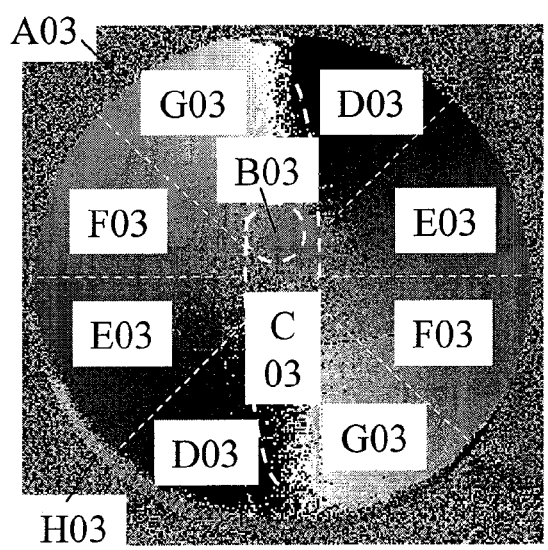
(c) POLARIZATION PHASE $\phi \max 1$
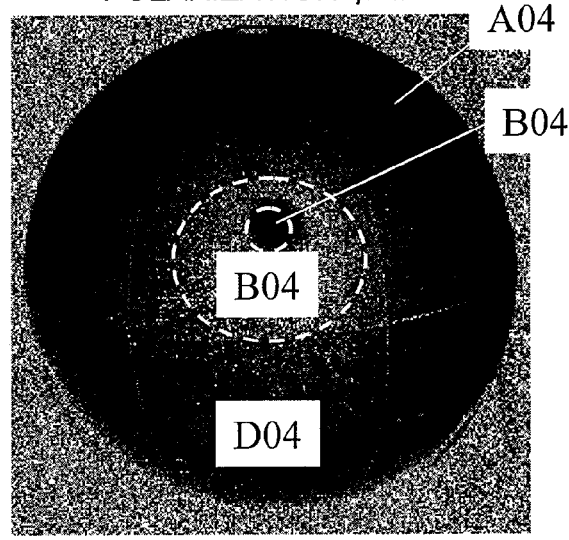
(d) POLARIZATION ESTIMATION ERROR E1

FIG.14
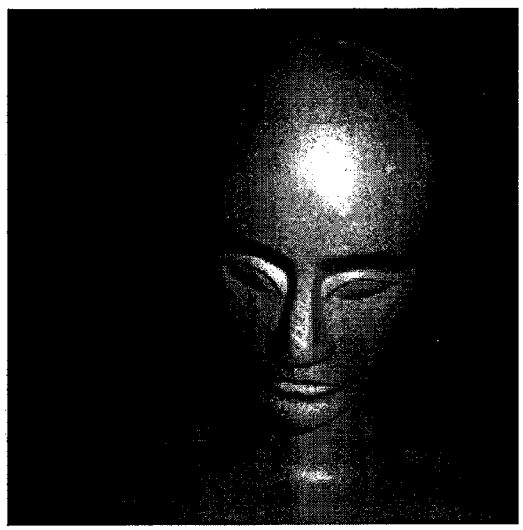
(a) SUBJECT (HEAD)
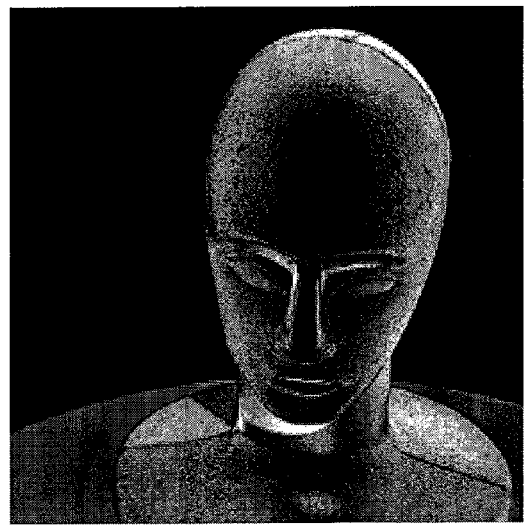
(b) DEGREE OF POLARIZATION $\rho 1$
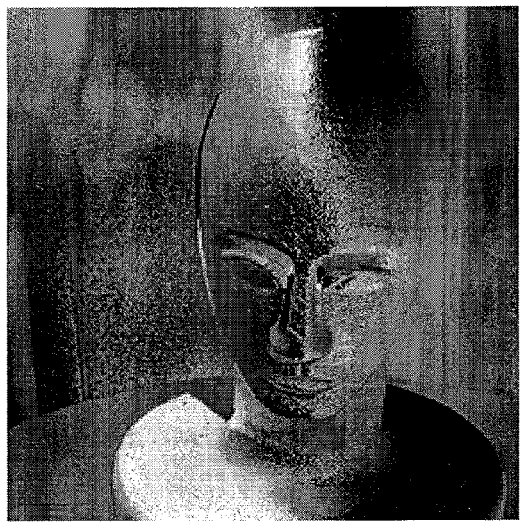
(c) POLARIZATION PHASE $\phi \max 1$
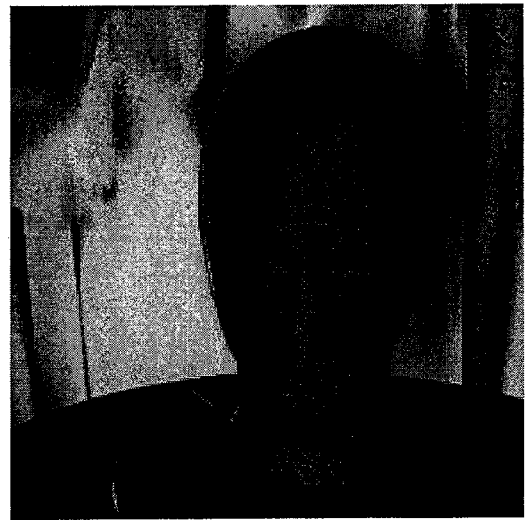
(d) POLARIZATION ESTIMATION ERROR E1

*FIG.16*
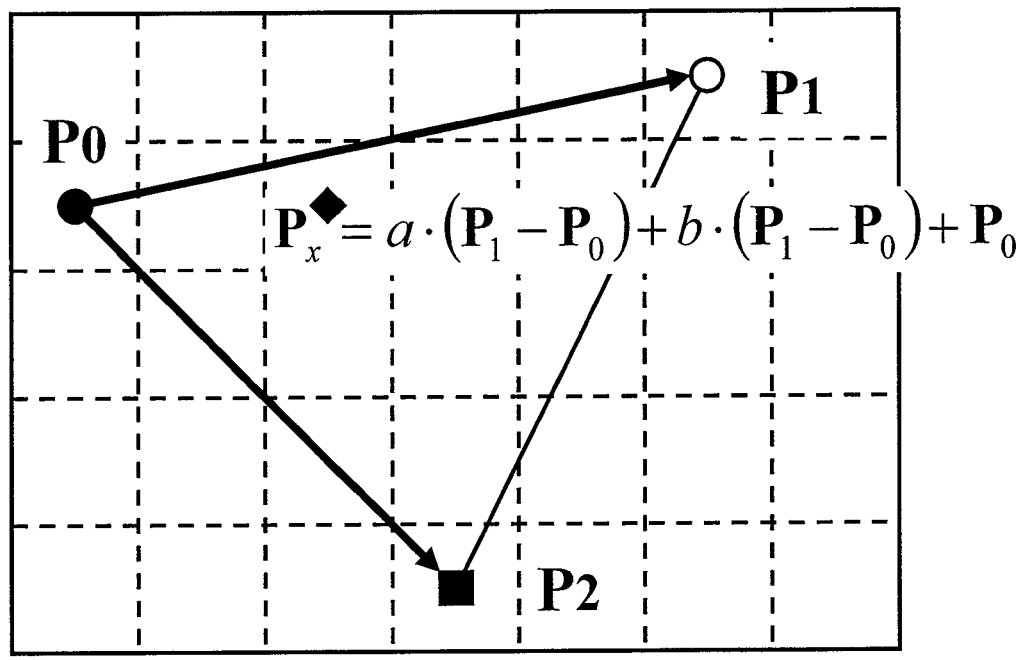
(a) FIRST IMAGE
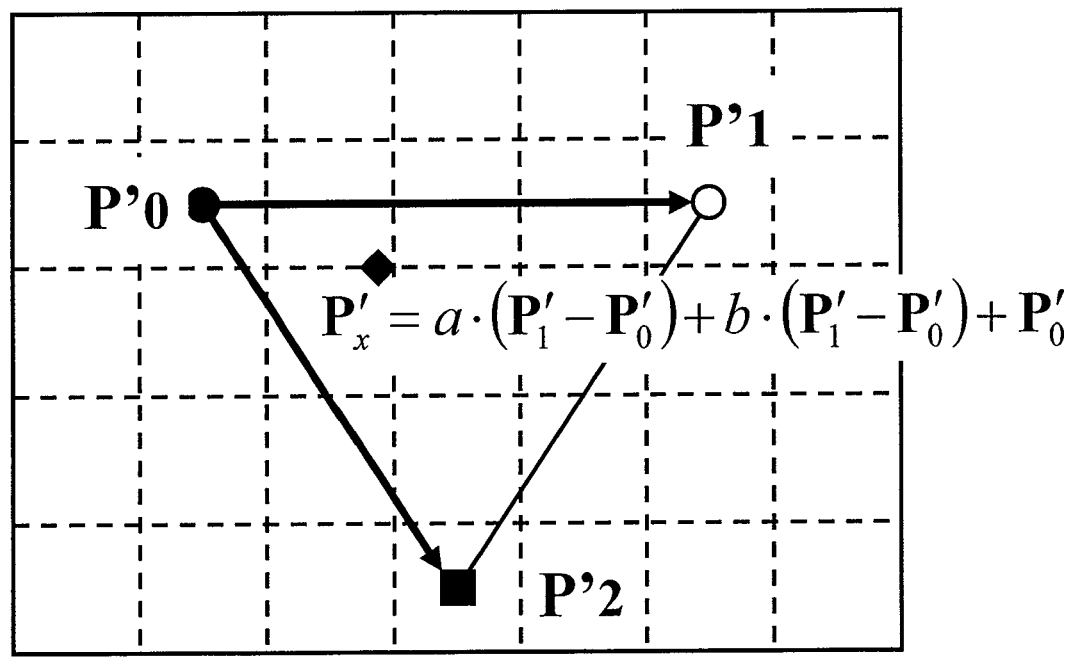
(b) SECOND IMAGE

FIG.24
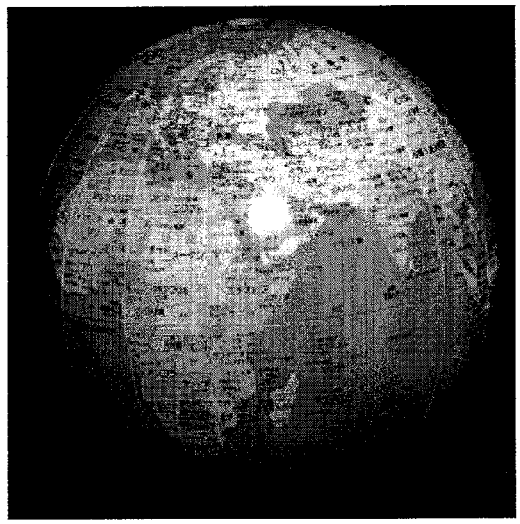
(a) FIRST IMAGE
(b) POLARIZATION PHASE $\phi\max1$
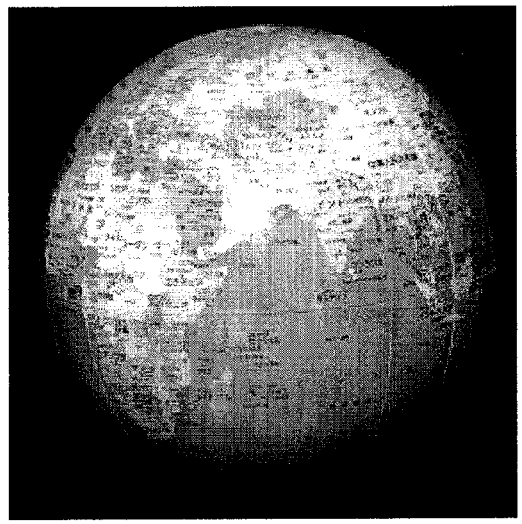
(c) SECOND IMAGE
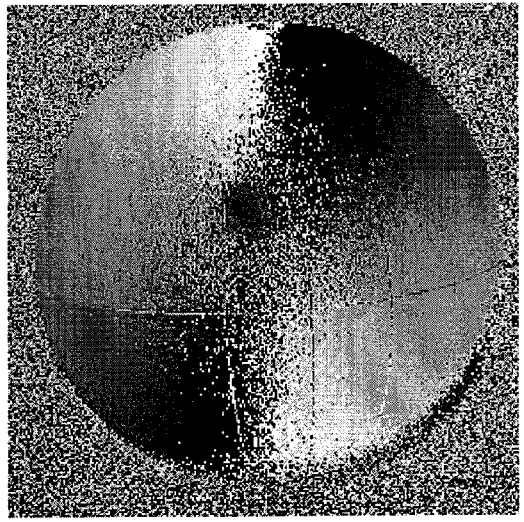
(d) POLARIZATION PHASE $\phi\max2$ FIG.25
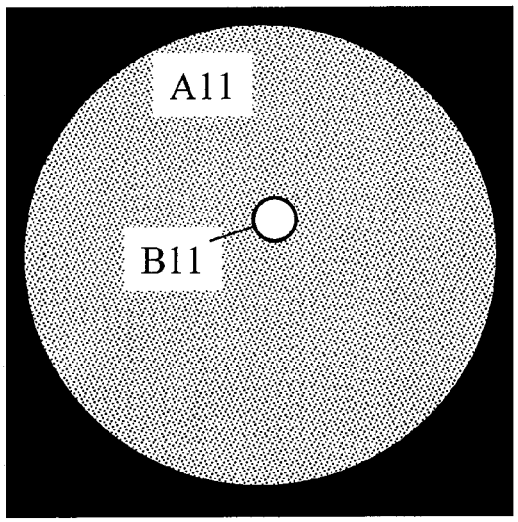
(a) FIRST IMAGE
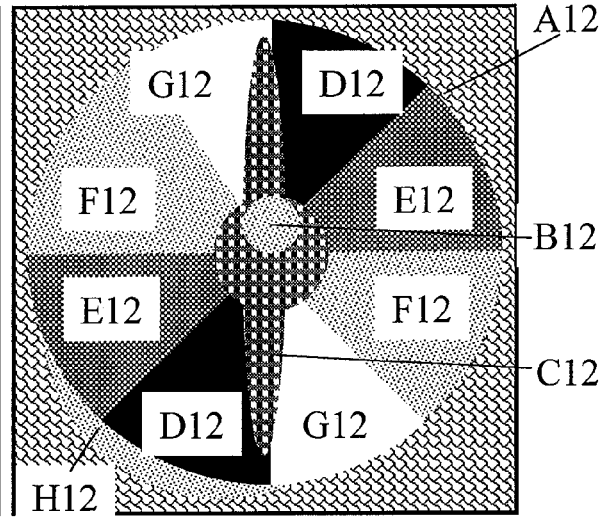
(b) POLARIZATION PHASE $\phi$ max1
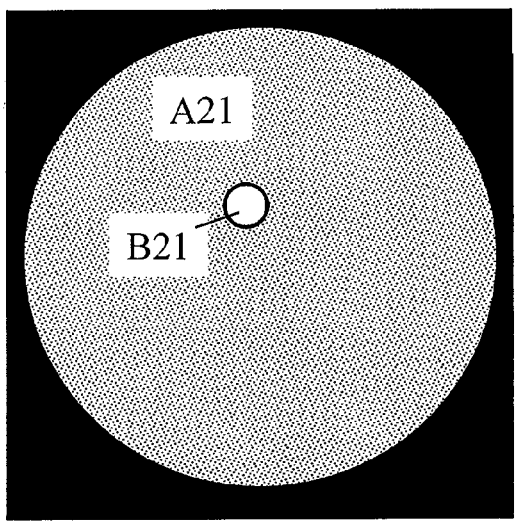
(c) SECOND IMAGE
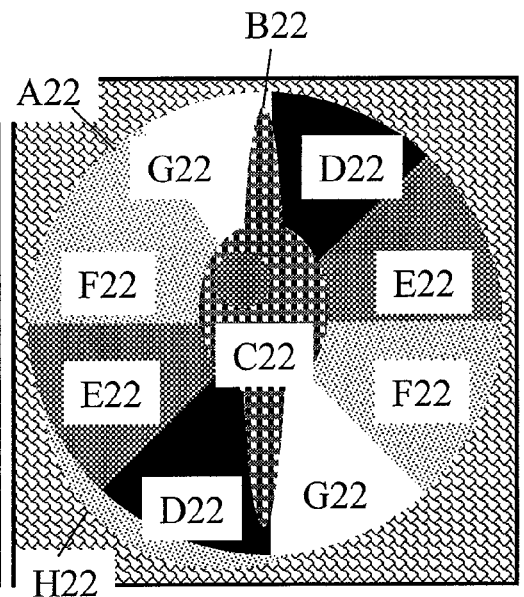
(d) POLARIZATION PHASE $\phi$ max2

FIG.26
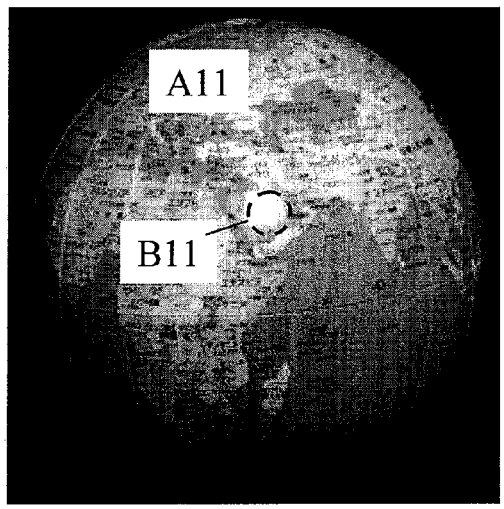
(a) FIRST IMAGE
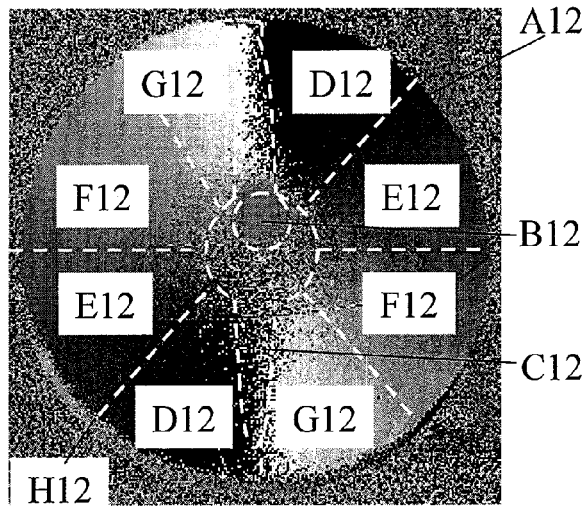
(b) POLARIZATION PHASE $\phi$max1
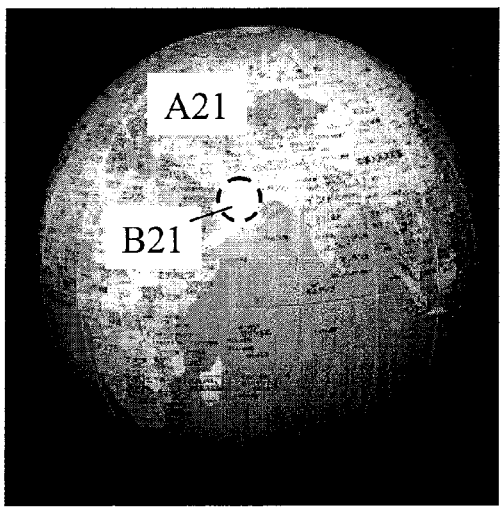
(c) SECOND IMAGE
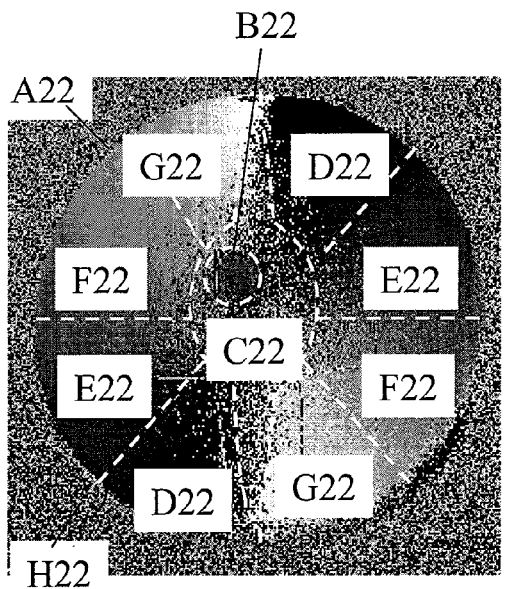
(d) POLARIZATION PHASE $\phi$max2

FIG.27
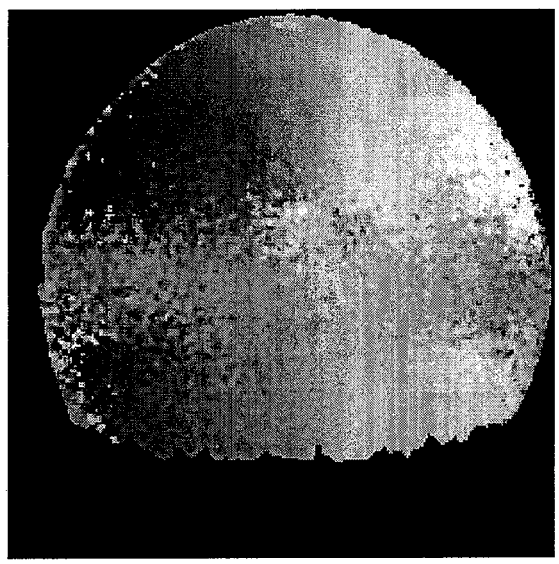
(a) x-COMPONENT NORMAL IMAGE
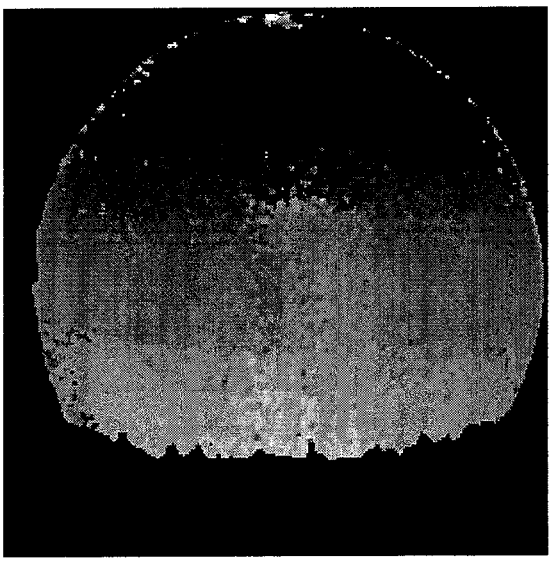
(b) y-COMPONENT NORMAL IMAGE
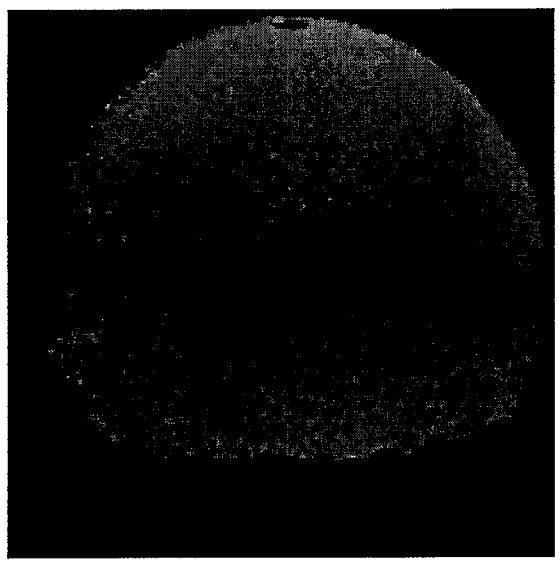
(c) z-COMPONENT NORMAL IMAGE FIG. 28
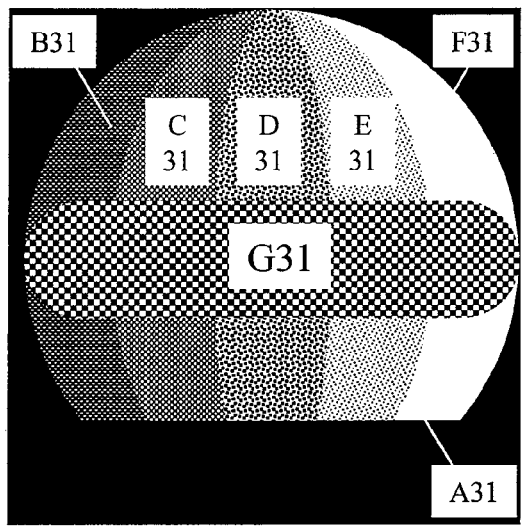
(a) x-COMPONENT NORMAL IMAGE
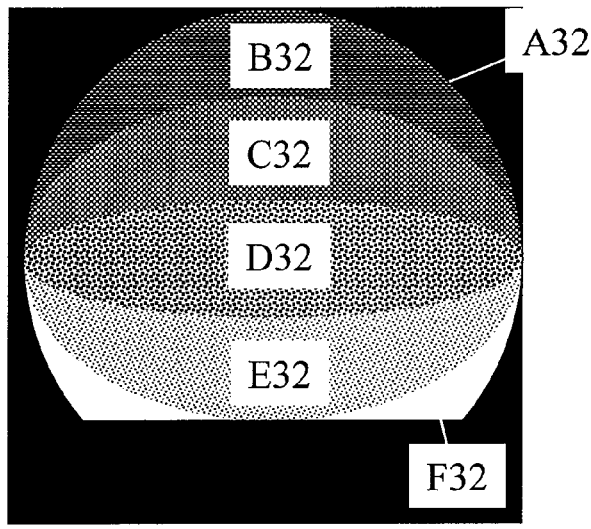
(b) y-COMPONENT NORMAL IMAGE
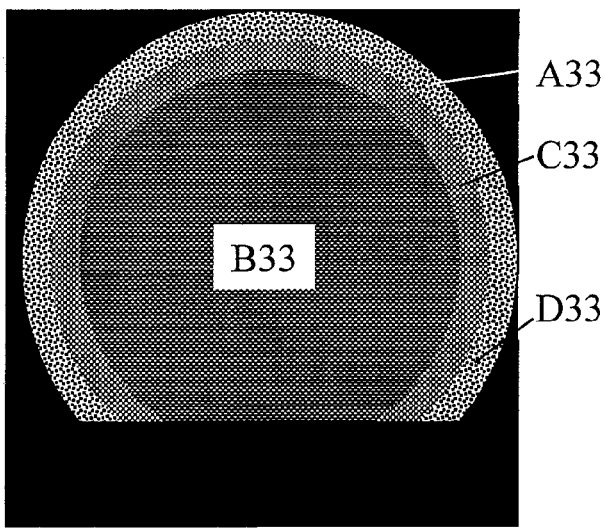
(c) z-COMPONENT NORMAL IMAGE

FIG.29
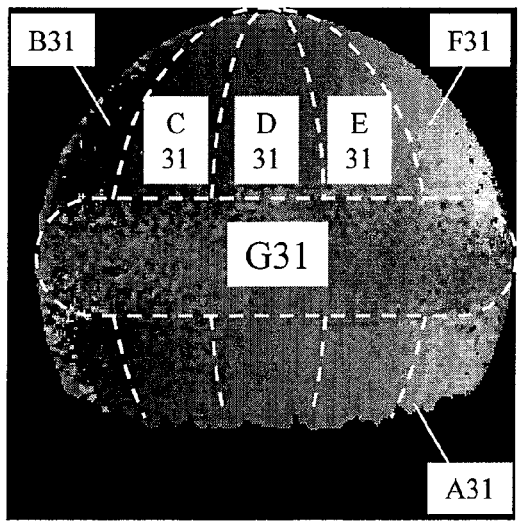
(a) x-COMPONENT NORMAL IMAGE
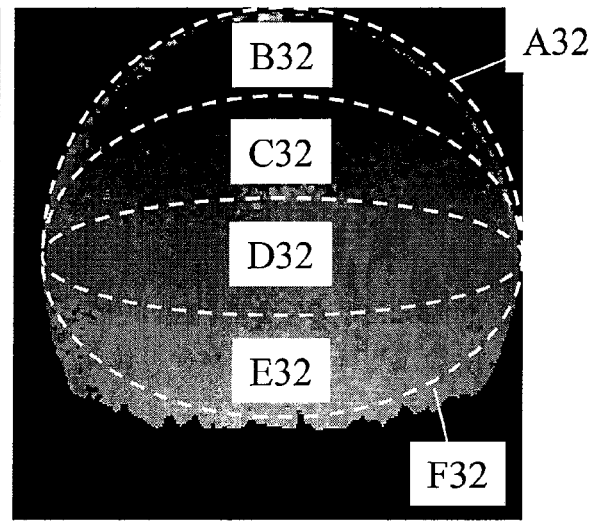
(b) y-COMPONENT NORMAL IMAGE
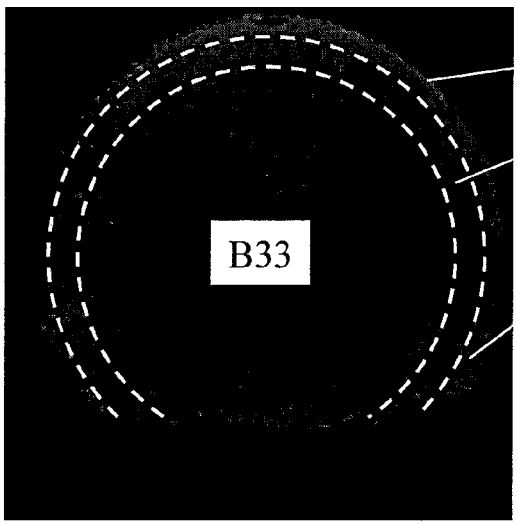
(c) z-COMPONENT NORMAL IMAGE

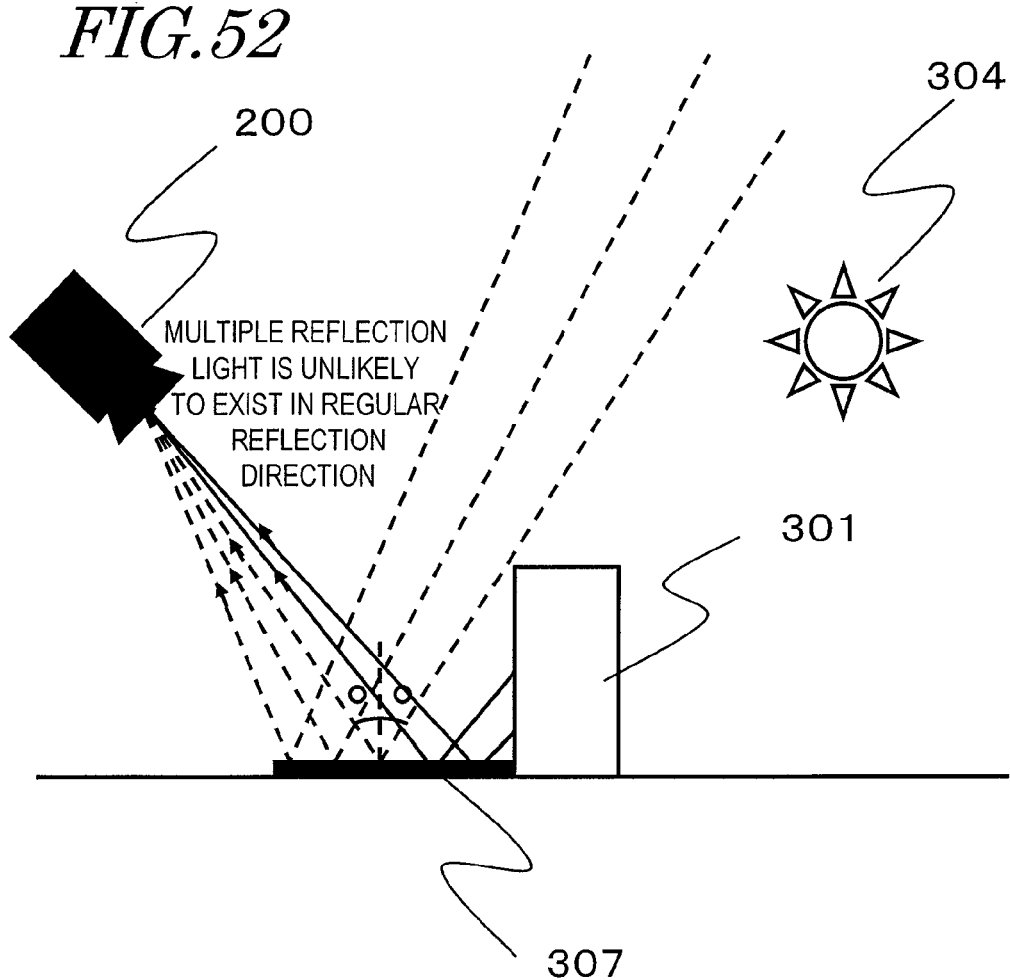

FIG.63
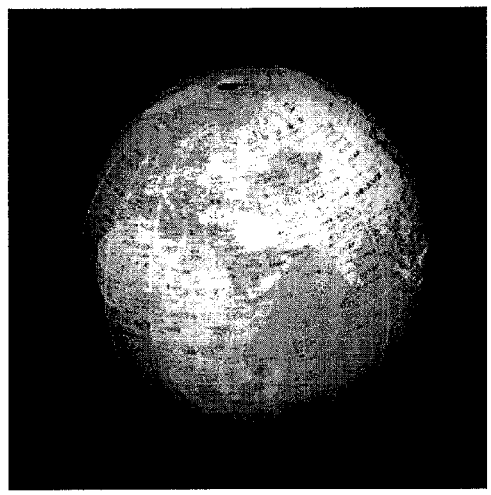
(a) THIRD IMAGE
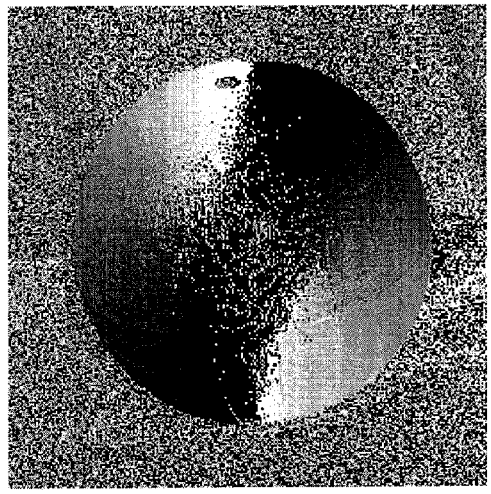
(b) POLARIZATION PHASE $\phi$ max3
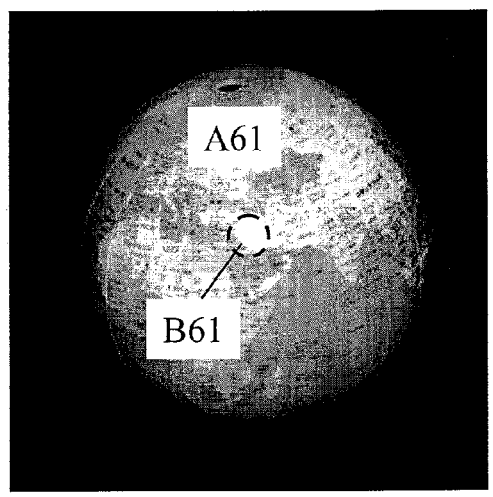
(c) THIRD IMAGE
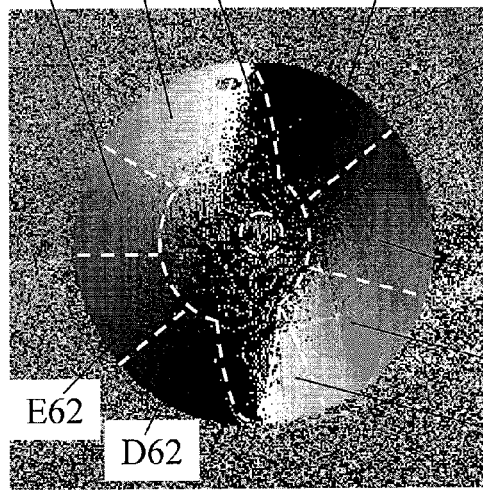
(d) POLARIZATION PHASE $\phi$ max3

(a) THIRD IMAGE    (b) POLARIZATION PHASE $\phi max3$

FIG. 65
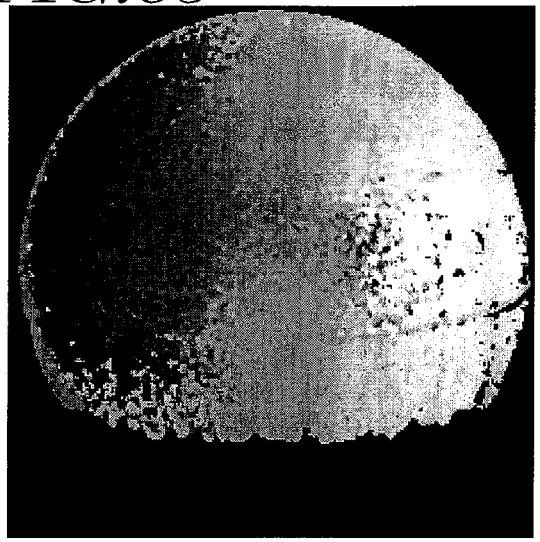
(a) x-COMPONENT NORMAL IMAGE
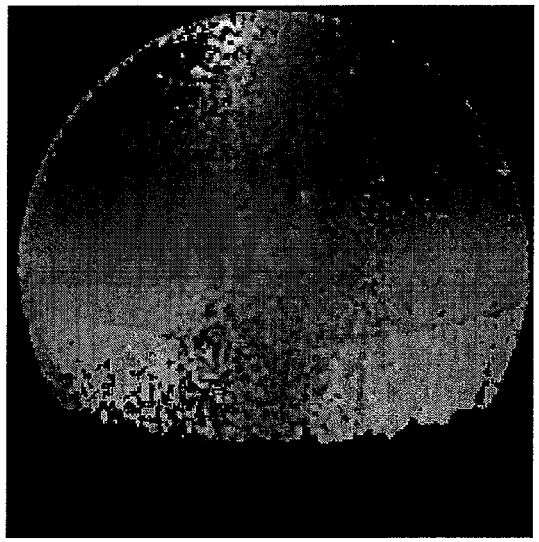
(b) y-COMPONENT NORMAL IMAGE
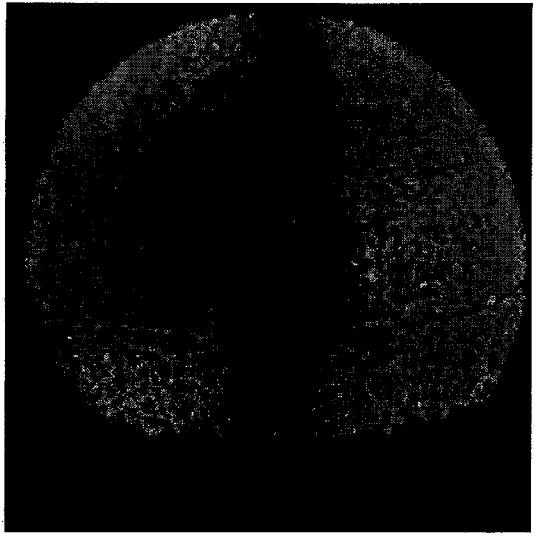
(c) z-COMPONENT NORMAL IMAGE FIG.66
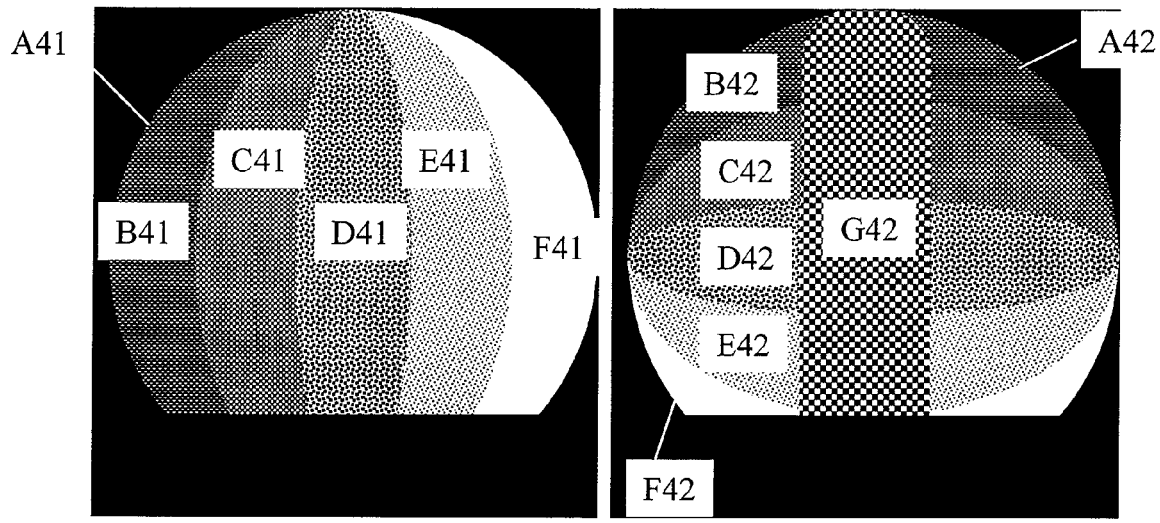
(a) x-COMPONENT NORMAL IMAGE
(b) y-COMPONENT NORMAL IMAGE
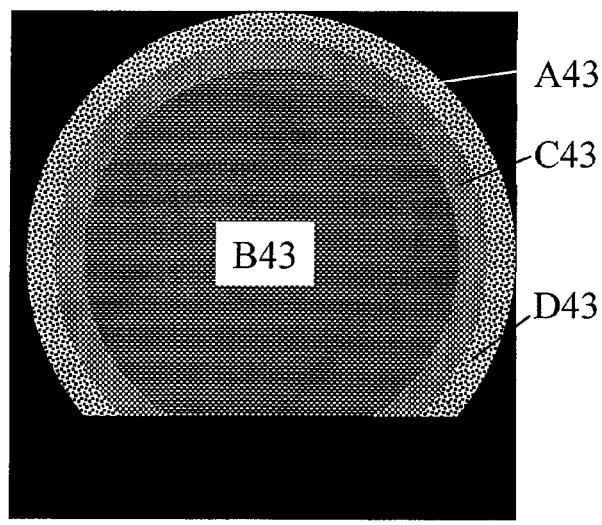
(c) z-COMPONENT NORMAL IMAGE

FIG.67
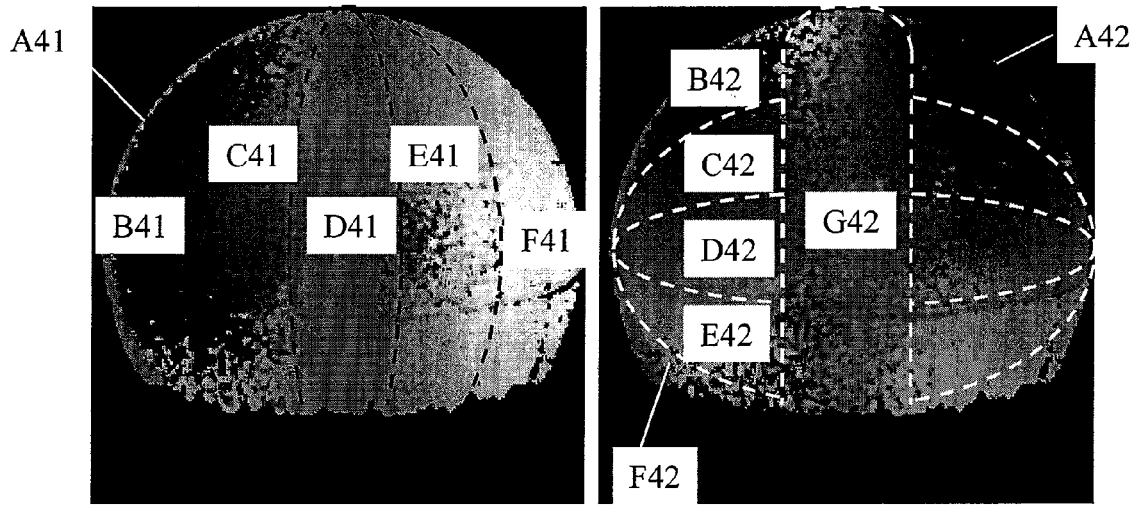
(a) x-COMPONENT NORMAL IMAGE
(b) y-COMPONENT NORMAL IMAGE
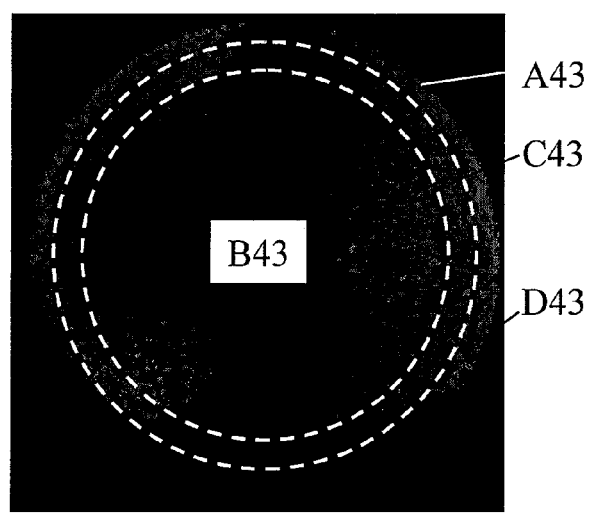
(c) z-COMPONENT NORMAL IMAGE

FIG.68
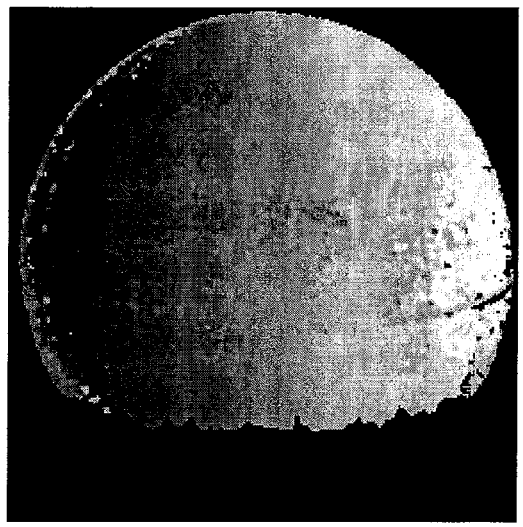
(a) x-COMPONENT NORMAL IMAGE
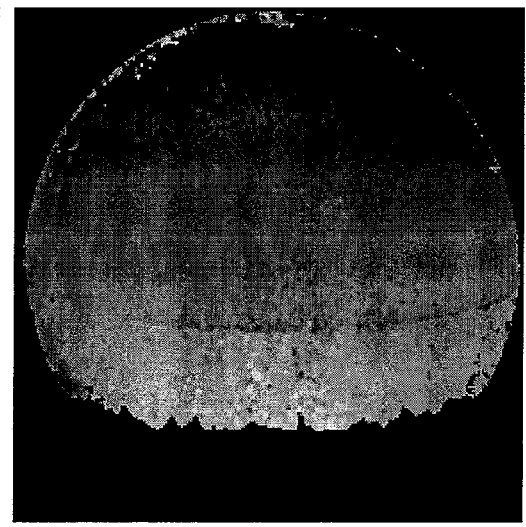
(b) y-COMPONENT NORMAL IMAGE
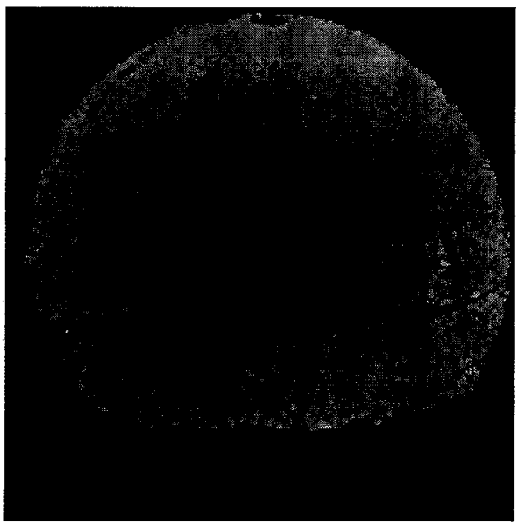
(c) z-COMPONENT NORMAL IMAGE
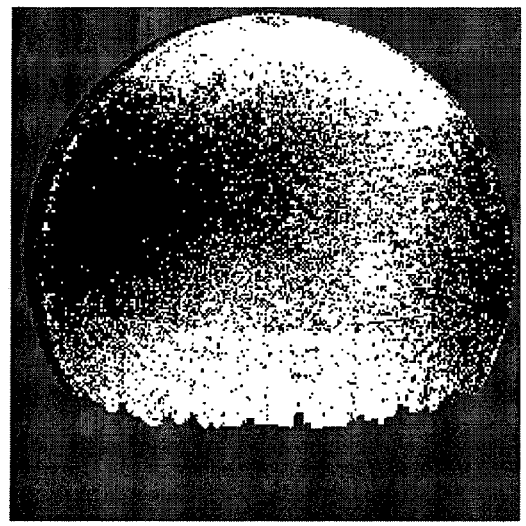
(d) OPTIMAL NORMAL SELECTION RESULT

FIG.69
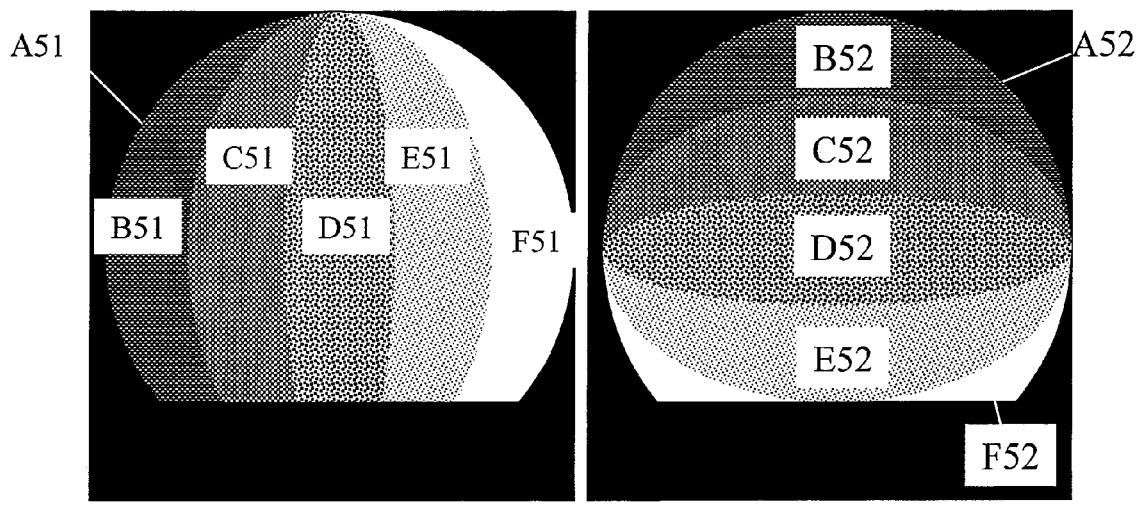
(a) x-COMPONENT NORMAL IMAGE
(b) y-COMPONENT NORMAL IMAGE
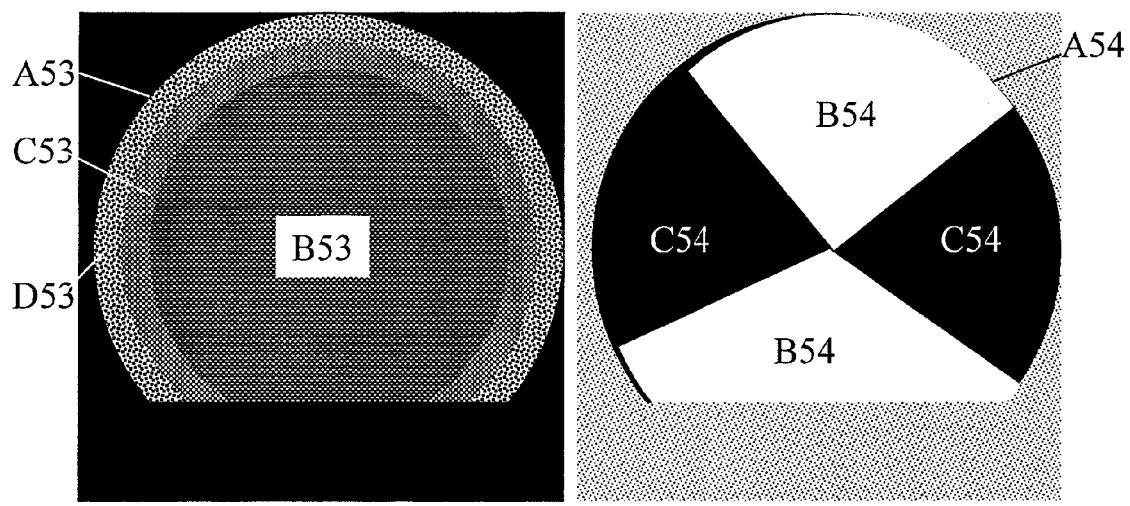
(c) z-COMPONENT NORMAL IMAGE
(d) OPTIMAL NORMAL SELECTION RESULT

FIG. 79
NORMAL IMAGE
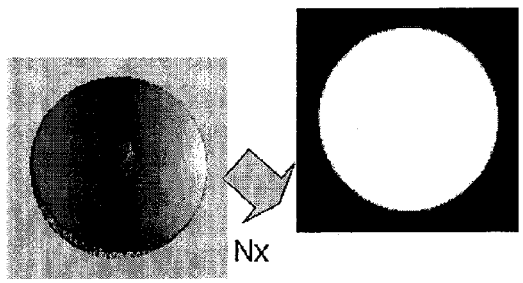
MASK IMAGE
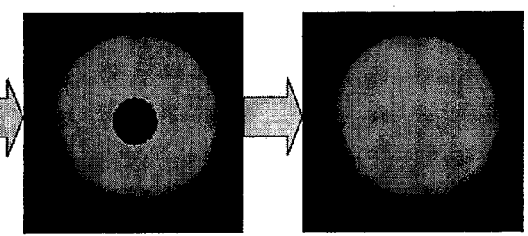
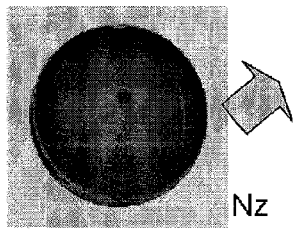
RESTORED "DEPTH" IMAGE FIG.81
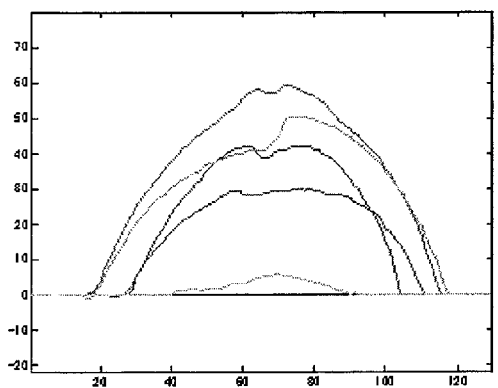
(1) INTEGRATION OF NORMALS (INITIAL SURFACE)
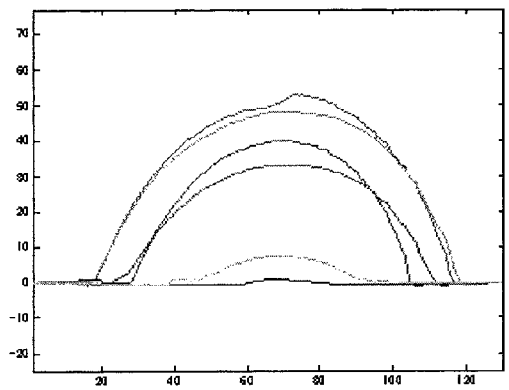
(2) OPTIMIZATION USING GRADIENT SPACE
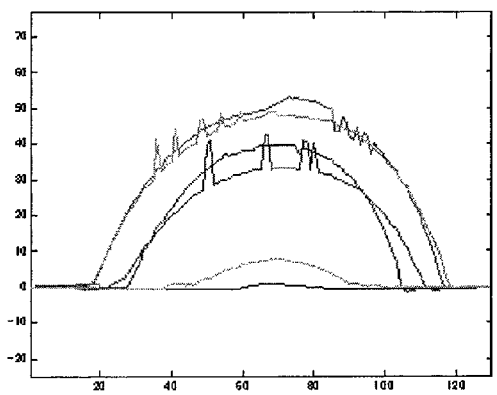
(3) INTRODUCTION OF STEREO CONTROL POINTS
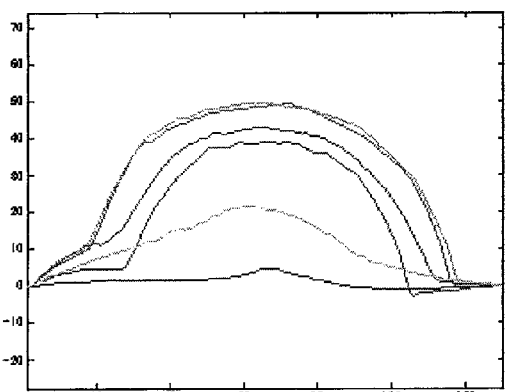
(4) REPRODUCED SHAPE BY OPTIMIZATION WITH CONTROL POINT CONSTRAINT
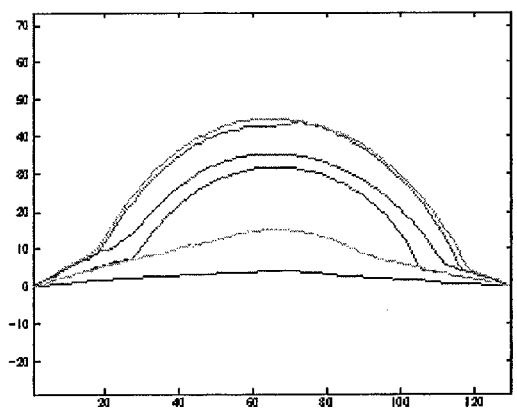
(5) SHAPE REPRODUCED "WITH PRIORITY ON SMOOTHNESS"

FIG.87
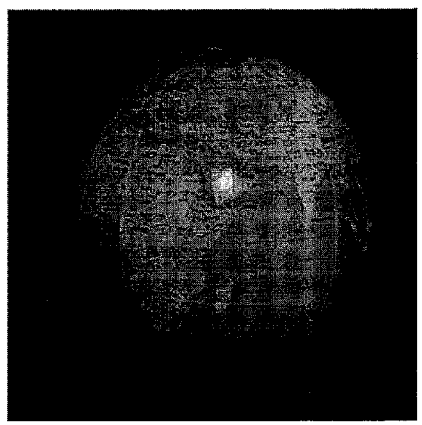
8701 INPUT IMAGE (LEFT)
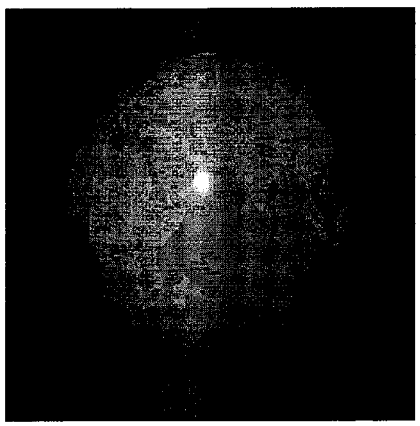
8702 INPUT IMAGE (RIGHT)
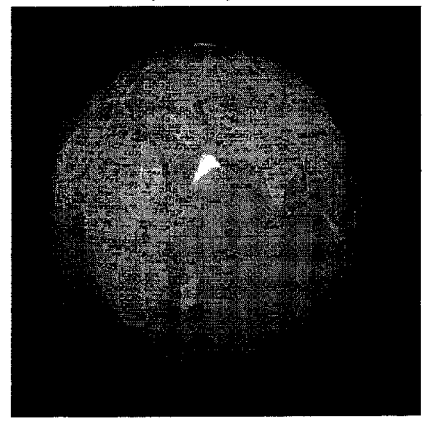
8703 SYNTHESIZED INTERMEDIATE VIEWPOINT IMAGE
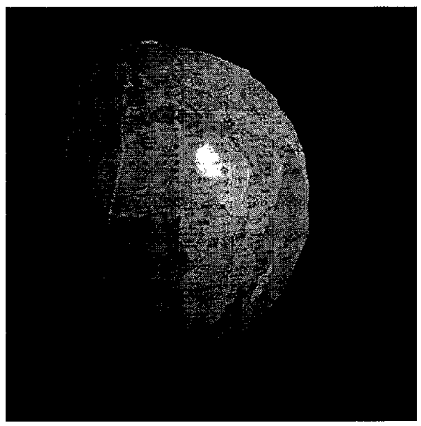
8704 VIEWPOINT MOVEMENT (45 DEGREES TO LEFT)
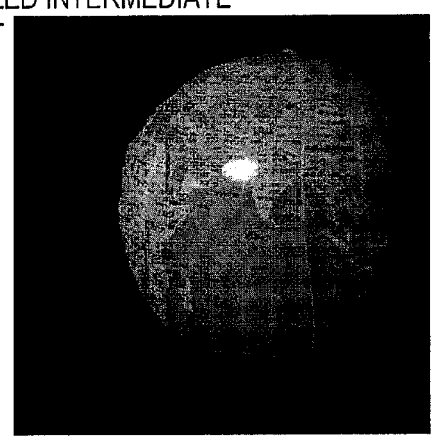
8705 VIEWPOINT MOVEMENT (45 DEGREES TO RIGHT)

IMAGE PROCESSING APPARATUS, METHOD AND COMPUTER PROGRAM FOR GENERATING NORMAL INFORMATION, AND VIEWPOINT-CONVERTED IMAGE GENERATING APPARATUS

TECHNICAL FIELD

The present invention relates to a technique for capturing an image of a subject to thereby generate normal information on the surface of the subject, and more particularly to a technique for generating normal information from polarization images captured from a plurality of viewpoints. The present invention further relates to a technique for generating an image as viewed from a viewpoint position different from a viewpoint position from which an image of the subject was captured.

BACKGROUND ART

It has been said that camera-equipped mobile telephones, digital cameras, digital camcorders, etc., will in the future have definitions as high as those of HDTVs, and they have been downsized for added values. However, downsizing the optical system and the image sensor will encounter the fundamental image-capturing limitations such as the sensitivity and the lens diffraction limit, and increasing the definition is expected to reach its limit in the future. Then, it will be effective to improve the image quality by adding information quantities relating to various physical characteristics used for image generation in computer graphics in addition to the insufficient image information of the subject obtained. For this, one needs to go over the limits of the conventional 2-dimensional image processing and to obtain 3-dimensional shape information of the subject and obtain physical information from the image generation process such as information of the light source illuminating the subject.

In order to input shape information, there is needed a distance-measuring system such as a range finder that emits laser light or an LED light source or a differential stereo vision system. However, such a distance-measuring system has limitations, e.g., data can be obtained for a distance of only up to several meters between the camera and the subject, and applicable subjects are limited to solid and bright diffusive objects, in addition to being a large-scale system. Then, it cannot be used for capturing images in an outdoor scene at a long distance, such as at a children's field day, or for capturing images of people, where hair and clothes are important.

Moreover, these methods obtain depth information as the 3-dimensional shape information. However, normal information, but not depth information, is very effective as physical information from the image generation process. Needless to say, it is a widely-used technique to obtain normal information from depth information obtained by these methods (e.g., Non-Patent Document 1), but it is known in the art that the precision of normal information so obtained is insufficient (e.g., Non-Patent Document 2).

That is, in order to achieve the above object with outdoor scenes or general subjects, there is needed a method for directly sensing (measuring) normal information in a completely passive manner.

Known methods for directly measuring normal information include a so-called "shape from shading" method such as a photometric stereo, and a method utilizing polarization. However, the former is an active sensing method, and cannot be called a passive sensing method, because the light source position needs to be known or the light source position needs to be varied.

As a method utilizing polarization, Patent Document 1, for example, discloses a method for generating local normal information of a subject by observing the specular reflection component while rotating a polarizing plate attached in front of the camera lens without making a special assumption on the subject illumination (random polarization: non-polarized lighting). A surface normal of a subject has two degrees of freedom, and the normal is determined by obtaining two angles: one being the incident plane that contains the incident light and the reflected light, and the other being the angle of incidence within the incident plane. Information of the incident plane of the specular reflection component is obtained from the angle of a rotated polarizing plate at which the intensity takes the minimum value.

Non-Patent Document 3 obtains, among the normal information of the subject, the angle (one degree of freedom) of the emittance plane that contains the incident light and the reflected light, by a method of observing the diffuse reflection component while rotating a polarizing plate attached in front of the camera lens without making a special assumption on the subject illumination (random polarization: non-polarized lighting). Information of the emittance plane of the diffuse reflection component is obtained from the angle of a rotated polarizing plate at which the intensity takes the maximum value.

Non-Patent Document 4 obtains the angle (one degree of freedom) by a method similar to that of Non-Patent Document 3, and further obtains the normal direction vector by directly utilizing the degree of polarization.

Moreover, Non-Patent Document 5 measures the normal information even with a texture-less subject by combining the polarization information and the shape from shading method.

Citation List

Patent Literature

[Patent Document 1] U.S. Pat. No. 5,028,138

Non-patent Literature

[Non-Patent Document 1] H. Hoppe, T. DeRose, T. Duchamp, J. McDonald, and W. Stuetzle, "Surface reconstruction from unorganized points," Computer Graphics (SIGGRAPH '92 Proceedings), pp. 71-78, 1992.

[Non-Patent Document 2] Tomoaki Higo, Daisuke Miyazaki, Katsushi Ikeuchi, "Simultaneous Determination of Shape and Reflection Parameters from Shading", Meeting on Image Recognition and Understanding (MIRU2007), pp. 1093-1098, 2007

[Non-Patent Document 3] Ondfej Drbohlav and Sara Radim, "Using polarization to determine intrinsic surface properties", Proc. SPIE Vol. 3826, pp. 253-263, 1999

[Non-Patent Document 4] G. A. Atkinson and E. R. Hancock, "Recovery of surface orientation from diffuse polarization," IEEE Transactions of Image Processing, Vol. 15, No. 6, pp. 1653-1664, 2006

[Non-Patent Document 5] Gary A. Atkinson and Edwin R. Hancock, "Shape Estimation Using Polarization and Shading from Two Views", IEEE Transactions on Pattern Analysis and Machine Intelligence, Vol. 29, Iss. 11, pp. 2001-2017, 2007

SUMMARY OF INVENTION

Technical Problem

However, any of the documents above has problems. Specifically, they are as follows.

Since the technique of Patent Document 1 above only deals with the specular reflection component, it is not possible to obtain normal information for the entire subject unless a special light source is used.

The technique of Non-Patent Document 2 requires a very large number of images with different light source positions, and it is therefore not a passive method.

The technique of Non-Patent Document 3 only deals with the normal's one degree of freedom of the diffuse reflection component, and is not capable of correctly obtaining normal information in an area of different reflection characteristics such as the specular reflection component. Moreover, with the technique of Non-Patent Document 3, a light source is placed near the camera in order to remove the influence of the specular reflection component. Thus, it also requires a special light source, and cannot be called a passive method.

Moreover, in Non-Patent Document 4, the normal direction vector is obtained directly from the degree of polarization. However, since degree-of-polarization information is very likely to be influenced by multiple reflection, etc., it has significantly limited applicability in terms of the material or shape of the subject and the image-capturing environment.

Non-Patent Document 5 captures images with the subject placed on a turning table, and is therefore also not a passive method.

Moreover, with recent cameras, the dynamic range has been increased. Therefore, polarized light due to the specular reflection component and polarized light due to the diffuse reflection component are obtained at the same time, and there is needed a method for obtaining normal information for both areas.

Solution to Problem

An image processing apparatus of the present invention is an image processing apparatus for capturing an image of a subject and thereby passively generating normal information on a surface of the subject, comprising: a stereo polarization image capturing section for receiving a plurality of polarized light of different polarization directions at different viewpoint positions and obtaining a plurality of polarization images of different viewpoint positions; and a normal information generating section for estimating a normal direction vector of the subject based on the plurality of polarization images of different viewpoint positions.

In one embodiment, the image processing apparatus further comprises: a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light; a stereo correspondence obtaining section for estimating pixel-by-pixel correspondence between the plurality of polarization images of different viewpoint positions; a segmentation section for dividing a polarization image into areas each having a common optical property based on similarity in at least one of the intensity information of the polarization image and the polarization information regarding the plurality of polarized light; and a normal's one-degree-of-freedom estimating section for estimating a normal's one degree of freedom on the surface of the subject corresponding to each area divided by the segmentation section based on the polarization information, for each of the plurality of polarization images, wherein the normal information generating section estimates a normal direction vector based on the normal's one-degree-of-freedoms estimated by the normal's one-degree-of-freedom estimating section and the correspondence between the plurality of polarization images obtained by the stereo correspondence obtaining section.

In one embodiment, the image processing apparatus further comprises: a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light; a stereo correspondence obtaining section for identifying a feature point contained in any of the plurality of polarization images of different viewpoint positions and searching through the other polarization images based on the feature point, thereby identifying feature points corresponding to each other between the plurality of polarization images, so as to estimate pixel-by-pixel correspondence between the plurality of polarization images based on the feature points; a segmentation section for dividing a polarization image into areas each having a common optical property based on similarity in at least one of the intensity information of the polarization image and the polarization information regarding the plurality of polarized light; and a normal's one-degree-of-freedom estimating section for estimating a normal's one degree of freedom on the surface of the subject corresponding to each area divided by the segmentation section based on the polarization information, for each of the plurality of polarization images, wherein the normal information generating section estimates a normal direction vector based on the normal's one-degree-of-freedoms estimated by the normal's one-degree-of-freedom estimating section and the correspondence between the plurality of polarization images obtained by the stereo correspondence obtaining section.

In one embodiment, the polarization information obtaining section generates, as the polarization information, at least one of a degree of polarization, a polarization phase, a polarization estimation error, a polarization maximum intensity value, and a polarization minimum intensity value.

In one embodiment, the segmentation section divides the surface of the subject into a diffuse reflection area and a specular reflection area.

In one embodiment, the segmentation section divides the surface of the subject into a diffuse reflection area, a specular reflection area and a shaded area.

In one embodiment, the segmentation section divides the surface of the subject into a diffuse reflection area, a specular reflection area, an attached shadow area and a cast shadow area.

In one embodiment, the segmentation section divides the surface of the subject into a diffuse reflection area, a specular reflection area, a stereo unmatched area and an occlusion area.

In one embodiment, for the diffuse reflection area, the normal's one-degree-of-freedom estimating section generates a polarization main axis angle, at which the intensity takes a maximum value according to the correspondence, as normal information of an emittance plane of the subject corresponding to the area.

In one embodiment, for the stereo unmatched area and the occlusion area, the normal's one-degree-of-freedom estimating section generates a normal direction vector based on a fact that a normal direction vector exists on a plane perpendicular to an optical axis.

In one embodiment, for the specular reflection area and the attached shadow area, the normal's one-degree-of-freedom estimating section generates a polarization main axis angle, at which the intensity takes a minimum value according to the correspondence, as normal information of an incident plane of the subject corresponding to the area.

In one embodiment, for a plurality of polarization images of different viewpoint positions, the normal information generating section generates a normal direction vector by obtaining a line of intersection of the incident plane or the emittance plane estimated by the normal's one-degree-of-freedom estimating section.

In one embodiment, the normal information generating section removes ambiguity of the generated normal direction vector by evaluating a correlation between the generated normal direction vector and a viewing direction.

In one embodiment, the stereo correspondence obtaining section obtains correspondence between stereo images by using the polarization minimum intensity value obtained by the polarization information obtaining section.

In one embodiment, for an occlusion area, the normal information generating section generates, as the normal direction vector, a vector perpendicular to a viewing vector on an incident plane or an emittance plane estimated by the normal's one-degree-of-freedom estimating section based on a fact that a normal direction vector is perpendicular to a viewing vector.

Another image processing apparatus of the present invention is an image processing apparatus for capturing an image of a subject and thereby generating normal information on a surface of the subject, comprising: a stereo polarization image capturing section for receiving a plurality of polarized light of different polarization directions at different viewpoint positions and obtaining a plurality of polarization images of different viewpoint positions; a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light; a stereo correspondence obtaining section for estimating pixel-by-pixel correspondence between the plurality of polarization images of different viewpoint positions; a normal's one-degree-of-freedom estimating section for estimating plurality of normal's one-degree-of-freedom candidates on a corresponding subject surface by switching between a process assuming a specular reflection component and a process assuming a diffuse reflection component, based on the polarization information, for each of the plurality of polarization images; a normal information generating section for generating a plurality of normal direction vector candidates based on the normal's one-degree-of-freedoms estimated by the normal's one-degree-of-freedom estimating section and the correspondence between the plurality of polarization images obtained by the stereo correspondence obtaining section; and an optimal normal selection section for selecting one of the plurality of normal direction vector candidates generated by the normal information generating section as an optimal normal direction vector.

In one embodiment, the normal information generating section selects the optimal normal direction vector based on at least one of a continuity of a normal direction vector, a spatial continuity of the specular reflection component and the diffuse reflection component, polarization information, a normal direction vector in an area near an occluding edge, normal information, and depth information.

In one embodiment, the image processing apparatus further comprises a reliability estimating section for estimating reliability of the normal direction vector generated by the normal information generating section and discarding the normal direction vector depending on how low the reliability is.

In one embodiment, the normal information generating section replaces the normal direction vector with a normal direction vector obtained based on depth information, depending on how low the reliability is.

In one embodiment, the normal information generating section replaces the normal direction vector with a normal direction vector obtained by performing an interpolation process for nearby normal direction vectors, depending on how low the reliability is.

In one embodiment, the reliability estimating section estimates reliability of a normal direction vector based on at least one of the polarization information obtained by the polarization information obtaining section, an area division result from the segmentation section, the normal's one-degree-of-freedom information estimated by the normal's one-degree-of-freedom estimating section, and the normal direction vector generated by the normal information generating section.

In one embodiment, the reliability estimating section varies a magnitude of the reliability of the normal direction vector estimated depending on a magnitude of an angle between incident planes or emittance planes, which are the normal's one-degree-of-freedom information estimated by the normal's one-degree-of-freedom estimating section, for a plurality of polarization images of different viewpoint positions.

In one embodiment, the segmentation section divides the surface of the subject as a shaded area; and the reliability estimating section estimates the reliability of the normal direction vector to be relatively low in an area divided as a shaded area by the segmentation section.

In one embodiment, the segmentation section divides the surface of the subject as a cast shadow area; and the reliability estimating section estimates the reliability of the normal direction vector to be relatively low in an area divided as a cast shadow area by the segmentation section.

In one embodiment, the reliability estimating section calculates normal information from the polarization information obtained by the polarization information obtaining section and an area division result from the segmentation section, and compares the calculated normal information with the normal direction vector generated by the normal information generating section, so as to vary the reliability of the normal direction vector according to a difference therebetween.

Still another image processing apparatus of the present invention is an image processing apparatus for capturing an image of a subject and thereby generating normal information on a surface of the subject, comprising: a stereo polarization image capturing section for receiving a plurality of polarized light of different polarization directions at different viewpoint positions and obtaining three or more polarization images of different viewpoint positions of the subject; a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light; a stereo correspondence obtaining section for estimating pixel-by-pixel correspondence between the plurality of polarization images of different viewpoint positions; a segmentation section for dividing a polarization image into areas each having a common optical property based on similarity in at least one of the intensity information of the polarization image and the polarization information regarding the plurality of polarized light; a normal's one-degree-of-freedom estimating section for estimating a normal's one degree of freedom on a corresponding subject surface by switching processes from one to another for each of areas divided by the segmentation section, based on the polarization information; a normal information generating section for estimating a plurality of normal direction vectors based on correspondence between the normal's one-degree-of-freedoms estimated by the normal's one-degree-of-freedom estimating section and the plurality of polarization images obtained by the stereo correspondence obtaining section; and an optimal normal selection section for selecting one of the plurality of normal direction vector candidates generated by the normal information generating section as an optimal normal direction vector.

In one embodiment, the normal information generating section generates a plurality of normal direction vector candidates for each set of two polarization images from the three or more polarization images of different viewpoint positions.

In one embodiment, the optimal normal selection section selects one of the plurality of normal direction vector candidates as an optimal normal direction vector, based on at least one of the polarization image captured by the stereo polarization image capturing section, the polarization information obtained by the polarization information obtaining section, an area division result from the segmentation section, the normal's one-degree-of-freedom information estimated by the normal's one-degree-of-freedom estimating section, and the normal direction vector generated by the normal information generating section.

In one embodiment, the optimal normal selection section estimates, as the optimal normal direction vector, a normal direction vector candidate for which an angle is largest between incident planes or emittance planes, which are the normal's one-degree-of-freedom information estimated by the normal's one-degree-of-freedom estimating section, for the three or more polarization images of different viewpoint positions.

In one embodiment, the optimal normal selection section calculates normal information based on degree-of-polarization information estimated by the reliability estimating section and an area division result from the segmentation section, and compares the calculated normal information with the normal direction vector generated by the normal information generating section, so as to estimate, as the optimal normal direction vector, a normal direction vector candidate for which a difference therebetween is minimum.

Still another image processing apparatus of the present invention is an image processing apparatus for capturing an image of a subject and thereby generating normal information on a surface of the subject, comprising: a stereo polarization image capturing section for receiving a plurality of polarized light of different polarization directions at different viewpoint positions and obtaining three or more polarization images of different viewpoint positions of the subject; a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light; a stereo correspondence obtaining section for estimating pixel-by-pixel correspondence between the plurality of polarization images of different viewpoint positions; a segmentation section for dividing a polarization image into areas each having a common optical property based on similarity in at least one of the intensity information of the polarization image and the polarization information regarding the plurality of polarized light; a normal's one-degree-of-freedom estimating section for estimating a normal's one degree of freedom on a corresponding subject surface by switching processes from one to another for each of areas divided by the segmentation section, based on the polarization information; and a normal information generating section for estimating a plurality of normal direction vectors based on correspondence between the normal's one-degree-of-freedoms estimated by the normal's one-degree-of-freedom estimating section and the plurality of polarization images obtained by the stereo correspondence obtaining section.

In one embodiment, the normal information generating section generates, as a normal information vector, a direction vector for which an angle is largest between a plurality of incident planes or emittance planes estimated by the normal's one-degree-of-freedom estimating section.

In one embodiment, the normal information generating section selects a normal direction vector by using, as a constraint, at least one of a continuity of a normal direction vector, a spatial continuity of the specular reflection component and the diffuse reflection component, polarization information, a normal direction vector in an area near an occluding edge, normal information, and depth information.

In one embodiment, the stereo polarization image capturing section receives, at the different viewpoint positions, light from the subject having passed through a plurality of polarizers of different polarization main axis angles, as a plurality of polarized light of different polarization directions.

In one embodiment, a polarizer whose polarization main axis angle can be varied by rotating the polarizer is rotated, whereby the stereo polarization image capturing section receives, at the different viewpoint positions, light from the subject having passed through the polarizer, as a plurality of polarized light of different polarization directions.

An image processing method of the present invention is a normal information generating method for capturing an image of a subject and thereby generating normal information on a surface of the subject, comprising: a step of receiving a plurality of polarized light of different polarization directions at different viewpoint positions and obtaining a plurality of polarization images of different viewpoint positions; a step of generating polarization information regarding the plurality of polarized light, wherein the polarization information obtaining section generates the polarization information, for each of unit images of each of the plurality of polarization images, based on correspondence between polarization angles and intensities of the plurality of polarized light; a step of estimating pixel-by-pixel correspondence between the plurality of polarization images of different viewpoint positions; a step of estimating a plurality of normal's one-degree-of-freedom candidates on a corresponding subject surface by switching between a process assuming a specular reflection component and a process assuming a diffuse reflection component, based on the polarization information, for each of the plurality of polarization images; a step of dividing a polarization image into areas each having a common optical property based on similarity in at least one of the intensity information of the polarization image and the polarization information regarding the plurality of polarized light; a step of estimating a normal's one degree of freedom on a corresponding subject surface by switching processes from one to another for each of areas divided by the segmentation section, based on the polarization information; a step of estimating a plurality of normal direction vectors based on the pixel-by-pixel correspondence between the estimated normal's one degree of freedom and the plurality of polarization images; and a step of selecting one of the plurality of normal direction vector candidates generated as an optimal normal direction vector.

A computer program of the present invention is a computer program for an image processing apparatus for capturing an image of a subject and thereby generating normal information on a surface of the subject, the computer program instructing a computer of the image processing apparatus to perform the steps of the method set forth above.

A viewpoint-converted image generating apparatus of the present invention is a viewpoint-converted image generating apparatus for capturing an image of a subject from a plurality of different viewpoint positions to thereby synthesize an image of the subject as viewed from an arbitrary viewpoint position that is different from the viewpoint positions from which the image of the subject is captured, comprising: a stereo polarization image capturing section for receiving a plurality of polarized light of different polarization directions at the plurality of different viewpoint positions and obtaining a plurality of polarization images of different viewpoint positions; a normal information generating section for estimating, as normal information, a normal direction vector of the subject based on the plurality of polarization images of different viewpoint positions; a shape restoring section for restoring a 3-dimensional shape of the subject from the normal information; and a viewpoint conversion section for converting a viewpoint position of the captured image of the subject based on the 3-dimensional shape.

In one embodiment, the viewpoint-converted image generating apparatus further comprises: a specular reflection image generating section for generating a specular reflection image from a viewpoint-converted image by a predetermined reflection model; a combining section for combining a plurality of images together to thereby generate a single image; and a presentation section for presenting an image, wherein: the viewpoint conversion section viewpoint-converts both a diffuse reflection image obtained by separating a diffuse reflection component and a specular reflection component from an image of the subject and a normal image obtained from the normal information generating section; the specular reflection image generating section generates a specular reflection image from the viewpoint-converted normal image; the combining section combines together the viewpoint-converted diffuse reflection image and the generated specular reflection image; and the presentation section presents the combined image.

In one embodiment, the viewpoint-converted image generating apparatus further comprises a stereo correspondence obtaining section for estimating pixel-by-pixel correspondence between the plurality of polarization images of different viewpoint positions, wherein the shape restoring section restores a 3-dimensional shape of the subject by using a normal image obtained from the normal information generating section, and a 3-dimensional position corresponding to a feature point of a corresponding pixel between the plurality of polarization images obtained from the stereo correspondence obtaining section.

In one embodiment, the viewpoint-converted image generating apparatus comprises a presentation section for sequentially displaying a viewpoint-converted 2-dimensional image on a 2-dimensional screen according to a viewpoint position of an observer.

In one embodiment, the viewpoint-converted image generating apparatus comprises a presentation section for realizing a multi-viewpoint stereoscopic display by generating two parallactic images at a viewpoint position of an observer.

An image generating device of the present invention is an image generating device for capturing an image of a subject and thereby restoring a shape of the subject, comprising: a stereo polarization image capturing section for receiving a plurality of polarized light of different polarization directions at different viewpoint positions and obtaining a plurality of polarization images of different viewpoint positions; a normal information generating section for estimating, as normal information, a normal direction vector of the subject based on the plurality of polarization images of different viewpoint positions; and a shape restoring section for restoring a 3-dimensional shape of the subject from the normal information.

ADVANTAGEOUS EFFECTS OF INVENTION

According to the present invention, an area division between the specular reflection area and the diffuse reflection area is performed by using the polarization information of the subject, and normal information is generated for each area. Therefore, it is possible to passively generate (or estimate) high-precision normal information over a wide area.

BRIEF DESCRIPTION OF DRAWINGS

[FIG. 1] A diagram showing a configuration of an image processing apparatus 500.

[FIG. 2] A table showing a comparison between methods for obtaining 3-dimensional shape information.

[FIG. 3] A flow chart showing the flow of the process performed by the image processing apparatus 500.

[FIG. 11] (a)-(d) show an image captured of the subject being a spherical globe, and the degree of polarization $\rho1$, the polarization phase $\phi max1$ and the polarization estimation error E1 obtained from that image.

[FIG. 12] (a)-(d) are schematic diagrams showing an image captured of the subject being a spherical globe, and the degree of polarization $\rho1$, the polarization phase $\phi max1$ and the polarization estimation error E1 obtained from that image.

[FIG. 13] (a)-(d) are diagrams showing the correspondence between the images shown in FIGS. 11(a)-(d) and the areas shown in FIGS. 12(a)-(d).

[FIG. 14] (a)-(d) show an image captured of the subject being a styrene-foam head model, and the degree of polarization ρ1, the polarization phase φmax1 and the polarization estimation error E1 obtained from that image.

[FIG. 16] (a) and (b) are schematic diagrams illustrating the interpolation process between corresponding points performed by the stereo correspondence obtaining section according to the first embodiment of the present invention.

[FIG. 24] (a)-(d) show images of the subject being a spherical globe captured by a stereo polarization image capturing section, and the polarization phases φmax obtained from the stereo polarization images.

[FIG. 25] (a)-(d) are schematic diagrams showing images of the subject being a spherical globe captured by a stereo polarization image capturing section, and the polarization phases φmax obtained from the stereo polarization images.

[FIG. 26] (a)-(d) are diagrams showing the correspondence between the images shown in FIGS. 24(a)-(d) and the areas shown in FIGS. 25(a)-(d).

[FIG. 27] (a)-(c) show normal images obtained by visualizing the normal direction vectors estimated by the normal information generating device according to the first embodiment of the present invention and the normal direction vector candidates estimated by the normal information generating device according to the sixth embodiment of the present invention.

[FIG. 28] (a)-(c) are schematic diagrams showing normal images obtained by visualizing the normal direction vectors estimated by the normal information generating device according to the first embodiment of the present invention and the normal direction vector candidates estimated by the normal information generating device according to the sixth embodiment of the present invention.

[FIG. 29] (a)-(c) show the correspondence between the images shown in FIGS. 27(a)-(c) and the areas shown in FIGS. 28(a)-(c).

[FIG. 52] A schematic diagram illustrating how multiple reflection light is incident on a cast shadow area.

[FIG. 53] A schematic table showing an area division criterion for areas divided as shaded areas used by the segmentation section according to the fifth embodiment of the present invention.

[FIG. 63] (a)-(d) are diagrams showing images of the subject being a spherical globe captured by a stereo polarization image capturing section, and the polarization phases $\phi$max obtained from the stereo polarization images.

[FIG. 65] (a)-(c) show normal images obtained by visualizing the normal direction vector candidates estimated by the normal information generating device according to the sixth embodiment of the present invention.

[FIG. 66] (a)-(c) are schematic diagrams showing normal images obtained by visualizing the normal direction vector candidates estimated by the normal information generating device according to the sixth embodiment of the present invention.

[FIG. 67] (a)-(c) show the correspondence between the images shown in FIGS. 65(a)-(c) and the areas shown in FIGS. 66(a)-(c).

[FIG. 68] (a)-(d) show normal images obtained by visualizing the normal direction vector selected by an optimal normal selection section according to the sixth embodiment of the present invention and the optimal normal selection result.

[FIG. 69] (a)-(d) are schematic diagrams showing normal images obtained by visualizing the normal direction vector selected by the optimal normal selection section according to the sixth embodiment of the present invention and the optimal normal selection result.

[FIG. 79] A diagram showing the process in which a depth image is generated from the normal image.

[FIG. 81] Graphs showing process results at different steps in the shape restoring section.

[FIG. 87] A diagram showing exemplary results of the generated viewpoint-converted images.

DESCRIPTION OF EMBODIMENTS

Figure 4:
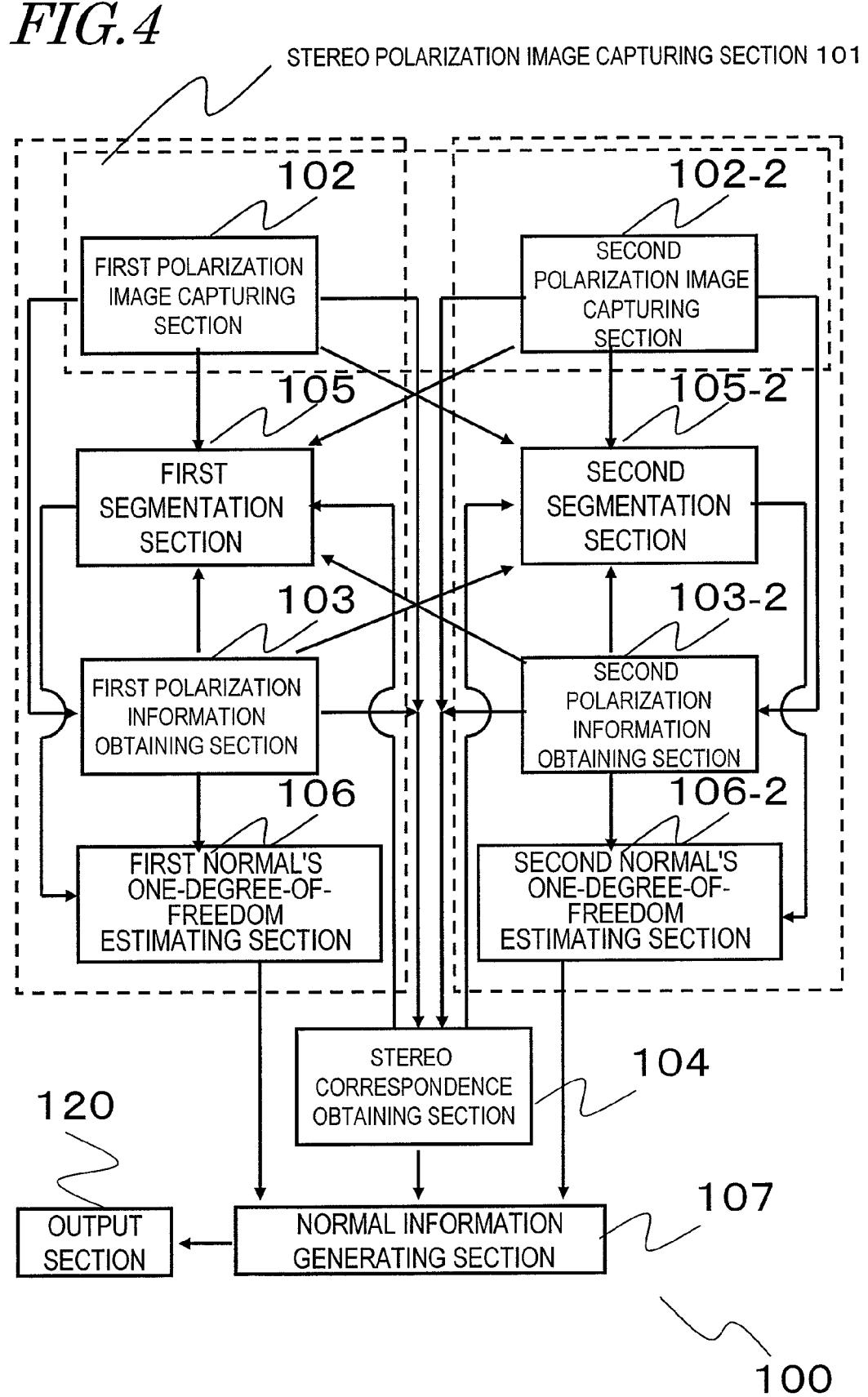
[FIG. 4] A functional block diagram showing a configuration of a normal information generating device according to the first and second embodiments of the present invention.

Embodiments of normal information generating devices of the present invention, and image processing apparatus including the normal information generating devices will be described with reference to the accompanying drawings.

The embodiments to be described below are primarily directed to a normal information generating device of the present invention. Before the description of the embodiments, the configuration and operation of an image processing apparatus including a normal information generating device will first be described.

FIG. 1 shows a configuration of an image processing apparatus 500 of the present invention. The image processing apparatus 500 includes a normal information generating device 501, an image capturing section 502, a database (DB) 503, an image processing section 504, and a presentation section 505.

The normal information generating device 501 is a normal information generating device of one of the first to seventh embodiments to be described below. The normal information generating device 501 generates and outputs normal information on the surface of the subject. This information represents a normal direction vector within the image estimated by the normal information generating device 501. In the present specification, "to estimate normal information (normal direction vector)" may be used to refer to the normal information generating device 501 generating normal information (normal direction vector).

Note that the normal information generating device 501 may be accommodated in a casing, or it may be accommodated in a casing together with the image capturing section 502, the DB 503 and the image processing section 504. In the former case, it may be implemented as an image processing system together with other elements such as the image capturing section 502 (camera), the presentation section 505 (display), etc., to be described later.

The image capturing section 502 is a camera, for example, and captures an image of the subject. The normal information generating devices of the embodiments to be described later each include an image capturing section. Therefore, by using the image capturing section, the image capturing section 502 does not need to be provided separately from the normal information generating device, and can be omitted.

The DB 503 stores subject information, etc. The presentation section 505 is a display, for example, and presents to the user an image produced by the image processing section 504.

The image processing section 504 performs image processes by using the image information captured by the image capturing section 502, the normal direction vector information estimated by the normal information generating device 501, and the subject information stored in the DB 503.

For example, the image processing section 504 may perform an image process using a method called a model-based image synthesis. This method obtains the normal information and the texture information of the subject, and further uses the light source information, the camera information, etc., to thereby synthesize an image from a free viewpoint position or an image under an arbitrary light source environment. Therefore, it has been used as an interactive image presentation method in the fields of digital archive and augmented reality (e.g., Y. Sato, M. D. Wheeler, and K. Ikeuchi, "Object shape and reflectance modeling from observation", SIGGRAPH 97, pp. 379-387, 1997). By using the normal information generating device of the present embodiment as the normal information generating device 501, it is possible to realize a high-precision model-based image synthesis.

Alternatively, the image processing section 504 may perform a model-based image resolution-increasing process. A significant problem in image processes using learning processes has been the variations between the viewpoint position and the light source environment during the learning process and those during the image synthesis process. However, by introducing a model-based method, it is possible to solve this problem and realize a high-precision resolution-increasing process. Such an image processing apparatus 500 can be realized by, for example, Japanese Patent No. 4082714, etc.

Alternatively, the image processing section 504 may perform an image process used for inspecting the surface of the subject, as used widely in FA (Factory Automation), etc. This is a technique for detecting scratches, etc., on the subject surface by comparing the ideal surface normal direction with the actual surface normal direction.

FIG. 2 shows a comparison between methods by which the image processing apparatus 500 obtains 3-dimensional shape information. The normal information generating device 501 passively generates normal information among all the information of the 3-dimensional shape information. A conventional polarization method, etc., are methods that actively obtain normal information, and are different from the present invention in which it is generated passively. The depth information of the 3-dimensional shape information will not be described below as it is not a subject of the present invention.

FIG. 3 is a flow chart showing the flow of the process performed by the image processing apparatus 500. Reference numerals 501 to 505 attached to broken lines surrounding steps S601 to S605 correspond to the reference numerals of the elements of the image processing apparatus 500 described above, indicating that the processes are performed by the corresponding elements.

First, the image capturing section 502 captures an image of the subject surface (step S601). The normal information generating device 501 estimates the normal direction vector ne of the subject surface by using any of the methods to be described below in conjunction with the various embodiments (step S602).

The image processing section 504 obtains the ideal normal direction vector ni of the subject surface stored in the DB 503 (step S603). The ideal normal direction vector ni of the subject surface may be realized, for example, as shape information produced from the CAD information of the subject. Herein, the order of step S601, step S602 and step S603 is arbitrary, and the steps may be performed successively or may be performed in parallel, needless to say.

The image processing section 504 detects an abnormal normal by comparing the normal direction vector ne of the subject surface estimated by the normal information generating device 501 with the ideal normal direction vector ni of the subject surface stored in the DB 503 (step S604).

The process will be described in detail. First, the image processing section 504 performs the alignment of shape information of the ideal normal direction vector ni by using the image information captured by the image capturing section 502. Then, the image processing section 504 detects the difference between the normal direction vector ne and the ideal normal direction vector ni, and detects, as an abnormal normal, a normal direction vector ne that gives a large difference value. The alignment of shape information using image information may be realized by using techniques known in the art.

The presentation section 505 presents to the user an image of the subject captured by the image capturing section 502 while emphasizing pixels corresponding to abnormal normals detected by the image processing section 504 (step S605). Such a pixel emphasis can be made by, for example, performing a process such as displaying pixels corresponding to abnormal normals in red color.

Note that the above process of detecting the abnormal normal using the normal information is an example. By using the obtained normal information together with the image information of the subject, it is possible to add information quantities relating to various physical characteristics used for image generation. Then, it is possible to present computer graphics of a higher quality than computer graphics displayed by using only the image information of the subject.

Various embodiments of the normal information generating device will now be described.

First Embodiment

First, the outline of a normal information generating device according to a first embodiment of the present invention will be described.

FIG. 4 is a functional block diagram showing a configuration of a normal information generating device 100 of the present embodiment. The normal information generating device 100 captures an image of the subject to thereby generate normal information on the surface of the subject.

The normal information generating device 100 includes polarization image capturing sections 102 and 102-2, which together form a stereo polarization image capturing section 101, polarization information obtaining sections 103 and 103-2, a stereo correspondence obtaining section 104, segmentation sections 105 and 105-2, normal's one-degree-of-freedom estimating sections 106 and 106-2, a normal information generating section 107, and an output section 120.

Among others, the processes of the second polarization image capturing section 102-2, the second polarization information obtaining section 103-2, the second segmentation section 105-2 and the second normal's one-degree-of-freedom estimating section 106-2 are equivalent to the processes of the first polarization image capturing section 102, the first polarization information obtaining section 103, the first segmentation section 105 and the first normal's one-degree-of-freedom estimating section 106. Thus, in many cases, only the latter is used in the description below for the sake of simplicity.

The stereo polarization image capturing section 101 is composed of a plurality of polarization image capturing sections 102 and obtains a plurality of polarization images of different viewpoints.

The polarization image capturing section 102 obtains polarization images of the subject by receiving light passing through a plurality of polarizers of different polarization main axis angles.

From the polarization image obtained by the polarization image capturing section 102, the polarization information obtaining section 103 generates polarization information, which is information regarding the received polarized light, by using the correspondence between the polarization main axis angles of the plurality of polarizers and the intensity of light passing through the plurality of polarizers, for each of the image areas of the polarization image.

The stereo correspondence obtaining section 104 estimates the pixel-by-pixel correspondence between the plurality of polarization images obtained by the stereo polarization image capturing section 101.

The segmentation section 105 divides the polarization image into areas each having a common optical property using the similarity (commonness) in at least one of the intensity information of the stereo polarization image and the polarization information of the stereo polarization image generated by the polarization information obtaining section 103. Specifically, the segmentation section 105 divides the image area as the specular reflection area or the diffuse reflection area by using the intensity of the image or the polarization information.

The normal's one-degree-of-freedom estimating section 106 performs a different process for each area divided by the segmentation section 105 by using the polarization information generated by the polarization information obtaining section 103 to thereby estimate the corresponding normal's one degree of freedom on the surface of the subject.

The normal information generating section 107 generates a normal direction vector by integrating together the plurality of normal's one-degree-of-freedoms estimated by the normal's one-degree-of-freedom estimating sections 106 and 106-2, by using the correspondence between images obtained by the stereo correspondence obtaining section 104.

The output section 120 is an output terminal for outputting the normal information. Alternatively, the output section 120 may be a display for outputting the image of the normal based on the normal information, together with the image, or the like, shown in FIG. 11, etc., to be discussed later. In the latter case, the output section 120 corresponds to the presentation section 505 (FIG. 1).

Figure 5:
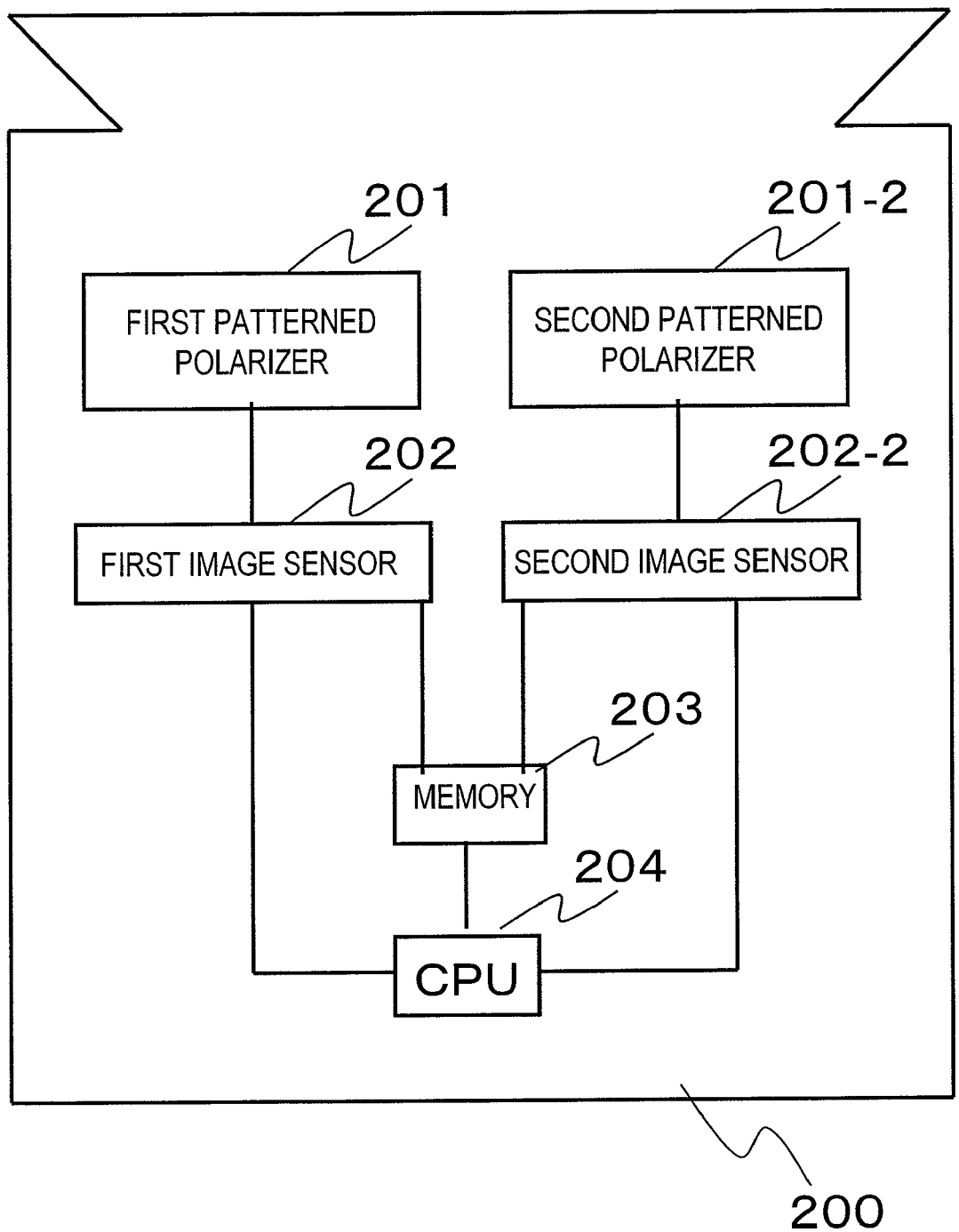
[FIG. 5] A diagram showing an exemplary configuration of a camera including therein a normal information generating device according to the first, second, third, fourth and fifth embodiments of the present invention.
Figure 6:
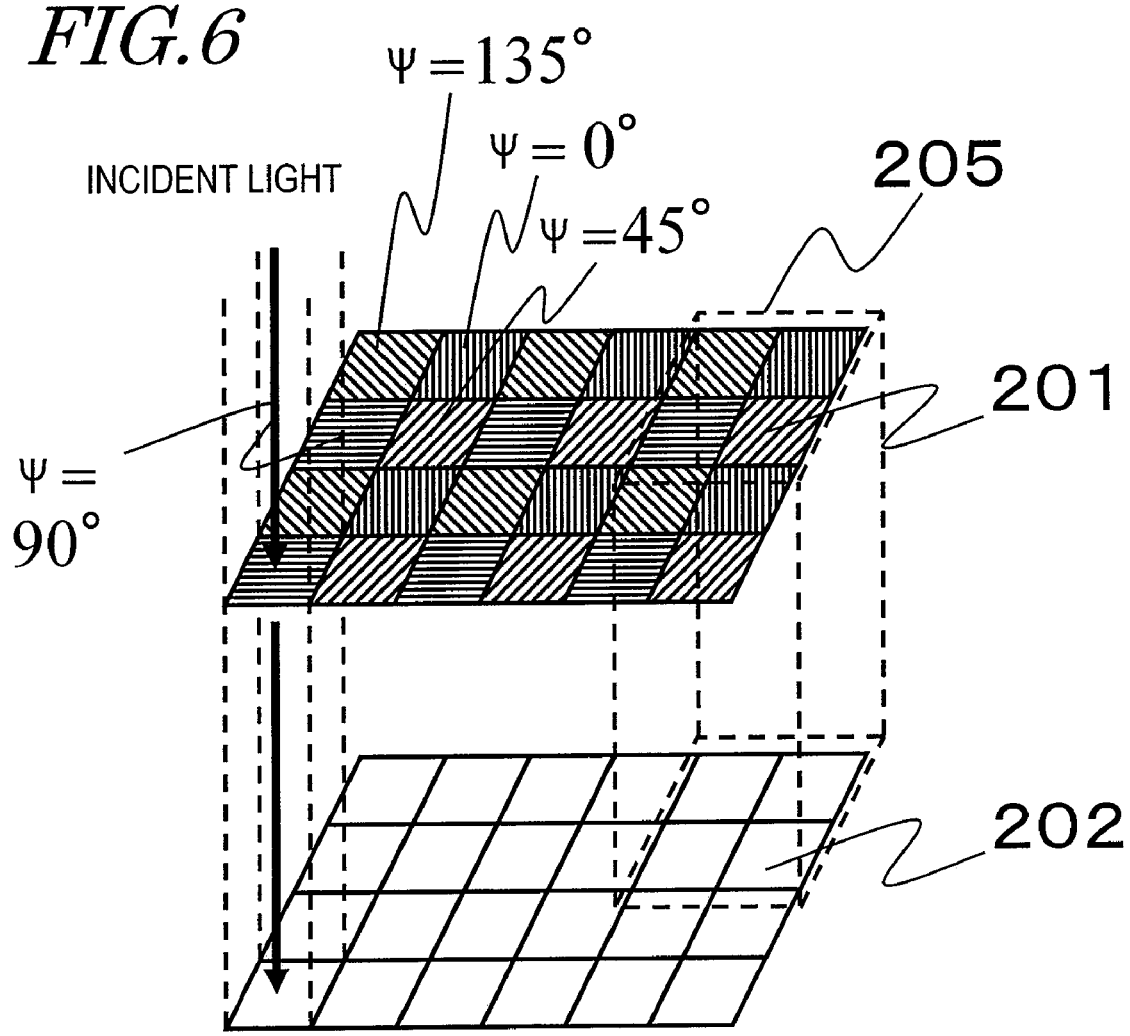
[FIG. 6] A schematic diagram showing a relationship between a patterned polarizer and image sensors of an image capture device of the present invention.

FIG. 5 shows a hardware configuration example of a camera 200 including, therein the normal information generating device 100 of the present embodiment. FIG. 6 is a schematic diagram showing the relationship between a patterned polarizer 201 and the image sensor 202 shown in FIG. 5. The camera 200 is an image capture device having a function of generating normal information, and includes a plurality of patterned polarizers 201 and 201-2, a plurality of image sensors 202 and 202-2, a memory 203, and a CPU 204.

The patterned polarizers 201 and 201-2 are a collection of polarizers arranged in a 2-dimensional pattern, each set including four different polarizers whose polarization main axis angles are $\Psi i=0°, 45°, 90°$ and $135°$, as shown in FIG. 6. Although FIG. 6 only shows the patterned polarizer 201 and the image sensor 202, the same applies to the patterned polarizer 201-2 and the image sensor 202-2. Therefore, only the patterned polarizer 201 and the image sensor 202 will be described in detail below for the sake of simplicity.

The image sensor 202 is a collection of pixels (light-receiving elements) arranged in a 2-dimensional pattern for receiving light passing through the individual polarizers of the patterned polarizer 201, as shown in FIG. 6. It is preferred that the patterned polarizer 201 is provided in parallel to the image-capturing plane of the image sensor 202. Note that the four (four different) polarizers of the patterned polarizer 201 and the corresponding four pixels of the image sensor 202 together form an image-capturing unit 205. The image obtained by the image-capturing unit 205 is a unit of process ("unit image") for the polarization information obtaining section 103, the segmentation section 105, the normal's one-degree-of-freedom estimating section 106, the stereo correspondence obtaining section 104 and the normal information generating section 107. That is, the normal information generating device 100 generates the polarization information, performs an area division, and generates the normal information for each unit image (hereinafter referred to also as "pixel") obtained by the image-capturing unit 205.

The memory 203 includes a RAM as a work area of the CPU 204, and a ROM storing a program, etc.

The CPU 204 is a processor for executing a program stored in the memory 203 to access the memory 203 and control the image sensors 202 and 202-2.

Note that the polarization image capturing section 102 shown in FIG. 4 is implemented by the patterned polarizer 201 and the image sensor 202 shown in FIG. 5. Similarly, the polarization image capturing section 102-2 shown in FIG. 4 is implemented by the patterned polarizer 201-2 and the image sensor 202-2 shown in FIG. 5.

The polarization information obtaining sections 103 and 103-2, the stereo correspondence obtaining section 104, the segmentation sections 105 and 105-2, the normal's one-degree-of-freedom estimating sections 106 and 106-2 and the normal information generating section 107 shown in FIG. 4 are implemented by the CPU 204 shown in FIG. 5 executing a program stored in the memory 203.

For example, a control process described by using a flow chart of the accompanying drawings can be implemented by a program executed by a computer. Such a computer program may be recorded on a recording medium such as a CD-ROM and be in circulation in the market or may be distributed through a telecommunication line such as the Internet. All or some of the components of the normal information generating device and the image processing apparatus may be implemented as a general-purpose processor (semiconductor circuit) executing a computer program. Alternatively, they may be implemented as a dedicated processor including such a computer program integrated with a processor.

The memory 203 may also be used as a work area for storing the polarization image obtained by the polarization image capturing sections 102 and 102-2, the polarization information generated by the polarization information obtaining sections 103 and 103-2, the stereo image correspondence information obtained by the stereo correspondence obtaining section 104, the area division information for the division done by the segmentation sections 105 and 105-2, the normal's one-degree-of-freedom information estimated by the normal's one-degree-of-freedom estimating sections 106 and 106-2, the normal information generated by the normal information generating section 107, and various temporary parameters, etc.

Figure 7:
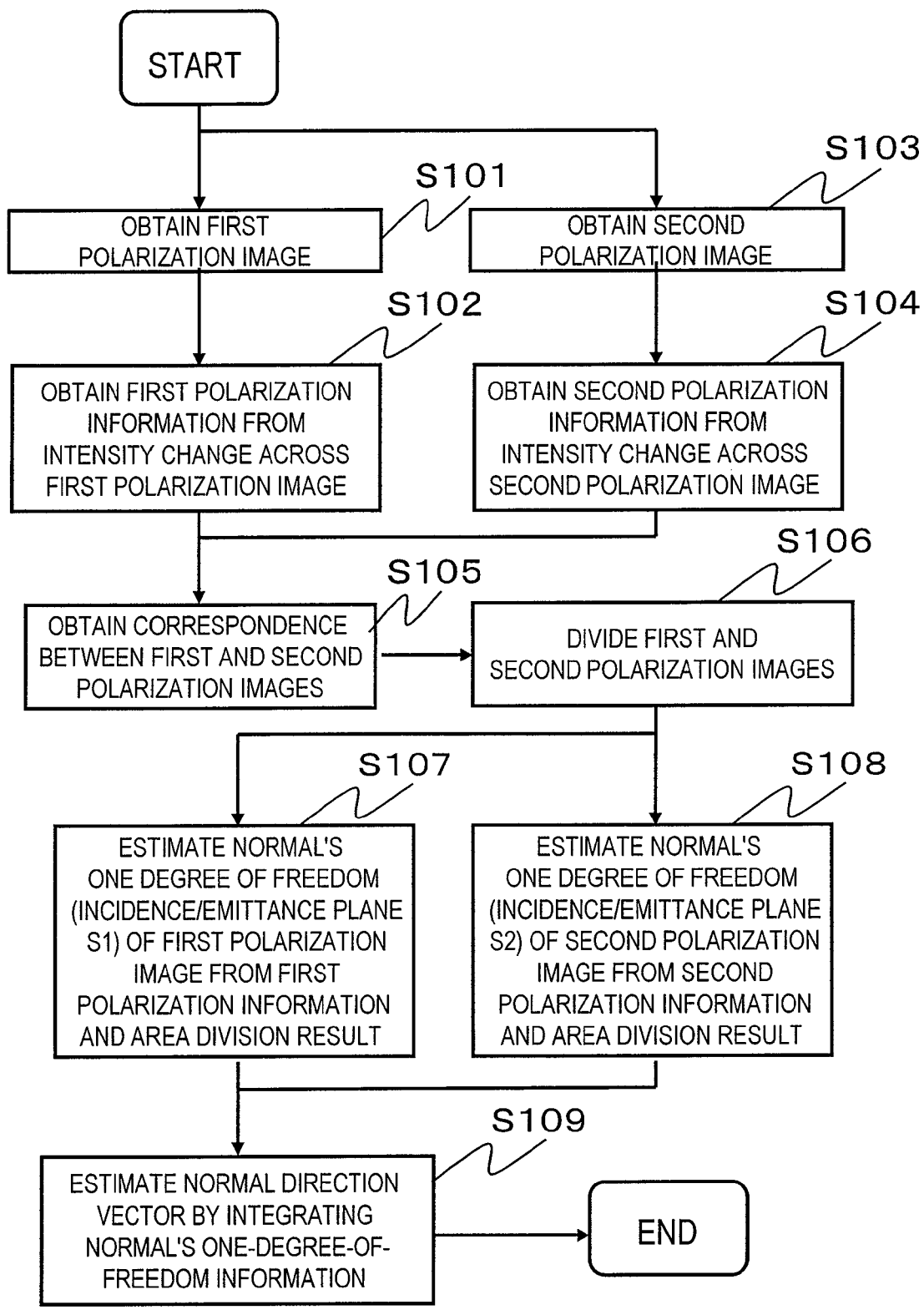
[FIG. 7] A flow chart showing the flow of the process performed by a normal information generating device according to the first embodiment of the present invention.

FIG. 7 is a flow chart showing the flow of the process performed by the normal information generating device 100 of the present embodiment.

First, the first polarization image capturing section 102 captures an image of the subject by receiving light from the subject through the first patterned polarizer 201 by means of the image sensor, thus obtaining a first polarization image, which is an image including polarization information (step S101). The first polarization information obtaining section 103 generates (obtains) first polarization information by using the intensity change across the first polarization image captured by the first polarization image capturing section 102 (step S102). Then, the second polarization image capturing section 102-2 obtains a second polarization image, which is an image including polarization information, by receiving light from the subject through the second patterned polarizer 201-2 by means of the image sensor (step S103). The second polarization information obtaining section 103-2 generates (obtains) second polarization information by using the intensity change across the second polarization image captured by the second polarization image capturing section 102-2 (step S104).

Herein, the order of steps S101 to S102 and steps S103 to S104 is arbitrary, and they may be performed in parallel. It is understood that they may be performed successively.

The stereo correspondence obtaining section 104 estimates the pixel-by-pixel correspondence between the first polarization image and the second polarization image obtained by the stereo polarization image capturing section 101 (step S105). The first segmentation section 105 and the second segmentation section 105-2 divide the first polarization image and the second polarization image each into a diffuse reflection component area and a specular reflection component area by using the first polarization information and the second polarization information generated by the first polarization information obtaining section 103 and the second polarization information obtaining section 103-2 and/or the first intensity information and the second intensity information obtained by the first polarization image capturing section 102 and the second polarization image capturing section 102-2 (step S106).

The first normal's one-degree-of-freedom estimating section 106 performs a different process for each of the areas divided by the first segmentation section 105 by using the polarization information generated by the polarization information obtaining section 103, thus estimating the normal's one degree of freedom on the corresponding subject surface (step S107). The second normal's one-degree-of-freedom estimating section 106-2 performs a different process for each of the areas divided by the second segmentation section 105-2 by using the polarization information generated by the polarization information obtaining section 103-2, thus estimating the normal's one degree of freedom on the corresponding subject surface (step S108). Herein, the order of steps S107 and S108 is arbitrary, and the steps may be performed in parallel or may be performed successively, needless to say. The normal information generating section 107 estimates a normal direction vector by integrating together the normal's one-degree-of-freedoms estimated by the normal's one-degree-of-freedom estimating sections 106 and 106-2, by using the correspondence between images obtained by the stereo correspondence obtaining section 104 (step S109).

Next, the detailed function of each component of the normal information generating device 100 of the present embodiment will be described.

The stereo polarization image capturing section 101 is composed of a plurality of polarization image capturing sections 102 and obtains a plurality of polarization images of different viewpoints. The first image sensor 202 and the second image sensor 202-2 have been calibrated, and the internal parameters and the external parameters thereof are known. Such a calibration can be done by using a known method, such as, for example, a method of Tsai (Roger Y. Tsai, "An Efficient and Accurate Camera Calibration Technique for 3D Machine Vision", Proceedings of IEEE Conference on Computer Vision and Pattern Recognition, Miami Beach, Fla., 1986, pp. 364-374).

It is understood that such a calibration is performed with patterned polarizers, lenses, etc., included.

Figure 8:
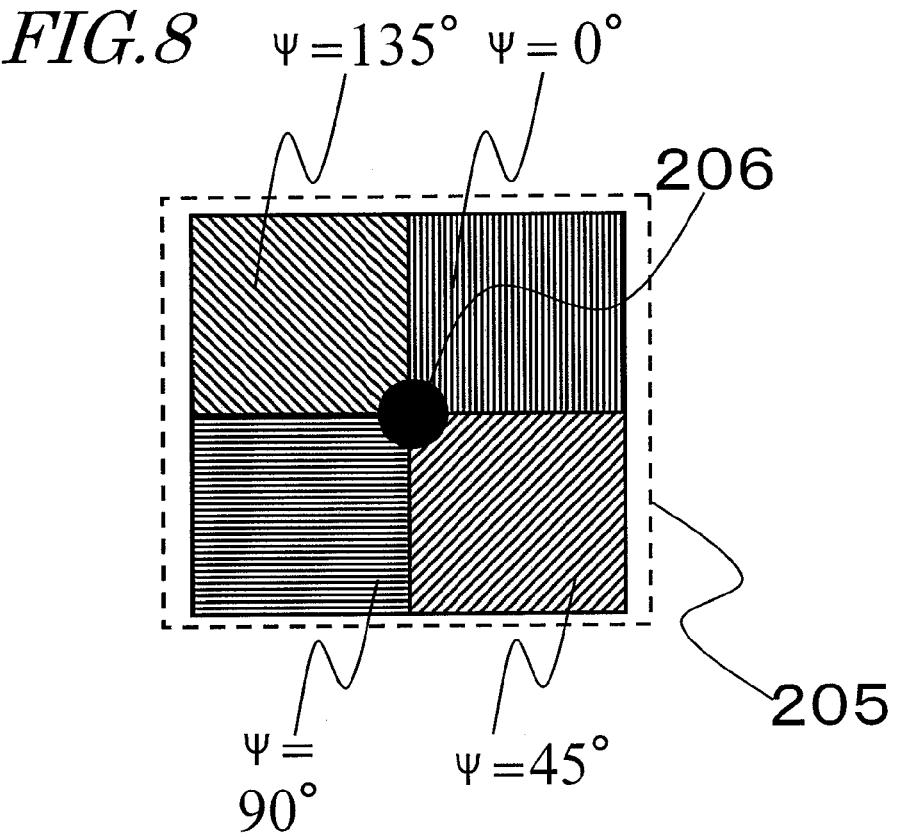
[FIG. 8] A schematic diagram illustrating an arrangement of the patterned polarizer of the present invention.

Next, the detailed function of the polarization image capturing sections 102 and 102-2 will be described. The polarization image capturing section 102 obtains a polarization image including polarization information by receiving light from the subject through the patterned polarizer 201 by means of the image sensor 202. FIG. 8 is a schematic diagram showing the image-capturing unit 205 shown in FIG. 6 as viewed from the direction of the incident light. In this figure, straight lines within each polarizer (each pixel) represent the polarization main axis direction of the minute polarizing plate provided on the pixel. That is, the image-capturing unit 205 includes pixels having four different polarization directions of polarization axis rotation angles ($\Psi i=0°$, 45°, 90° and 135°). The patterned polarizer exhibits polarization characteristics such that the TM-wave is transmitted and the TE-wave is reflected (not transmitted). Therefore, it is possible to obtain an image similar to that of Patent Document 1, which is captured by rotating a polarizer placed in front of the image sensor.

Such characteristics can be produced by, for example, using a photonic crystal described in Kawashima, Sato, Kawakami, Nagashima, Ota, Aoki, "Development of polarization imaging device and applications by using patterned polarizer", Proceedings of the IEICE General Conference 2006, No. D-11-52, P.52, 2006. With a photonic crystal, the TE-wave is light that has the vibration plane parallel to grooves formed on the surface and the TM-wave is light that has the vibration plane perpendicular thereto.

When capturing this polarization image, it is preferred that the dynamic range of the intensity and the number of bits are as large as possible (e.g., 16 bits).

Next, the detailed function of the polarization information obtaining sections 103 and 103-2 will be described. The polarization information obtaining section 103 generates polarization information by using the polarization image obtained by the polarization image capturing section 102.

Figure 9:
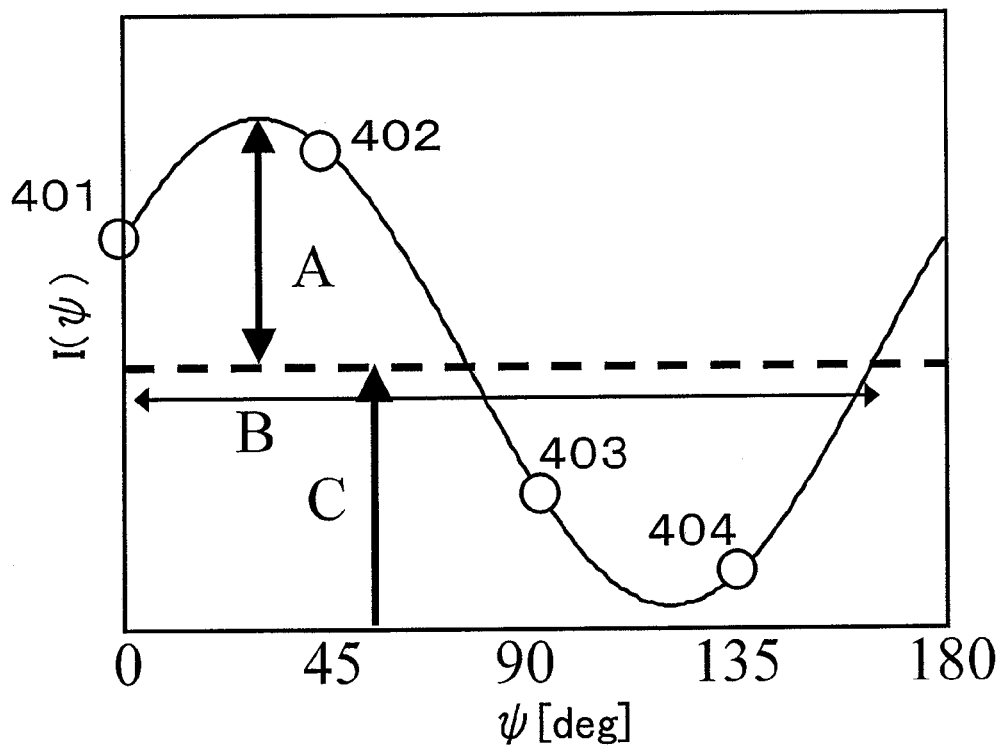
[FIG. 9] A schematic diagram illustrating the sinusoidal intensity change and the observed intensity points of the present invention.

It is known in the art that the intensity of light passing through a polarizer changes depending on the polarization main axis angle of the polarizer. FIG. 9 shows how a single sinusoidal curve is formed by the intensities 401 to 404 of light passing through four different polarizers having different polarization main axis angles $\Psi i=0°$, 45°, 90° and 135°.

That is, the sinusoidal curve represents the polarization characteristics at the point 206 in FIG. 8. Note that the polarization main axis angle being 0° is equal to that being 180° (π). When obtaining the sinusoidal curve, it is preferred that a camera such that the shooting gamma=1 is used or a linearity correction is made so that the shooting gamma=1. While the four points are shown to be closely along the single sinusoidal curve, it is in fact preferred that a single sine function with a 180-degree cycle is determined, as an optimal value, from many measured points.

The polarization information obtaining section 103 generates, as the polarization information, the amplitude and the phase information of the curve. Specifically, the reflected light intensity I for the main axis angle φ of the patterned polarizer 201 is approximated as follows.

$$I(\phi) = A \cdot \sin 2(\phi - B) + C \quad \text{[Expression 1]}$$

Herein, as shown in FIG. 9, A, B and C in Expression 1 are constants that represent the amplitude, the phase and the average value, respectively, of the intensity fluctuation curve due to the polarizer. Now, Expression 1 can be developed as follows.

$$I(\phi) = a \cdot \sin 2\phi + b \cdot \cos 2\phi + C \quad \text{[Expression 2]}$$

where $$A = \sqrt{a^2 + b^2}, \; \sin(-2B) = \frac{b}{\sqrt{a^2 + b^2}}, \quad \text{[Expression 3]}$$
$$\cos(-2B) = \frac{a}{\sqrt{a^2 + b^2}}$$

$$B = -\frac{1}{2}\tan^{-1}\left(\frac{b}{a}\right) \quad \text{[Expression 4]}$$

That is, for a 4-pixel sample (φi Ii), the sine function, Expression 1, can be approximated by obtaining A, B and C that minimize Expression 5 below. Note that Ii represents the measured intensity for the polarizing plate rotation angle φi. N is the number of samples, which is 4 here.

$$f(a, b, C) = \sum_{i=1}^{N}(I_i - a \cdot \sin 2\phi_i - b\cos 2\phi_i - C)^2 \quad \text{[Expression 5]}$$

Through the above process, the three parameters A, B and C of the sinusoidal approximation are determined. By using the parameters obtained as described above, the polarization information obtaining section 103 obtains at least one of the information below, as the polarization information.

Degree of polarization ρ

$$\rho = \frac{I_{max} - I_{min}}{I_{max} + I_{min}} = \frac{A}{C} = \frac{A}{\overline{I}}. \quad \text{[Expression 6]}$$

Polarization phase φmax (0≦φmax≦π [rad])

$$\phi_{max} = \frac{\pi}{4} + B \quad \text{[Expression 7]}$$

Polarization estimation error E $$E = \sum_{i=1}^{N}(I_i - A \cdot \sin 2(\psi_i - B) - C)^2 \quad \text{[Expression 8]}$$

Polarization maximum intensity value Imax $$I_{max} = A + C \quad \text{[Expression 9]}$$

Polarization minimum intensity value Imin $$I_{min} = C - A \quad \text{[Expression 10]}$$

The terms above are defined herein as follows.

Degree of polarization ρ: The index representing how much light is polarized;

Polarization phase φmax: The angle at which the intensity, which varies depending on the polarization main axis angle of the patterned polarizer, is maximized;

Polarization estimation error E: The total difference between the intensity measured for 4-pixel sample and the intensity determined from the above sine function obtained by approximation;

Polarization maximum intensity value Imax: The maximum possible intensity value resulting as the main axis angle φ of the patterned polarizer is varied; and Polarization minimum intensity value Imin: The minimum possible intensity value resulting as the main axis angle φ of the patterned polarizer is varied. Non-polarized component.

Figure 10:
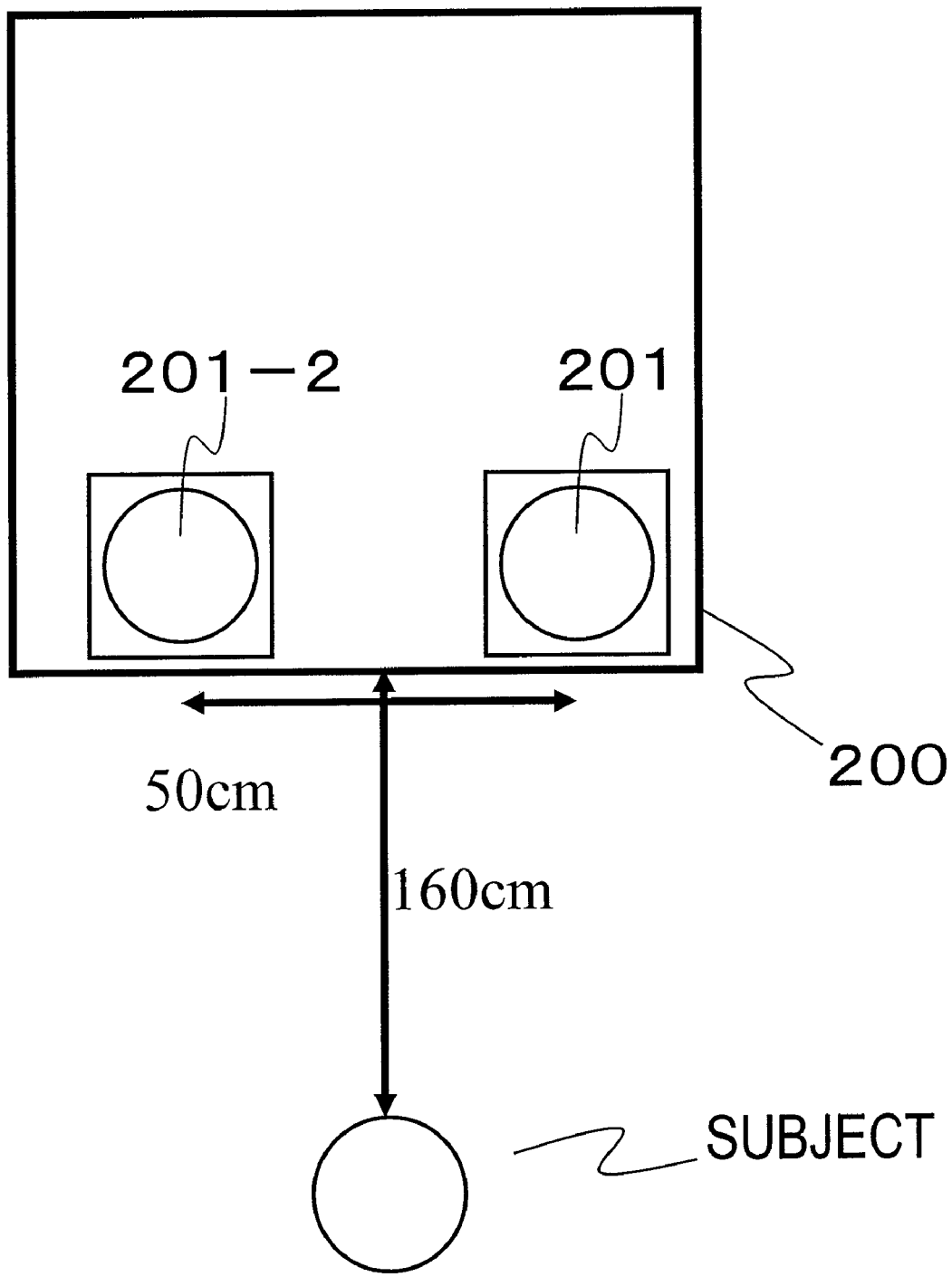
[FIG. 10] A diagram showing the positional relationship between a camera 200 and the subject and the positional relationship between patterned polarizers 201 and 201-2 within the camera 200 during the image-capturing process by the present inventors.

An image example generated by the normal information generating device 100 based on the polarization information described above will now be described. In the image example, the subject is a spherical globe. FIG. 10 shows the positional relationship between the camera 200 and the subject and the positional relationship between the patterned polarizers 201 and 201-2 within the camera 200 during the image-capturing process by the present inventors. The distance from the camera 200 to the subject is 160 cm, and the interval between the patterned polarizers 201 and 201-2 or the interval between the image sensors 202 and 202-2 is 50 cm.

FIG. 11 shows, each as an image, the degree of polarization ρ1, the polarization phase φmax1 and the polarization estimation error E1, which are obtained from the first polarization image for the spherical globe. In this figure, FIG. 11(*a*) shows an image of the globe, which is the subject, FIG. 11(*b*) the degree of polarization ρ1 for the subject of FIG. 11(*a*), FIG. 11(*c*) the polarization phase φmax1 (0° being black, and 180° being white) for the subject of FIG. 11(*a*), and FIG. 11(*d*) the polarization estimation error E1 for the subject of FIG. 11(*a*).

FIGS. 12(*a*)-(*d*) show FIGS. 11(*a*)-(*d*), respectively, in a schematic manner (with shading emphasized). FIGS. 13(*a*)-(*d*) show the correspondence between the images shown in FIGS. 11(*a*)-(*d*) and different areas (e.g., areas A01 and B01 in (a)) shown in FIGS. 12(*a*)-(*d*). In FIGS. 11(*a*)-(*d*) and FIGS. 13(*a*)-(*d*), the whiter the area is, the larger the intensity value. FIG. 14 shows the result of a similar process performed for a styrene-foam head model.

From these images, it can be seen that the degree of polarization is high near the occluding edge, and that the polarization phase monotonously increases clockwise around the sphere with a 180° cycle in areas that are not covered by the shade of the subject. This polarization phase is the angle of rotation at which the intensity takes the maximum value and is information of the emittance plane where the subject is of diffuse reflection.

Next, the stereo correspondence obtaining section 104 will be described. The stereo correspondence obtaining section 104 identifies the pixel-by-pixel correspondence between a plurality of polarization images obtained by the stereo polarization image capturing section 101. Note however that "to identify" does not mean to certainly determine, but means to determine in a sense that it seems probable. Therefore, one may also use "to estimate" the correspondence. This can be detected, for example, by an image process utilizing the intensity information. The relationship between the terms "to identify" and "to estimate" applies not only to the stereo correspondence obtaining section 104, but also similarly to the normal's one-degree-of-freedom estimating sections 106 and 106-2, etc.

Figure 15:
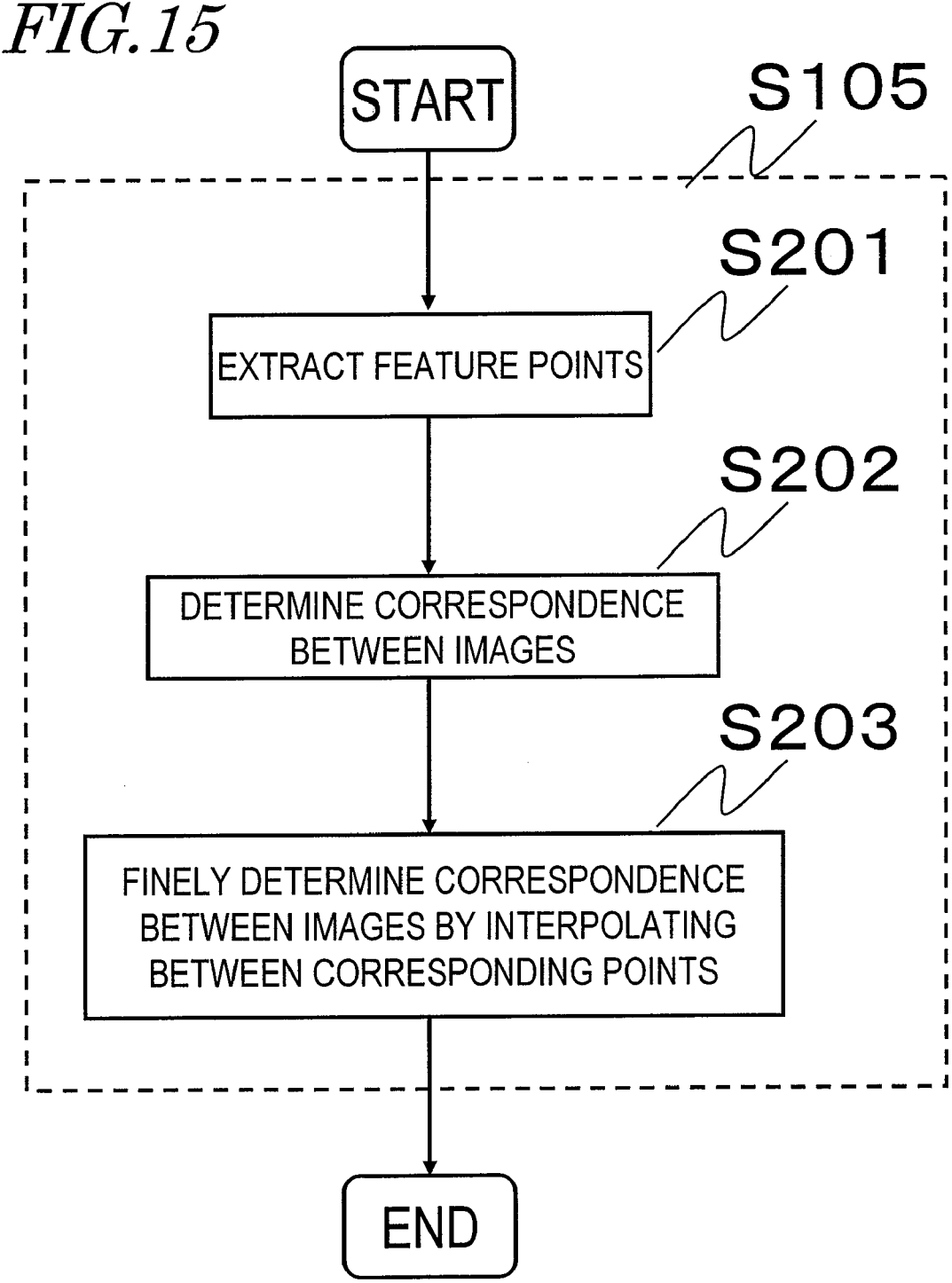
[FIG. 15] A flow chart showing the flow of the process performed by the stereo correspondence obtaining section according to the first embodiment of the present invention.

FIG. 15 is a flow chart showing the flow of the process performed by the stereo correspondence obtaining section 104 of the present embodiment. The flow chart corresponds to step S105. First, the process extracts feature points from a plurality of images (step S201). The process determines the correspondence between the plurality of images by using the obtained feature points (step S202). By the process as it is, however, the correspondence is determined only for a coarse set of pixels on the image where feature points have been detected. In view of this, the process performs an interpolation process between the feature points for which the correspondence has been determined in step S202, thereby finely determining the correspondence for the entire images (step S203). Each process will now be described in detail.

In step S201, the process extracts feature points from a plurality of images. This process detects "a point for which the correspondence can be determined easily", called a feature point, in order to determine the pixel-by-pixel correspondence between a plurality of images, and searches for points between a plurality of images that best match the feature of the feature point, thereby determining the pixel-by-pixel correspondence between a plurality of images.

While various methods are known as the method for detecting feature points, such as the Harris operator or the KLT (Kanade-Lucas-Tomasi) Feature Tracker, the SIFT (Scale-Invariant Feature Transform) operator is used herein (see David G. Lowe, "Distinctive image features from scale-invariant keypoints," International Journal of Computer Vision, Vol. 60, No. 2, pp. 91-110, 2004).

SIFT is known as a feature quantity that is invariant to the scale and the rotation. The process is to extract scale-invariant key points using the Difference-of-Gaussian process, and further calculate the orientation from the gradient direction histogram of the image, thereby extracting the feature quantity normalized by the orientation (for details, see Fujiyoshi Hironobu, "Gradient-Based Feature Extraction—SIFT and HOG—", IPSJ SIG Technical Report CVIM 160, pp. 211-224, 2007). Herein, for each of the first polarization image and the second polarization image captured by the polarization image capturing sections 102 and 102-2, the process extracts a key point and extracts the feature quantity normalized by the orientation.

In step S202, the process determines the correspondence for feature points obtained in step S201 between the first polarization image and the second polarization image. This is realized by detecting, for each key point obtained in step S201, key point from other images that minimizes the Euclid distance of the feature quantity. Each key point for which the correspondence is determined as described above will be a corresponding point. It is understood that the epipolar constraint, which is widely used for determining the correspondence between stereo images, may be used for determining the correspondence.

In step S203, the process performs an interpolation process between the feature points for which the correspondence has been determined in step S202, thereby finely determining the correspondence for the entire image. This process will now be described. First, by using the feature points and the corresponding points for which the correspondence has been determined, the process performs Delaunay triangulation for the first polarization image and the second polarization image. The process interpolates corresponding points for each triangle thus divided.

FIG. 16 is a schematic diagram illustrating this process. In FIG. 16(a), the points P0, P1 and P2 are points that are identified by the on-image coordinate values of the feature points in the first image detected by SIFT, and are the three vertices of a triangle divided by Delaunay triangulation. In FIG. 16(b), the points P'0, P'1 and P'2 are corresponding points in the second image that correspond to the feature points P0, P1 and P2, respectively. Herein, the process obtains, through an interpolation process, the corresponding point at the point Px within the triangle P0-P1-P2 in the first polarization image. First, the process obtains the variables a and b that satisfy the following relationship.

$$P_x = a \cdot (P_1 - P_0) + b \cdot (P_2 - P_0) + P_0 \qquad \text{[Expression 11]}$$

Herein, the variables are such that $0 \leq a \leq 1$ and $0 \leq b \leq 1$. Then, the corresponding point P'x at Px is expressed by the expression below.

$$P_x' = a \cdot (P_1' - P_0') + b \cdot (P_2' - P_0') + P_0' \qquad \text{[Expression 12]}$$

This process is performed for all pixels needed. According to Expressions 11 and 12 above, it is possible to interpolate points along the sides of the triangle shown in FIGS. 16(a) and (b). Then, it is possible to obtain all points inside the triangle by applying Expressions 11 and 12 to a triangle formed by a single interpolated point and two vertices of the triangle, a triangle formed by two interpolated points and one vertex of the triangle, or a triangle formed by three interpolated points. By performing a similar process for all the triangles divided by Delaunay triangulation, it is possible to obtain through interpolation all the points in the first image and the second image. As a result, it is possible to finely determine the correspondence for the entire image between the first image and the second image. Note that although the interpolation process is performed by using coordinates on the image in step S203, the process may be performed on 3-dimensional coordinates obtained from the corresponding points.

While the correspondence is determined by using polarization images in the process described above, it is understood that the process may use the polarization maximum intensity value Imax and the polarization minimum intensity value Imin obtained by the polarization information obtaining sections 103 and 103-2, or the average value or the weighted sum between the polarization maximum intensity value Imax and the polarization minimum intensity value Imin (e.g., Imax+ 2·Imin or Imax+Imin). Particularly, using the polarization minimum intensity value Imin is very effective because it is then possible to reduce the influence of the specular reflection component which is significantly influenced by the movement of the viewpoint. Imax+Imin is an image equivalent to an image that is captured when no polarizer is provided. Therefore, by performing the image process using this value, it is possible to perform a process similar to a normal process where polarization is not used. It is understood that instead of using feature points, the stereo corresponding point obtaining section 104 may use the block matching method and the gradient method, which are widely used in the stereo corresponding point obtaining process for image processes.

Next, the detailed function of the segmentation section 105 will be described. The segmentation section 105 divides an image into a diffuse reflection area and a specular reflection area by using the polarization information generated by the polarization information obtaining section 103 and/or the intensity information obtained by the polarization image capturing section 102.

Now, diffuse reflection and specular reflection will be described. It is known that the reflection characteristic of a subject surface is represented as the sum of the specular reflection component, which is a "shine", and the diffuse reflection component, which is a mat reflection component. While the diffuse reflection component is observed irrespective of the direction of the light source illuminating the subject, the specular reflection component is a component that is strongly dependent on direction and is observed only when the light source is present generally in the regular reflection direction with respect to the normal direction and the viewing direction of the subject. This holds also for the polarization characteristic.

Figure 17:
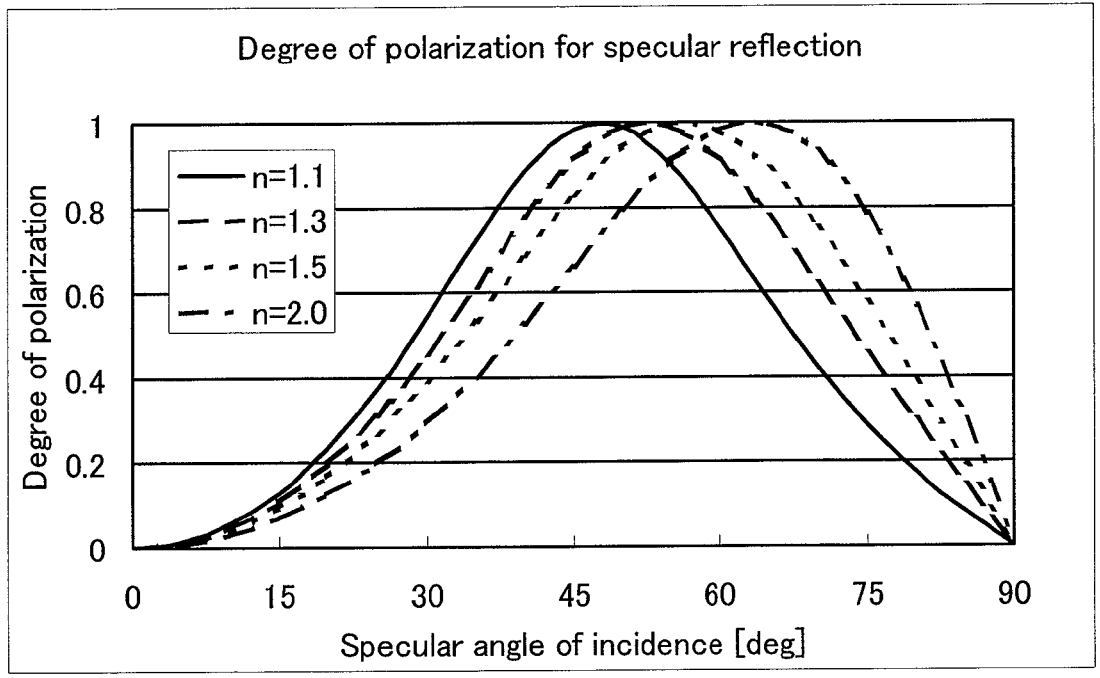
[FIG. 17] A graph showing the degree of polarization with respect to the angle of incidence of the specular reflection component for subjects whose refractive indices are n=1.1, 1.3, 1.5 and 2.0.
Figure 18:
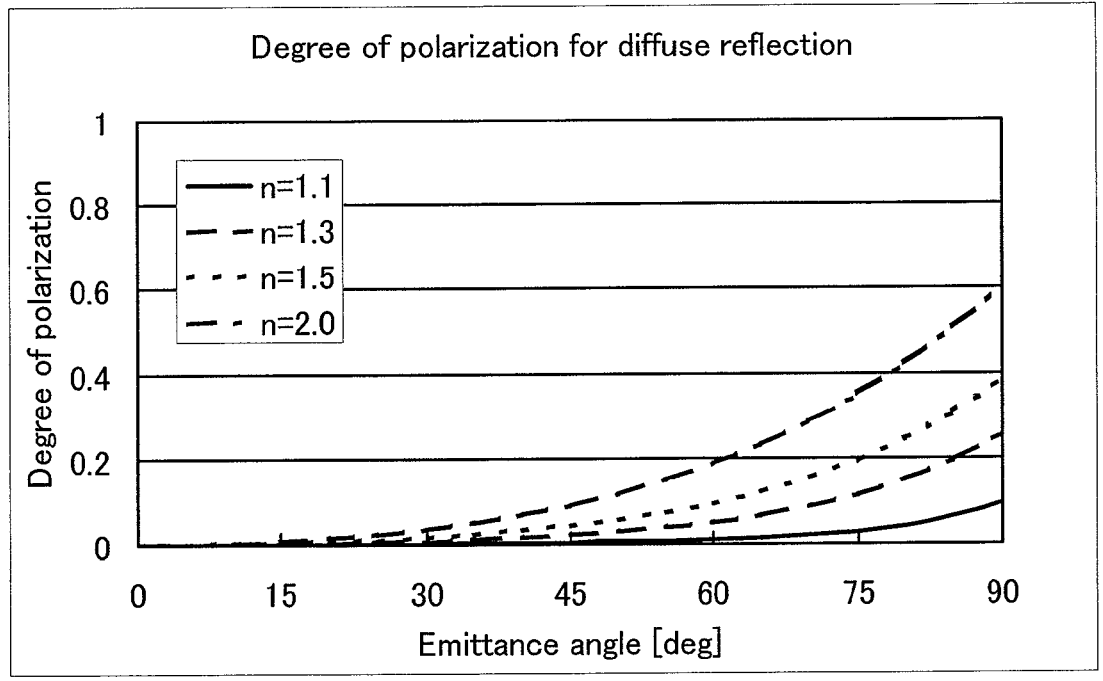
[FIG. 18] A graph showing the degree of polarization with respect to the emittance angle of the diffuse reflection component for subjects whose refractive indices are n=1.1, 1.3, 1.5 and 2.0.

FIGS. 17 and 18 are graphs showing the degree of polarization for specular reflection and the diffuse reflection component, respectively, for subjects whose refractive indices are n=1.1, 1.3, 1.5 and 2.0 (see, for example, L. B. Wolff and T. E. Boult, "Constraining object features using a polarization reflectance model", IEEE Transactions on Pattern Analysis and Machine Intelligence, Vol. 13, No. 7, pp. 635-657, 1991). The horizontal axis of FIG. 17 represents the angle of incidence, and the vertical axis represents the degree of polarization of the specular reflection component. The horizontal axis of FIG. 18 represents the emittance angle, and the vertical axis represents the degree of polarization of the diffuse reflection component. It can be seen from these figures that the degree of polarization of the specular reflection component is not dependent on the emittance angle, but the degree of polarization of the diffuse reflection component is dependent on the emittance angle. Thus, it can be seen that when the camera is moved to vary the emittance angle, the degree of polarization will change for the diffuse reflection component while the degree of polarization will not change for the specular reflection component.

It is known in the art that the intensity value Id of the diffuse reflection component complies with the Lambertian model below.

$$i_d = (\rho_d \cdot n) \cdot (I_p \cdot L) = I_p \rho_d \cos \theta \quad \text{[Expression 13]}$$

Herein, $\rho d$ denotes the diffuse reflectance (albedo) of the reference point, n the normal direction vector of the reference point, Ip the intensity of the point light source, L the direction vector of the light source, and θ the angle of incidence (the angle between the normal direction vector and the light source direction vector). The length of the vector is normalized to 1.

It can be seen from this expression that when the emittance angle is changed by moving the camera, the intensity value will not change for the diffuse reflection component.

On the other hand, it is known that the intensity value Is of the specular reflection component complies with the Cook-Torrance model shown in Expressions 14 to 22 below.

$$I_s = K_s \rho_{s,\lambda} \quad \text{[Expression 14]}$$

$$K_s = \frac{1}{\pi} E_i k_s \quad \text{[Expression 15]}$$

$$\rho_{s,\lambda} = \frac{F_\lambda DG}{n \cdot V} \quad \text{[Expression 16]}$$

$$F_\lambda = \frac{1}{2} \frac{(g_\lambda - c)^2}{(g_\lambda + c)^2}\left(1 + \frac{[c(g_\lambda + c) - 1]^2}{[c(g_\lambda - c) + 1]^2}\right) \quad \text{[Expression 17]}$$

-continued $$c = L \cdot H \quad \text{[Expression 18]}$$

$$g_\lambda = \sqrt{n_\lambda^2 - 1 + c^2} \quad \text{[Expression 19]}$$

$$D = \frac{1}{4m^2 \cos^4 \beta} \exp\left\{-\frac{\tan^2 \beta}{m^2}\right\} \quad \text{[Expression 20]}$$

$$G = \min\left\{1, \frac{2(n \cdot H)(n \cdot V)}{(V \cdot H)}, \frac{2(n \cdot H)(n \cdot L)}{(V \cdot H)}\right\} \quad \text{[Expression 21]}$$

$$E_i = \sum_{j=0}^{n-1} I_j n \cdot L_j \quad \text{[Expression 22]}$$

Figure 19:
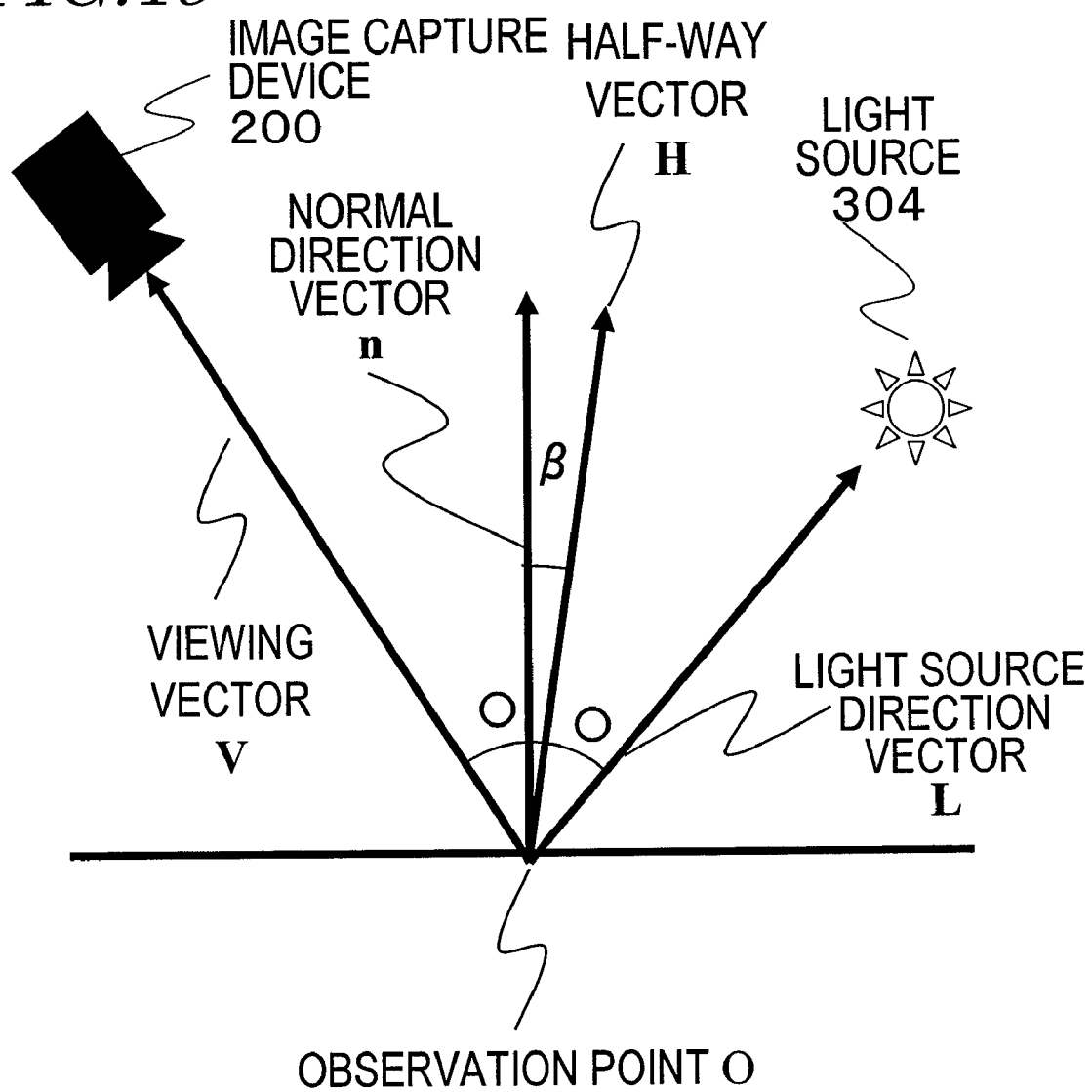
[FIG. 19] A schematic diagram illustrating the relationship between the normal direction vector, the viewing vector and the light source direction vector.

Herein, Ei denotes the incident illuminance, $\rho s,\lambda$ the bidirectional reflectance of the specular reflection component for the wavelength λ, n the normal direction vector of the subject, V the viewing vector, L the light source direction vector, H the half-way vector between the viewing vector and the illumination direction vector, and β the angle between the half-way vector H and the normal direction vector n (see FIG. 19). Fλ denotes the Fresnel coefficient, which is the ratio of reflected light from the dielectric surface obtained from Fresnel equations, D the microfacet distribution function, and G the geometric attenuation factor representing the influence of shading due to irregularities on the object surface. Moreover, nλ denotes the refractive index of the subject, m a coefficient representing the roughness of the subject surface, and Ij the radiation intensity of the incident light. Ks denotes the coefficient of the specular reflection component. It can be seen from these expressions that when the emittance angle is changed by moving the camera, the intensity value will change for the specular reflection component.

Now, the corresponding points of all pixels are known by the stereo correspondence obtaining section 104. Based on the above, the specular reflection component and the diffuse reflection component of a stereo image (the first image and the second image) can be divided as follows.

[Expression 23]

if $|Ic1-Ic2| \leq Thd$ and $Ic1 \leq ThI$ and $Ic2 \leq ThI$ then first image and second image are both diffuse reflection component if $Ic1 > Ic2 + Thd$ then first image is specular reflection component and second image is diffuse reflection component if $Ic2 > Ic1 + Thd$ then first image is diffuse reflection component and second image is specular reflection component if $|Ic1-Ic2| \leq Thd$ and ($Ic1 > ThI$ or $Ic2 > ThI$) then first image and second image are both specular reflection component Herein, Ic1 denotes the sum Imax+Imin between the polarization maximum intensity value Imax and the polarization minimum intensity value Imin obtained by the polarization information obtaining section 103. Ic2 denotes the sum Imax+Imin between the polarization maximum intensity value Imax and the polarization minimum intensity value Imin obtained by the polarization information obtaining section 103-2. Herein, Imax+Imin is the intensity value to be observed by the image sensor 202 when the patterned polarizer 201 is absent. Thd is a threshold value representing how much it is apart from the original Lambertian model, and ThI is a threshold value based on which the specular reflection component and the diffuse reflection component are judged by the intensity information. These threshold values can be determined experimentally.

Figure 20:
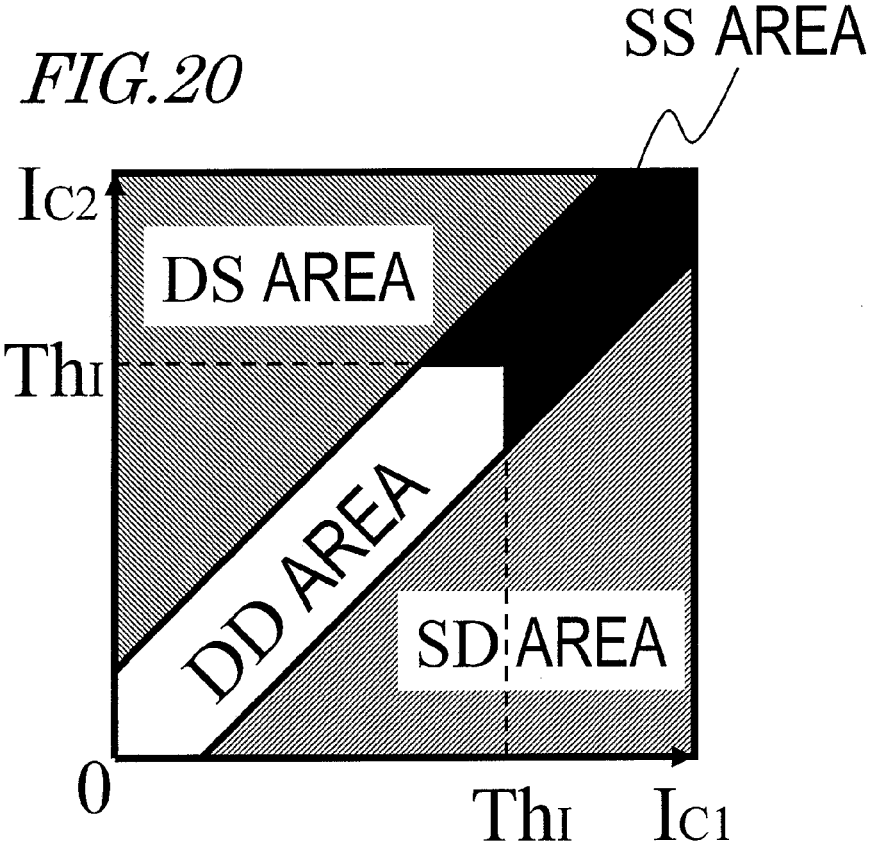
[FIG. 20] A schematic diagram representing the area division criterion used by a segmentation section according to the first embodiment of the present invention.

FIG. 20 is a schematic diagram representing the area division criterion described above. The four areas shown in FIG. 20, i.e., the DD, SD, DS and SS areas, are each classified as having the following components.

DD area: the diffuse reflection component for both the first image and the second image.

SD area: the specular reflection component for the first image and the diffuse reflection component for the second image.

DS area: the diffuse reflection component for the first image and the specular reflection component for the second image.

SS area: the specular reflection component for both the first image and the second image.

Figure 21:
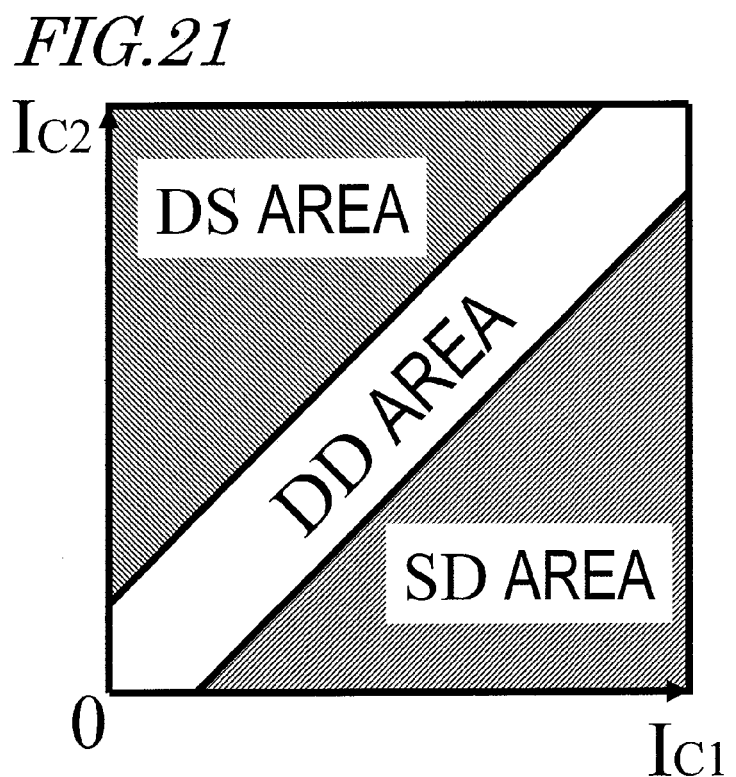
[FIG. 21] A schematic diagram representing another area division criterion used by the segmentation section according to the first embodiment of the present invention.

It is understood that such an area division is not limited to FIG. 20, but may employ such an area division criterion as shown in FIG. 21 where the SS area is excluded, for example. This is effective where the surface of the subject is very smooth as is a glazed ceramic and the specular reflection component is observed only in a limited area near the regular reflection area. In such a case, it is very rare that specular reflection is observed in both images of corresponding points in the first image and the second image.

Then, the specular reflection component and the diffuse reflection component in the stereo images (the first image and the second image) can be divided as follows.

[Expression 24]

if $|Ic1-Ic2| \leq Thd$ then first image and second image are both diffuse reflection component if $Ic1 > Ic2+Thd$ then first image is specular reflection component and second image is diffuse reflection component if $Ic2 > Ic1+Thd$ then first image is diffuse reflection component and second image is specular reflection component It is understood that the segmentation section 105 may perform the process by dividing all pixels of the image into the diffuse reflection component or the specular reflection component. For example, if the subject is a subject such as plaster, it is probable that all pixels are diffuse reflection components. For example, if the subject is a glossy metal, it is probable that all pixels are specular reflection components.

Figure 22:
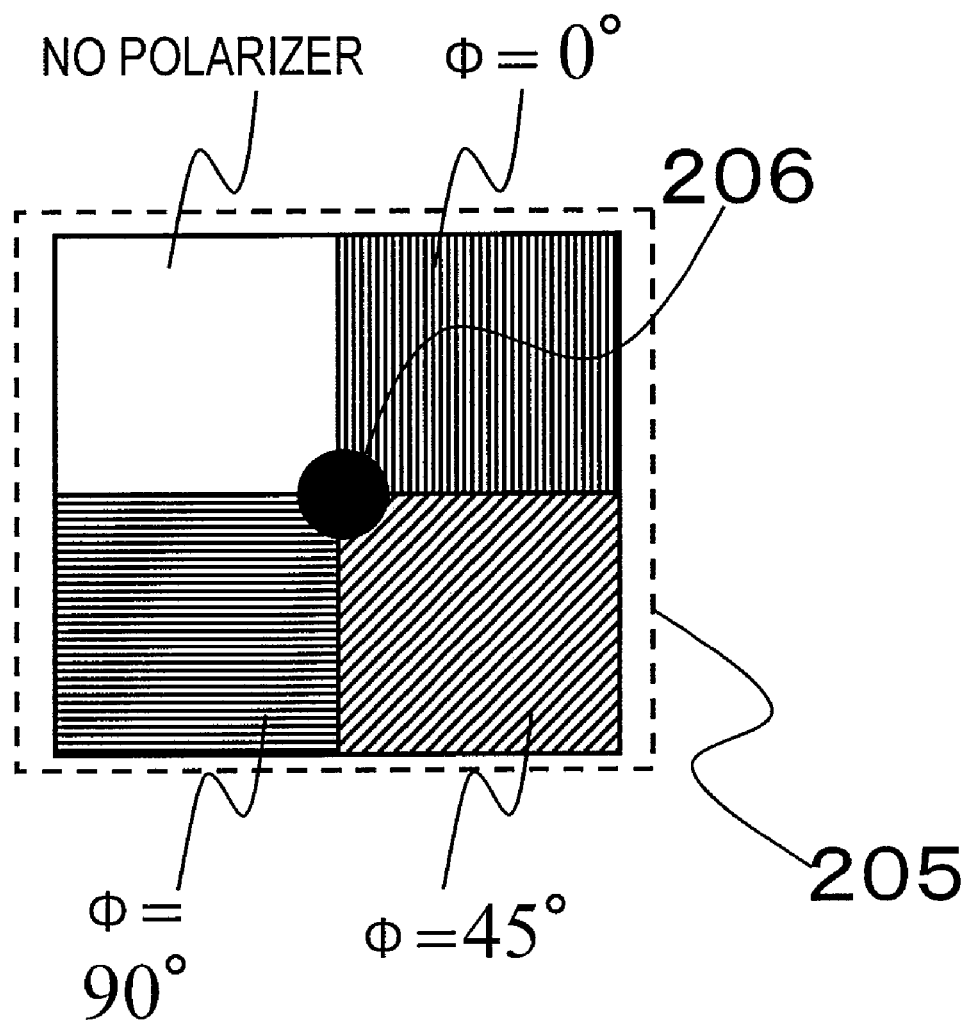
[FIG. 22] A schematic diagram illustrating another arrangement of the patterned polarizer of the present invention.

It is understood that the segmentation section 105 may use, as Ic1 and Ic2, the polarization maximum intensity value Imax, the polarization minimum intensity value Imin, or the average value between the polarization maximum intensity value Imax and the polarization minimum intensity value Imin, instead of using the weighted sum Imax+Imin between the polarization maximum intensity value Imax and the polarization minimum intensity value Imin. For example, where the polarization minimum intensity value Imin is used, it is possible to reduce the influence of the shine component. It is understood that where a intensity value not including the patterned polarizer 201 can be observed at the polarization image capturing section 102, that intensity value may be used. This can be realized by providing a pixel including no polarizer in the patterned polarizer 201, as shown in FIG. 22.

Next, the detailed function of the normal's one-degree-of-freedom estimating section 106 will be described. The normal's one-degree-of-freedom estimating section 106 estimates the normal's one degree of freedom on the corresponding subject surface by using the polarization information generated by the polarization information obtaining section 103 for each of the areas divided by the segmentation section 105. The normal's one degree of freedom refers to the angle information of the incident plane or the emittance plane described above.

As described above, the information of the incident plane of the specular reflection component is obtained from the angle of the rotated polarizing plate at which the intensity takes the minimum value. That is, it is given by the expression below.

$$\text{if } 0 \leq \phi_{max} \leq \frac{\pi}{2} \text{ then } \phi_n = \phi_{max} + \frac{\pi}{2} \qquad \text{[Expression 25]}$$
$$\text{if } \frac{\pi}{2} \leq \phi_{max} \leq \pi \text{ then } \phi_n = \phi_{max} - \frac{\pi}{2}$$

Herein, $\phi_{max}$ is the polarization phase obtained by Expression 7.

On the other hand, the information of the emittance plane of the diffuse reflection component is obtained from the angle of the rotated polarizing plate at which the intensity takes the maximum value. That is, the normal's one-degree-of-freedom information is given as follows.

$$\phi_n = \phi_{max} \qquad \text{[Expression 26]}$$

The obtained normal's one-degree-of-freedom information $\phi_n$, which is the angle information of the incident plane or the emittance plane, has an ambiguity of 180 degrees, i.e., $\phi_n$ or ($\phi_n+\pi$).

Next, the detailed function of the normal information generating section 107 will be described. The normal information generating section 107 generates a normal direction vector by integrating together the normal's one-degree-of-freedoms $\phi_{n1}$ and $\phi_{n2}$ estimated by the normal's one-degree-of-freedom estimating sections 106 and 106-2, by using the correspondence between images obtained by the stereo correspondence obtaining section 104.

Figure 23:
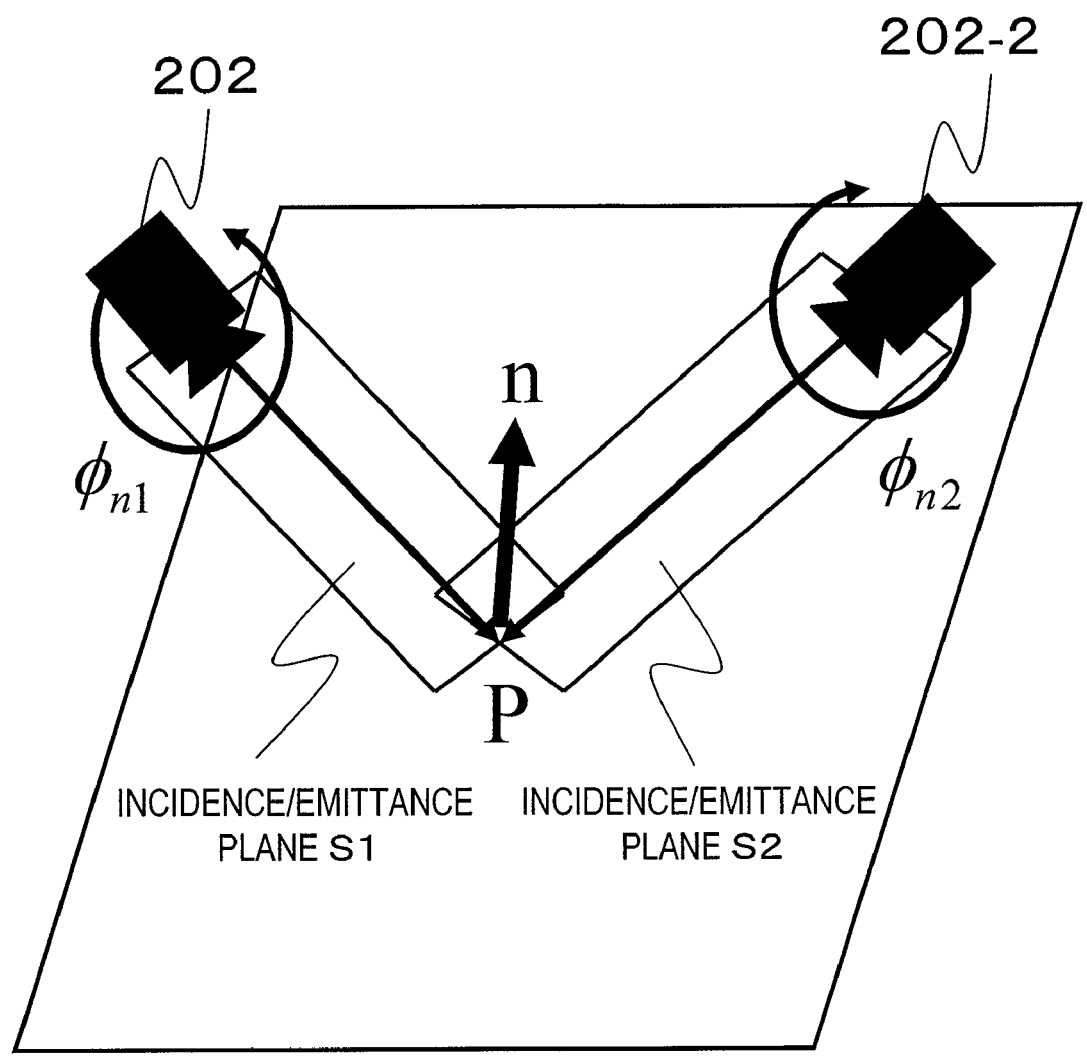
[FIG. 23] A schematic diagram illustrating the normal direction vector estimation process performed by a normal information generating section according to the first embodiment of the present invention.

FIG. 23 is a schematic diagram illustrating this process. In this figure, the point P is a reference point, and the pixel corresponding to the point P of the first image captured by the image sensor 202 and the pixel corresponding to the point P of the second image captured by the image sensor 202-2 have been known by means of the stereo correspondence obtaining section 104. The normal's one-degree-of-freedoms obtained by the normal's one-degree-of-freedom estimating sections 106 and 106-2 for corresponding pixels of the first image and the second image are $\phi_{n1}$ and $\phi_{n2}$.

Since the image sensors 202 and 202-2 have been calibrated, the mutual positional relationship is known. Therefore, the incidence/emittance planes S1 and S2 can be calculated. Herein, the incidence/emittance plane is the incident plane or the emittance plane of the reference point, the incidence/emittance plane S1 is a plane that passes through the focal position of the image sensor 202 and the polarization main axis direction of the normal's one degree of freedom $\phi_{n1}$ obtained by Expression 25 and Expression 26, and the incidence/emittance plane S2 is a plane that passes through the focal position of the image sensor 202-2 and the polarization main axis direction of the normal's one degree of freedom $\phi_{n2}$ obtained by Expression 25 and Expression 26.

That is, the normal direction vector n of the reference point is included in both of the incidence/emittance planes S1 and S2. Therefore, the normal direction vector n of the reference point is obtained as the line of intersection between these two planes.

However, since the normal's one-degree-of-freedom information $\phi_n$ has an ambiguity of 180 degrees, the normal direction vector n thus obtained has an ambiguity of 180 degrees, i.e., n(nx,ny,nz) and n'(-nx,-ny,-nz). One may use the normal direction vector n and the viewing vector V of the reference point P in order to remove the ambiguity. Specifically, one may select a normal direction vector that satisfies the mathematical relation below.

$$n \cdot V \geq 0 \quad \text{[Expression 27]}$$

If Expression 27 is not satisfied, it means that the reference point P is facing in the opposite direction to the image sensor 202, and the reference point P is supposed to be not captured. Therefore, such a normal direction vector can be eliminated, and as a result, the normal information generating section 107 can eliminate the ambiguity.

Moreover, a spatial filtering process may be performed on the normal direction vector obtained by the above method to thereby remove noise occurring in the normal information generating section 107. Such a spatial filtering process can be done by, for example, quantizing the normal direction, creating a histogram of normal direction vectors near different pixels, and performing an averaging process only for normal direction vectors near the mode.

FIGS. 24 to 28 show results of estimating normal direction vectors by means of the normal information generating device 100 of the present embodiment. FIG. 24(a) represents the sum (Imax+Imin) between the polarization maximum intensity value Imax and the polarization minimum intensity value Imin obtained by the polarization information obtaining section 103 where the subject is a globe, FIG. 24(b) represents the polarization phase φmax1. (0° being black and 180° being white) obtained by the polarization information obtaining section 103 where the subject is a globe, FIG. 24(c) represents the sum (Imax+Imin) between the polarization maximum intensity value Imax and the polarization minimum intensity value Imin obtained by the polarization information obtaining section 103-2 where the subject is a globe, and FIG. 24(d) represents the polarization phase φmax2 (0° being black and 180° being white) obtained by the polarization information obtaining section 103-2 where the subject is a globe. The second image sensor 202-2 is placed on the right side of the first image sensor 202. FIGS. 25(a)-(d) show the figures of FIG. 24 in a schematic manner (with shading emphasized). FIGS. 26(a)-(d) show the correspondence between the images shown in FIGS. 24(a)-(d) and different areas (e.g., areas A11 and B11 in (a)) shown in FIGS. 25(a)-(d). In FIGS. 24(a)-(d) and FIGS. 26(a)-(d), the whiter the area is, the larger the intensity value.

FIGS. 27(a)-(c) represent normal images obtained by visualizing the normal direction vectors estimated by the normal information generating section 107 by using the polarization phases of FIGS. 24(b) and 24(d). Since each component of a normal direction vector has a value range from −1 to 1, normal images are shown using a gray color representing the component of the normal direction vector being 0, with blacker colors in the negative direction and whiter colors in the positive direction. The background is shown in black.

FIG. 27(a) shows a normal image of the x component of the normal direction vector. FIG. 27(b) shows a normal image of the y component of the normal direction vector. FIG. 27(c) shows a normal image of the z component of the normal direction vector.

FIGS. 28(a)-(c) show the figures of FIGS. 27(a)-(c) in a schematic manner (with shading emphasized). FIGS. 29(a)-(c) show the correspondence between the images shown in FIGS. 27(a)-(c) and different areas shown in FIGS. 28(a)-(c).

Figure 30:
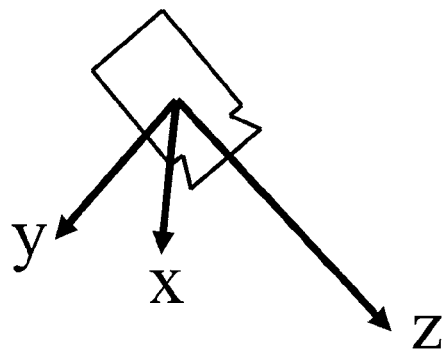
[FIG. 30] A schematic diagram illustrating the x, y and z directions of a coordinate system.

The x, y and z components of a normal direction vector are in the x direction in the rightward direction of the camera, in the y direction in the downward direction of the camera and in the z direction in the optical axis direction of the camera, respectively, as shown in FIG. 30. It can be seen from FIGS. 27(a) and 28(a) that the x-component normal image is blacker toward the left and whiter toward the right, except for the central portion of the image, indicating that qualitatively correct normals are obtained. It can be seen from FIGS. 27(b) and 28(b) that the y-component normal image is blacker toward the top and whiter toward the bottom, indicating that qualitatively correct normals are obtained. Moreover, it can be seen from FIGS. 27(c) and 28(c) that the z-component normal image is black in the central portion and gray near the occluding edge, indicating that qualitatively correct normals are obtained.

As described above, by performing an area division between the specular reflection area and the diffuse reflection area and by performing a different process for each of the divided areas using the polarization information of the subject, it is possible to passively estimate high-precision normal information over a wide area.

Note that while the patterned polarizer 201 is a photonic crystal in the present embodiment, may be a polarizer element of a film type or a wire-grid type, or be a polarizer element of any other suitable principle. Alternatively, images may be captured while rotating a polarizing plate attached in front of the image sensor 202, without using a patterned polarizer, to thereby obtain intensity values for different polarization main axes over time. This method is disclosed in Japanese Laid-Open Patent Publication No. 11-211433, for example. In such a case, polarizers may be placed in front of the individual image sensors 202 and 202-2. It is understood that one may use only one polarizer that covers the plurality of image sensors 202 and 202-2.

Note that while the polarization information obtaining section 103 is provided separately for the first polarization image capturing section 102 and for the second polarization image capturing section 102-2 in the present embodiment, it is understood that they may be implemented as a single module.

While the segmentation section 105 is provided separately for the first polarization information obtaining section 103 and for the second polarization information obtaining section 103-2 in the present embodiment, it is understood that they may be implemented as a single module.

While the normal's one-degree-of-freedom estimating section 106 is provided separately for the first polarization information obtaining section 103 and the second polarization information obtaining section 103-2 in the present embodiment, it is understood that they may be implemented as a single module.

While the segmentation section 105 divides an area into the specular reflection component area and the diffuse reflection component area by using the intensity difference between the stereo images, it is understood that this may be done based only on each image. Such a process may be done by using a known method, e.g., a method that utilizes color information of an image (see, for example, S. K. Nayar, X. S. Fang, and T. Boult, "Separation of reflection components using color and polarization", International Journal of Computer Vision (IJCV), Vol. 21, No. 3, pp. 163-186, 1997).

As described above, by performing an area division between the specular reflection area and the diffuse reflection area and by performing a different process for each of the divided areas using the polarization information of the subject, it is possible to passively estimate high-precision normal information over a wide area.

Second Embodiment

Next, a normal information generating device according to a second embodiment of the present invention will be described. The normal information generating device of the present embodiment is for performing a different normal information generating process for an occlusion area for which the stereo correspondence cannot be determined.

The normal information generating device of the present embodiment has the same configuration as that of the normal information generating device 100 of Embodiment 1 (FIG. 1). A difference from the first embodiment is in the segmentation section 105 and the normal information generating section 107. The segmentation section 105 performs an area division such that an area for which the correspondence cannot be determined by the stereo correspondence obtaining section 104 is divided as an unmatched area, and the normal information generating section 107 performs a different normal information generating process only for the unmatched area. An area for which the correspondence cannot be determined by the stereo correspondence obtaining section 104 due to the influence of occlusion is called an "occlusion area", and is known in the stereo method as an area for which 3-dimensional shape information cannot be obtained. With the normal obtaining method of the present embodiment, however, it is possible to estimate a normal direction vector even in an occlusion area by detecting an occlusion area by means of the segmentation section 105 and using the normal's one-degree-of-freedom information obtained by the normal's one-degree-of-freedom estimating section 106. This process will now be described.

Figure 31:
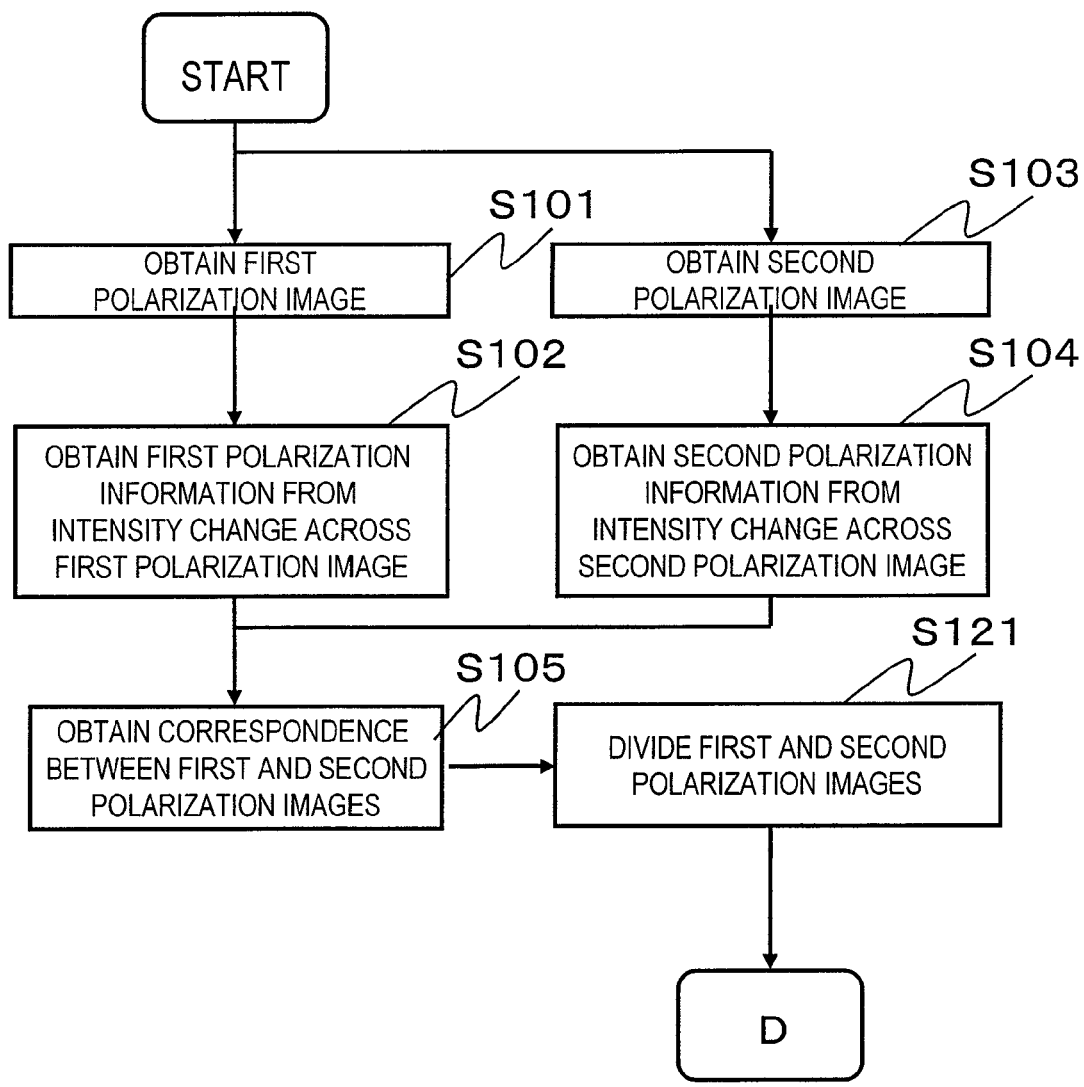
[FIG. 31] A flow chart showing the flow of the process performed by a normal information generating device according to the second embodiment of the present invention.
Figure 32:
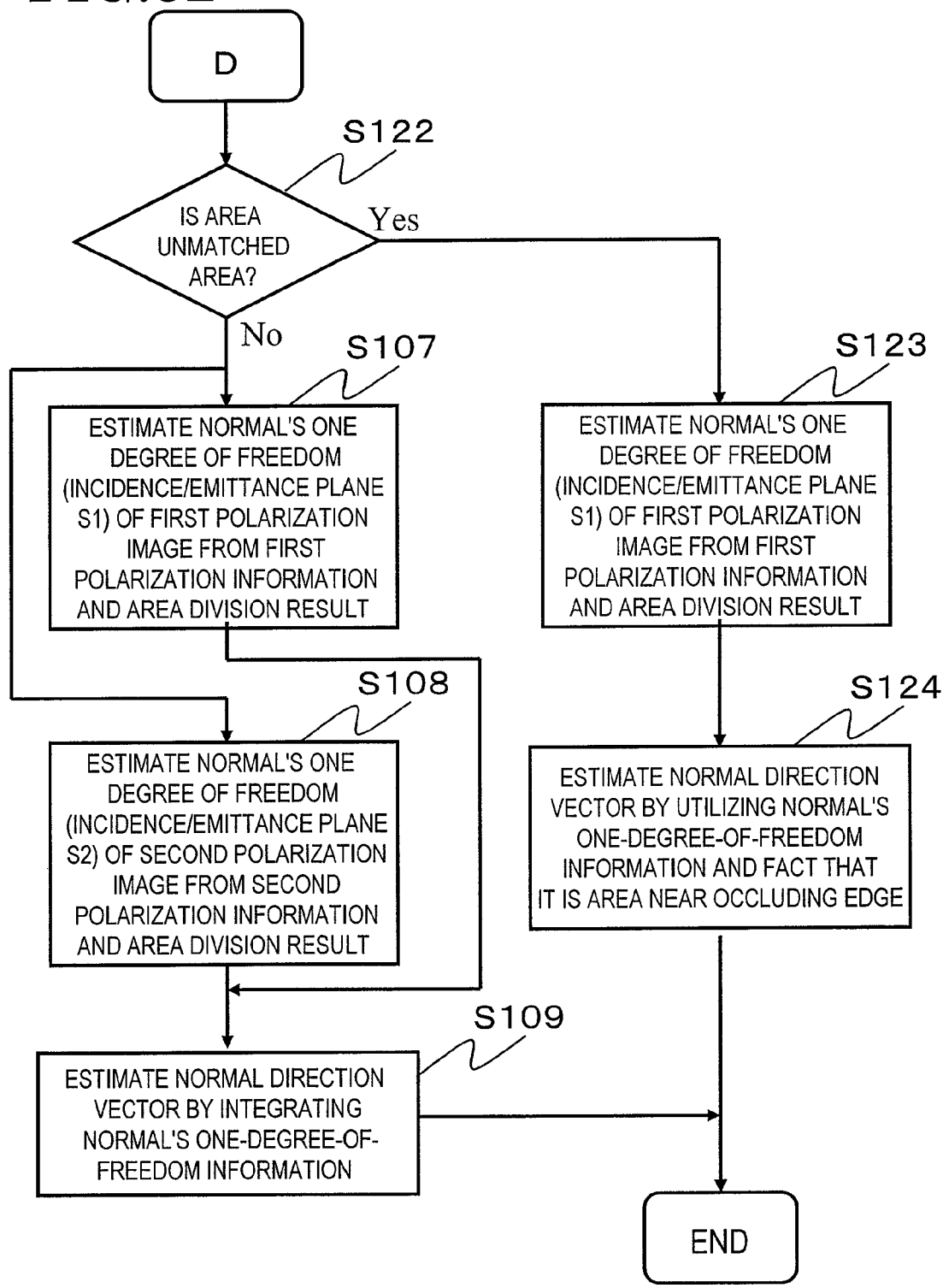
[FIG. 32] A flow chart showing the flow of the process performed by the normal information generating device according to the second embodiment of the present invention.

FIGS. 31 and 32 are flow charts showing the flow of the process performed by the normal information generating device 100 of the present embodiment. Note that in FIGS. 31 and 32, like steps to those of FIG. 7 are denoted by like reference numerals to those of FIG. 7 and will not be described in detail below.

First, the segmentation section 105 performs an area division such that an area for which the correspondence cannot be determined by the stereo correspondence obtaining section 104 is divided as an unmatched area (step S121).

Figure 33:
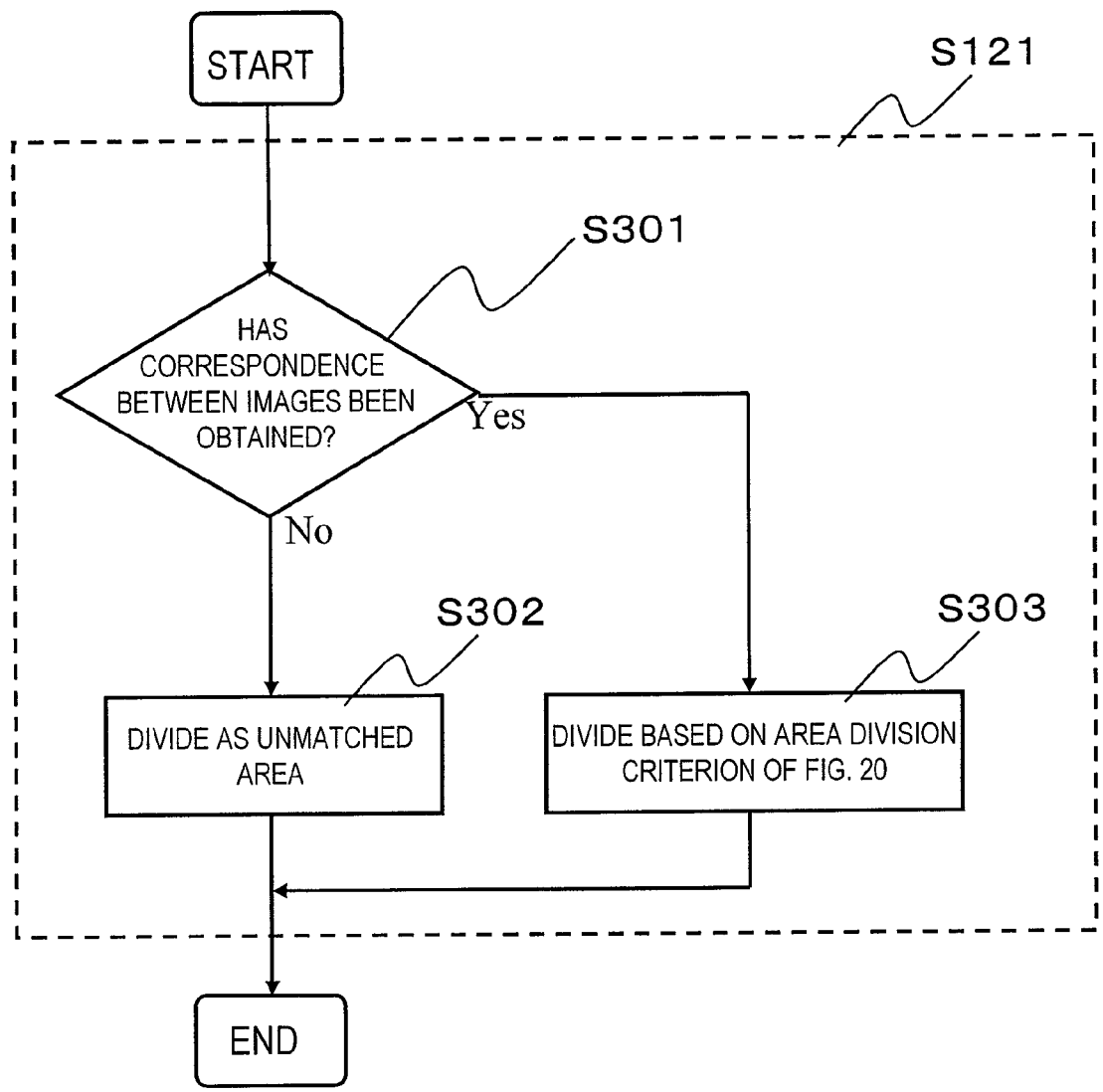
[FIG. 33] A flow chart showing the flow of the process performed by a segmentation section according to the second embodiment of the present invention.

FIG. 33 is a flow chart showing the flow of the process performed by the segmentation section 105 of the present embodiment. The flow chart corresponds to step S121 in FIG. 31.

First, the segmentation section 105 determines whether the reference pixel has been associated with the other image by using the results from the stereo correspondence obtaining section 104 (step S301). Where the reference pixel has not been associated with the other image (No in step S301), the segmentation section 105 determines that the reference pixel is causing an occlusion and it is divided as an unmatched area (step S302). On the other hand, where the reference pixel has been associated with the other image (Yes in step S301), the segmentation section 105 performs an area division based on the area division criterion of FIG. 20 as described above (step S303).

The normal information generating section 107 switches the process of generating normal information from one to another based on the area division result from the segmentation section 105 (step S122). Where the area is not an unmatched area (No in step S122), the normal information generating section 107 generates normal information by a method similar to that of the first embodiment (steps S107-S109). On the other hand, where the area is an unmatched area (Yes in step S122), the normal information generating section 107 obtains normal information by utilizing the fact that an unmatched area is an area near the occluding edge. Specifically, first, the normal's one-degree-of-freedom estimating section 106 estimates normal's one-degree-of-freedom information (step S123), and the normal direction vector of the unmatched area is estimated from normal information of a nearby pixel by utilizing the obtained normal's one-degree-of-freedom information and the fact that it is an area near the occluding edge (step S124).

Figure 34:
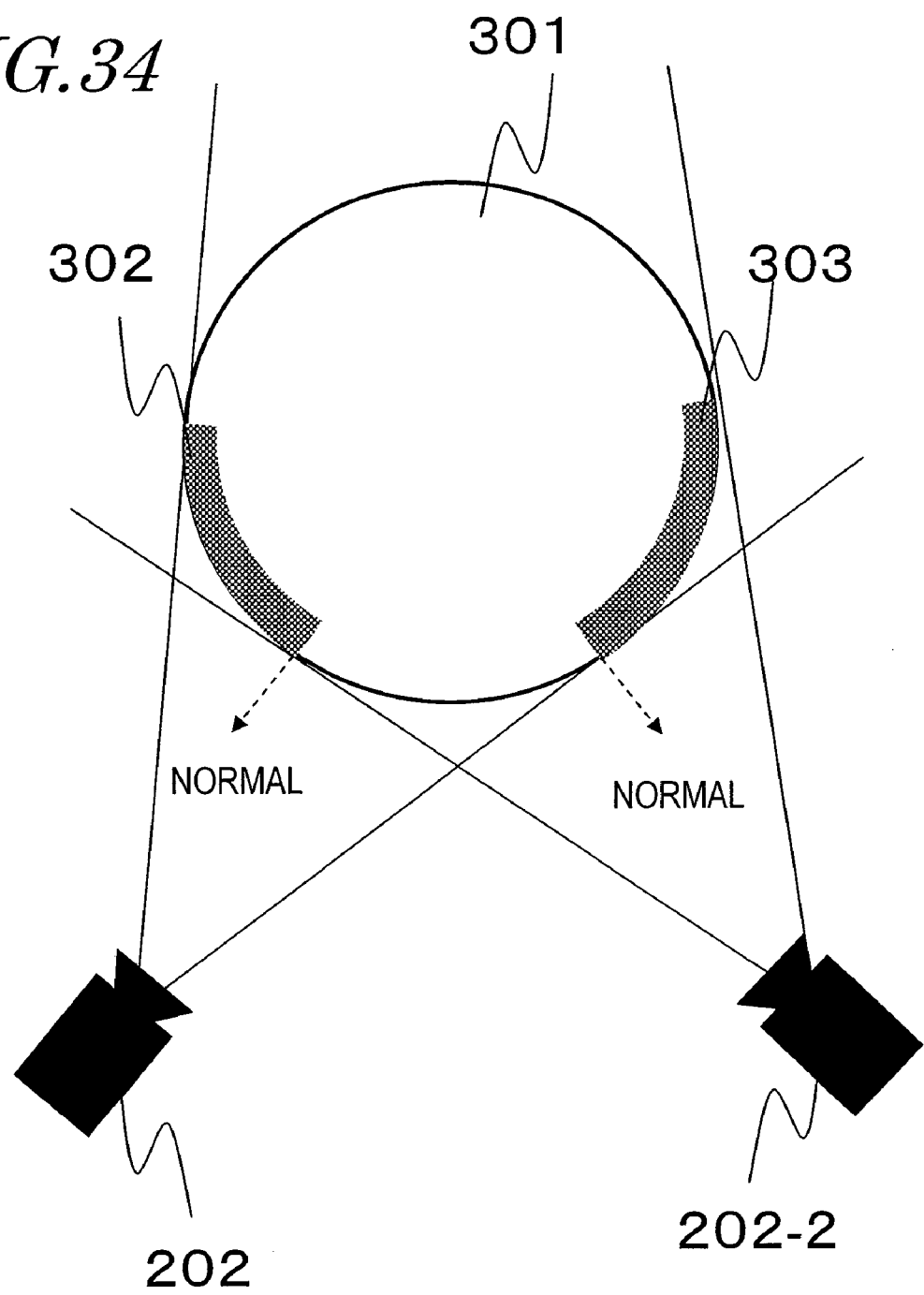
[FIG. 34] A schematic diagram illustrating the relationship between an unmatched area, which is an occlusion area, and the normal direction.

FIG. 34 is a schematic diagram illustrating the relationship between an unmatched area, which is an occlusion area, and a normal direction. In this figure, the image sensors 202 and 202-2 are capturing images of a spherical subject 301. In this case, an area 302 and an area 303 are the areas to be unmatched areas for the image sensors. The area 302 is not observed from the image sensor 202-2, and the area 303 is not observed from the image sensor 202. Therefore, the area 302 is an unmatched area for the image sensor 202, i.e., the first image, and the area 303 is an unmatched area for the image sensor 202-2, i.e., the second image. Because the unmatched area 302, 303 has an occlusion in either image, it can be seen that it is an area near the occluding edge.

At the occluding edge boundary, a normal direction vector exists on the x-y plane of FIG. 30, i.e., on the plane perpendicular to the optical axis. Therefore, the normal information generating section 107 obtains the normal direction vector assuming that the normal's second degree of freedom of the unmatched area is on the x-y plane. Then, since the normal's one-degree-of-freedom information $\phi n$ has an ambiguity of 180 degrees, the normal direction vector n has an ambiguity of 180 degrees, i.e., n(nx,ny,0) and n'(−nx,−ny,0). One may use the continuity of the normal direction vector near the unmatched area in order to remove the ambiguity. Specifically, one may calculate the continuity of each of the normal direction vector candidates (nx,ny,0) and (−nx,−ny,0) with the normal direction vector near the unmatched area, to thereby choose, as the normal direction vector, the normal direction vector candidate with which the continuity is better maintained. Specifically, one may calculate the inner product value with the nearby normal direction vector, to thereby choose, as the normal direction vector, the normal direction vector candidate having a greater inner product value. This process identifies the normal direction vector represented as a broken-line arrow in FIG. 34.

In order to obtain the normal's one-degree-of-freedom information by means of the normal's one-degree-of-freedom estimating section 106, it is necessary to perform an area division between the diffuse reflection component and the specular reflection component. This can be done by using the area division result of a nearby area. It is understood that one may assume that no specular reflection occurs in an occluding area, and may process it as the diffuse reflection component.

A camera including therein the normal information generating device 100 of the present embodiment is the same as the camera 200 of Embodiment 1 (FIG. 5). Therefore, the detailed description will be omitted.

As described above, with the normal obtaining method of the present embodiment, it is possible to estimate a normal direction vector even in an occlusion area, which was difficult with conventional approaches, by detecting an occlusion area by means of the segmentation section 105, and using the normal's one-degree-of-freedom information obtained by the normal's one-degree-of-freedom estimating section 106.

Note that while the patterned polarizer 201 is a photonic crystal in the present embodiment, it may be a polarizer element of a film type or a wire-grid type, or be a polarizer element of any other suitable principle. Alternatively, images may be captured while rotating a polarizing plate attached in front of the image sensor 202, without using a patterned polarizer, to thereby obtain intensity values for different polarization main axes over time. This method is disclosed in Japanese Laid-Open Patent Publication No. 11-211433, for example. In such a case, polarizers may be placed in front of the individual image sensors 202 and 202-2. It is understood that one may use only one polarizer that covers the plurality of image sensors 202 and 202-2.

Note that while the polarization information obtaining section 103 is provided separately for the first polarization image capturing section 102 and for the second polarization image capturing section 102-2 in the present embodiment, it is understood that they may be implemented as a single module.

While the segmentation section 105 is provided separately for the first polarization information obtaining section 103 and for the second polarization information obtaining section 103-2 in the present embodiment, it is understood that they may be implemented as a single module.

While the normal's one-degree-of-freedom estimating section 106 is provided separately for the first polarization information obtaining section 103 and the second polarization information obtaining section 103-2 in the present embodiment, it is understood that they may be implemented as a single module.

While the segmentation section 105 divides an area into the specular reflection component area and the diffuse reflection component area by using the intensity difference between the stereo images, it is understood that this may be done based only on each image. Such a process may be done by using a known method, e.g., a method that utilizes color information of an image (see, for example, S. K. Nayar, X. S. Fang, and T. Boult, "Separation of reflection components using color and polarization", International Journal of Computer Vision (IJCV), Vol. 21, No. 3, pp. 163-186, 1997).

As described above, by performing an area division between the specular reflection area and the diffuse reflection area and by performing a different process for each of the divided areas using the polarization information of the subject, it is possible to passively estimate high-precision normal information over a wide area.

Third Embodiment

Figure 35:
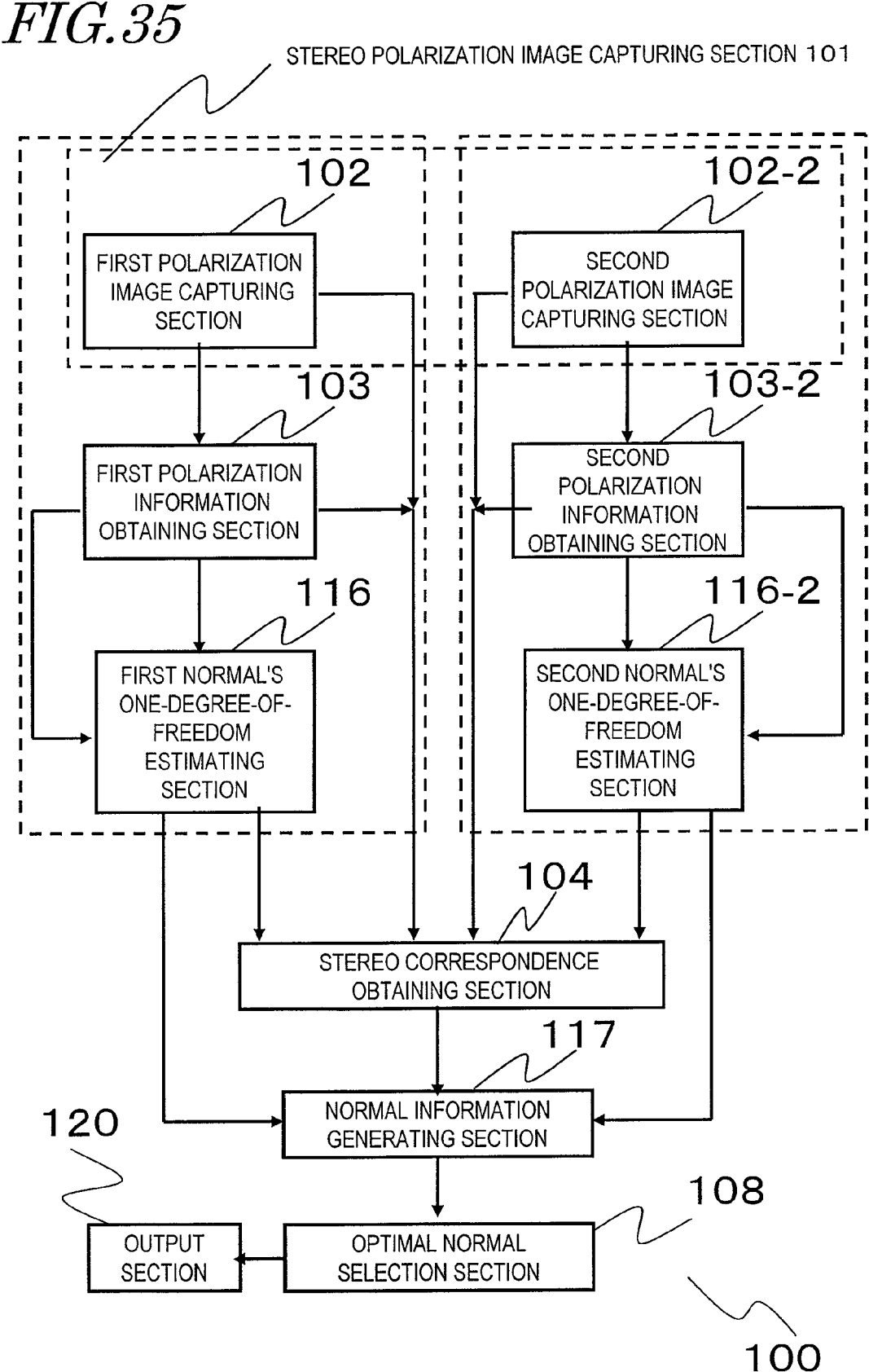
[FIG. 35] A functional block diagram showing a configuration of a normal information generating device according to the third embodiment of the present invention.

Next, a normal information generating device according to a third embodiment of the present invention will be described. FIG. 35 is a functional block diagram showing a configuration of the normal information generating device 100 of the present embodiment. The normal information generating device 100 does not have the segmentation section 105, but instead generates a plurality of normal direction vector candidates by means of a normal information generating section 117, and estimates a normal direction vector by evaluating the appropriateness of the plurality of normal direction vector candidates by means of an optimal normal selection section 108. Note that like elements to those of the normal information generating device 100 of the first embodiment are denoted by like reference numerals to those of FIG. 4 and will not be described below.

The normal's one-degree-of-freedom estimating section 116 estimates, for each pixel, the normal's one degree of freedom on the corresponding subject surface by using the polarization information generated by the polarization information obtaining section 103. Then, the way of obtaining the normal's one degree of freedom varies depending on whether the pixel is a diffuse reflection component or a specular reflection component. Therefore, the normal's one-degree-of-freedom estimating section 116 estimates, as normal's one-degree-of-freedom candidates, both a normal's one-degree-of-freedom candidate ϕnd for a case where the pixel is a diffuse reflection component and a normal's one-degree-of-freedom candidate ϕns for a case where the pixel is a specular reflection component. Specifically, the normal's one-degree-of-freedom candidates ϕnd and ϕns are estimated as described above based on expressions below.

$$\phi_{nd} = \phi_{max} \quad \text{[Expression 28]}$$

$$\text{if } 0 \le \phi_{max} \le \frac{\pi}{2} \text{ then } \phi_{ns} = \phi_{max} + \frac{\pi}{2} \quad \text{[Expression 29]}$$

$$\text{if } \frac{\pi}{2} \le \phi_{max} \le \pi \text{ then } \phi_{ns} = \phi_{max} - \frac{\pi}{2}$$

Herein, ϕmax is the polarization phase obtained by Expression 7. Herein, ϕnd shown in Expression 28 is the information of the emittance plane where it is assumed that the pixel shown in Expression 26 is a diffuse reflection component, and ϕns shown in Expression 29 is the information of the incident plane where it is assumed that the pixel shown in Expression 25 is a specular reflection component.

The normal information generating section 117 estimates a normal direction vector by integrating together the normal's one-degree-of-freedom candidates ϕnd1 and ϕns1 estimated by the first normal's one-degree-of-freedom estimating section 116 and the normal's one-degree-of-freedom candidates ϕnd2 and ϕns2 estimated by the second normal's one-degree-of-freedom estimating section 116-2, by using the correspondence between images obtained by the stereo correspondence obtaining section 104. Since two normal's one-degree-of-freedom candidates are obtained from each of the image sensors 202 and 202-2, four normal direction vector candidates nc1 to nc4 are obtained from the four combinations ("ϕnd1-ϕnd2", "ϕnd1-ϕns2", "ϕns1-ϕnd2", "ϕns1-ϕns2").

The optimal normal selection section 108 selects the optimal one of the four normal direction vector candidates generated by the normal information generating section 117, and estimates the selected one as the normal direction vector n. This process will now be described.

The optimal normal selection section 108 utilizes the continuity of the normal direction vector in order to estimate an optimal normal direction vector for the entire image from among a plurality of candidates. This can be done by selecting, for the entire image, a normal direction vector candidate that minimizes the evaluation function Ev(n) below.

$$Ev(n) = \sum_{y=1}^{wy} \sum_{x=1}^{wx-1} \left( 1 - n(x, y) \cdot n(x+1, y) \right) + \sum_{y=1}^{wy-1} \sum_{x=1}^{wx} \left( 1 - n(x, y) \cdot n(x, y+1) \right) \quad \text{[Expression 30]}$$

Herein, n(x,y) is the normal direction vector at the pixel (x,y), and wx and wy are the width and the height, respectively, of the image. It is understood that such a minimization process, when utilizing the constraint, enables one to obtain an even more accurate normal direction vector.

The constraint for selecting the optimal normal direction vector candidate will be described. First, the spatial continuity of the specular reflection component and the diffuse reflection component among a plurality of cameras will be described. As described above, the specular reflection component is easily influenced by the position of the image sensor (the emittance angle) and the normal direction vector of the subject. From the degree of polarization of the specular reflection component and the diffuse reflection component shown in FIGS. 17 and 18, and the Lambertian model and the Cook-Torrance model shown in Expressions 13, 14 to 22, it can be seen that the intensity information and the polarization information of the specular reflection component and the diffuse reflection component vary continuously with respect to the movement of the image sensor or the movement of the reference point. Therefore, it is believed that where the first polarization image and the second polarization image are both a diffuse reflection component with respect to the reference point P, it is very unlikely that the first polarization image and the second polarization image are both a specular reflection component at the nearby point P'''. That is, the specular reflection component, the diffuse reflection component at the corresponding point in each polarization image is continuously variant to the spatial variation of the reference point. The optimal normal selection section 108 utilizes this finding as the constraint. The constraint is very effective as it is applicable over a wide area of the subject. Moreover, the constraint is also effective where there are a plurality of light sources. In the present embodiment, the constraint described above is applied between pixels that are adjacent to each other.

Figure 36:
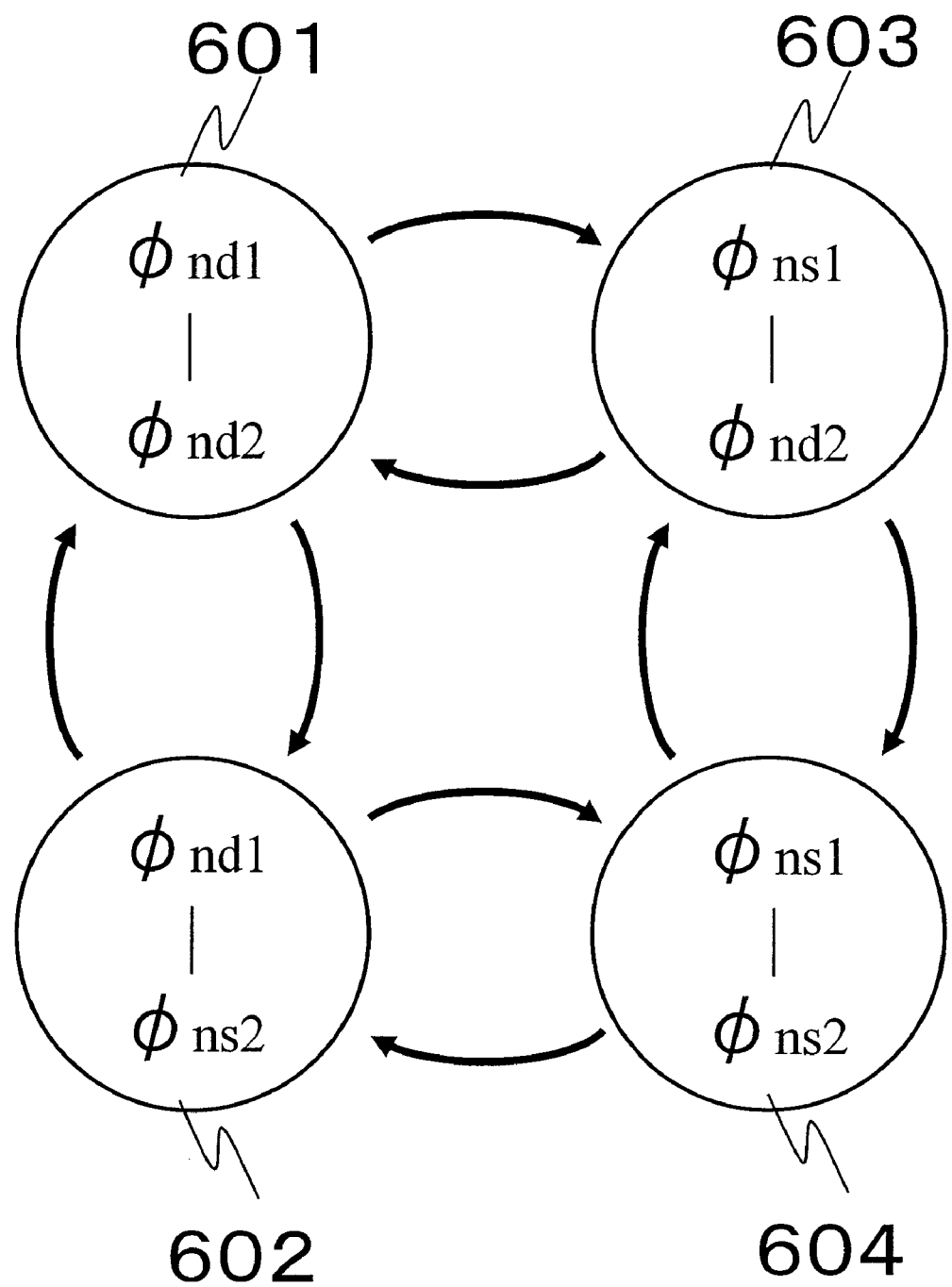
[FIG. 36] A state transition diagram for utilizing, as a constraint, the spatial continuity of the specular reflection component or the diffuse reflection component in the normal information generating section according to the third embodiment of the present invention.

FIG. 36 shows a state transition diagram for utilizing this continuity as the constraint. In this diagram, a state 601 is a state where a normal direction vector is generated while assuming that the first polarization image is a diffuse reflection component and the second polarization image is also a diffuse reflection component. A state 602 is a state where a normal direction vector is generated while assuming that the first polarization image is a diffuse reflection component and the second polarization image is a specular reflection component. A state 603 is a state where a normal direction vector is generated while assuming that the first polarization image is a specular reflection component and the second polarization image is a diffuse reflection component. A state 604 is a state where a normal direction vector is generated while assuming that the first polarization image is a specular reflection component and the second polarization image is also a specular reflection component.

Since the specular reflection component and the diffuse reflection component of a corresponding point of each polarization image vary continuously, if the reference point is 601, i.e., a state where a normal direction vector is generated while assuming that the first polarization image is a diffuse reflection component and the second polarization image is also a diffuse reflection component, then, the neighborhood thereof cannot be 604, i.e., a state where a normal direction vector is generated while assuming that the first polarization image is a specular reflection component and the second polarization image is also a specular reflection component. If the reference point is 602, i.e., a state where a normal direction vector is generated while assuming that the first polarization image is a diffuse reflection component and the second polarization image is a specular reflection component, then, the neighborhood thereof cannot be 603, i.e., a state where a normal direction vector is generated while assuming that the first polarization image is a specular reflection component and the second polarization image is a diffuse reflection component. Therefore, the optimal normal selection section 108 selects the normal direction vector n by selecting, for the entire image, a normal direction vector candidate that minimizes the evaluation function Ev2 below.

$$Ev2(n) = Ev(n) + C_2 Ev1$$ [Expression 31]

Herein, Ev1 is the constraint according to the state transition diagram of FIG. 36, given by the expression below, and C2 is a weighting coefficient of the constraint.

[Expression 32]
if state transition diagram of FIG. 36 is satisfied,
then Ev1=0
else
then Ev1=1

Such a weighting coefficient may be determined experimentally, and may be set to C2=2.0, for example. Expression 31 is an evaluation function such that the evaluation function of Expression 30 takes a large value when it does not comply with the state transition diagram of FIG. 36.

As described above, an optimal normal direction vector can be selected by using the continuity of the specular reflection component and the diffuse reflection component of a corresponding point of each polarization image as the constraint.

As a different constraint, the polarization information obtained by the first polarization information obtaining section 103 and the second polarization information obtaining section 103-2 may be utilized. This process will now be described.

From FIG. 18, the degree of polarization of the diffuse reflection component comes close to 0 when the emittance angle is small. Therefore, it is believed that in an area where the degree of polarization is sufficiently small, the normal direction vector n is sufficiently close to the viewing vector V. Therefore, in an area where the degree of polarization is sufficiently small, a candidate that is closest to the viewing vector may be selected as the normal direction vector n from among the four normal direction vector candidates nc1 to nc4. For example, with a threshold value process, this can be done for an area where the degree of polarization is smaller than 0.05, for example. It is understood that in an area where the degree of polarization is sufficiently small, the normal information generating section 117 may not use the normal's one-degree-of-freedom information obtained by the normal's one-degree-of-freedom estimating section 116, but the normal direction vector n may be set to be equal to the viewing vector V. This is because in an area where the degree of polarization is sufficiently small, the process of obtaining the polarization information by Expression 5 becomes unstable and the normal's one-degree-of-freedom information obtained by the normal's one-degree-of-freedom estimating section 116 will have a low estimation precision. This constraint is effective for an area where the degree of polarization is low.

It is understood that as a different constraint, the normal direction vector of the occluding edge area described above may be used. As described above, near the occluding edge, the normal direction vector n comes close to the x-y plane of FIG. 30. Therefore, the optimal normal selection section 108 may select, as the normal direction vector n, one of the four normal direction vector candidates nc1 to nc4 that is closest to the x-y plane. This constraint is very effective for an occluding edge area.

As a different constraint by using the polarization information, the degree-of-polarization information may be used. As shown in FIG. 18, for the diffuse reflection component, the degree of polarization, is uniquely determined by the emittance angle and the refractive index. Therefore, where the refractive index of the subject is known, one may make a comparison between the estimated degree of polarization ρe obtained from the estimated normal direction vector and FIG. 18 and the measured degree of polarization ρ obtained by the polarization information obtaining section 103, so as to use such a constraint as to decrease the difference therebetween. In view of the fact that the optical axis is in the z direction as shown in FIG. 30, the emittance angle θe can be calculated by the relationship of the expression below by using the normal direction vector n(nx,ny,nz).

$$\theta_e = \operatorname{Tan}^{-1}\left(\frac{\sqrt{n_x^2 + n_y^2}}{|n_z|}\right)$$ [Expression 33]

The constraint can be used only when the normal's one-degree-of-freedom candidate is estimated to be φnd by the normal's one-degree-of-freedom estimating section 116.

It is understood that where the light source direction is known (for example, where the normal information generating device 100 has a flash function and captures images while using a flash), the degree of polarization of the specular reflection component shown in FIG. 17 may be used. As shown in FIG. 17, for the specular reflection component, the degree of polarization is uniquely determined by the angle of incidence and the refractive index. Therefore, where the refractive index of the subject and the light source direction vector L are known, one may make a comparison between the estimated degree of polarization obtained from the estimated normal direction vector and FIG. 17 and the measured degree of polarization obtained by the polarization information obtaining section 103, so as to use such a constraint as to decrease the difference therebetween. In such a case, by combining this with the constraint described above where the diffuse reflection component is assumed, it is possible to evaluate the normal direction vector candidates nc1 to nc4. Such a constraint based on the degree-of-polarization information is effective in cases where accurate degree-of-polarization information can be obtained. They are cases where the obtained degree of polarization is high or cases where the subject has a convex shape so that multiple reflection does not occur.

It is understood that one may make a comparison between the normal direction vector candidates nc1 to nc4 and the polarization-degree-based normal direction vector obtained from the measured degree of polarization ρ by using FIGS. 17 and 18, so as to use such a constraint as to decrease the difference therebetween. In such a case, since two polarization-degree-based normal direction vectors are obtained from FIG. 17, one may use such a constraint as to decrease the smaller one of the difference values between the normal direction vector candidates nc1 to nc4 and the polarization-degree-based normal direction vectors. Such a constraint based on the degree-of-polarization information is effective in cases where accurate degree-of-polarization information can be obtained. They are cases where the obtained degree of polarization is high or cases where the subject has a convex shape so that multiple reflection does not occur.

It is understood that as a different constraint, the depth information may be used. Such depth information can be obtained by using the correspondence between images obtained by the stereo correspondence obtaining section 104. As described above, the first image sensor 202 and the second image sensor 202-2 have been calibrated, and internal parameters and external parameters thereof are known. Therefore, the depth information of the subject can be obtained from the stereo correspondence information obtained by the stereo correspondence obtaining section 104. Moreover, it is possible to obtain the normal direction from the obtained depth information. This can be done by, for example, using the technique of Non-Patent Document 1. Specifically, the following process is performed.

First, assume that the 3-dimensional position coordinates of n neighboring points that are present near the reference point P are (Xi,Yi,Zi). Herein, i satisfies 1≦i≦n. These points are obtained based on the correspondence information obtained by the stereo correspondence obtaining section 104 and the internal parameters and the external parameters of the first image sensor 202 and the second image sensor 202-2. Then, the covariance matrix C of the n neighboring points is calculated by the expression below.

$$C = \sum_{i=1}^{n} \begin{bmatrix} (X_i - X_a) \\ (Y_i - Y_a) \\ (Z_i - Z_a) \end{bmatrix} [(X_i - X_a) \ (Y_i - Y_a) \ (Z_i - Z_a)]$$ [Expression 34]

Herein, (Xa,Ya,Za) are the coordinates of the center of gravity among the n neighboring points. Then, the depth-based normal direction vector nd of the reference point P is obtained as the eigenvector corresponding to the minimum eigenvalue of the covariance matrix C.

As described above, the depth-based normal direction vector nd thus obtained does not have a sufficient precision. However, it can be used as a roughly-determined normal. Thus, the optimal normal selection section 108 selects, as the normal direction vector n, one of the four normal direction vector candidates nc1 to nc4 that is closest to the depth-based normal direction vector nd.

Such a constraint based on the depth information is very effective as it is applicable over a wide area of the subject.

The optimal normal selection section 108 obtains the optimal normal direction vector by using the continuity of the normal direction vector over the entire image, by using at least one of the constraints described above.

Figure 37:
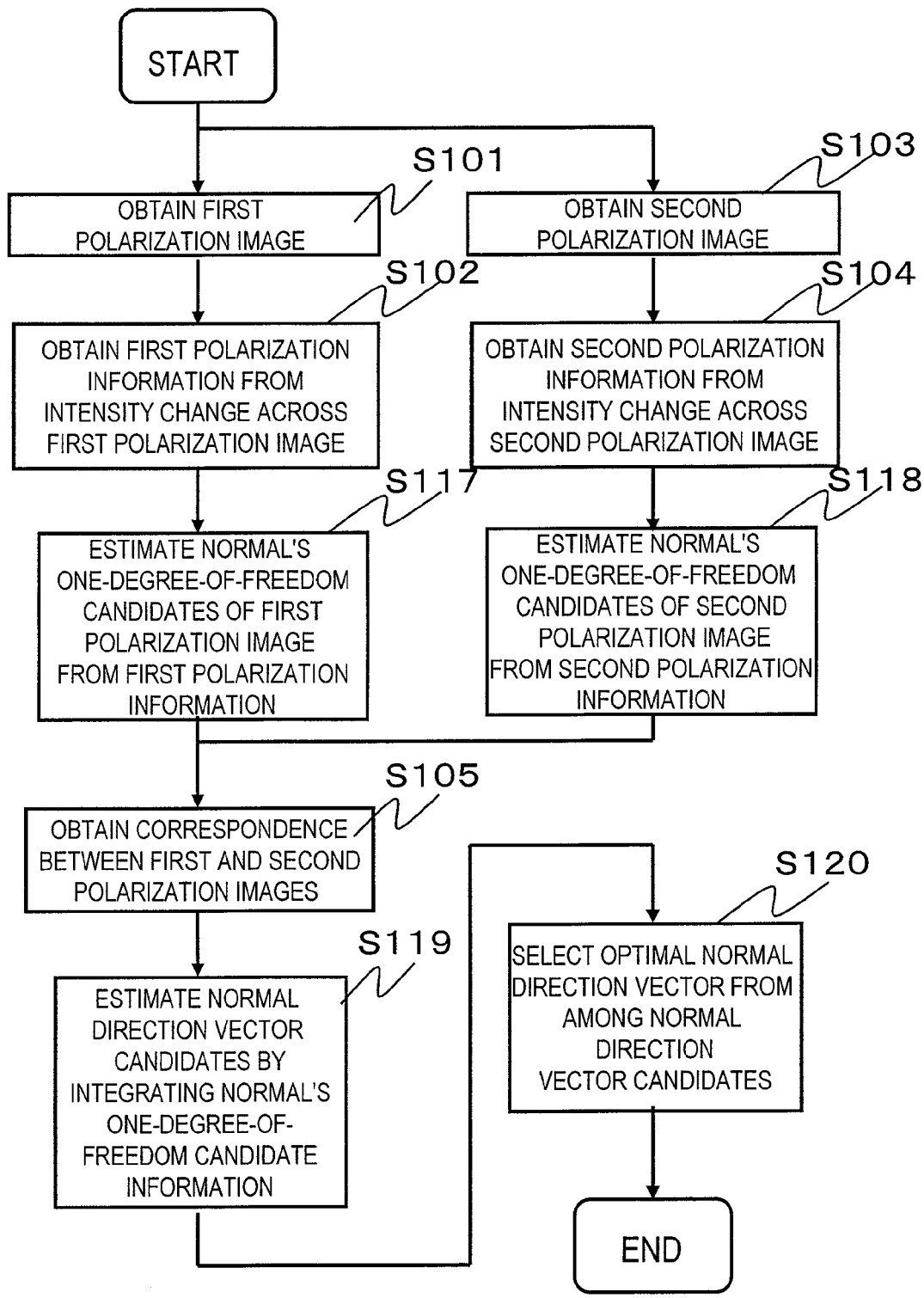
[FIG. 37] A flow chart showing the flow of the process performed by the normal information generating device according to the third embodiment of the present invention.

FIG. 37 is a flow chart showing the flow of the process performed by the normal information generating device 100 of the present embodiment. Note that in FIG. 37, like steps to those of FIG. 7 are denoted by like reference numerals to those of FIG. 7 and will not be described in detail below.

First, the first polarization image capturing section 102 receives light from the subject through the first patterned polarizer 201 by means of the first image sensor 202, thereby obtaining a first polarization image containing polarization information therein (step S101). The first polarization information obtaining section 103 generates the first polarization information by using the intensity change across the first polarization image captured by the first polarization image capturing section 102 (step S102). The first normal's one-degree-of-freedom estimating section 116 estimates, for each pixel, normal's one-degree-of-freedom candidates φnd1 and φns1 on the corresponding subject surface by using the polarization information generated by the polarization information obtaining section 103 (step S117). Then, the second polarization image capturing section 102-2 receives light from the subject through the second patterned polarizer 201-2 by means of the second image sensor 202-2, thereby obtaining a second polarization image containing polarization information therein (step S103). The second polarization information obtaining section 103-2 generates the second polarization information by using the intensity change across the second polarization image captured by the second polarization image capturing section 102-2 (step S104). The second normal's one-degree-of-freedom estimating section 116-2 estimates, for each pixel, normal's one-degree-of-freedom candidates φnd2 and φns2 on the corresponding subject surface by using the polarization information generated by the polarization information obtaining section 103-2 (step S118). Herein, the order of steps S101-S102 and 117 and steps S103-S104 and 118 is arbitrary, and the steps may be performed in parallel or may be performed successively, needless to say. The stereo correspondence obtaining section 104 estimates the pixel-by-pixel correspondence between a plurality of polarization images obtained by the stereo polarization image capturing section 101, by using at least one of the polarization image obtained by the polarization image capturing section 102 (102-2) and the polarization information obtained by the polarization information obtaining section 103 (103-2) (step S105). The normal direction vector candidates nc1 to nc4 are estimated by integrating together the normal's one-degree-of-freedom candidates $\phi$nd1 and $\phi$ns1 estimated by the first normal's one-degree-of-freedom estimating section 116 and the normal's one-degree-of-freedom candidates $\phi$nd2 and $\phi$ns2 estimated by the second normal's one-degree-of-freedom estimating section 116-2, by using the correspondence between images obtained by the stereo correspondence obtaining section 104 (step S119). The optimal normal selection section 108 selects the optimal normal direction vector n from among the normal direction vector candidates nc1 to nc4 by using, for example, the continuity of the normal direction vector (step S120).

A camera including therein the normal information generating device 100 of the present embodiment is the same as the camera 200 of Embodiment 1 (FIG. 5). Therefore, the detailed description will be omitted.

Note that while the polarization information obtaining section 103 is provided separately for the first polarization image capturing section 102 and for the second polarization image capturing section 102-2 in the present embodiment, it is understood that they may be implemented as a single module.

While the normal's one-degree-of-freedom estimating section 116 is provided separately for the first polarization information obtaining section 103 and for the second polarization information obtaining section 103-2 in the present embodiment, it is understood that they may be implemented as a single module.

As described above, by optimally integrating together normal's one-degree-of-freedom candidates assuming both the specular reflection component and the diffuse reflection component, by using the polarization information of the subject, normal information is generated for each pixel, and it is therefore possible to passively estimate high-precision normal information over a wide area.

Fourth Embodiment

Next, a normal information generating device according to a fourth embodiment of the present invention will be described.

Figure 38:
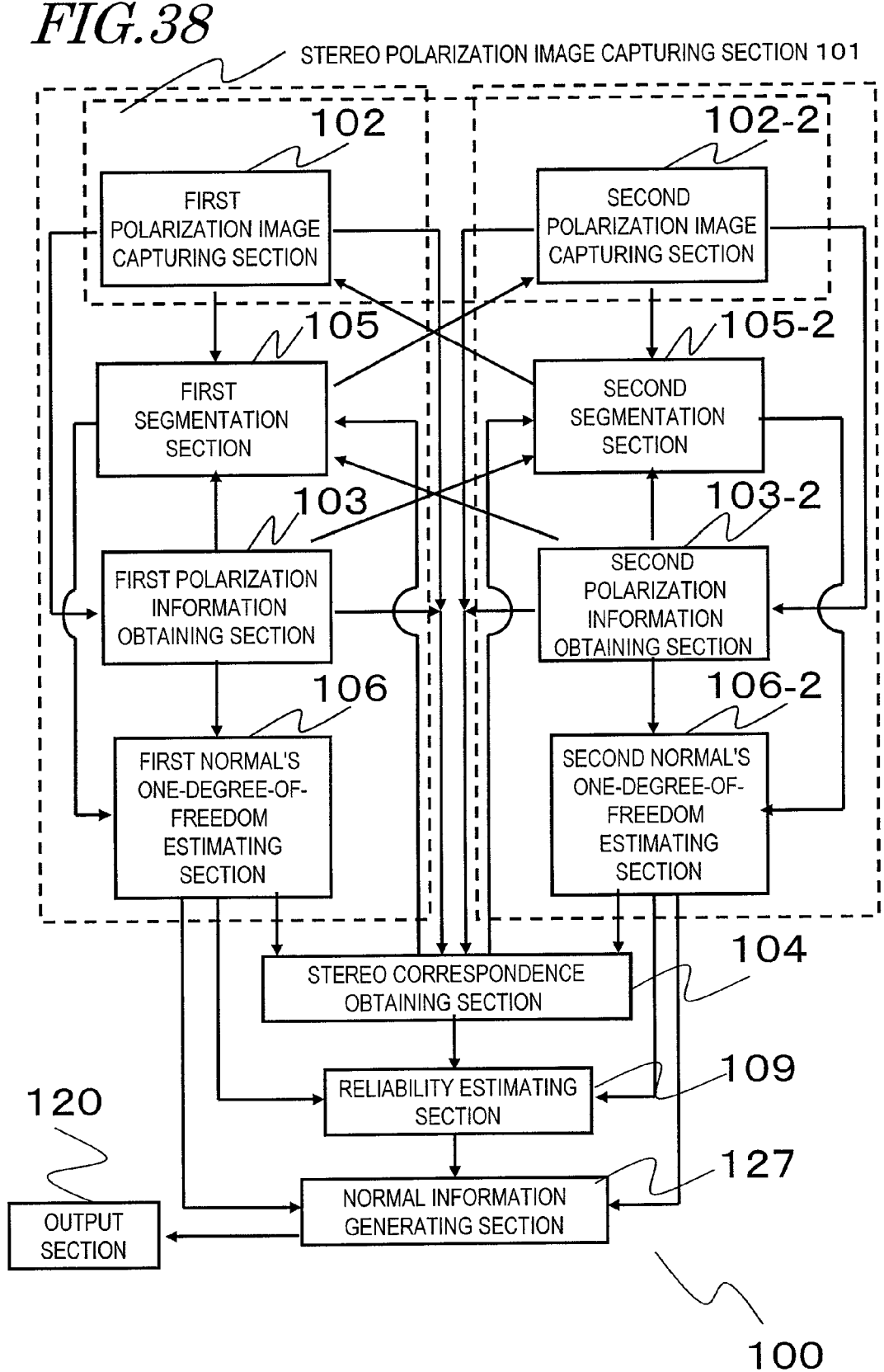
[FIG. 38] A functional block diagram showing a configuration of a normal information generating device according to the fourth and fifth embodiments of the present invention.

FIG. 38 is a functional block diagram showing a configuration of a normal information generating device 100 of the present embodiment. The normal information generating device 100 includes a reliability estimating section 109 for estimating an area where a normal information generating section 127 can accurately estimate normal information and an area where the reliability is low. The normal information generating section 127 estimates the normal direction vector by switching the normal information estimation process from one to another based on the reliability result estimated by the reliability estimating section 109. Note that like elements to those of the normal information generating device 100 of the first embodiment are denoted by like reference numerals to those of FIG. 4 and will not be described below.

The reliability estimating section 109 evaluates the reliability of the normal direction vector estimated by the normal information generating section 127. This can be estimated from the normal's one-degree-of-freedom information estimated by the first normal's one-degree-of-freedom estimating section 106 and the second normal's one-degree-of-freedom estimating section 106-2.

Figure 39:
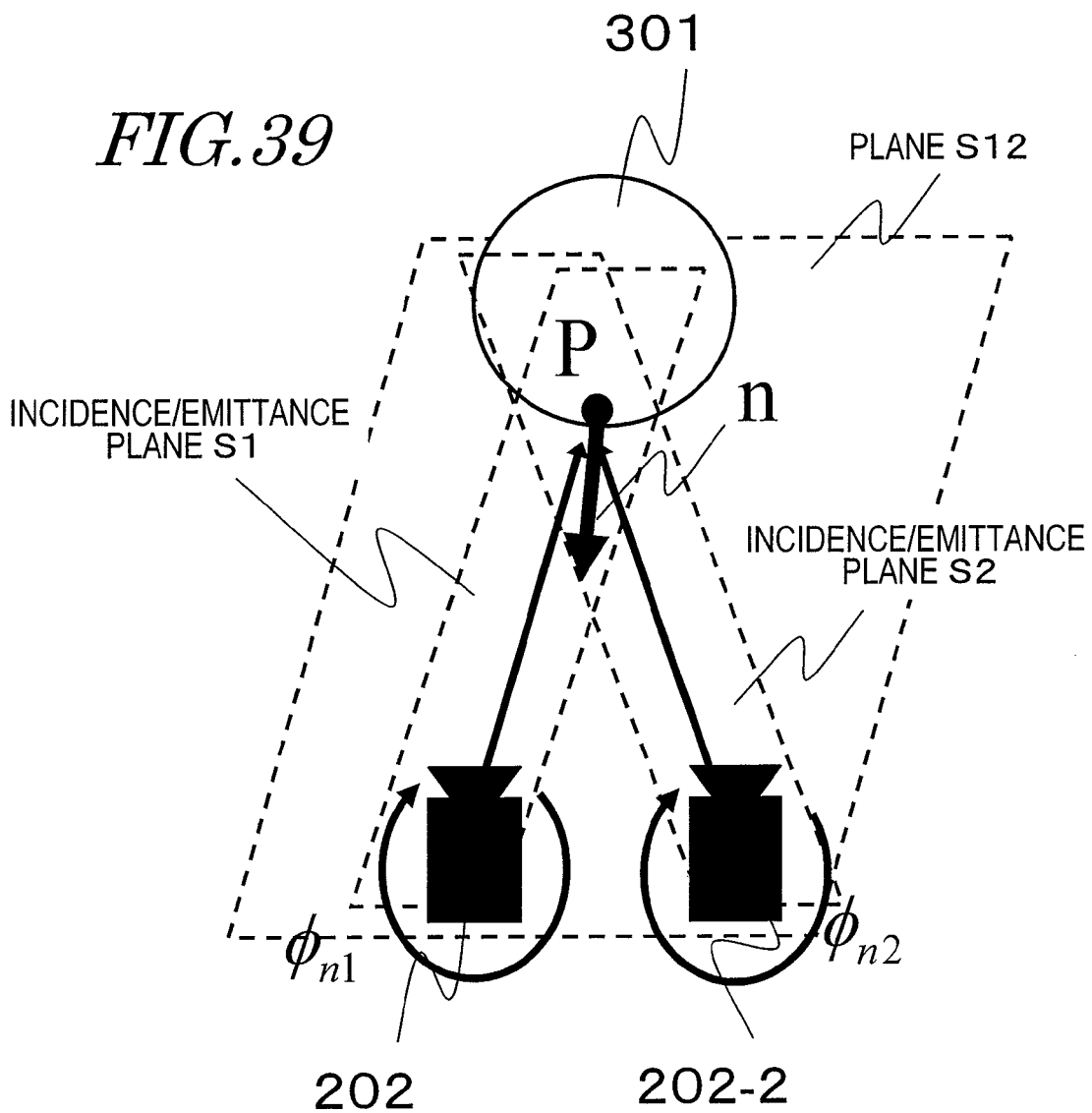
[FIG. 39] A schematic diagram illustrating the reliability of the normal direction vector estimation.

FIG. 39 is a schematic diagram illustrating the reliability of an estimated normal direction vector. As shown in FIG. 23, the normal information generating section 107 of the first embodiment obtains the normal direction vector n as the line of intersection between the incidence/emittance planes S1 and S2 obtained from the polarization images. However, where the following condition is satisfied, the line of intersection between the incidence/emittance planes S1 and S2 is not uniquely determined, and the normal direction vector n is indefinite.

[Condition Where Estimation of Normal Direction Vector N is Indefinite]

The normal direction vector of the reference point P is present on a plane that passes through the following three points:
  the focal position of the image sensor 202;
  the focal position of the image sensor 202-2; and
  the reference point P.

Under the above condition, the incidence/emittance planes S1 and S2 are the same plane S12, and the normal direction vector cannot be uniquely determined as the line of intersection therebetween. Therefore, the reliability estimating section 109 calculates the incidence/emittance plane angle between the incidence/emittance plane S1 and the incidence/emittance plane S2 so as to determine that it is reliable when the incidence/emittance plane angle is large and that it is unreliable when the incidence/emittance plane angle is small.

The normal information generating section 127 switches the normal direction vector estimation process from one to another based on the reliability information estimated by the reliability estimating section 109.

Figure 40:
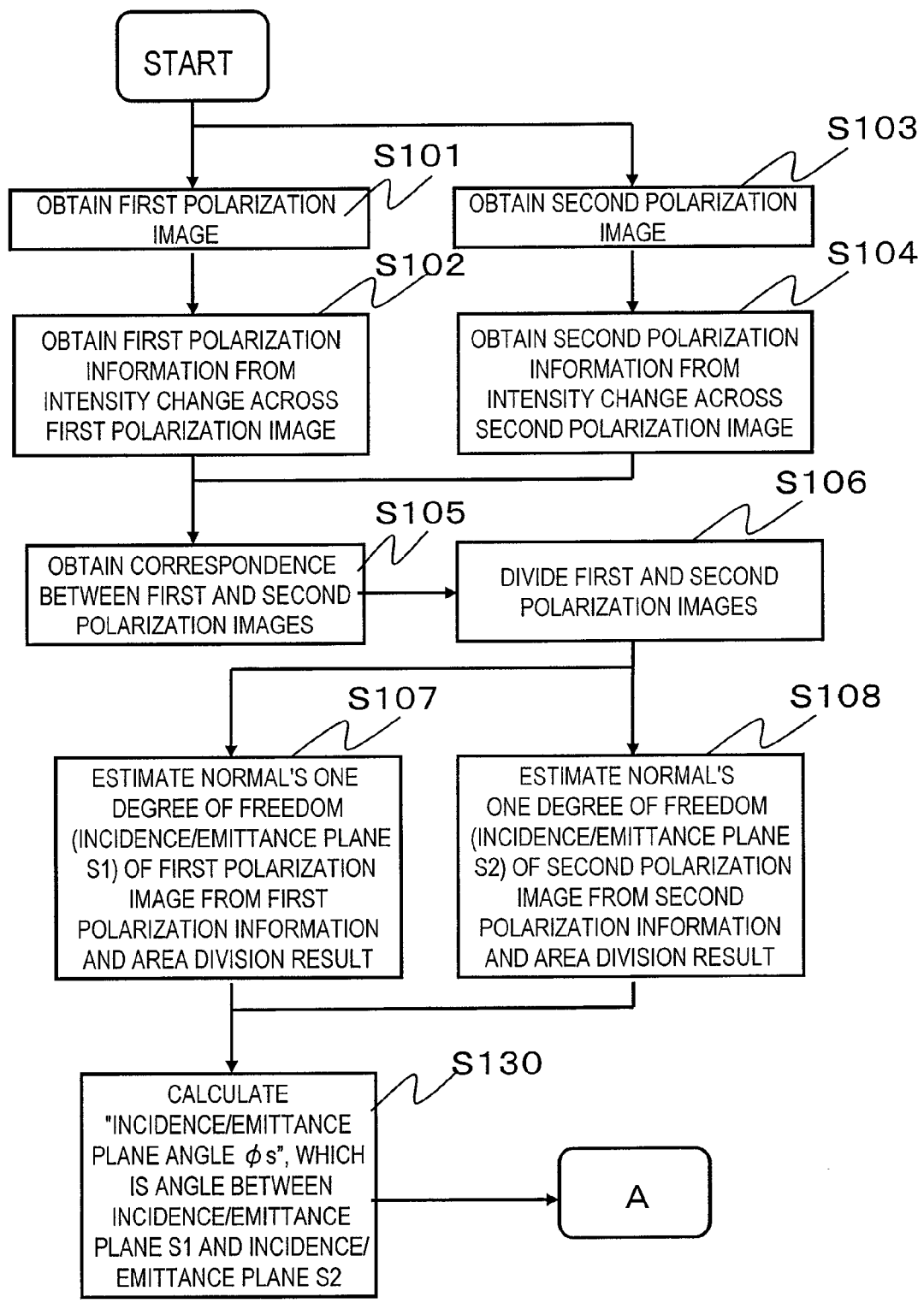
[FIG. 40] A flow chart showing the flow of the process performed by the normal information generating device according to the fourth embodiment of the present invention.
Figure 41:
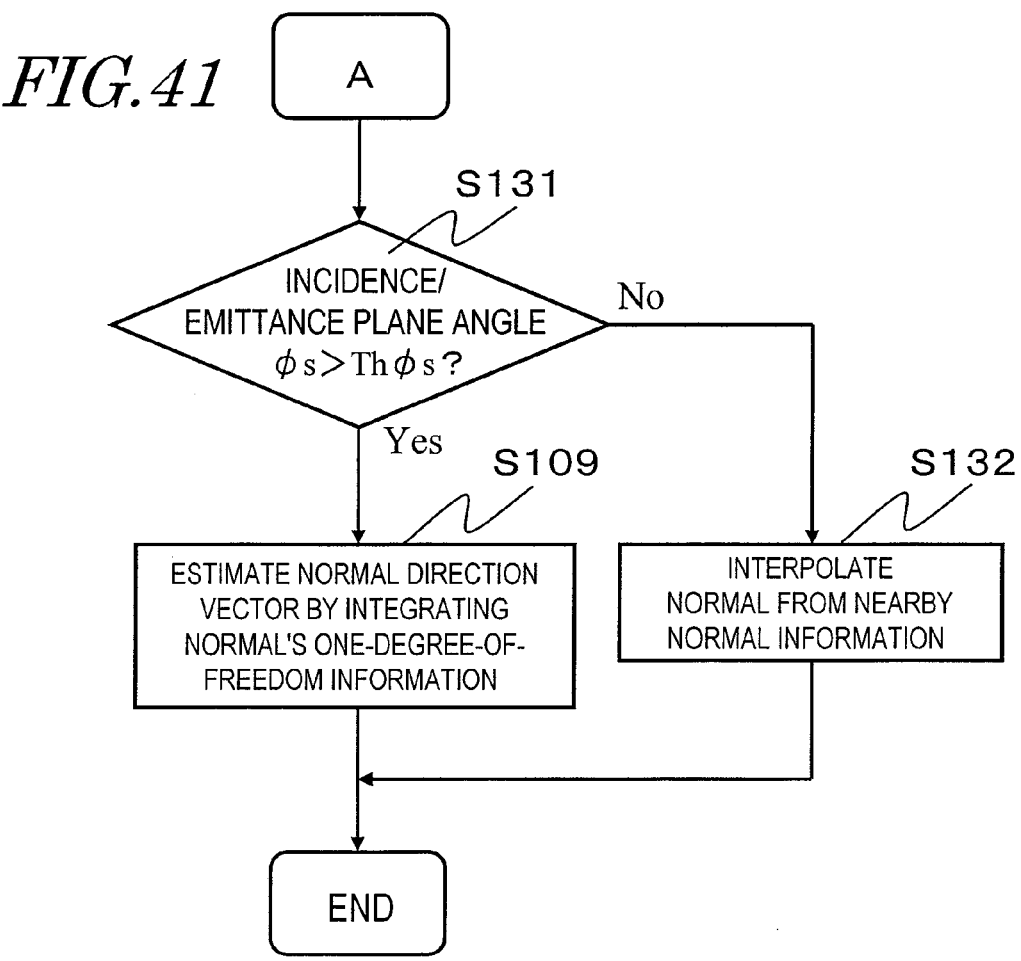
[FIG. 41] A flow chart showing the flow of the process performed by the normal information generating device according to the fourth embodiment of the present invention.

FIGS. 40 and 41 are flow charts showing the flow of the process performed by the normal information generating device 100 of the present embodiment. Note that in FIGS. 40 and 41, like steps to those of FIG. 7 are denoted by like reference numerals to those of FIG. 7 and will not be described in detail below.

The reliability estimating section 109 calculates the incidence/emittance plane angle $\phi$s as the angle between the incidence/emittance plane S1 estimated by the first normal's one-degree-of-freedom estimating section 106 and the incidence/emittance plane S2 estimated by the second normal's one-degree-of-freedom estimating section 106-2 (step S130). Herein, the range of the incidence/emittance plane angle $\phi$s is $[0,\pi]$.

Figure 42:
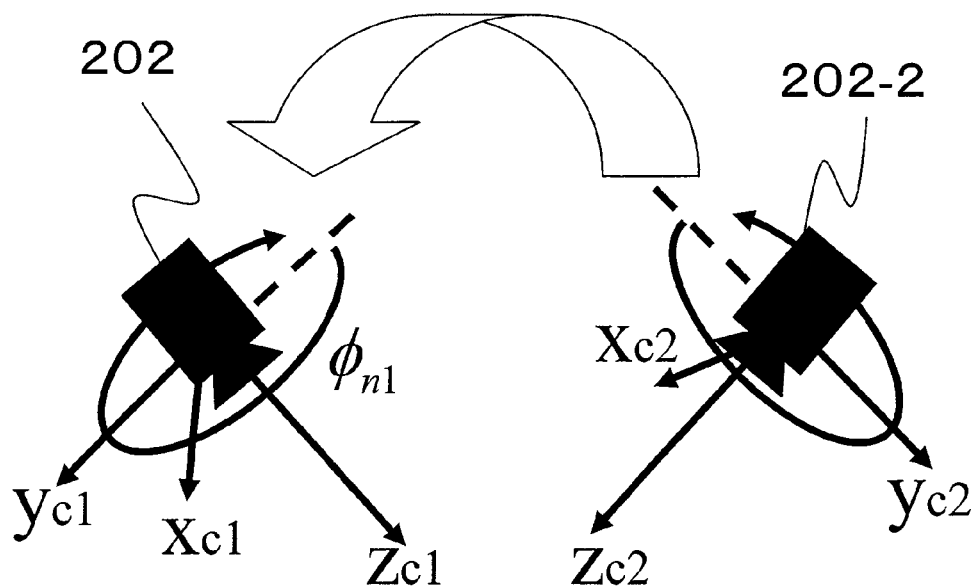
[FIG. 42] A schematic diagram illustrating a method for calculating the incidence/emittance plane angle.

A method for calculating the incidence/emittance plane angle will be described. FIG. 42 is a schematic diagram illustrating a method for calculating the incidence/emittance plane angle. The camera coordinate system C1 of the first image sensor 202 is denoted as xc1–yc1–zc1, and the camera coordinate system C2 of the second image sensor 202-2 as xc2–yc2–zc2. In either coordinate system, the left-right direction of the camera is the x direction, the up-down direction of the camera is the y direction, and the camera optical axis direction is the z direction, as in FIG. 30. The rotation matrix representing a transformation from the camera coordinate system C2 to the camera coordinate system C1 is denoted as Rc2–c1. Moreover, the normal's one degree of freedom $\phi$n and the polarization phase $\phi$max are set so that the –yc direction is 0 (rad) and the xc direction is $\pi/2$ (rad). Then, where $\phi$n1 denotes the normal's one degree of freedom obtained by the first normal's one-degree-of-freedom estimating section 106 and φn2 denotes the normal's one degree of freedom obtained by the second normal's one-degree-of-freedom estimating section 106-2, the incidence/emittance plane angle φs is obtained by the expression below.

$$\phi_s = \min[\cos^{-1}(n_{\phi 1} \cdot (R_{c2-c1} n_{\phi 2})), \cos^{-1}(-n_{\phi 1} \cdot (R_{c2-c1} n_{\phi 2}))]$$ [Expression 35]

Herein, min[A,B] denotes an operator that selects the minimum value between A and B, and this is due to the fact that φn1 and φn2 have an ambiguity of 180 degrees, as described above. $\cos^{-1}(x)$ takes a range of $[0,\pi]$ where $-1 \le x \le 1$. In Expression 35, nφ1 and nφ2 are normal direction vectors of the incidence/emittance planes S1 and S2. Herein, in view of the fact that φn1 and φn2 are each a tilt angle of a plane, nφ1 and nφ2 can be expressed by the expression below.

$$n_{\phi 1} = [\cos(\phi_{n1}) \sin(\phi_{n1}) 0]^T$$ [Expression 36]

$$n_{\phi 2} = [\cos(\phi_{n2}) \sin(\phi_{n2}) 0]^T$$ [Expression 37]

The reliability estimating section 109 evaluates the magnitude of the incidence/emittance plane angle φs (step S131). That is, the reliability estimating section 109 compares the magnitude of the incidence/emittance plane angle φs with the threshold Thφs. As a result, if the magnitude of the incidence/emittance plane angle φs is greater than the threshold Thφs (Yes in step S131), the normal information generating section 127 estimates a normal direction vector by integrating together the normal's one-degree-of-freedoms estimated by the normal's one-degree-of-freedom estimating sections 106 and 106-2 by using the correspondence between images obtained by the stereo correspondence obtaining section 104 as described above (step S109), and ends the process. On the other hand, if the magnitude of the incidence/emittance plane angle φs is less than or equal to the threshold Thφs (No in step S131), the reliability estimating section 109 determines that the normal's one-degree-of-freedom information is unreliable, and the normal information generating section 127 does not estimate a normal direction vector by integrating together the normal's one-degree-of-freedom estimating sections 106 and 106-2. In such an area, the normal information generating section 127 obtains the normal direction vector by performing an interpolation process, for example, by using nearby normal direction vectors, which have been obtained (step S132).

The threshold Thφs of the incidence/emittance plane angle φs may be determined experimentally, and may be set to 3 (deg), for example.

It is understood that in step S132, the normal information generating section 127 may obtain a normal direction vector by using the depth-based normal direction vector nd described above, for example, instead of using nearby normal direction vectors.

It is understood that a reliability estimating section 129 may evaluate the reliability from the polarization information estimated by the polarization information obtaining section 103, for example. Herein, the process of evaluating the reliability by comparing the polarization information estimated by the polarization information obtaining section 103 with the normal direction vector n generated by a normal information generating section 147 will be described.

Figure 43:
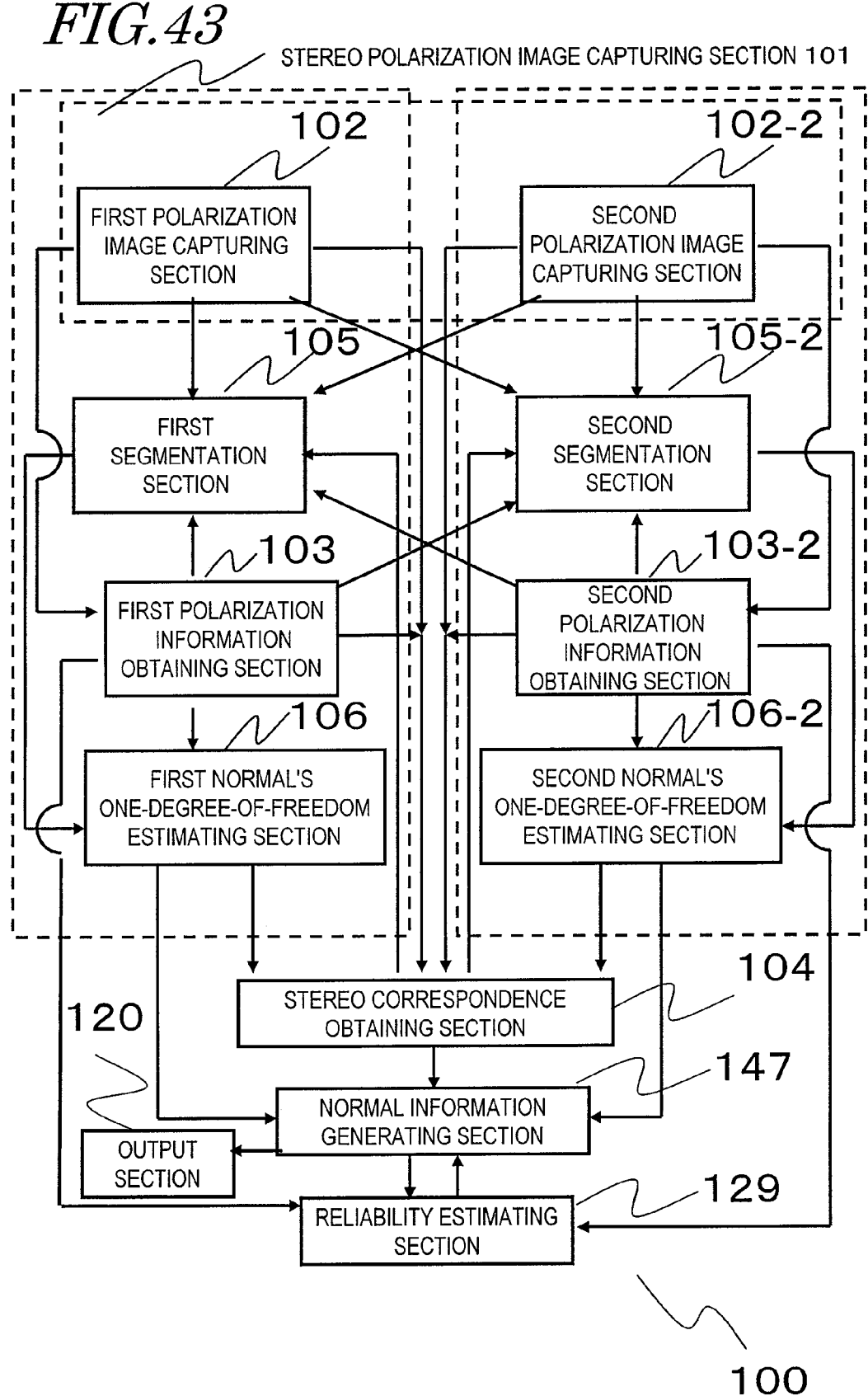
[FIG. 43] Another functional block diagram showing a configuration of the normal information generating device according to the fourth embodiment of the present invention.

FIG. 43 is a functional block diagram showing a configuration of a normal information generating device 100 of the present embodiment. Note that like elements to those of the normal information generating device 100 of the first embodiment are denoted by like reference numerals to those of FIG. 4 and will not be described below.

The normal information generating section 147 of the normal information generating device 100 of the present embodiment estimates the normal direction vector n by first performing a process similar to that of the normal information generating section 107 of the first embodiment. The reliability estimating section 129 evaluates the reliability of the normal direction vector n by comparing the normal direction vector n generated by the normal information generating section 147 with the polarization information estimated by the polarization information obtaining section 103. The normal information generating section 147 discards a normal direction vector n that has been evaluated by the reliability estimating section 129 to be unreliable, and obtains the normal direction vector by performing an interpolation process, for example, by using nearby normal direction vectors, which have been obtained.

Herein, a method for evaluating the reliability based on the degree of polarization ρ, as the polarization information, will be described. First, consider a case where the light source direction and the refractive index of the subject are known as described above. In view of the fact that pixels are divided as the specular reflection component or the diffuse reflection component by the segmentation section 105, the degree of polarization ρe can be estimated from the normal direction vector n from FIGS. 17 and 18 described above. That is, where the pixel is a specular reflection component, the angle of incidence is obtained from the normal direction vector direction n and the light source direction of the reference point. From FIG. 17, the degree of polarization ρe can be estimated if the angle of incidence and the refractive index of the subject are known. On the other hand, if the pixel is a diffuse reflection component, the emittance angle is obtained from the normal direction vector direction n of the reference point and Expression 33. From FIG. 18, the degree of polarization ρe can be estimated if the emittance angle and the refractive index of the subject are known. Herein, if the result of the area division by the segmentation section 105 and the result of estimating the normal direction vector n by the normal information generating section 147 are correct, the degree of polarization ρ obtained by the polarization information obtaining section 103 and the estimated degree of polarization ρe will be values sufficiently close to each other. Therefore, the reliability estimating section 129 calculates the difference value between ρ and ρe, and determines that the reliability is low when the difference value is large and the reliability is high when the difference value is small.

Figure 44:
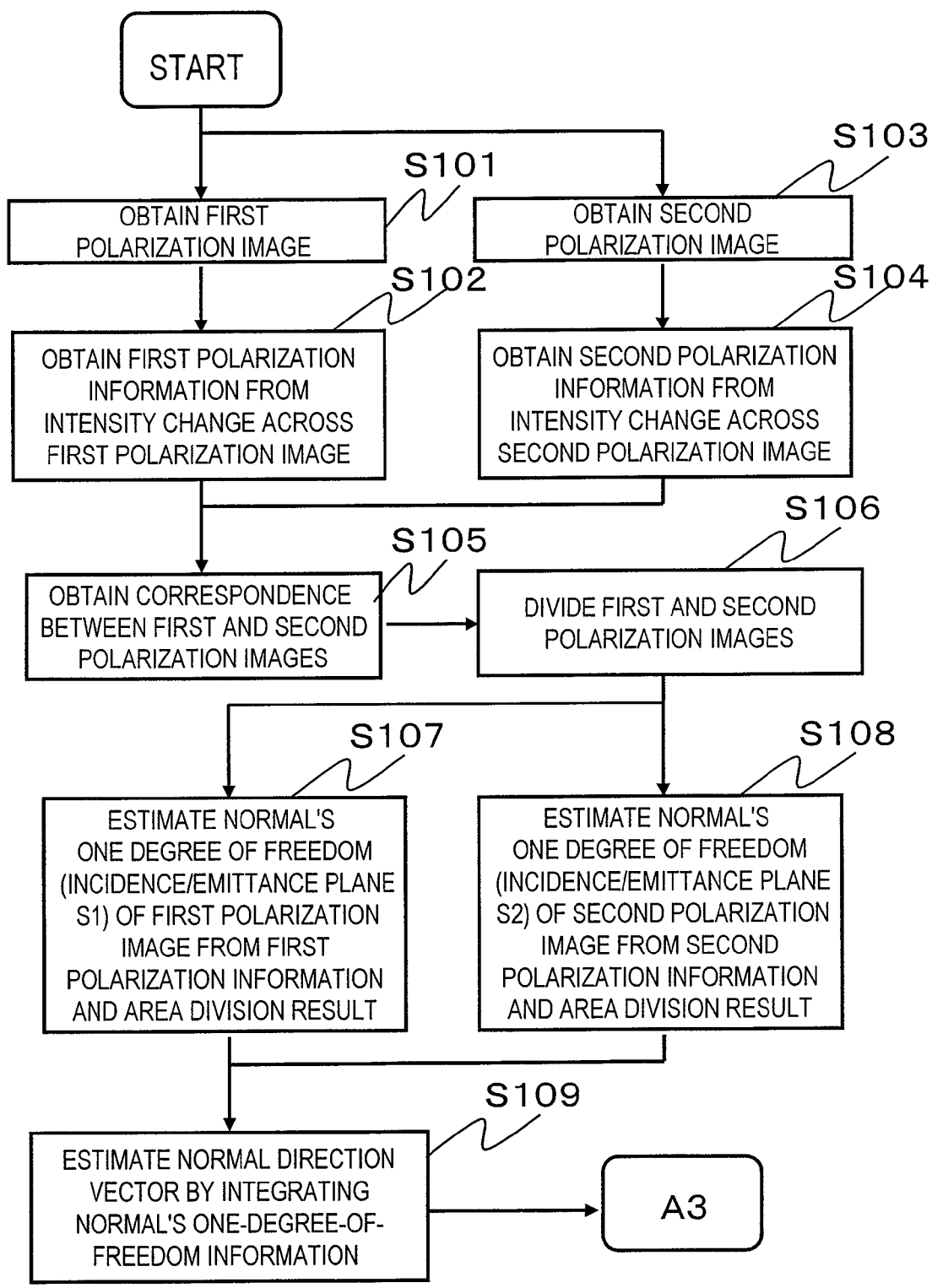
[FIG. 44] Another flow chart showing the flow of the process performed by a segmentation section according to the fourth embodiment of the present invention.
Figure 45:
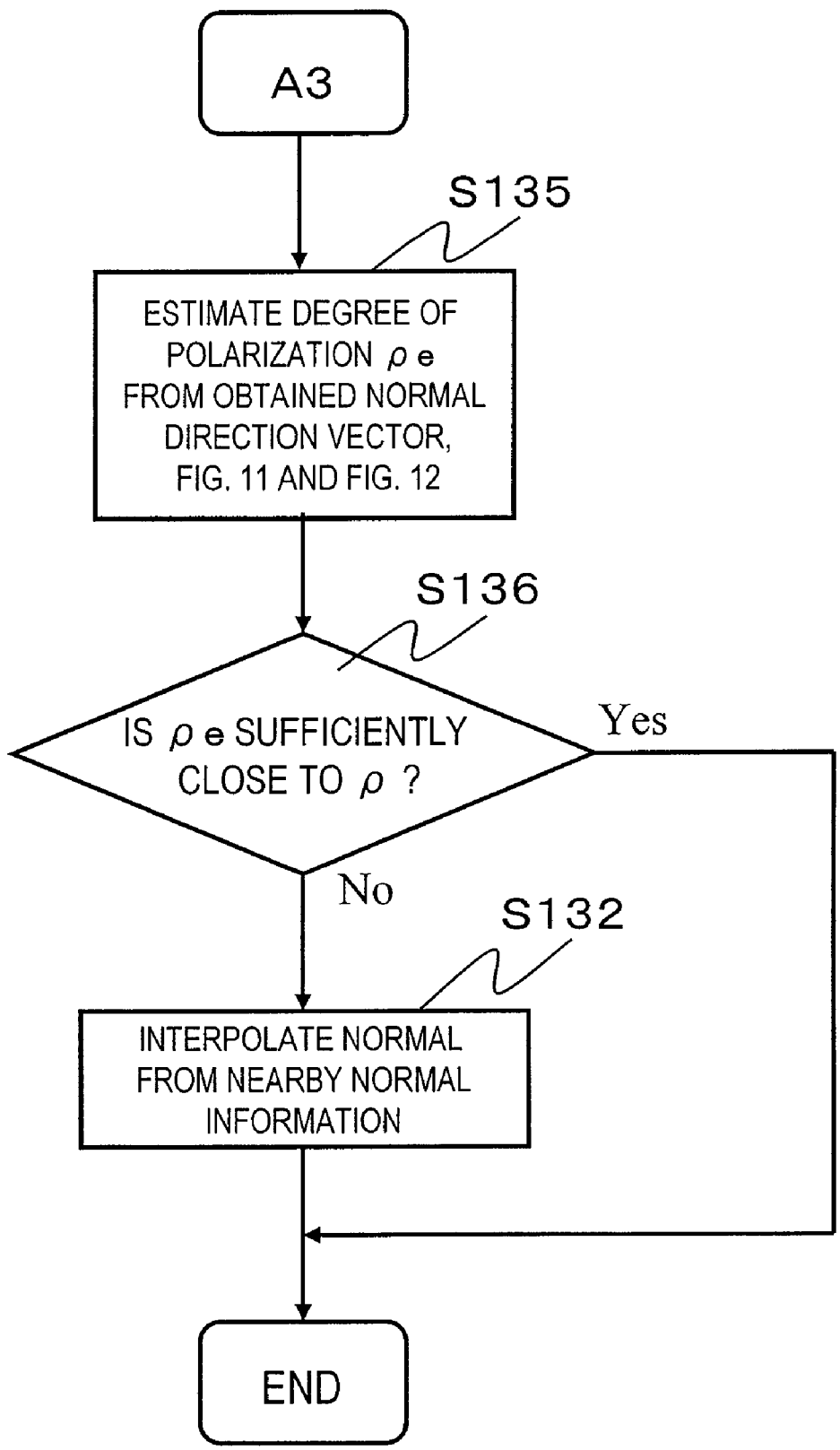
[FIG. 45] Another flow chart showing the flow of the process performed by the segmentation section according to the fourth embodiment of the present invention.

FIGS. 44 and 45 are flow charts showing the flow of the process performed by the segmentation section 105 of the present embodiment. Note that in FIGS. 44 and 45, like steps to those of FIGS. 7 and 41 are denoted by like reference numerals to those of FIGS. 7 and 41 and will not be described in detail below.

First, the normal information generating device 100 estimates the normal direction vector n by performing a process similar to that of the first embodiment (steps S101-S109). The reliability estimating section 129 estimates the degree of polarization ρe by using the normal direction vector n and FIGS. 17 and 18 as described above (step S135). The reliability estimating section 129 estimates the reliability by comparing the degree of polarization ρ obtained by the polarization information obtaining section 103 with the estimated degree of polarization ρe (step S136). Herein, if the degree of polarization ρ obtained by the polarization information obtaining section 103 and the estimated degree of polarization ρe are sufficiently close to each other (Yes in step S136), the reliability estimating section 129 determines that the reliability of the normal direction vector n is sufficiently high and ends the process. On the other hand, if the degree of polarization ρ obtained by the polarization information obtaining section 103 and the estimated degree of polarization ρe are substantially different from each other (No in step S136), the reliability estimating section 129 determines that the normal direction vector n is not reliable, and the normal information generating section 147 does not estimate a normal direction vector by integrating together the normal's one-degree-of-freedom estimating sections 106 and 106-2. In such an area, the normal information generating section 147 obtains the normal direction vector by performing an interpolation process, for example, by using nearby normal direction vectors, which have been obtained (step S132).

A camera including therein the normal information generating device 100 of the present embodiment is the same as the camera 200 of Embodiment 1 (FIG. 5). Therefore, the detailed description will be omitted.

As described above, by optimally integrating together normal's one-degree-of-freedom candidates assuming both the specular reflection component and the diffuse reflection component by using the reliability, by using the polarization information of the subject, normal information is generated for each pixel, and it is therefore possible to passively estimate high-precision normal information over a wide area.

Fifth Embodiment

Next, a normal information generating device according to a fifth embodiment of the present invention will be described. A difference from the normal information generating device of the fourth embodiment is that the reliability is evaluated from the area division result from the segmentation section instead of evaluating the reliability from the normal direction vector.

The process performed by the normal information generating device of the present embodiment is the same as that performed by the normal information generating device of the fourth embodiment shown in FIG. 38. The reliability estimating section 109 of the normal information generating device of the present embodiment evaluates the reliability from the area division result from the segmentation section 105 instead of evaluating the reliability from the normal direction vector estimated by the normal information generating section 127. Herein, a process using a shaded area will be described.

In a shaded area, light is complicated, thus losing the reliability of the polarization information. Therefore, with the normal information generating device 100 of the present embodiment, the shaded area is divided by a segmentation section 115, and the reliability estimating section 109 determines that the shaded area is an area with a low reliability.

Figure 46:
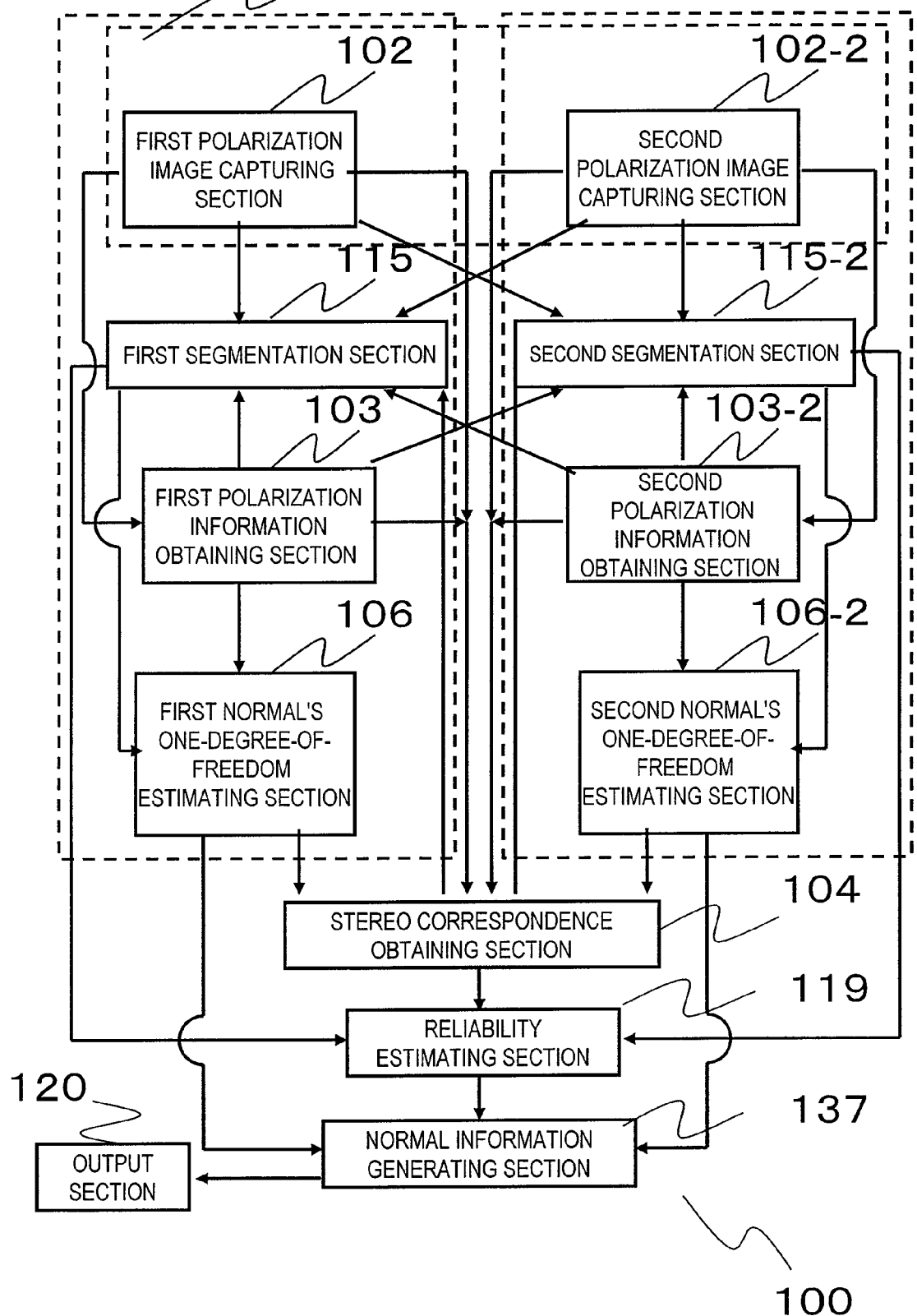
[FIG. 46] Another functional block diagram showing a configuration of a normal information generating device according to the fifth embodiment of the present invention.

FIG. 46 is a functional block diagram showing a configuration of the normal information generating device 100 of the present embodiment. The first segmentation section 115 and the second segmentation section 115-2 of the normal information generating device 100 divide an image into a specular reflection component area, a diffuse reflection component area, and a shaded area. A reliability estimating section 119 estimates an area where a normal information generating section 137 can accurately estimate the normal information and an area with a low reliability based on the area division results obtained by the first segmentation section 115 and the second segmentation section 115-2. The normal information generating section 137 estimates the normal direction vector by switching the normal information estimation process from one to another based on the reliability result estimated by the reliability estimating section 119. Note that like elements to those of the normal information generating device 100 of the first embodiment are denoted by like reference numerals to those of FIG. 4 and will not be described below.

The segmentation section 115 divides an image into a diffuse reflection area, a specular reflection area, and a shaded area, based on the polarization information generated by the polarization information obtaining section 103 and/or the intensity information obtained by the polarization image capturing section 102. Herein, focus on the fact that the shaded area has a low intensity value and the fact that shading is invariant to the movement of the camera. Then, the specular reflection component area, the diffuse reflection component area and the shaded area for a stereo camera can be divided as follows.

[Expression 38]

if $Ic1 < Ths$ or $Ic2 < Ths$ then first polarization image and second polarization image are both shaded area else if $Ic1 > T \cdot Ic2$ then first polarization image is specular reflection component and second polarization image is diffuse reflection component else if $Ic2 > T \cdot Ic1$ then first polarization image is diffuse reflection component and second polarization image is specular reflection component else then first polarization image and second polarization image are both diffuse reflection component Herein, T is a threshold value indicating how much it is separated from the normal Lambertian model, and Ths is a shading threshold value. Although the intensity value of shading is supposed to be 0, it does not become 0 due to the influence of a dark current or ambient light. These threshold values can be determined experimentally.

Figure 47:
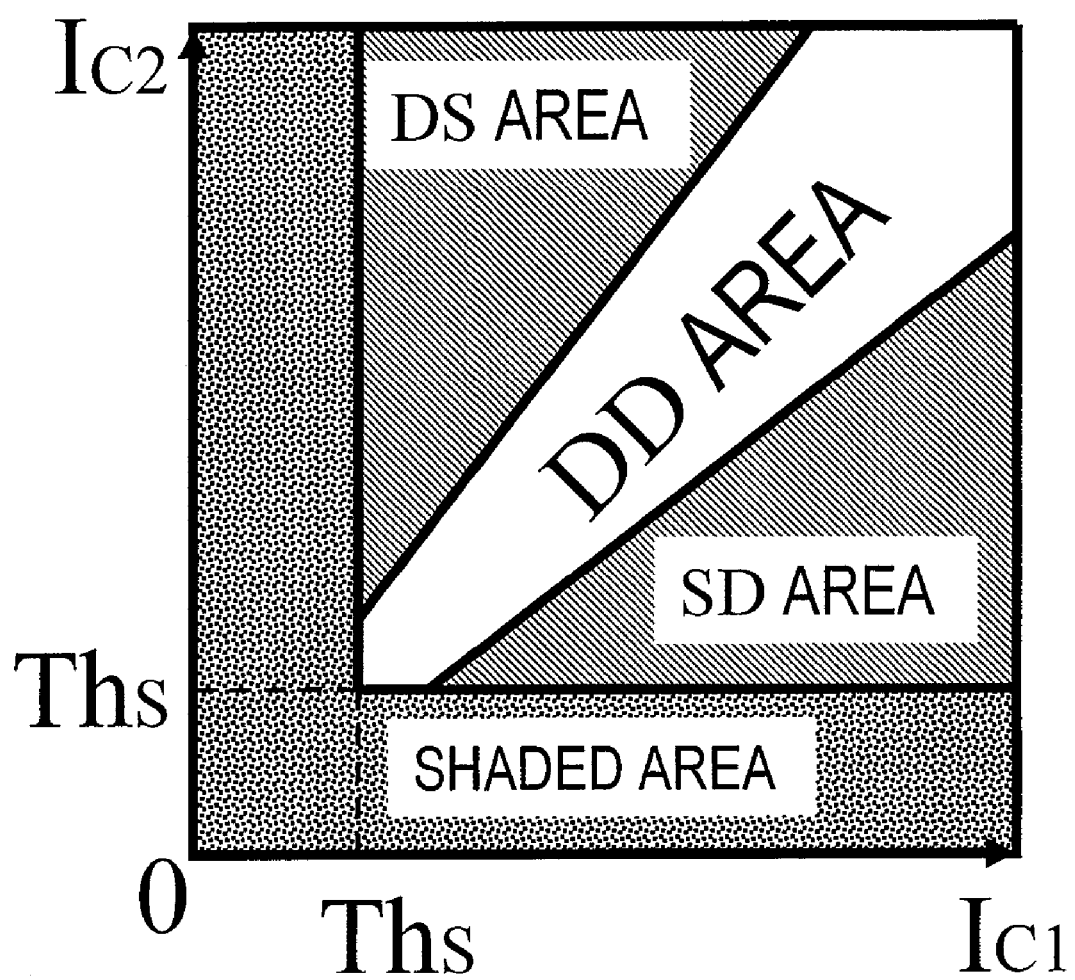
[FIG. 47] A schematic diagram representing an area division criterion used by a segmentation section according to the fifth embodiment of the present invention.

FIG. 47 is a schematic diagram representing the area division criterion described above.

It is understood that the segmentation section 105 may use the polarization maximum intensity value Imax or the polarization minimum intensity value Imin obtained by the polarization information obtaining sections 103 and 103-2, or the average value or the weighted sum between the polarization maximum intensity value Imax and the polarization minimum intensity value Imin (e.g., Imax+2·Imin or Imax+Imin) as Ic1 and Ic2, instead of using the intensity value of the image. As described above, when the polarization minimum intensity value Imin is used, it is possible to reduce the influence of the shine component. Imax+Imin is an image equivalent to an image that is captured when no polarizer is provided. Therefore, by performing the image process using this average value, it is possible to perform a process similar to a normal process where polarization is not used.

The reliability estimating section 119 evaluates the reliability of the normal direction vector estimated by the normal information generating section 137. This can be done by determining whether or not the area divided by the segmentation section 115 is a shaded area.

The normal information generating section 137 switches the normal direction vector estimating process from one to another based on the reliability information estimated by the reliability estimating section 119.

Figure 48:
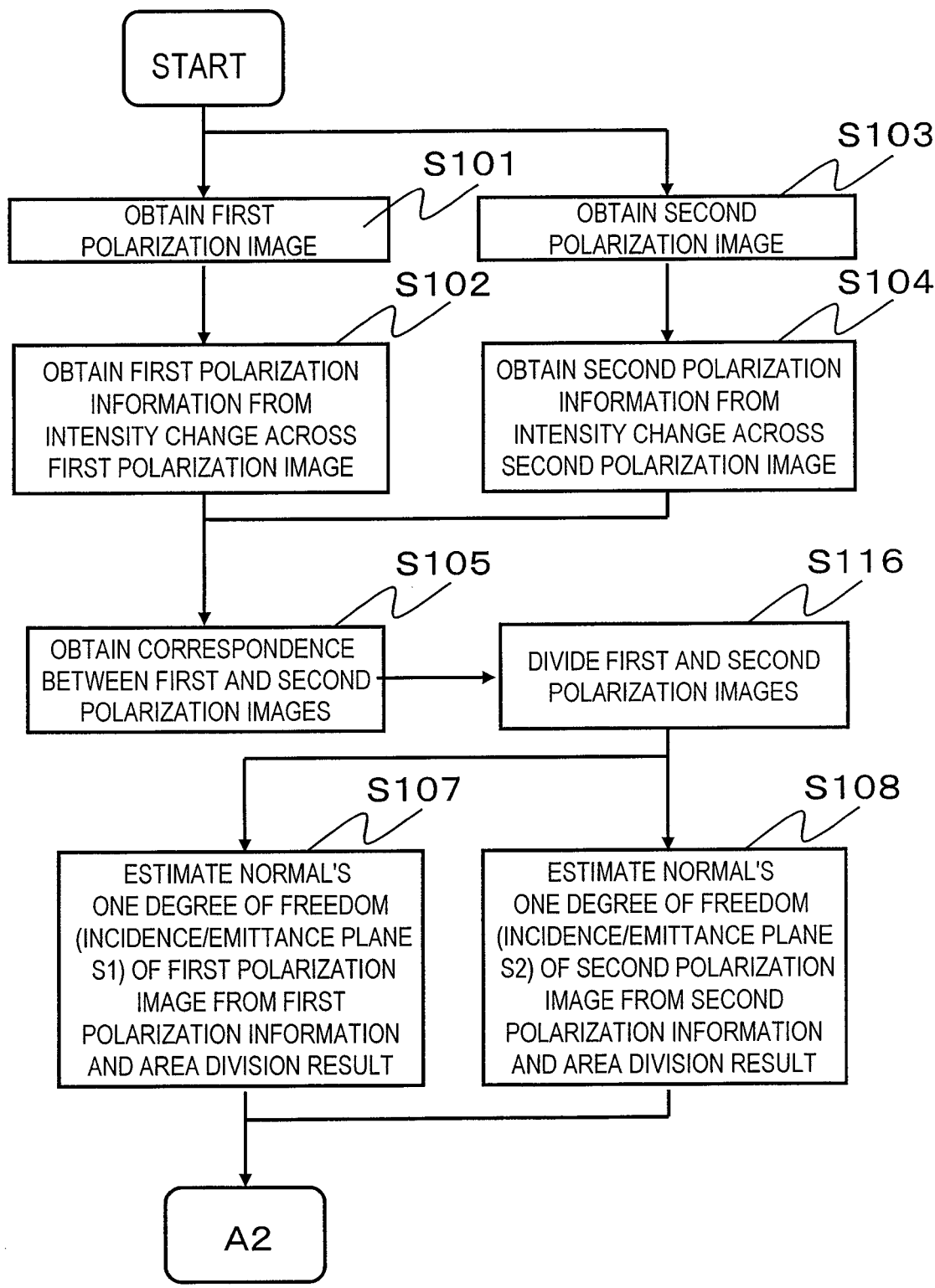
[FIG. 48] Another flow chart showing the flow of the process performed by the normal information generating device according to the fifth embodiment of the present invention.
Figure 49:
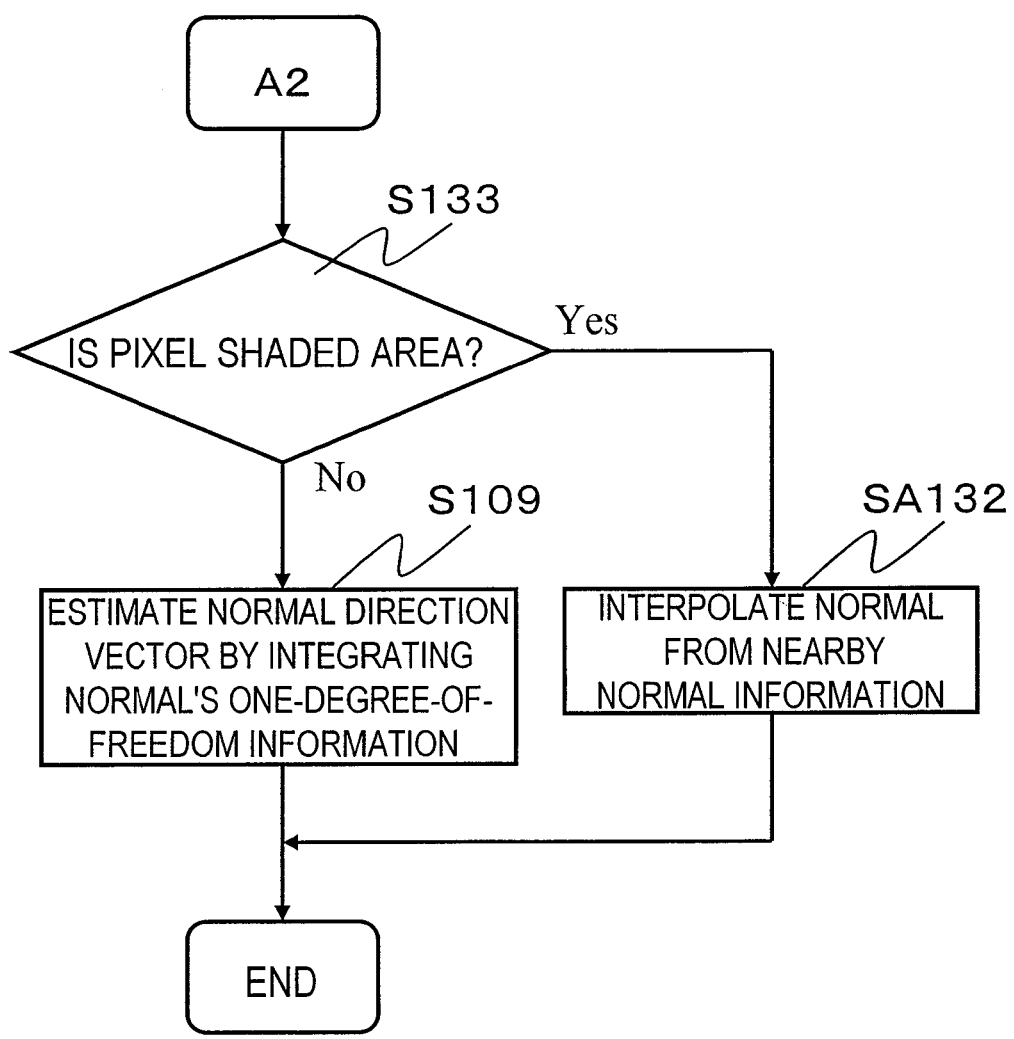
[FIG. 49] Another flow chart showing the flow of the process performed by the normal information generating device according to the fifth embodiment of the present invention.

FIGS. 48 and 49 are flow charts showing the flow of the process performed by the normal information generating device 100 of the present embodiment. Note that in FIGS. 48 and 49, like steps to those of FIGS. 40 and 41 are denoted by like reference numerals to those of FIGS. 40 and 41 and will not be described in detail below.

The segmentation section 115 divides the first image and the second image into a diffuse reflection area, a specular reflection area and a shaded area based on the area division criterion of FIG. 47 by using the first polarization information and the second polarization information generated by the first polarization information obtaining section 103 and the second polarization information obtaining section 103-2 and/or the first intensity information and the second intensity information obtained by the first polarization image capturing section 102 and the second polarization image capturing section 102-2 (step S116).

The reliability estimating section 119 determines the reliability of the estimated normal direction vector by determining whether or not the area division result by the segmentation section 115 is a shaded area (step S133). As a result, if the reference pixel is not a shaded area (No in step S133), the normal information generating section 137 estimates a normal direction vector by integrating together the normal's one-degree-of-freedoms estimated by the normal's one-degree-of-freedom estimating sections 106 and 106-2 by using the correspondence between images obtained by the stereo correspondence obtaining section 104 as described above (step S109), and ends the process. If the reference pixel is a shaded area (Yes in step S133), the reliability estimating section 119 determines that the normal's one-degree-of-freedom information is unreliable, and the normal information generating section 137 does not estimate a normal direction vector by integrating together the normal's one-degree-of-freedom estimating sections 106 and 106-2. In such an area, the normal information generating section 137 obtains the normal direction vector by performing an interpolation process, for example, by using nearby normal direction vectors, which have been obtained (step S132).

A shaded area may be further divided into an attached shadow area and a cast shadow area based on the polarization information. An attached shadow area is also called a "shade area", and a cast shadow area is also called a "shadow area". In a cast shadow area, light is complicated, thus losing the reliability of the polarization information. On the other hand, an attached shadow area exhibits polarization characteristics close to those of the specular reflection component.

Therefore, with the normal information generating device 100 of the present embodiment, the shaded area is divided by a segmentation section into an attached shadow area and a cast shadow area, and the reliability estimating section 109 determines that the cast shadow area is an area with a low reliability. This process will now be described in detail.

Figure 50:
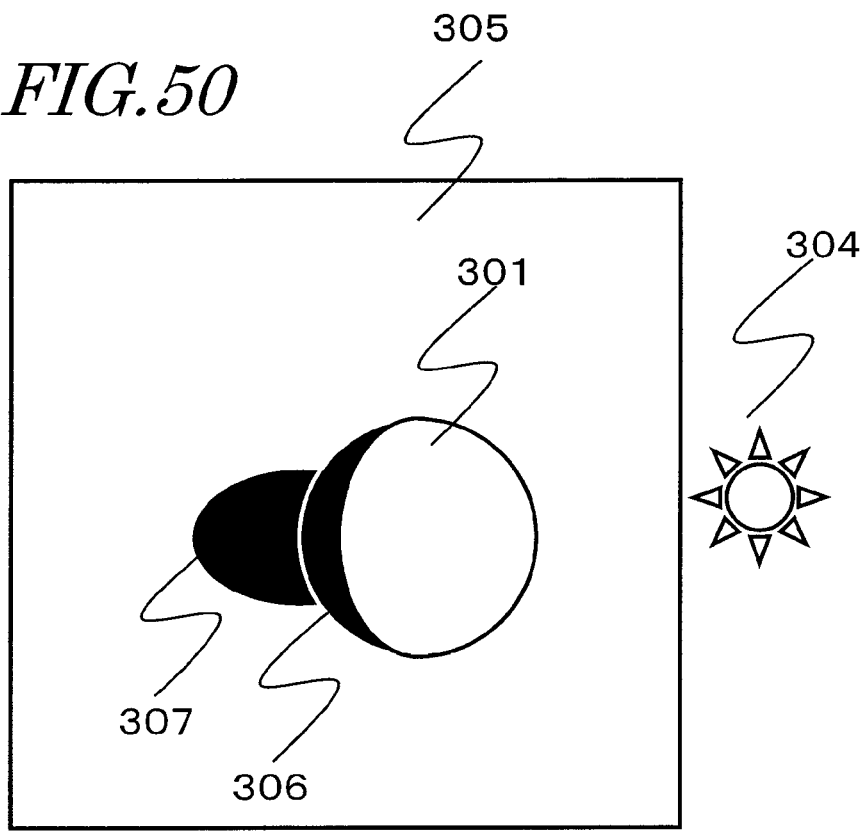
[FIG. 50] A schematic diagram illustrating the shading classification into an attached shadow and a cast shadow.

First, an attached shadow and a cast shadow will be described. FIG. 50 is a schematic diagram illustrating the classification of shading into an attached shadow and a cast shadow. Here, the subject 301 placed on a plane 305 is illuminated by a light source 304. In this figure, reference numerals 306 and 307 each denote a shading. The reference numeral 306 is an attached shadow produced because the normal of the subject 301 is not facing toward the light source 304, and the reference numeral 307 is a cast shadow produced on 305 because the light is blocked by the subject 301, which is a light-blocking subject.

Next, the difference in polarization characteristics between an attached shadow and a cast shadow will be described. First, it is assumed that images are captured in an image-capturing scene that satisfies Condition 1 below, which holds in almost any image-capturing scene on the ground.

Condition 1: "in an image-capturing scene where the subject is present, there exists an object having a large surface near the subject, with a light source present in the opposite direction from the large surface with respect to the subject"

This holds in such an image-capturing scene as follows, for example.

1. In an indoor scene, a ball, being the subject, is placed on a desk. The ball is illuminated by a fluorescent light installed on the ceiling.

2. In an indoor scene, a person, being the subject, is sitting on a chair placed on the floor surface. The person is illuminated by sunlight coming in through a window.

3. In an outdoor scene, an automobile, being the subject, is running on a road. The subject is illuminated by sunlight.

Since a wall or a building also has a large surface, this condition holds in almost any image-capturing scene on the ground.

Figure 51:
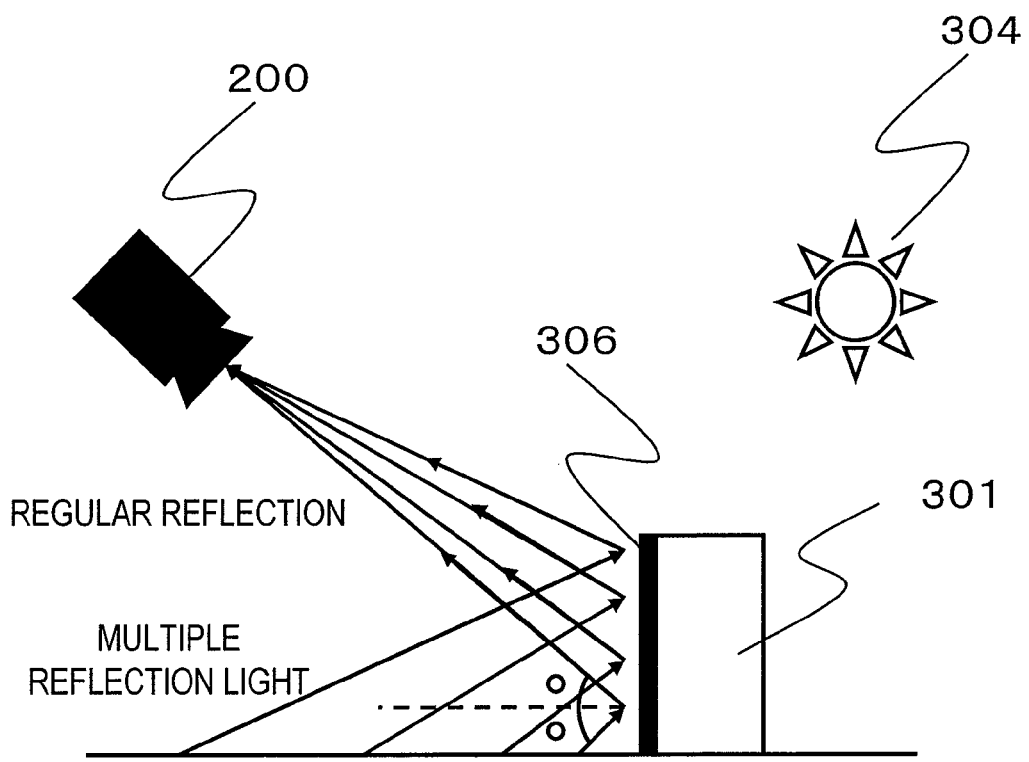
[FIG. 51] A schematic diagram illustrating how multiple reflection light is incident on an attached shadow area.

First, consider an attached shadow, for cases where Condition 1 holds. As shown in FIG. 50, an attached shadow is a shading produced because the normal of the subject is facing in the opposite direction to the light source. Herein, it is believed from Condition 1 that multiple reflection light is incident on the attached shadow from various directions, in view of the fact that there is a large surface in the opposite direction to the light source and the fact that there are actually many rays of diffracted light (multiple reflection light) in the shaded area. That is, it is believed that there exists multiple reflection light, which is to be regular reflection, for the normal of the pixel having an attached shadow. FIG. 51 is a schematic diagram showing this.

Now, it is known that the reflection characteristic of a subject surface is represented as the sum of the specular reflection component, which is a shine, and the diffuse reflection component, which is a mat reflection component. While the diffuse reflection component is observed irrespective of the direction of the light source illuminating the subject, the specular reflection component is a component that is strongly dependent on direction and is observed only when the light source is present generally in the regular reflection direction with respect to the normal direction and the viewing direction of the subject. This holds also for the polarization characteristic.

It is known that where the subject is an object that causes specular reflection, which is a shine, if light is coming from every direction, the subject is strongly influenced by the specular reflection, which is a regular reflection component (for a transparent object, see, for example, Megumi Saito, Yoichi Sato, Katsushi Ikeuchi, Hiroshi Kashiwagi, "Measurement of Surface Orientations of Transparent Objects Using Polarization in Highlight", Trans. of IEICE, D-II, Vol.J82-D-II, No. 9, pp. 1383-1390, 1999). Thus, an attached shadow has a polarization characteristic of specular reflection.

From FIGS. 17 and 18 above, showing the degrees of polarization of the specular reflection component and the diffuse reflection component, it can be seen that if light is coming from every direction, the degree of polarization of the specular reflection component is higher than that of the diffuse reflection component. Also from this, it is speculated that the specular reflection component will be dominant also for the polarization characteristic.

Excluding an occluding edge, and the like, where the emittance angle is close to 90°, the degree of polarization of the specular reflection component is higher than that of the diffuse reflection component, as can be seen from FIGS. 17 and 18. Therefore, an attached shadow, which exhibits the reflection characteristic of the specular reflection component, has a relatively high degree of polarization.

Next, consider a cast shadow. As shown in FIG. 50, a cast shadow is a shading produced as light is blocked by some light-blocking object. In view of Condition 1, a cast shadow is likely to occur on a surface that has a normal direction close to that of the large surface. Therefore, multiple reflection light is incident only from limited directions, as compared with an attached shadow. From this, it is believed that it is unlikely that a light source exists in the regular reflection direction. FIG. 52 is a schematic diagram showing this.

Moreover, as shown in FIG. 18, the degree of polarization of the diffuse reflection component is relatively low. From this, it can be seen that a cast shadow has a relatively small polarization component. In a shaded area, the intensity itself is small, and it is therefore very difficult to estimate the small polarization component. Thus, a cast shadow has a very large polarization estimation error.

In summary, the polarization characteristics of shaded areas are classified as follows.

Attached shadow
  High degree of polarization, low polarization estimation error.
  Exhibits specular reflection characteristic in many cases.
Cast shadow
  Low degree of polarization, large polarization estimation error.
  Exhibits diffuse reflection characteristic in many cases.

By using this classification criterion, shadings are divided into the attached shadow and the cast shadow.

Figures 54, 55:
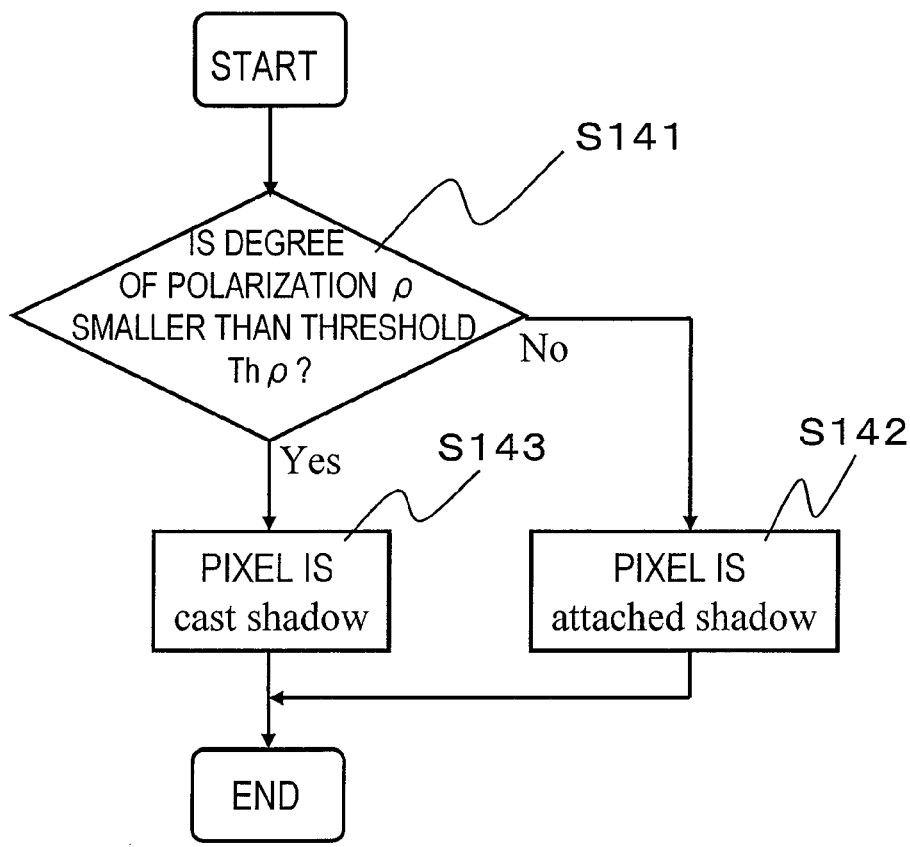
[FIG. 54] A flow chart showing the flow of the process performed by the segmentation section according to the fifth embodiment of the present invention.
[FIG. 55] A schematic table showing another area division criterion for areas divided as shaded areas used by the segmentation section according to the fifth embodiment of the present invention.

FIG. 53 shows a shading area division criterion for an area that is divided as a shaded area according to the image classification criterion of FIG. 47. FIG. 54 is a flow chart showing the flow of the process performed by the segmentation section 115 for an area that is divided as a shaded area.

When the pixel is determined to be a shaded area, the segmentation section 115 evaluates the magnitude of the degree of polarization ρ obtained by the polarization information obtaining section 103 (step S141). That is, the segmentation section 115 compares the magnitude of the degree of polarization ρ with the threshold Thρ. As a result, if the magnitude of the degree of polarization ρ is greater than or equal to the threshold Thρ (No in step S141), the segmentation section 115 determines the pixel to be an attached shadow (step S142), and ends the process. On the other hand, if the magnitude of the degree of polarization ρ is smaller than the threshold Thρ (Yes in step S141), the segmentation section 115 determines the pixel to be a cast shadow (step S143), and ends the process. Then, the threshold Thρ of the degree of polarization may be set based on the refractive index of the subject, the normal direction of the subject, the light source direction, the viewing direction, etc. As shown in FIGS. 17 and 18, the degree of polarization for specular reflection and the degree of polarization for diffuse reflection of the subject can be determined uniquely once the refractive index, the angle of incidence and the emittance angle are obtained. Therefore, the degree of polarization for specular reflection and the degree of polarization for diffuse reflection, which are obtained from FIGS. 17 and 18, may be used as Thρ. If information such as the refractive index of the subject, the normal direction of the subject, the light source direction, the viewing direction, etc., is not available, the threshold Thρ may be determined based on the maximum value of the degree of polarization for diffuse reflection. For example, assuming that there is no subject whose refractive index is 2.0 or more, the maximum value of the degree of polarization for diffuse reflection is believed to be about 0.6 from FIG. 18, and the threshold Thρ may therefore be set to be about 0.8.

It is understood that the threshold Thρ of the degree of polarization may be determined experimentally.

As described above, by using the area division criteria of FIGS. 47 and 53, the segmentation section 115 divides an image into a diffuse reflection area, a specular reflection area, an attached shadow and a cast shadow.

It is understood that the criterion for dividing a shaded area into an attached shadow and a cast shadow is not limited to the polarization estimation error information, but may be the degree-of-polarization information, for example. This process will now be described in detail.

Figure 56:
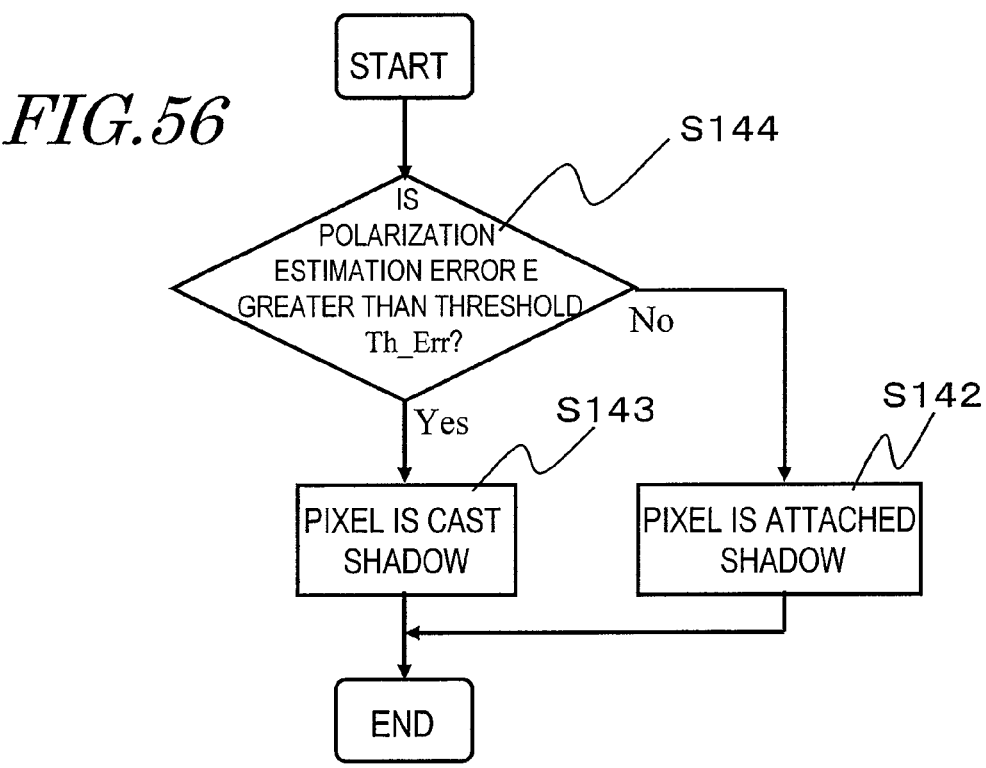
[FIG. 56] Another flow chart showing the flow of the process performed by the segmentation section according to the fifth embodiment of the present invention.

FIG. 55 shows a shading area division criterion for an area that is divided as a shaded area according to the image classification criterion of FIG. 47. FIG. 56 is a flow chart showing the flow of the process performed by the segmentation section 115 for an area that is divided as a shaded area.

When the pixel is determined to be a shaded area, the segmentation section 115 evaluates the magnitude of the polarization estimation error E obtained by the polarization information obtaining section 103 (step S141). That is, the segmentation section 115 compares the magnitude of the polarization estimation error E with the threshold Th_Err. As a result, if the magnitude of the polarization estimation error E is less than or equal to the threshold Th_Err (No in step S144), the segmentation section 115 determines the pixel to be an attached shadow (step S142), and ends the process. On the other hand, if the magnitude of the polarization estimation error E is greater than the threshold Th_Err (Yes in step S144), the segmentation section 115 determines the pixel to be a cast shadow (step S143), and ends the process. In this process, the threshold Th_Err may be determined with reference to the intensity value of the captured image, the amplitude component A of (Expression 1), or the bias component C thereof. For example, the threshold Th_Err may be determined as follows when it is determined with reference to the amplitude component A.

$$Th\_Err = (Th\_E)^2 \cdot (2A)^2 \cdot N \qquad \text{[Expression 39]}$$

This expression indicates how much the polarization estimation error E differs from the amplitude component A. Herein, Th_E is an arbitrary positive constant, which may be determined experimentally, and may be set to 0.3, for example. N is the number of samples described above.

As described above, by using the area division criteria of FIGS. 47 and 55, the segmentation section 115 divides an image into a diffuse reflection area a specular reflection area, an attached shadow and a cast shadow.

The normal's one-degree-of-freedom estimating section 106 estimates the normal's one degree of freedom on the corresponding subject surface by using the polarization information generated by the polarization information obtaining section 103 for each area divided by the segmentation section 115 as described above. Then, a pixel that has been divided as an attached shadow by the segmentation section 115 is regarded as a specular reflection component, and the normal's one-degree-of-freedom information φn is calculated by Expression 25.

The reliability estimating section 119 evaluates the reliability of the normal direction vector estimated by the normal information generating section 137. This may be done by determining whether or not the area divided by the segmentation section 115 is a cast shadow.

The normal information generating section 137 switches the normal direction vector estimating process from one to another based on the reliability information estimated by the reliability estimating section 119.

Figure 57:
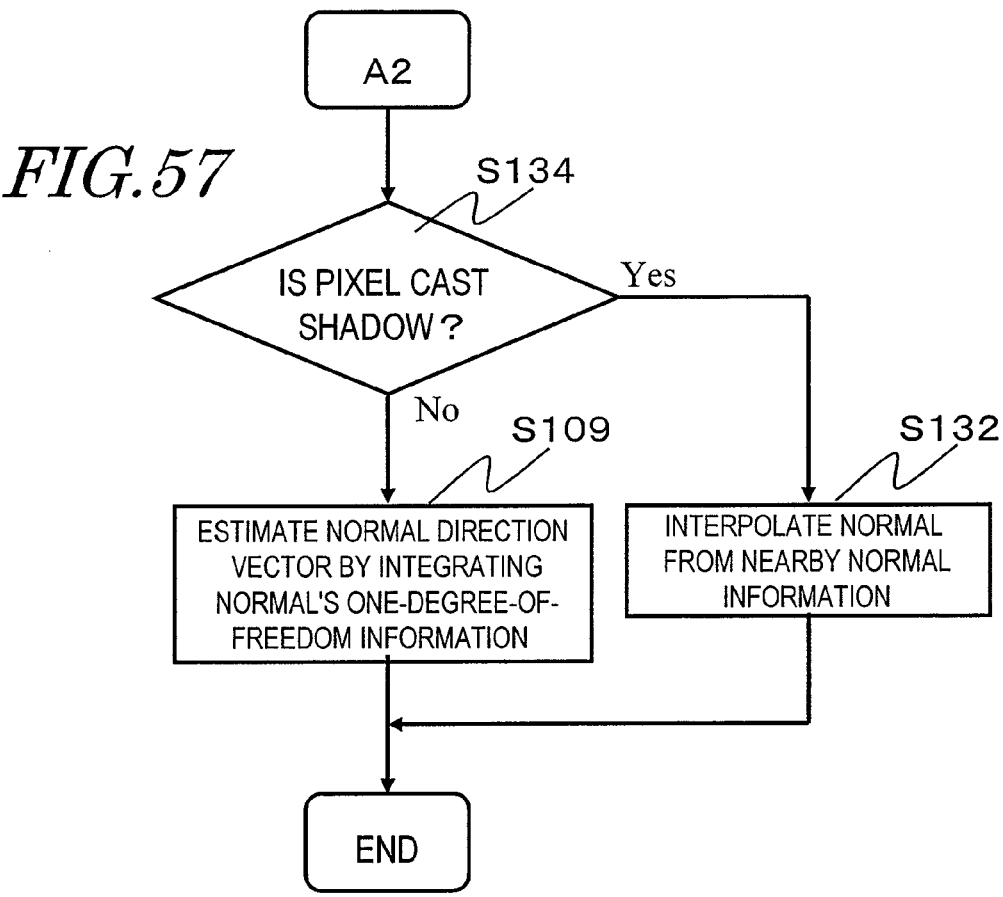
[FIG. 57] Another flow chart showing the flow of the process performed by the normal information generating device according to the fifth embodiment of the present invention.

FIGS. 48 and 57 are flow charts showing the flow of the process performed by the normal information generating device 100 of the present embodiment. Note that in FIG. 57, like steps to those of FIG. 49 are denoted by like reference numerals to those of FIG. 49 and will not be described in detail below.

The reliability estimating section 119 determines the reliability of the estimated normal direction vector by determining whether or not the area division result by the segmentation section 115 is a cast shadow (step S134). As a result, where the reference pixel is not a cast shadow area (No in step S134), the normal information generating section 137 estimates a normal direction vector by integrating together the normal's one-degree-of-freedoms estimated by the normal's one-degree-of-freedom estimating sections 106 and 106-2 by using the correspondence between images obtained by the stereo correspondence obtaining section 104 (step S109) as described above, and ends the process. Where the reference pixel is a cast shadow (Yes in step S134), the reliability estimating section 119 determines that the normal's one-degree-of-freedom information is unreliable, and the normal information generating section 137 does not estimate normal direction vector by integrating together the normal's one-degree-of-freedom estimating sections 106 and 106-2. In such an area, the normal information generating section 137 obtains the normal direction vector by performing an interpolation process, for example, by using nearby normal direction vectors, which have been obtained (step S132).

A camera including therein the normal information generating device 100 of the present embodiment is the same as the camera 200 of Embodiment 1 (FIG. 5). Therefore, the detailed description will be omitted.

It is understood that the reliability estimating section 109 may use a multiple reflection area, for example, instead of using a shaded area. In a multiple reflection area, light is complicated, thus losing the reliability of the polarization information. Therefore, with the normal information generating device 100 of the present embodiment, the multiple reflection area is divided by the segmentation section 115, and the reliability estimating section 109 determines that the multiple reflection area is an area with a low reliability.

In order to divide the multiple reflection area by means of the segmentation section 115, color information may be used, for example. Typically, the color vector of a diffuse reflection component is equal to the object color, and the color vector of a specular reflection component is equal to the light source color. Herein, consider a secondary reflection as a multiple reflection. A secondary reflection refers to a state where one observes the area B where light from the light source is reflected in the area A with the reflected light further illuminating the area B. In such a case, if a diffuse reflection occurs in the area A and a specular reflection occurs in the area B, the color vector observed in the area B is equal to the object color vector in the area A. Herein, it is assumed that the color vector of a non-polarized component is generally equal to the object color vector. Then, if the color vector of a polarized component observed in the area B is different from the color vector of a non-polarized component in the area B, and is also different from the light source color vector, it can be determined that a multiple reflection is occurring in the area B.

As described above, by optimally integrating together normal's one-degree-of-freedom candidates assuming both the specular reflection component and the diffuse reflection component by using the reliability, by using the polarization information of the subject, normal information is generated for each pixel, and it is therefore possible to passively estimate high-precision normal information over a wide area.

Sixth Embodiment

Next, a normal information generating device according to a sixth embodiment of the present invention will be described.

Figure 58:
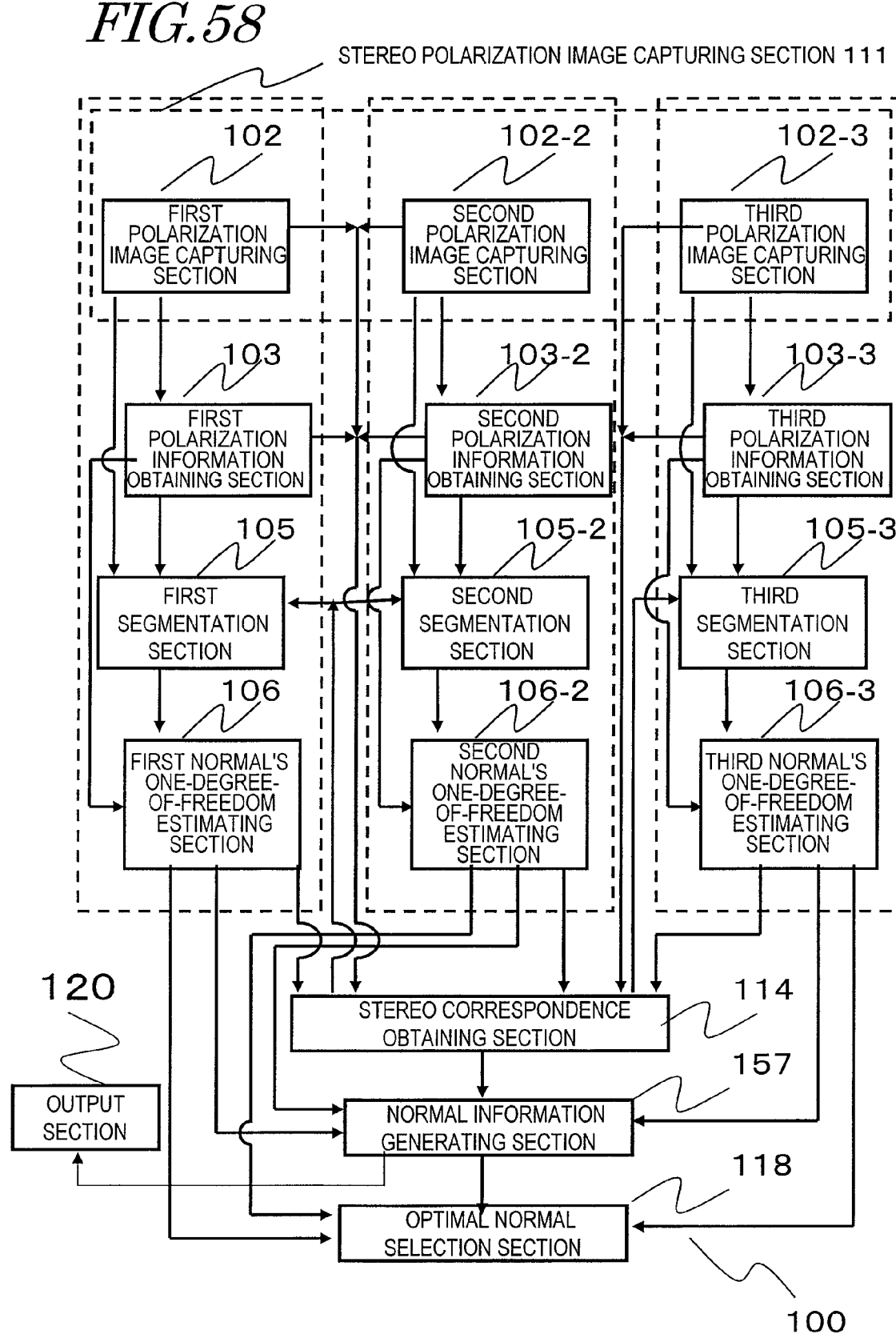
[FIG. 58] A functional block diagram showing a configuration of a normal information generating device according to the sixth embodiment of the present invention.

FIG. 58 is a functional block diagram showing a configuration of a normal information generating device 100 of the present embodiment. The normal information generating device 100 includes a stereo polarization image capturing section 111 with three or more view points, and obtains three or more polarization images of different viewpoints (the first polarization image, the second polarization image and the third polarization image). Therefore, a normal information generating section 157 produces the normal direction vector candidate n12 from the first polarization image and the second polarization image, the normal direction vector candidate n13 from the first polarization image and the third polarization image, and the normal direction vector candidate n23 from the second polarization image and the third polarization image, for example. An optimal normal selection section 118 selects a normal direction vector by evaluating the appropriateness of the plurality of normal direction vector candidates thus obtained. Where the stereo polarization image capturing section 101 with only binocular stereo is used, there may be cases where the estimation of the normal direction vector n is indefinite, as described above, depending on the 3-dimensional arrangement between the camera and the reference point and the relationship of the normal direction vector of the reference point. The normal information generating device 100 of the present embodiment solves this problem by using the stereo polarization image capturing section 111 with three or more viewpoints. Note that like elements to those of the normal information generating device 100 of the first embodiment are denoted by like reference numerals to those of FIG. 4 and will not be described below.

A stereo correspondence obtaining section 114 estimates the pixel-by-pixel correspondence between the first polarization image, the second polarization image and the third polarization image of three or more viewpoints, obtained by the stereo polarization image capturing section 111 with three or more viewpoints. This can be done by performing the process shown in FIG. 15 above for polarization images of three or more viewpoints.

The first segmentation section 105, the second segmentation section 105-2 and a third segmentation section 105-3 divide the first image, the second image and the third image, respectively, into a diffuse reflection area and a specular reflection area, based on the first polarization information, the second polarization information and the third polarization information generated by the first polarization information obtaining section 103, the second polarization information obtaining section 103-2 and a third polarization information obtaining section 103-3, and the first intensity information, the second intensity information and the third intensity information obtained by the first polarization image capturing section 102, the second polarization image capturing section 102-2 and the third polarization image capturing section 102-3. This can be done by performing the area dividing process described above successively or in parallel for the first image and the second image, and/or for the first image and the third image, and/or for the second image and the third image.

The normal information generating section 157 estimates a plurality of normal direction vector candidates by integrating together the normal's one-degree-of-freedoms estimated by the normal's one-degree-of-freedom estimating sections 106, 106-2 and 106-3 by using the correspondence between images obtained by the stereo correspondence obtaining section 114. The normal information generating device 100 of the present embodiment includes the stereo polarization image capturing section 111 with three or moreview points. Therefore, it generates the normal direction vector candidate n12 from the first polarization image and the second polarization image, the normal direction vector candidate n13 from the first polarization image and the third polarization image, and the normal direction vector candidate n23 from the second polarization image and the third polarization image, for example.

The optimal normal selection section 118 estimates the normal direction vector n by selecting the optimal one of the three normal direction vector candidates n12, n13 and n23. The optimal normal selection section 118 uses the normal's one-degree-of-freedom information estimated by the normal's one-degree-of-freedom estimating section 106 for selecting the optimal one of the plurality of normal direction vector candidates. This process will now be described.

As described above, where the following condition is satisfied, the line of intersection between the incidence/emittance planes S1 and S2 obtained from binocular stereo polarization images is not uniquely determined, and therefore the normal direction vector n is indefinite.

[Condition Where Estimation of Normal Direction Vector n is Indefinite]

The normal direction vector of the reference point P is present on a plane that passes through the following three points:
- the focal position of the image sensor 202;
- the focal position of the image sensor 202-2; and
- the reference point P.

Therefore, the optimal normal selection section 118 first calculates the incidence/emittance plane angle of the incidence/emittance plane S1 obtained from the first polarization image with respect to the incidence/emittance plane S2 obtained from the second polarization image, and that with respect to the incidence/emittance plane S3 obtained from the third polarization image, according to Expression 35 above. Herein, the incidence/emittance plane angle obtained from the incidence/emittance plane S1 and the incidence/emittance plane S2 is denoted as $\phi s12$, the incidence/emittance plane angle obtained from the incidence/emittance plane S1 and the incidence/emittance plane S3 as $\phi s13$, and the incidence/emittance plane angle obtained from the incidence/emittance plane S2 and the incidence/emittance plane S3 as $\phi s23$. From among the incidence/emittance plane angles $\phi s12$, $\phi s13$ and $\phi s23$ thus obtained, a set of cameras of the largest value is selected. The normal direction vector n is obtained as described above from the selected set of cameras. The normal direction vector n thus obtained can be determined to be a normal direction vector that least meets the condition for indefinite estimation, i.e., the most reliable normal direction vector.

Figure 59:
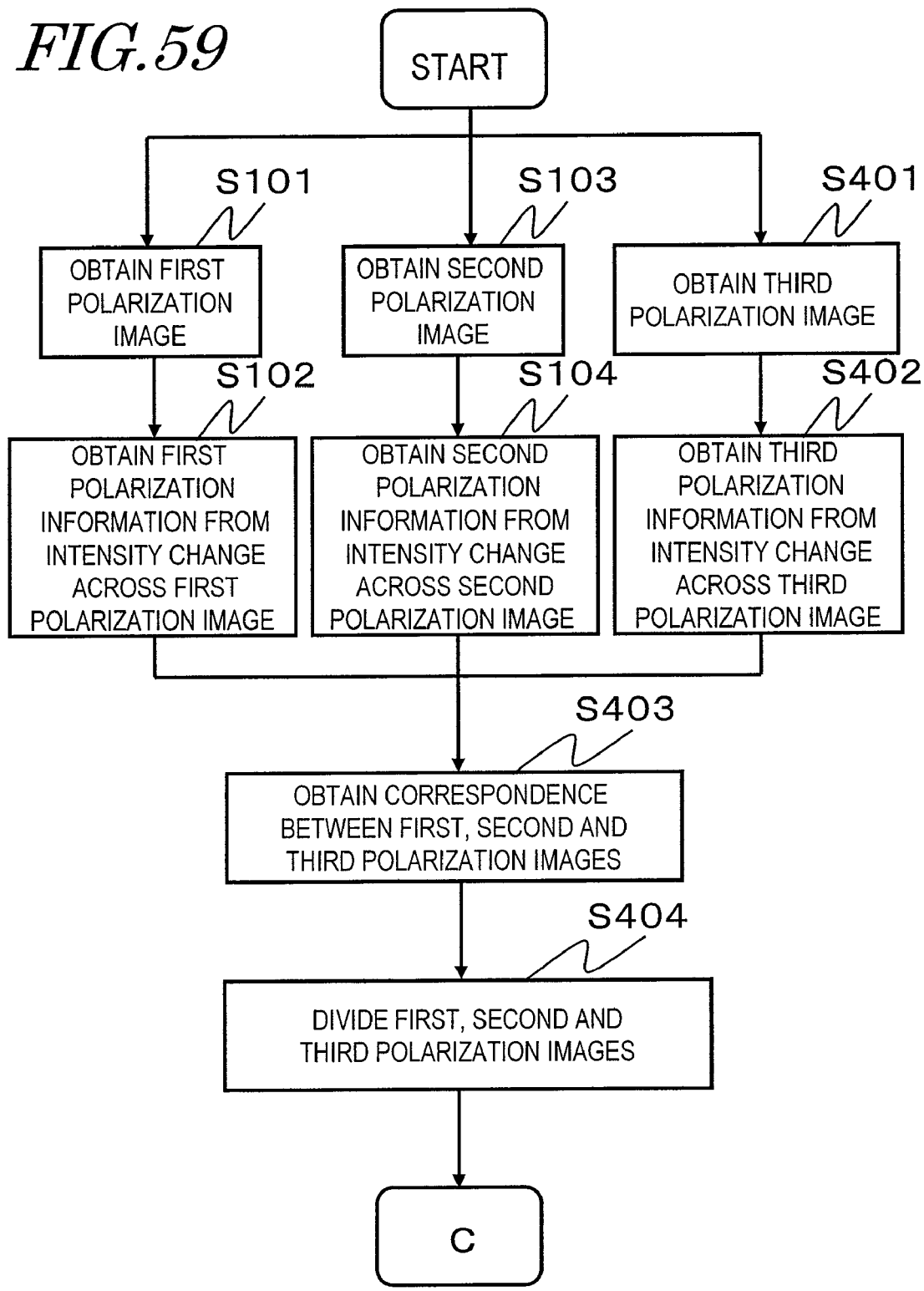
[FIG. 59] A flow chart showing the flow of the process performed by the normal information generating device according to the sixth embodiment of the present invention.
Figure 60:
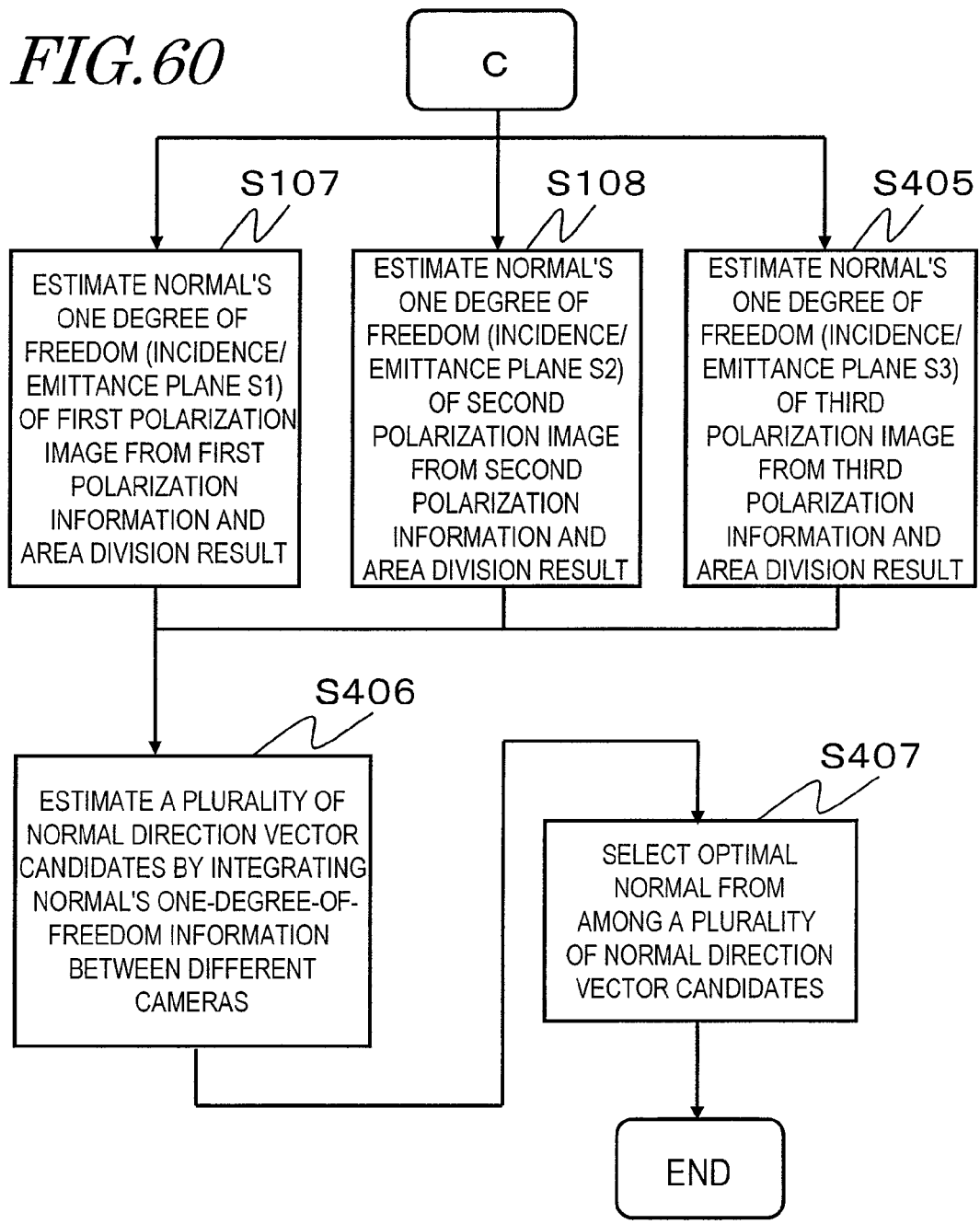
[FIG. 60] A flow chart showing the flow of the process performed by the normal information generating device according to the sixth embodiment of the present invention.

FIGS. 59 and 60 are flow charts showing the flow of the process performed by the normal information generating device 100 of the present embodiment. Note that in FIGS. 59 and 60, like steps to those of FIG. 7 are denoted by like reference numerals to those of FIG. 7 and will not be described in detail below.

First, the first polarization image capturing section 102 receives light from the subject through the first patterned polarizer 201 by means of the first image sensor 202, thereby obtaining a first polarization image containing polarization information therein (step S101). The first polarization information obtaining section 103 generates the first polarization information by using the intensity change across the first polarization image captured by the first polarization image capturing section 102 (step S102). The second polarization image capturing section 102-2 receives light from the subject through the second patterned polarizer 201-2 by means of the second image sensor 202-2, thereby obtaining a second polarization image containing polarization information therein (step S103). The second polarization information obtaining section 103-2 generates the second polarization information by using the intensity change across the second polarization image captured by the second polarization image capturing section 102-2 (step S104). The third polarization image capturing section 102-3 receives light from the subject through the third patterned polarizer 201-3 by means of the third image sensor 202-3, thereby obtaining a third polarization image containing polarization information therein (step S401). The third polarization information obtaining section 103-3 generates the third polarization information by using the intensity change across the third polarization image captured by the third polarization image capturing section 102-3 (step S402). Herein, the order of steps S101-S102, steps S103-S104 and steps S401-S402 is arbitrary, and the steps may be performed in parallel or may be performed successively, needless to say. The stereo correspondence obtaining section 114 estimates the pixel-by-pixel correspondence between the first polarization image, the second polarization image and the third polarization image obtained by the stereo polarization image capturing section 111 (step S403). The first segmentation section 105, the second segmentation section 105-2 and the third segmentation section 105-3 divide the first image, the second image and the third image, respectively, into a diffuse reflection area and a specular reflection area, based on the first polarization information, the second polarization information and the third polarization information generated by the first polarization information obtaining section 103, the second polarization information obtaining section 103-2 and the third polarization information obtaining section 103-3 and/or the first intensity information, the second intensity information and the third intensity information obtained by the first polarization image capturing section 102, the second polarization image capturing section 102-2 and the third polarization image capturing section 102-3 (step S404). The first normal's one-degree-of-freedom estimating section 106 estimates the incidence/emittance plane S1 as the normal's one-degree-of-freedom information on the corresponding subject surface by performing a different process for each of the areas divided by the first segmentation section 105 by using the first polarization information generated by the polarization information obtaining section 103 (step S107). The second normal's one-degree-of-freedom estimating section 106-2 estimates the incidence/emittance plane S2 as the normal's one-degree-of-freedom information on the corresponding subject surface by performing a different process for each of the areas divided by the second segmentation section 105-2 by using the second polarization information generated by the polarization information obtaining section 103-2 (step S108). The third normal's one-degree-of-freedom estimating section 106-3 estimates the incidence/emittance plane S3 as the normal's one-degree-of-freedom information on the corresponding subject surface by performing a different process for each of the areas divided by the third segmentation section 105-3 by using the third polarization information generated by the polarization information obtaining section 103-3 (step S405). Herein, the order of step S107, step S108 and step S405 is arbitrary, and the steps may be performed in parallel or may be performed successively, needless to say. The normal information generating section 157 estimates the three normal direction vector candidates n12, n13 and n23 by integrating together the normal's one-degree-of-freedom information estimated by the normal's one-degree-of-freedom estimating sections 106, 106-2 and 106-3 by using the correspondence between images obtained by the stereo correspondence obtaining section 114 (step S406). The optimal normal selection section 118 selects the optimal one of the three normal direction vector candidates n12, n13 and n23 based on the incidence/emittance plane angle information described above, and selects the selected normal direction vector candidate as the normal direction vector n (step S407).

It is understood that the normal information generating section 157 may estimate only two normal direction vector candidates n12 and n13 instead of estimating three normal direction vector candidates n12, n13 and n23.

Figure 61:
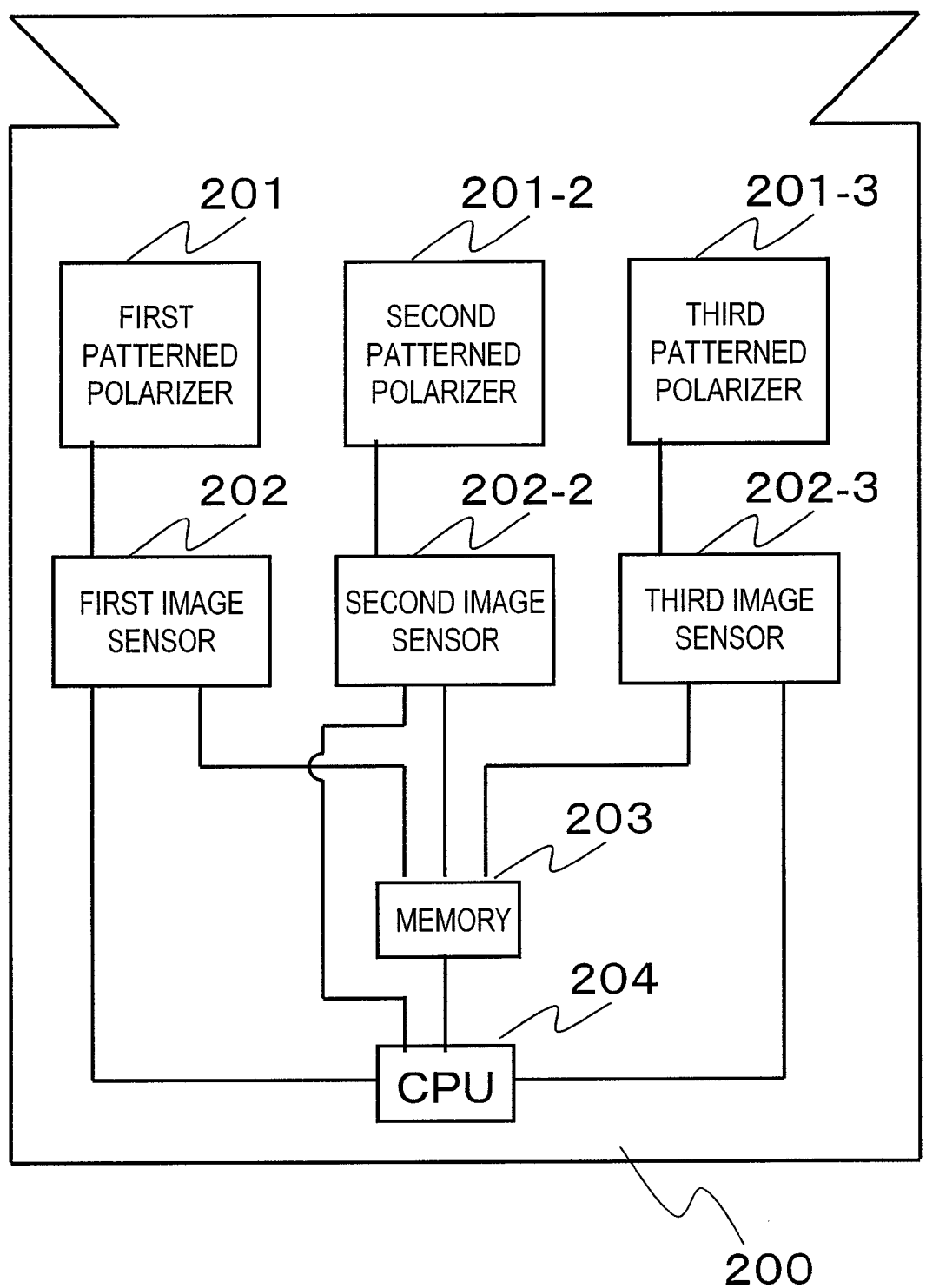
[FIG. 61] A diagram showing an exemplary configuration of a camera including therein a normal information generating device according to the sixth and seventh embodiments of the present invention.

FIG. 61 shows an example of a hardware configuration of the camera 200 including therein the normal information generating device 100 of the present embodiment. The camera 200 is an image capture device having a function of generating normal information, and includes three or more patterned polarizers (the first patterned polarizer 201, the second patterned polarizer 201-2 and the third patterned polarizer 201-3), three or more image sensors (the first image sensor 202, the second image sensor 202-2 and the third image sensor 202-3), the memory 203, and the CPU 204. Note that in FIG. 61, like elements to those of FIG. 5 are denoted by like reference numerals to those of FIG. 5, and will not be described in detail below as there are no new elements.

FIGS. 27, 65 and 68 show normal images in which normal direction vectors estimated by the normal information generating section 157 of the present embodiment are visualized. As described above, since each component of a normal direction vector has a value range from −1 to 1, normal images are shown using a gray color representing the component of the normal direction vector being 0, with blacker colors in the negative direction and whiter colors in the positive direction. The background is shown in black. FIG. 27 represents normal images obtained by visualizing the normal direction vector candidate n12 estimated by the normal information generating section 157 by using the polarization phases of FIGS. 24(b) and 24(d), in which image sensors are arranged in a horizontal direction.

FIG. 27(a) shows a normal image of the x component of the normal direction vector candidate n12. FIG. 27(b) shows a normal image of the y component of the normal direction vector candidate n12. FIG. 27(c) shows a normal image of the z component of the normal direction vector candidate n12. FIG. 28 shows the figures of FIG. 27 in a schematic manner (with shading emphasized).

Figure 62:
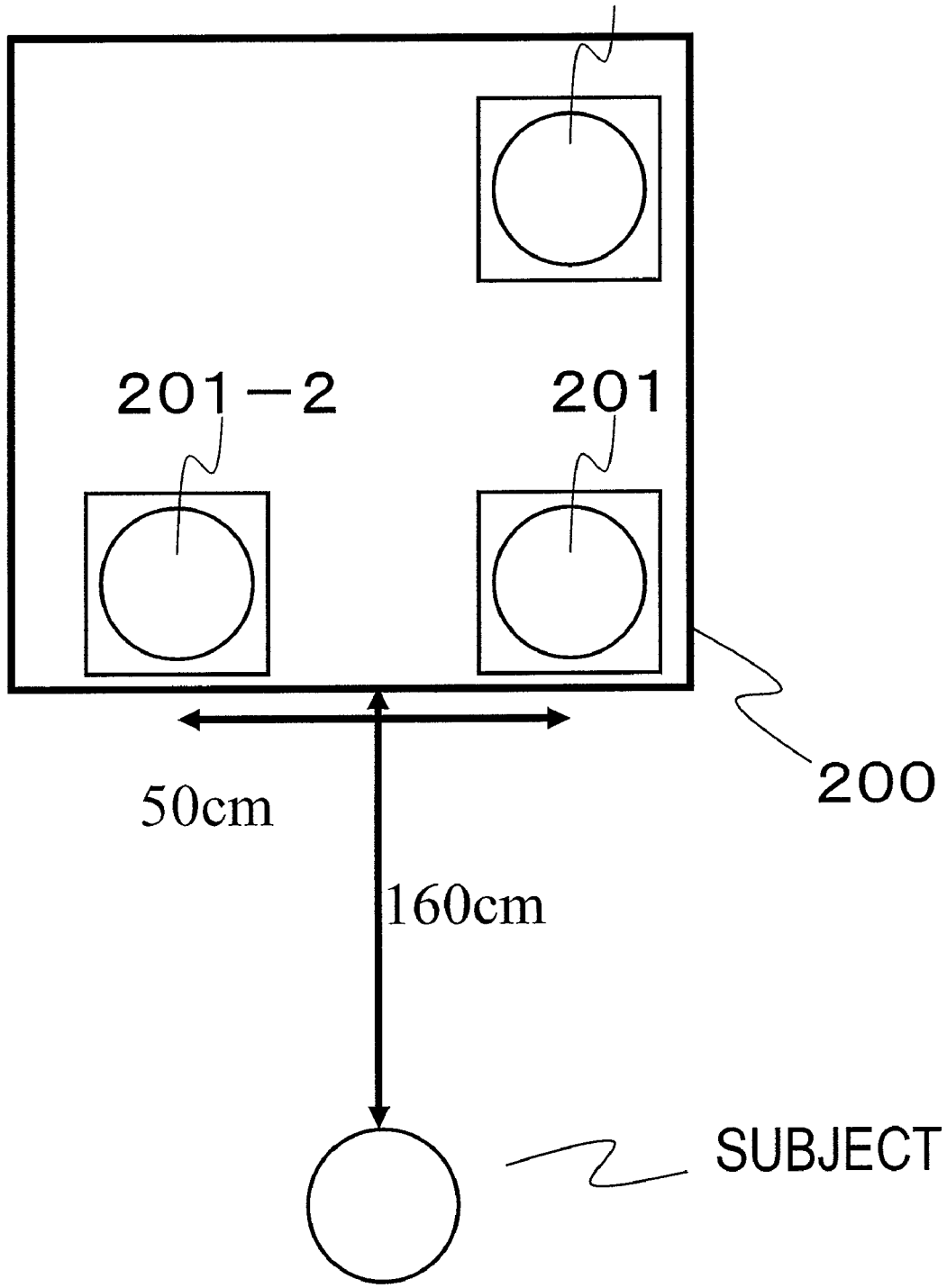
[FIG. 62] A diagram showing the positional relationship between the camera 200 and the subject and the positional relationship between patterned polarizers 201, 201-2 and 201-3 within the camera 200 during the image-capturing process by the present inventors.

An example of how an image is generated by using the normal information generating device 100 of the present embodiment will now be described. In the example, the subject is a spherical globe. FIG. 62 shows the positional relationship between the camera 200 and the subject and the positional relationship between the patterned polarizers 201, 201-2 and 201-3 within the camera 200 during the image-capturing process by the present inventors. The distance from the camera 200 to the subject is 160 cm, and the interval between the patterned polarizers 201 and 201-2 and that between the patterned polarizers 201 and 201-3 are 50 cm. The interval between patterned polarizers is generally equal to that between image sensors.

Figure 64:
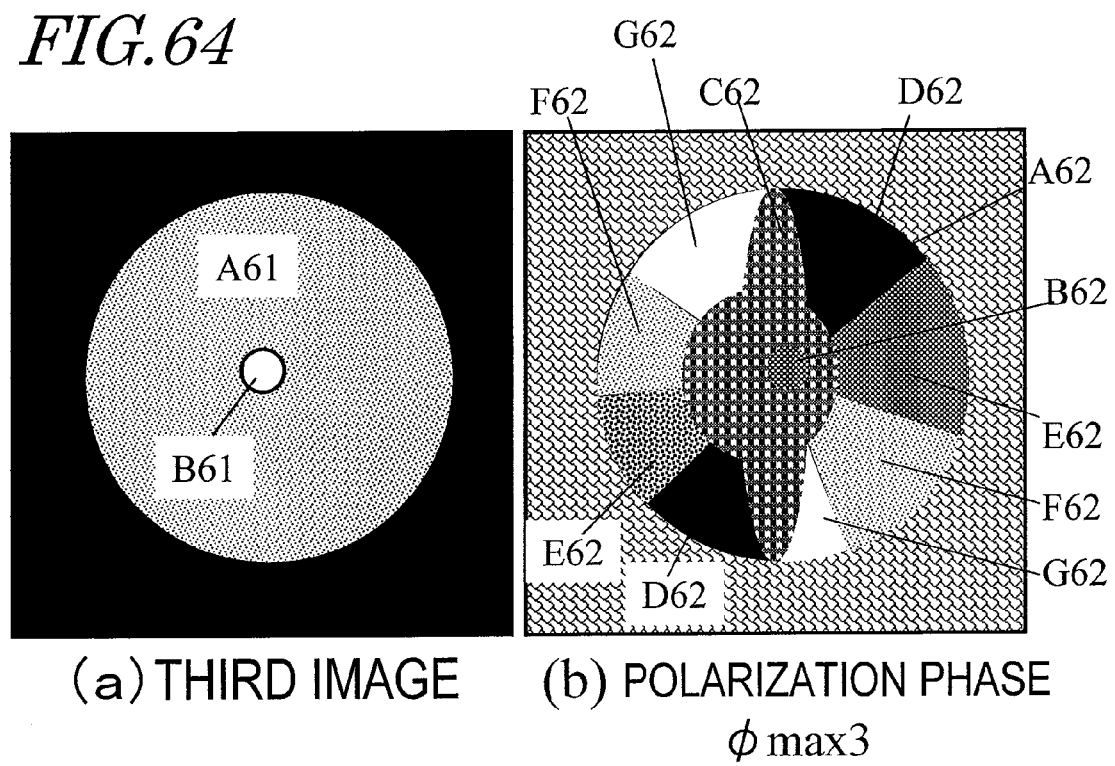
[FIG. 64] (a) and (b) are diagrams showing areas corresponding to the images shown in FIGS. 63(c) and (d).
Figure 70:
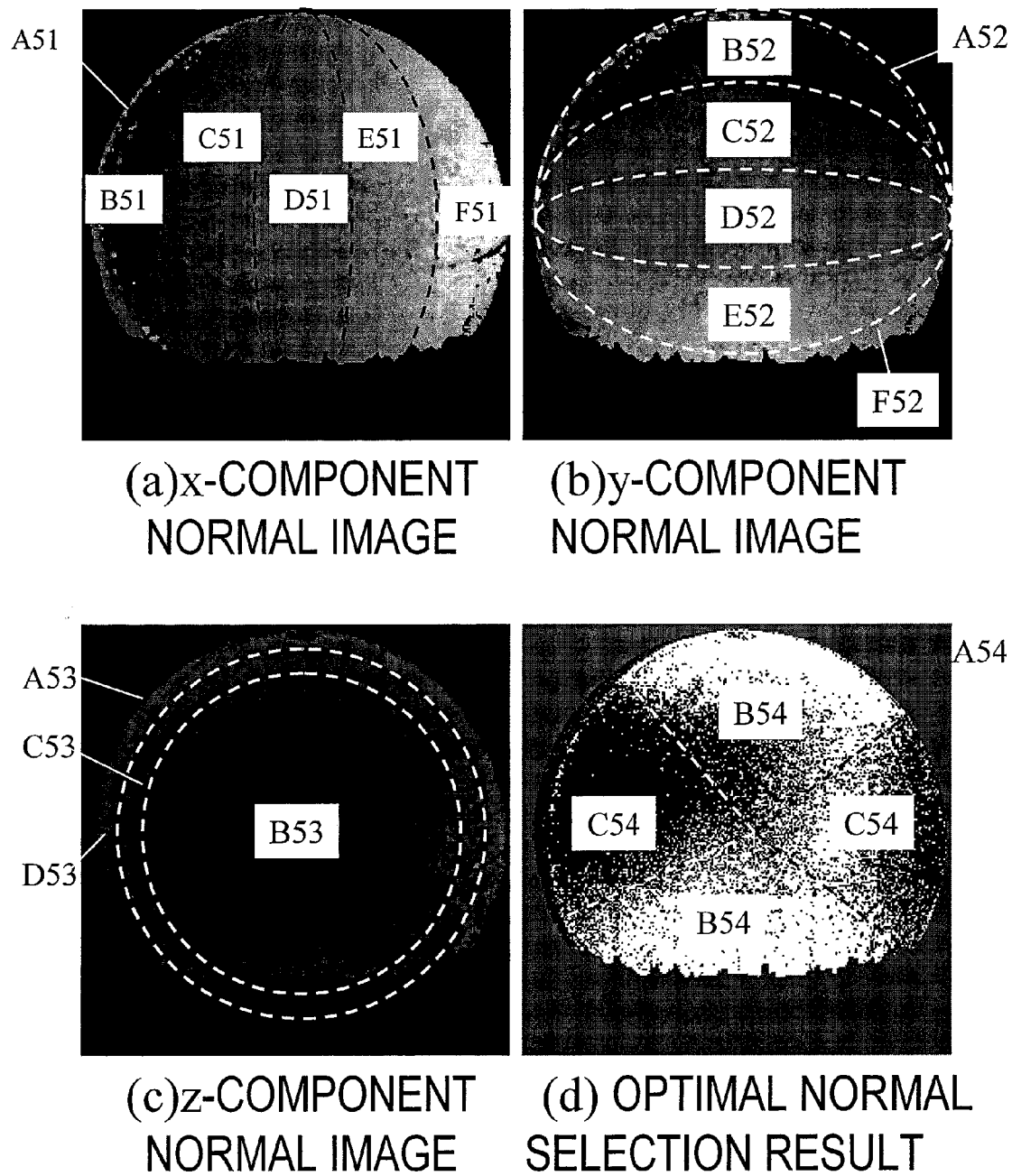
[FIG. 70] (a)-(d) show the correspondence between the images shown in FIGS. 68(a)-(d) and the areas shown in FIGS. 69(a)-(d).

FIG. 63(a) represents the sum (Imax+Imin) between the polarization maximum intensity value Imax and the polarization minimum intensity value Imin obtained by the polarization information obtaining section 103-3 (capturing images from above the polarization information obtaining section 103) where the subject is a globe, and FIG. 63(b) represents the polarization phase ϕmax3 (0° being black and 180° being white) obtained by the polarization information obtaining section 103-3 where the subject is a globe. FIGS. 63(c) and 63(d) show FIGS. 63(a) and 63(b) in a schematic manner (with shading emphasized). FIGS. 64(a) and (b) respectively show areas corresponding to images shown in FIGS. 63(c) and (d).

FIGS. 65(a)-(c) represent normal images obtained by visualizing the normal direction vector candidate n13 estimated by the normal information generating section 157 by using the polarization phases of FIGS. 24(b) and 63(b), in which image sensors are arranged in a vertical direction. FIG. 65(a) shows a normal image of the x component of the normal direction vector candidate n13. FIG. 65(b) shows a normal image of the y component of the normal direction vector candidate n13. FIG. 65(c) shows a normal image of the z component of the normal direction vector candidate n13.

FIGS. 66(a)-(c) show the figures of FIGS. 65(a)-(c) in a schematic manner (with shading emphasized). FIGS. 67(a)-(c) show the correspondence between the images shown in FIGS. 65(a)-(c) and different areas shown in FIGS. 66(a)-(c).

FIGS. 68(a)-(d) represent normal images obtained by visualizing the optimal normal direction vector n selected by the optimal normal selection section 118 of the present embodiment. FIG. 68(a) shows a normal image of the x component of the normal direction vector n. FIG. 68(b) shows a normal image of the y component of the normal direction vector n. FIG. 68(c) shows a normal image of the z component of normal direction vector candidate n. FIG. 68(d) is a schematic diagram showing, for each pixel, whether the optimal normal selection section 118 has selected the normal direction vector candidate n12 or the normal direction vector n 13. In this figure, each pixel where the normal direction vector candidate n12 has been selected is shown to be white, and each pixel where the normal direction vector candidate n13 has been selected is shown to be black. The background is shown in gray.

FIGS. 69(a)-(d) show the figures of FIGS. 68(a)-(d) in a schematic manner (with shading emphasized). FIGS. 70(a)-(d) show the correspondence between the images shown in FIGS. 68(a)-(d) and different areas shown in FIGS. 69(a)-(d), respectively.

It can be seen that in FIG. 27 showing the normal direction vector candidate n12 in which image sensors are arranged horizontally, the x-component normal image is disturbed across a horizontal area in the central image portion of the sphere (the area G31 in FIGS. 28(a) and 29(a)) since the subject is spherical. This area is an area that satisfies "the condition under which the estimation of the normal direction vector n is indefinite" described above. On the other hand, in FIG. 65 showing the normal direction vector candidate n13 in which image sensors are arranged vertically, the y-component normal image is disturbed across a vertical area in the central image portion of the sphere (the area G42 in FIGS. 66(b) and 67(b)). This area is also an area that satisfies "the condition under which the estimation of the normal direction vector n is indefinite" described above. On the other hand, it can be seen from FIG. 68(d) that "the condition under which the estimation of the normal direction vector n is indefinite" is avoided as the optimal normal selection section 118 selects the normal direction vector candidate n13 in the horizontal area in the central image portion and the normal direction vector candidate n12 in the vertical area in the central image portion. Thus, it can be seen that the estimation of the generated normal direction vector n is stable (see FIGS. 68(a)-(c)).

As described above, by performing an area division between the specular reflection area and the diffuse reflection area and by performing a different process for each of the divided areas using the polarization information of the subject, it is possible to passively estimate high-precision normal information over a wide area.

It is understood that the optimal normal selection section 118 may use the polarization information obtained by the polarization information obtaining section 103 in order to select the optimal one of a plurality of normal direction vector candidates. This may be done by using the degree of polarization $\rho$, for example. This may be done by making a comparison between the magnitudes of the degrees of polarization $\rho 1$, $\rho 2$ and $\rho 3$ obtained from three polarization images (the first polarization image, the second polarization image and the third polarization image), and selecting, as the normal direction vector n, a normal direction vector candidate that is obtained by using images corresponding to the greater two of the degrees of polarization. This is because the polarization information is unreliable when the degree of polarization is low. When the degree of polarization is low, it is very difficult to obtain the polarization phase information $\phi max$ as the polarization information. It is possible to avoid such a state as described above and solve the problem by selecting the normal direction vector by using the degree of polarization.

It is understood that the optimal normal selection section 118 may use the polarization estimation error E obtained by the polarization information obtaining section 103 in order to select the optimal one of a plurality of normal direction vector candidates. This may be done by making a comparison between the magnitudes of the polarization estimation errors E1, E2 and E3 obtained from three polarization images (the first polarization image, the second polarization image and the third polarization image), and selecting, as the normal direction vector n, a normal direction vector candidate that is obtained by using images corresponding to the smallest two of the polarization estimation errors. This is because the polarization information is unreliable when the polarization estimation error E is large. By selecting a normal direction vector by using the polarization estimation error, it is possible to generate a normal direction vector by using only polarization phase information estimated with a high reliability.

It is understood that the optimal normal selection section 118 may use the polarization image obtained by the polarization image capturing section 102 in order to select the optimal one of a plurality of normal direction vector candidates. This may be done by making a comparison between the magnitudes of the intensity values of the reference pixels in three polarization images (the first polarization image, the second polarization image and the third polarization image), and selecting, as the normal direction vector n, a normal direction vector candidate that is obtained by using images corresponding to the greater two of the intensity values. This is because it is believed that when the intensity value of the polarization image is low, the intensity resolution is low, and the reliability of the polarization information is low. By selecting a normal direction vector by using the polarization image, it is possible to generate a normal direction vector by using only polarization phase information estimated with a high reliability.

It is understood that the normal information generating section 157 may generate only the optimal normal direction vector n selected by the optimal normal selection section 118, instead of generating a plurality of normal direction vector candidates.

Figure 71:
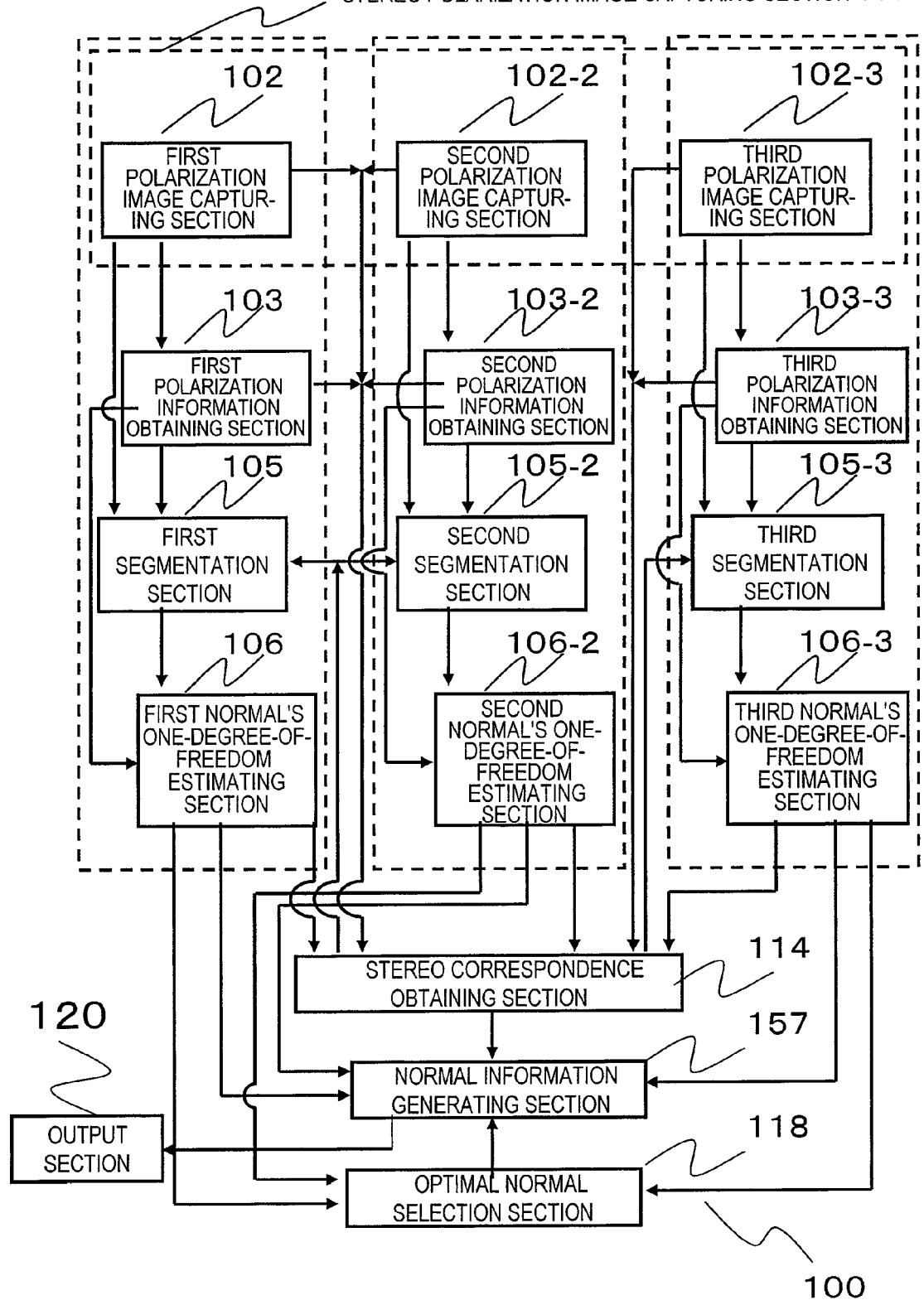
[FIG. 71] Another functional block diagram showing a configuration of the normal information generating device according to the sixth embodiment of the present invention.

FIG. 71 is a functional block diagram showing a configuration of a normal information generating device 100 of the present embodiment. Note that since all elements are like elements to those of FIG. 58, and they are therefore denoted by like reference numerals and will not be described below.

Figure 72:
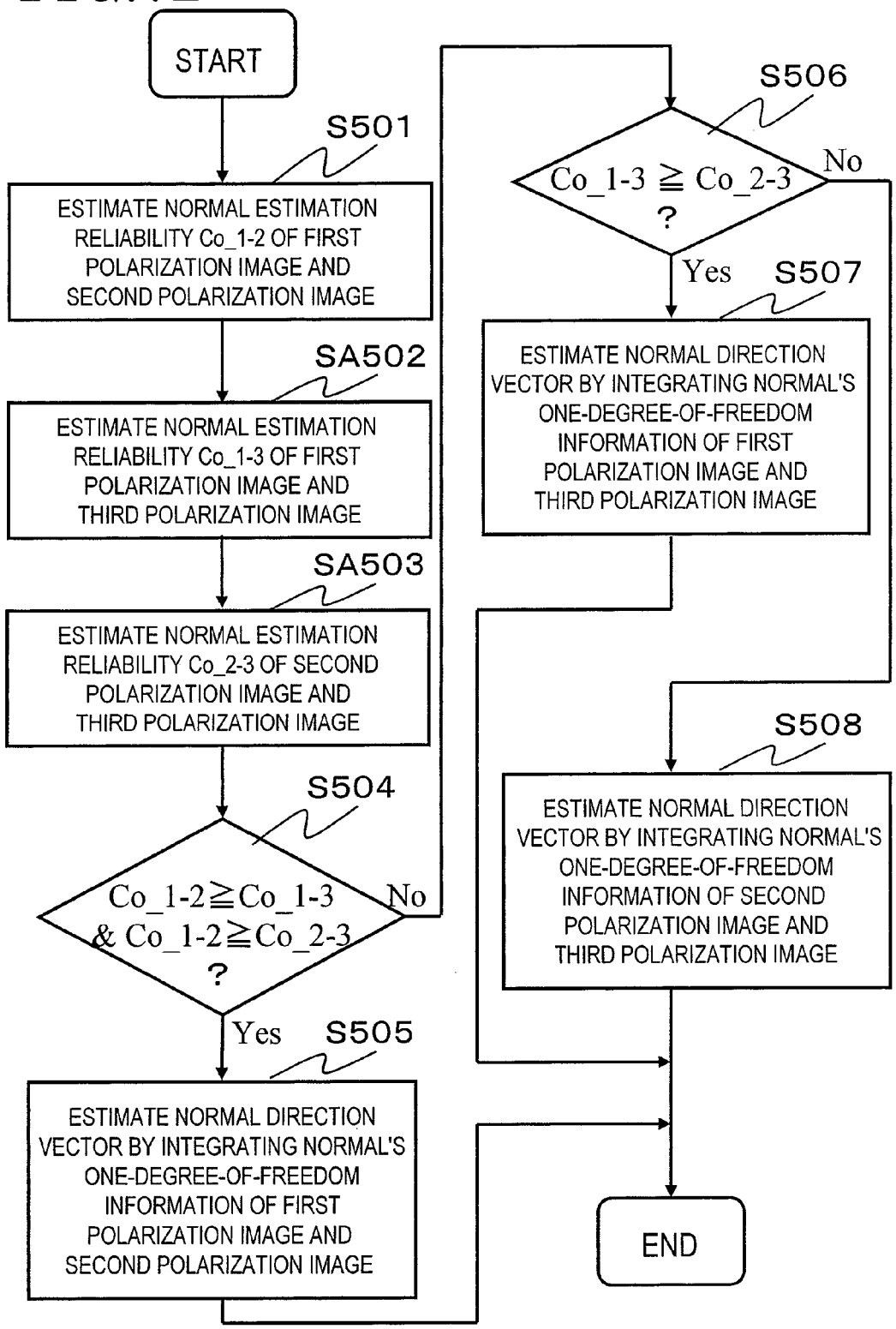
[FIG. 72] Another flow chart showing the flow of the process performed by the optimal normal selection section and the normal information generating section according to the sixth embodiment of the present invention.

FIG. 72 is a flow chart showing the flow of the process performed by the optimal normal selection section 118 and the normal information generating section 157 of the present embodiment.

First, the optimal normal selection section 118 calculates the incidence/emittance plane angle $\phi s12$ by Expression 35 based on the incidence/emittance plane S1 (obtained from the first polarization image) and the incidence/emittance plane S2 (obtained from the second polarization image), thus yielding the normal estimation reliability Co_1–2 (step S501). Then, the optimal normal selection section 118 calculates the incidence/emittance plane angle $\phi s13$ by Expression 35 based on the incidence/emittance plane S1 (obtained from the first polarization image) and the incidence/emittance plane S3 (obtained from the third polarization image), thus yielding the normal estimation reliability Co_1–3 (step S502). The optimal normal selection section 118 calculates the incidence/emittance plane angle $\phi s23$ by Expression 35 based on the incidence/emittance plane S2 (obtained from the second polarization image) and the incidence/emittance plane S3 (obtained from the third polarization image), thus yielding the normal estimation reliability Co_2–3 (step S503). Herein, the optimal normal selection section 118 makes a comparison between the magnitudes of the normal estimation reliabilities Co_1–2, Co_1–3 and Co_2–3 (step S504). First, where Co_1–2 is greater than or equal to Co_1–3 and Co_1–2 is greater than or equal to Co_2–3 (Yes in step S504), the normal information generating section 157 estimates the normal direction vector n from the incidence/emittance plane S1 (obtained from the first polarization image) and the incidence/emittance plane S2 (obtained from the second polarization image) (step S505), and ends the process. Where Co_1–2 is smaller than Co_1–3 or Co_1–2 is smaller than Co_2–3 (No in step S504), the optimal normal selection section 118 makes a comparison between the magnitudes of the normal reliabilities Co_1–3 and Co_2–3 (step S506). Where Co_1–3 is greater than or equal to Co_2–3 (Yes in step S506), the normal information generating section 157 estimates the normal direction vector n from the incidence/emittance plane S1 (obtained from the first polarization image) and the incidence/emittance plane S3 (obtained from the third polarization image) (step S507), and ends the process. Where Co_2–3 is greater than Co_1–3 (No in step S506), the normal information generating section 157 estimates the normal direction vector n from the incidence/emittance plane S2 (obtained from the second polarization image) and the incidence/emittance plane S3 (obtained from the third polarization image) (step S508), and ends the process.

It is understood that while the above description has been directed to a case where there are three image sensors 202, four or more image sensors may be used.

Note that while the polarization information obtaining section 103 is provided separately for the first polarization image capturing section 102, for the second polarization image capturing section 102-2 and for the third polarization image capturing section 102-3 in the present embodiment, it is understood that they may be implemented as a single module.

While the segmentation section 105 is provided separately for the first polarization information obtaining section 103, for the second polarization information obtaining section 103-2 and for the third polarization information obtaining section 103-3 in the present embodiment, it is understood that they may be implemented as a single module.

While the normal's one-degree-of-freedom estimating section 106 is provided separately for the first polarization information obtaining section 103, for the second polarization information obtaining section 103-2 and for the third polarization information obtaining section 103-3 in the present embodiment, it is understood that they may be implemented as a single module.

As described above, by performing an area division between the specular reflection area and the diffuse reflection area and by performing a different process for each of the divided areas using the polarization information of the subject, it is possible to passively estimate high-precision normal information over a wide area.

Seventh Embodiment

Next, a normal information generating device according to a seventh embodiment of the present invention will be described.

Figure 73:
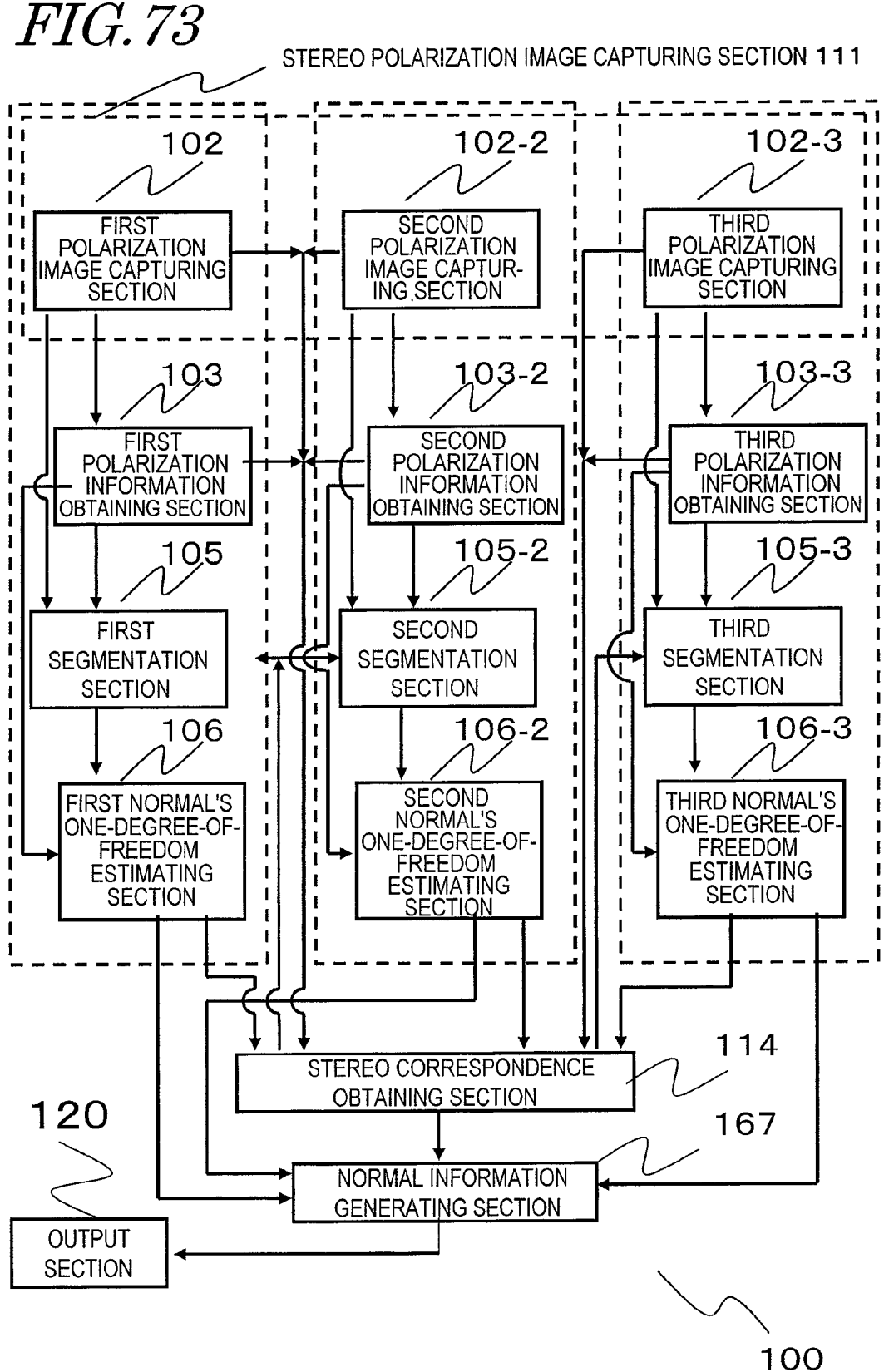
[FIG. 73] Another functional block diagram showing a configuration of the normal information generating device according to the seventh embodiment of the present invention.

FIG. 73 is a functional block diagram showing a configuration of a normal information generating device 100 of the present embodiment. In the normal information generating device 100, a normal information generating section 167 estimates a normal direction vector by using normal's one-degree-of-freedom information obtained from three or more viewpoints. Note that like elements to those of the normal information generating device 100 of the sixth embodiment are denoted by like reference numerals to those of FIG. 71 and will not be described below.

The normal information generating section 167 estimates a single normal direction vector n by integrating together the normal's one-degree-of-freedoms estimated by the normal's one-degree-of-freedom estimating sections 106, 106-2 and 106-3 by using the correspondence between images obtained by the stereo correspondence obtaining section 114. This may be done by, for example, generating a normal direction vector n such as to maximize (90 degrees) the angel between the normal direction of the three incidence/emittance planes S1, S2 and S3 and the normal direction vector n to be estimated. This process will now be described.

First, a normal direction vector to be generated is denoted as n, and it is assumed that this is represented in the camera coordinate system C1 in the first image sensor 202. The normal direction vector in the camera coordinate system C2 in the second image sensor 202-2 is denoted as n_C2, and the normal direction vector in the camera coordinate system C3 in the third image sensor 202-3 as n_C3. Then, the normal direction vectors on the various camera coordinates are represented by expressions below.

$$n\_C2 = \begin{bmatrix} n_{x\_C2} \\ n_{y\_C2} \\ n_{z\_C2} \end{bmatrix} = R_{C1-C2} \cdot n = R_{C1-C2} \cdot \begin{bmatrix} n_x \\ n_y \\ n_z \end{bmatrix} \quad \text{[Expression 40]}$$

$$n\_C3 = \begin{bmatrix} n_{x\_C3} \\ n_{y\_C3} \\ n_{z\_C3} \end{bmatrix} = R_{C1-C3} \cdot n = R_{C1-C3} \cdot \begin{bmatrix} n_x \\ n_y \\ n_z \end{bmatrix} \quad \text{[Expression 41]}$$

Herein, Rc1–c2 denotes a rotation matrix representing a transformation from the camera coordinate system C1 to the camera coordinate system C2, and Rc1–c3 denotes a rotation matrix representing a transformation from the camera coordinate system C1 to the camera coordinate system C3. Herein, where the normal's one-degree-of-freedoms in the various image sensors are denoted as φn1, φn2 and φn3, the normal direction vector n is obtained as a normal direction vector n that minimizes the evaluation function Ev3 below.

$$Ev3(n) = \frac{(n_x \cdot \cos\varphi_{n1} - n_y \cdot \sin\varphi_{n1})^2}{(n_x^2 + n_y^2)} + \frac{(n_{x\_C2} \cdot \cos\varphi_{n2} - n_{y\_C2} \cdot \sin\varphi_{n2})^2}{(n_{x\_C2}^2 + n_{y\_C2}^2)} + \frac{(n_{x\_C3} \cdot \cos\varphi_{n3} - n_{y\_C3} \cdot \sin\varphi_{n3})^2}{(n_{x\_C3}^2 + n_{y\_C3}^2)} \quad \text{[Expression 42]}$$

Figure 74:
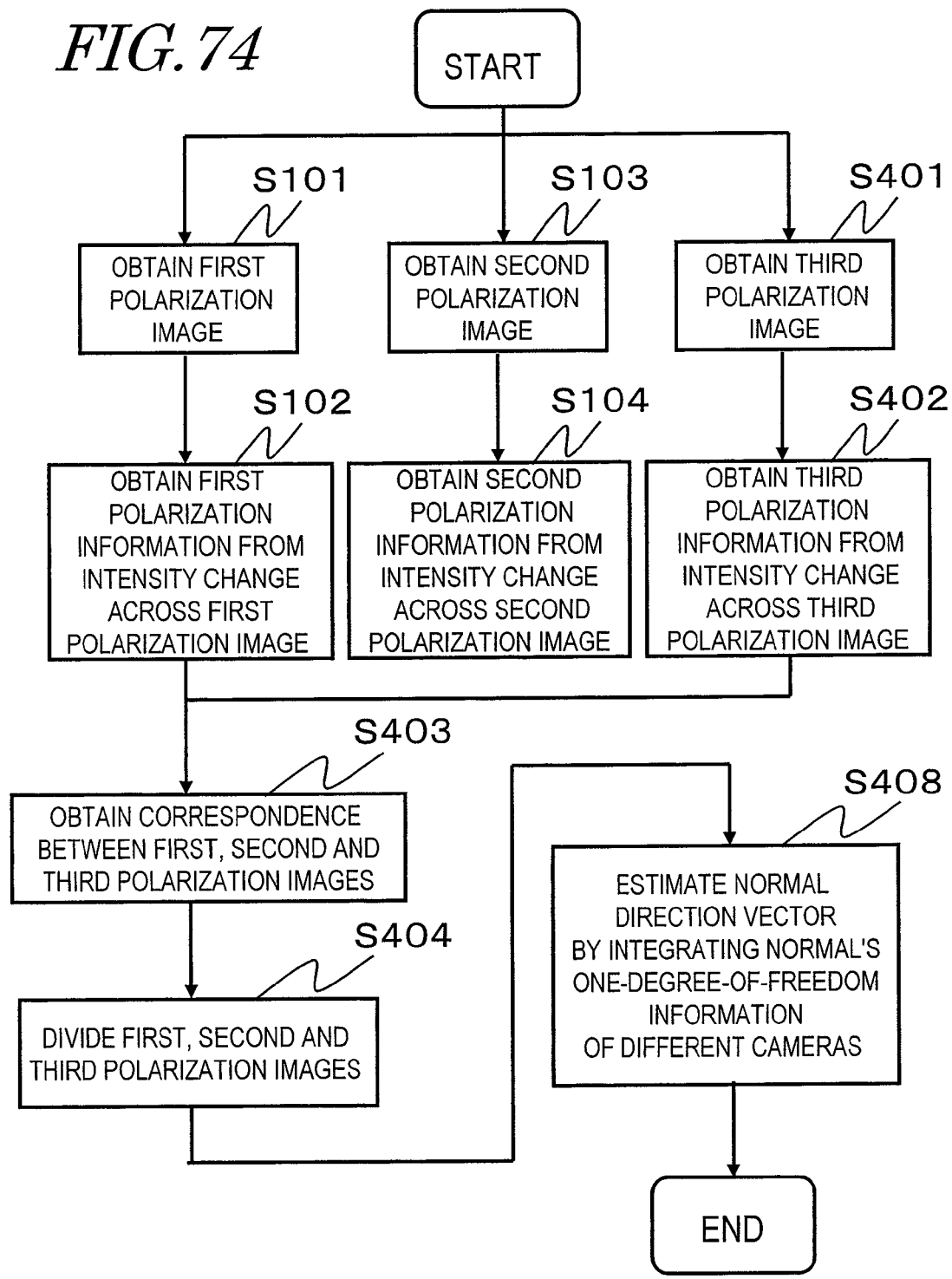
[FIG. 74] A flow chart showing the flow of the process performed by a normal information generating device according to the seventh embodiment of the present invention.

FIG. 74 is a flow chart showing the flow of the process performed by the normal information generating device 100 of the present embodiment. Note that in FIG. 74, like steps to those of FIG. 59 are denoted by like reference numerals to those of FIG. 59 and will not be described in detail below.

The normal information generating section 157 estimates the normal direction vector n by minimizing Expression 42 above based on the incidence/emittance plane S1 (obtained from the first polarization image), the incidence/emittance plane S2 (obtained from the second polarization image) and the incidence/emittance plane S3 (obtained from the third polarization image) (step S408), and ends the process.

It is understood that when the normal information generating section 157 may further introduce the constraint described above to the evaluation function Ev3 when estimating the normal direction vector n by minimizing Expression 42, so as to obtain globally stable normals. As described above, the constraint may be, for example, at least one of the continuity of the normal direction vector, the spatial continuity of the specular reflection component and the diffuse reflection component, the polarization information, the normal direction vector in an area near the occluding edge, the normal information and the depth information. For example, if the continuity of the normal direction vector and the spatial continuity of the specular reflection component and the diffuse reflection component are used as constraints, the normal direction vector n can be obtained as a normal direction vector n that minimizes the evaluation function Ev4 below.

$$Ev4(n) = Ev3(n) + C_1 Ev(n) + C_2 Ev1 \quad \text{[Expression 43]}$$

Herein, C1 and C2 are weighting coefficients of the constraints.

It is understood that while the above description has been directed to a case where there are three image sensors 202, four or more image sensors may be used.

The evaluation functions shown in Expressions 42 and 43 may be used by the stereo correspondence obtaining section 114 or the segmentation section 105, for example, instead of using them for estimating the normal direction vector n. When the segmentation section 105 divides the reference point into a specular reflection component or a diffuse reflection component, the following process may be performed. First, the first normal's one-degree-of-freedom estimating section 106, the second normal's one-degree-of-freedom estimating section 106-2 and the third normal's one-degree-of-freedom estimating section 106-3 obtain the normal's one-degree-of-freedom candidates (φ1nd, φ1ns), (φ2nd, φ2ns) and (φ3nd, φ3ns) of the reference point and the corresponding point. Herein, φ1nd and φ1ns are a normal's one-degree-of-freedom candidate when assuming a diffuse reflection component for the first polarization image captured by the image sensor 202 and a normal's one-degree-of-freedom candidate when assuming a specular reflection component for the first polarization image, respectively. For each of all the eight combinations of normal's one-degree-of-freedom candidates (φ1nd-φ2nd-φ3nd, φ1nd-φ2nd-φ3ns, φ1nd-φ2ns-φ3nd, φ1nd-φ2ns-φ3ns, φ1ns-φ2nd-φ3nd, φ1ns-φ2nd-φ3ns, φns-φ2ns- φ3*nd*, and φ1*ns*-φ2*ns*-φ3*ns*), the process calculates a normal direction vector candidate that minimizes Expression 42 and the value of the evaluation function. The segmentation section 105 may select, as the area division result, a combination that minimizes the evaluation function obtained as described above. It is understood that the normal information generating section 157 may generate, as the normal direction vector n, the normal direction vector candidate in the combination that minimizes the evaluation function.

For example, when obtaining corresponding points between a plurality of images, the stereo corresponding point obtaining section 114 may detect a corresponding point that minimizes Expression 42 or 43 by, for example, searching along an epipolar line.

A camera including therein the normal information generating device 100 of the present embodiment is the same as the camera 200 of Embodiment 1 (FIG. 61). Therefore, the detailed description will be omitted.

Note that while the polarization information obtaining section 103 is provided separately for the first polarization image capturing section 102, for the second polarization image capturing section 102-2 and for the third polarization image capturing section 102-3 in the present embodiment, it is understood that they may be implemented as a single module.

While the segmentation section 105 is provided separately for the first polarization information obtaining section 103, for the second polarization information obtaining section 103-2 and for the third polarization information obtaining section 103-3 in the present embodiment, it is understood that they may be implemented as a single module.

While the normal's one-degree-of-freedom estimating section 106 is provided separately for the first polarization information obtaining section 103, for the second polarization information obtaining section 103-2 and for the third polarization information obtaining section 103-3 in the present embodiment, it is understood that they may be implemented as a single module.

As described above, by optimally integrating together normal's one-degree-of-freedom candidates assuming both the specular reflection component and the diffuse reflection component, by using the polarization information of the subject, normal information is generated for each pixel, and it is therefore possible to passively estimate high-precision normal information over a wide area.

Note that a normal information generating device may be called an image processing apparatus in that it also processes images. Note however that such an image processing apparatus has a different function from that of the image processing apparatus shown in FIG. 1.

Eighth Embodiment

A viewpoint-converted image generating apparatus according to an eighth embodiment of the present invention will now be described.

With a normal information generating device of any of the embodiments above, it is possible to obtain the normal information of the subject. A viewpoint-converted image generating apparatus of the present embodiment generates an image that has been viewpoint-converted (hereinafter, referred to as a "viewpoint-converted image") by using the normal information. Herein, the term "viewpoint conversion" refers to a process of generating an image of a subject as viewed from a different viewpoint position than the viewpoint position from which the image of the subject was captured. Through viewpoint conversion, it is possible to obtain images of the same subject as viewed from different directions.

Conventional methods for realizing the viewpoint conversion include an image-based method of capturing multi-viewpoint images using a multi-view camera and interpolating the captured images, and a model-based method of obtaining a 3-dimensional geometric model of the subject and pasting textures thereon. With the former method, however, the number of cameras used will increase considerably for higher definitions, and the viewpoint conversion cannot be done from a viewpoint where the group of cameras is not present because the method basically uses interpolation. With the latter method, it is difficult to obtain a high-quality 3-dimensional model of the subject.

On the other hand, with the normal information generating device of the present invention, it is possible to obtain pixel-based subject normals by using stereo polarization images. An advantage of being able to obtain pixel-based normals is as follows. The polarization-based method can be said to be the only method, except for the so-called "Shape From Shading" method in which normals are restored from shading, and it is possible, by restoring the shape from this, to generate a high-definition 3-dimensional model and to perform a model-based viewpoint conversion.

According to the present invention, by stereo polarization imaging, i.e., by capturing images only using a 2-lens camera system, it is possible to generate multi-viewpoint images that are substantially equal to those captured by a multi-view camera and to further generate stereoscopic images. As a result, it is applicable to techniques over a wide range of applications, including the medical endoscopy field, the ITS field, the surveillance field, and other fields such as 3D movies and e-commerce.

Figure 75:
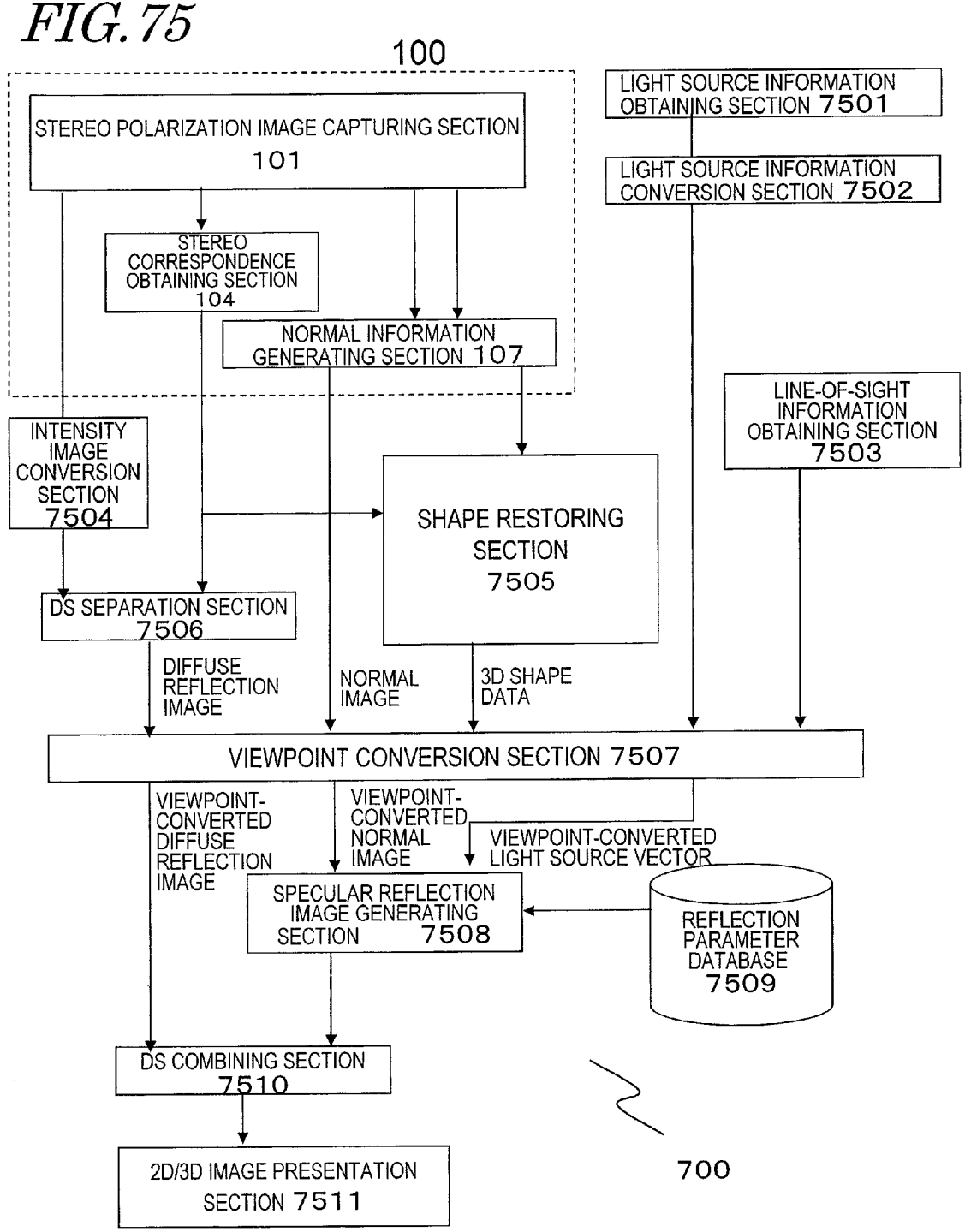
[FIG. 75] A block diagram showing a viewpoint-converted image generating apparatus according to the eighth embodiment of the present invention.

FIG. 75 shows a block diagram of a viewpoint-converted image generating apparatus 700 of the present embodiment. The viewpoint-converted image generating apparatus 700 includes a normal information generating device 100 of any of the first to seventh embodiments above. The viewpoint-converted image generating apparatus 700 extracts normal information from the subject, restores the subject shape based on the information, and presents it further combined with a viewpoint-converted image or a light source-converted image.

The normal information generating device 100 includes the stereo polarization image capturing section 101, the stereo correspondence obtaining section 104 and the normal information generating section 107, and obtains information of the normal of the subject. The details of this process have already been described above, and will therefore be omitted. Note that in the description below, it is assumed that normal information is obtained over the entire area of the subject, including such an area where normal cannot be obtained due to stereoscopic occlusion, by the techniques described in Embodiment 2.

A light source information obtaining section 7501 obtains the light source information under the image-capturing environment. In a simplest model, the light source information can assume a light source vector L (two degrees of freedom), which can be obtained by a method using a mirror ball. This method is described in, for example, Mark W. Powell, Sudeep Sarker, and Dmity Goldgof: "A Simple Strategy for Calibrating the Geometry of Light Sources", IEEE Transaction on pattern analysis and machine intelligence, Vol. 23, No. 9, September 2001, pp. 1023-1026.

A light source information conversion section 7502 freely changes the light source vector at the time of image-capturing in order to synthesize images in which the light source is varied by using different light source vectors. Note however that the light source variation is not the primary function of the present embodiment, but it is done for the purpose of reproducing the effect of the relative change of the light source entailing the viewpoint conversion.

A line-of-sight information obtaining section 7503 obtains the viewpoint vector of the camera using camera parameters. The camera parameters include external parameters such as the position and the direction in the world coordinates of the camera, and internal parameters such as the focal length, the lens center, and the lens distortion. These parameters are obtained by using the method of Tsai, supra, etc., during the calibration of the stereo polarization image capturing section. Therefore, the details will be omitted.

A intensity image conversion section 7504 converts a polarization image to a intensity image. Where the polarization image capturing section includes minute polarizing plates placed on pixels as shown in FIG. 8, intensity values obtained from pixels having four different polarization directions of polarization axis rotation angles ($\Psi i=0°$, $45°$, $90°$ and $135°$ are used for obtaining the polarization information, but the average value thereof is the intensity value with no polarization information. The intensity image conversion section 7504 generates a intensity image by this averaging process.

A shape restoring section 7505 restores the subject shape by using the normal information of the subject obtained by the normal information generating section 107, and the 3-dimensional coordinates of discrete feature points on the subject surface from the stereo correspondence obtained by the stereo correspondence obtaining section 104.

What is output from the normal information generating device 100 is a normal image. This is an image including distributed normals, each being a vector having three components, on the (x,y) 2-dimensional plane, and since it certainly represents a part of the 3D shape of the subject, it is sufficient for the image generation when the light source changes. However, when viewpoint conversion is performed, the subject shape itself changes and the 3D shape changes, and it is therefore necessary to perform shape restoration from normal images. An example in which the shape of a globe photographed in a darkroom is restored will be described in detail.

Figure 76:
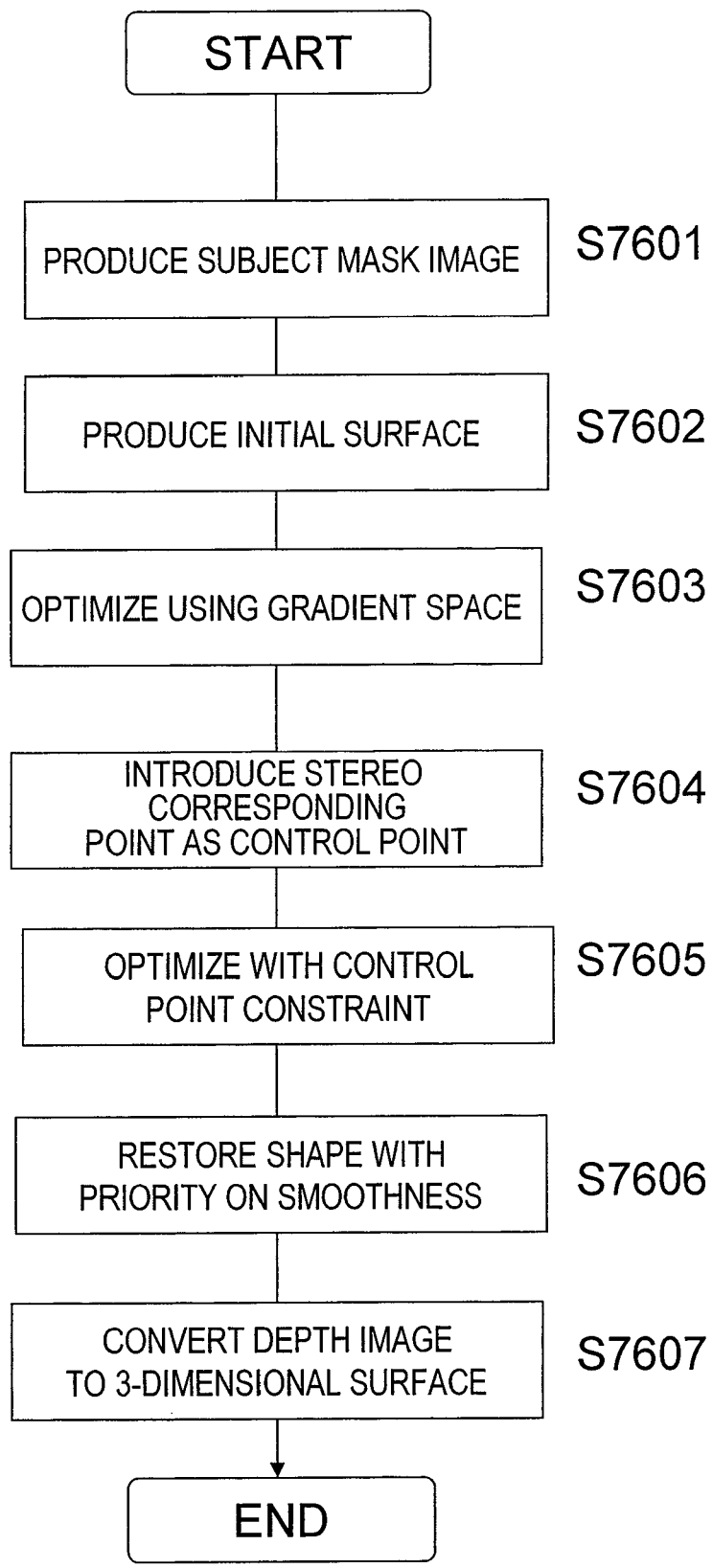
[FIG. 76] A flow chart showing the operation of a shape restoring section.

FIG. 76 is a flow chart showing the process performed by the shape restoring section 7505.

In step S7601, the shape restoring section 7505 produces a subject mask image. This process determines the occluding edge of a globe, which is the subject, and separates it from the background. It is difficult to separate the background and the subject in any scene. However, the subject can be separated by setting an appropriate threshold value and performing binarization with the image intensity. In the present embodiment, an image obtained as described above is employed as the subject mask image.

In step S7602, the shape restoring section 7505 produces an initial surface by successively integrating gradients from the occluding edge. Thereafter, the gradient (p,q) space of two degrees of freedom is used to represent normals.

Figure 77:
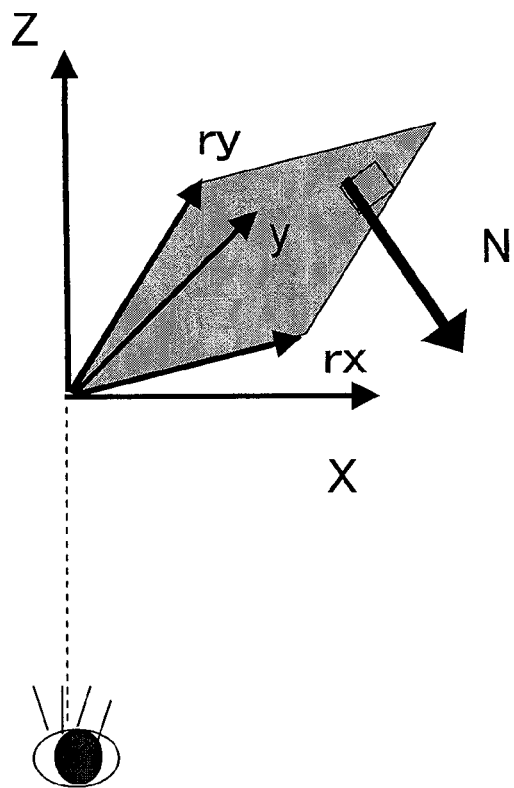
[FIG. 77] A diagram showing the geometric relationship between the gradient and the normal vector N.

FIG. 77 shows how a gradient is obtained while assuming parallel projection from the normal vector N. Assuming that the camera coordinate system is xyz, if the xy coordinate system exists within the screen, the viewpoint is located in the negative z direction. Therefore, assuming that N is what is obtained by changing the sign of the outer product between the tangent vectors rx and ry and is facing toward the viewpoint, the gradient is obtained from the normal as a mathematical relation as follows.

$$r_x = \begin{pmatrix} 1 & 0 & \frac{\partial z}{\partial x} \end{pmatrix}^T = (1 \quad 0 \quad p)^T$$ [Expression 44]

$$r_y = \begin{pmatrix} 0 & 1 & \frac{\partial z}{\partial y} \end{pmatrix}^T = (0 \quad 1 \quad q)^T$$

$$N = -r_x \times r_y = (p \quad q \quad -1)$$

$$\therefore p = \frac{\partial z}{\partial x} = -\frac{N_x}{N_Z} \quad q = \frac{\partial z}{\partial y} = -\frac{N_y}{N_Z}$$

Figure 78:
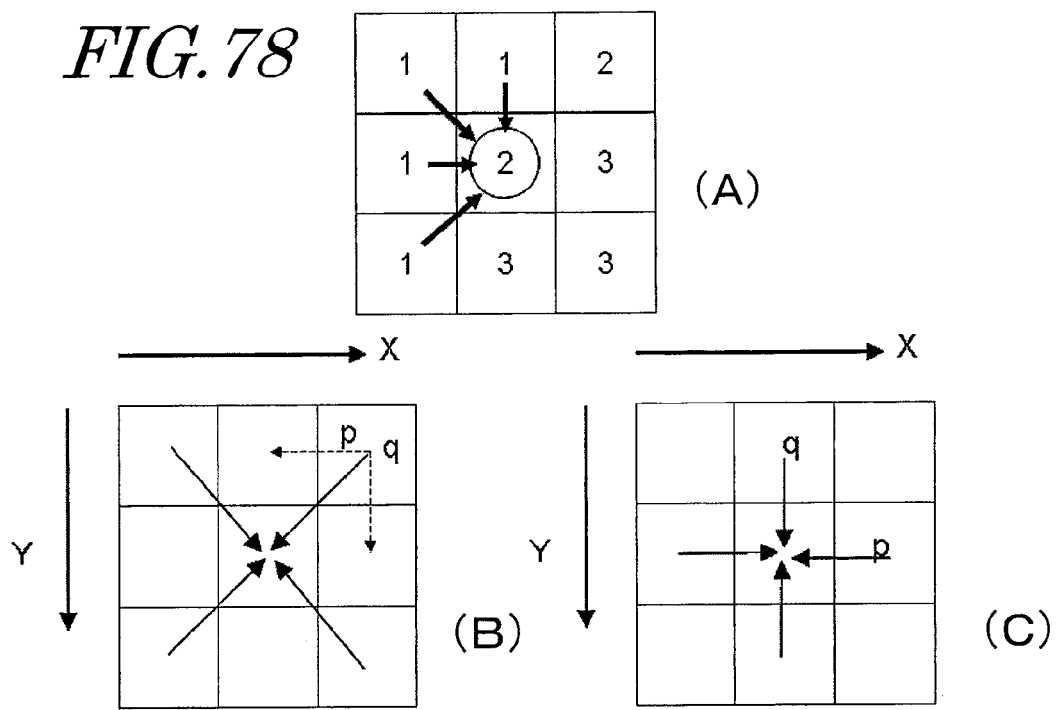
[FIG. 78] A diagram illustrating a specific integration method for a gradient (p,q).

Referring to FIG. 78, a specific integration of the gradient (p,q) will be described. While the inside of the subject is represented by a mask image, it is ordered, by way of conversion of the distance from the occluding edge, so that the value gradually increases from the occluding edge toward the central portion. After Z is zero-cleared as an initialization, the direction in which the distance increases is obtained for the integrated pixels (FIG. 78(A)). The case where the direction is diagonal with respect to the neighbors (FIG. 78(B)) and the case where it is vertical or horizontal with respect to the neighbors (FIG. 78(B)) are separated from each other, and the gradient (p,q) is successively calculated for each of these cases. As a result, the shape is restored successively from the periphery of the globe toward the inner side. The shape is represented by a depth image Z(y,x) which is the pixel coordinate system on the captured image surface.

FIG. 79 is a diagram showing the process in which the surface is produced as a depth image as a result of the integration described above with the normal image (Nx,Ny,Nz) and the mask image being input. Thus, an initial surface is produced.

In step S7603, since the shape precision of the surface obtained in the initial surface is far from the shape of a sphere, the shape is updated again as a surface having the gradient (p,q). In this method, the following integration is evaluated globally so as to obtain Z, which minimizes it.

$$\iint_D [(z_x-p)^2 + (z_y-q)^2] dx\, dy$$ [Expression 45]

This variational problem results in a Langrange-Euler equation (Poisson equation).

$$\nabla^2 z = p_x + q_y$$ [Expression 46]

This equation is discretized, and the optimal solution is obtained by the following sequential process. The iterative process is performed about 1000 times for normal images of 130×130 pixels.

$$z_{i,j}^{k+1} = \frac{1}{4}\begin{bmatrix} z_{i+1,j}^k + z_{i-1,j}^k + z_{i,j+1}^k + z_{i,j-1}^k - \\ p_{i,j} + p_{i-1,j} - q_{i,j} + q_{i,j-1} \end{bmatrix}$$ [Expression 47]

In step S7604 (FIG. 76), the shape restoring section 7505 introduces the stereo corresponding point as a control point. According to the present invention, the shape of the subject surface can be controlled by using the 3-dimensional position information of the feature point (hereinafter a "control point") obtained by binocular or trinocular stereo vision, in addition to the normal information from polarized light.

Figure 80:
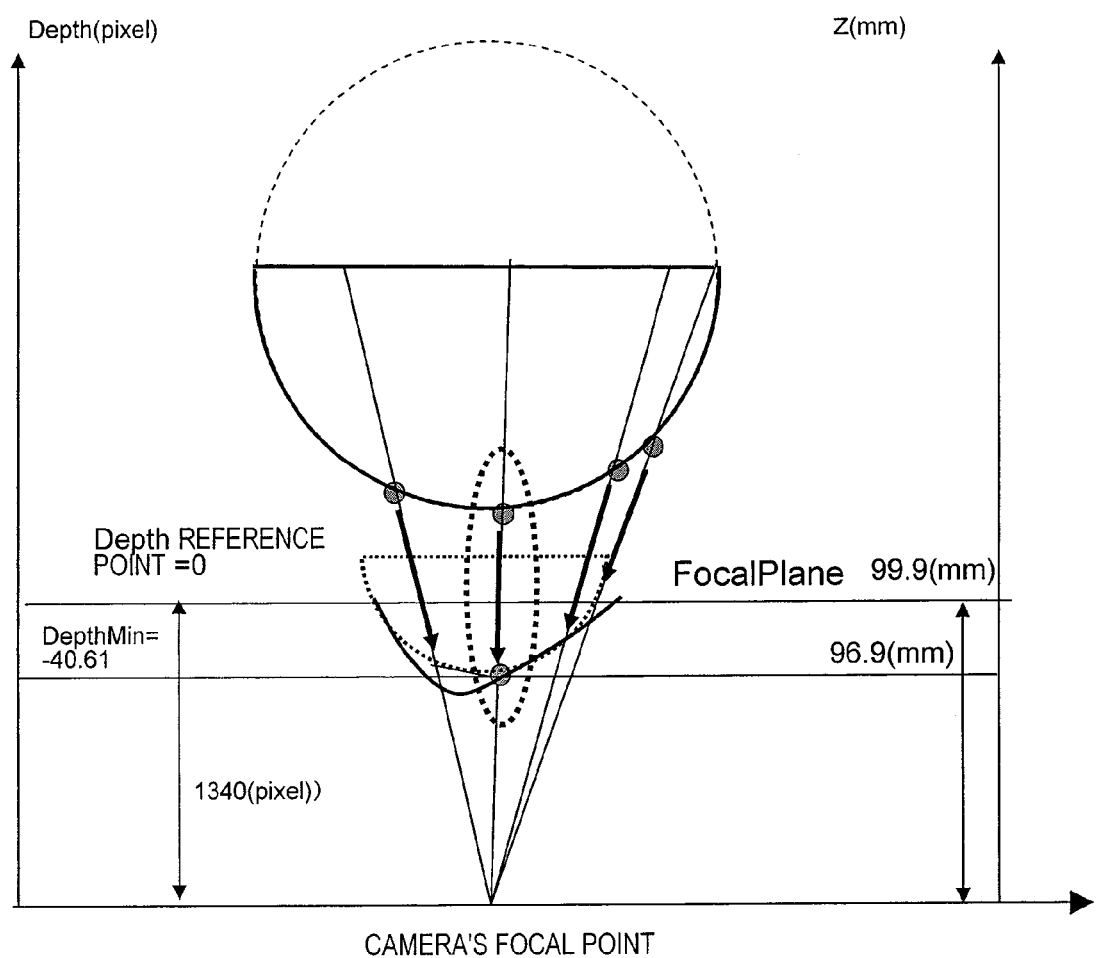
[FIG. 80] A diagram illustrating how the depth image restoration is controlled by control points from a stereo vision.

FIG. 80 shows this process, wherein a control point having the smallest Z value (being closest to the camera) is taken as the reference point, and a conversion is performed in which the pixel coordinate point thereof is associated with the corresponding depth image, thereby uniformly embedding all control points into the depth image on the focal plane by perspective projection.

In step S7605, the process performs an optimization with control point constraint. Through the process up to this point, control points have been embedded discontinuously on the smooth but distorted surface, the surface is updated again iteratively using the gradient constraint. A method called Weighted Least Squares (WLS) is used as such an optimization process with control point constraint. This method is described in Itsik Horovitz and Nahum Kiryati, Tel Aviv University: "Depth from Gradient Fields and Control Points: Bias Correction in Photometric Stereo", Image and Vision Computing Vol. 22, pp. 681-694, 2004.

With this method, the influence from a control point that is closest from the subject pixel is set as a function weighted by the inverse of the distance, wherein the weight is increased as the distance is closer and the weight is decreased as the distance is longer.

Specifically, $$\sum_{i,j} w_{i,j}[(z_{i+1,j} - z_{i,j} - p_{i,j})^2 + (z_{i,j+1} - z_{i,j} - q_{i,j})^2] \quad \text{[Expression 48]}$$

is minimized. Using a least-squares method, in which this is differentiated with Zij and is assumed to be zero yields the following.

$$w_{ij}(-z_{i+1j}+z_{ij}+P_{ij})+w_{ij}(-z_{i+1j}+z_{ij}+q_{ij})+$$
$$w_{i-1j}(-z_{i-1j}+z_{ij}-P_{i-1j})+$$
$$w_{ij-1}(-z_{ij-1}+z_{ij}-q_{ij-1})=0 \quad \text{[Expression 49]}$$

Therefore, one will solve the following expression by an iterative method.

$$Z_{ij} = \frac{1}{2w_{ij} + w_{i-1j} + w_{ij-1}} \begin{bmatrix} w_{ij}\begin{pmatrix} z_{i+1j} + z_{ij+1} - \\ p_{ij} - q_{ij} \end{pmatrix} + \\ w_{i-1j}(z_{i-1j} + p_{i-1j}) + \\ w_{ij-1}(z_{ij-1} + q_{ij-1}) \end{bmatrix} \quad \text{[Expression 50]}$$

While the function form of the weighted function is arbitrary, the following form is used herein.

$$W = \min\left(100, \frac{1}{R^2}\right) \quad \text{[Expression 51]}$$

Herein, R is the distance, on the image, to the control point that is closest from the subject pixel.

In order to specifically realize the constraint of the control point, the control point is set again for each iteration. Otherwise, the surface after the iteration will be a surface that does not substantially reflect the control point.

In step S7606 (FIG. 76), the shape restoring section 7505 performs a shape restoration with priority on "smoothness". The reason is as follows. Through the process up to step S7605, the shape is restored. Therefore, the viewpoint conversion of the diffuse reflection component is roughly realized. However, a close examination on the surface reveals the following problems:
  considerable irregularities as a whole; and
  particularly poor reproduction in a globe central portion where the polarization of specular reflection is regarded as polarization of diffuse reflection.
For the purpose of reproducing the diffuse reflection component, such shape errors do not have substantial influence except for occluding edge portions. However, it has been known that when modeling the specular reflection, a very high-precision and smooth curved surface is needed, and such shape errors will be a problem. To deal with this, the present invention employs a method of obtaining a smooth normal by differentiating a shape that has been restored with priority on smoothness, and controls the weight of the term that is influenced by the normal using the coefficient W in the process of restoring the shape using the gradient space (p,q). Specifically, for the reproduction of the specular reflection, a surface produced with W=0.5 is used.

$$z_{ij}^{k+1} = \frac{1}{4}\begin{bmatrix} z_{i-1,j}^k + z_{i+1,j}^k + z_{ij-1}^k + z_{ij+1}^k + \\ W(-p_{ij} + p_{i-1j} - q_{ij} + q_{ij-1}) \end{bmatrix} \quad \text{[Expression 52]}$$

In step S7607, the shape restoring section 7505 performs a conversion from the restored depth image to a surface shape represented within the 3-dimensional space of the camera coordinate system.

FIG. 81 shows how the shape is successively reproduced by the processes above. This example illustrates a plurality of horizontal-direction profiles of the depth image of the globe.

(1) in FIG. 81 shows the result of producing an initial surface by integrating the normals starting from the periphery. This result contains a substantial amount of noise. (2) in FIG. 81 shows the result of optimizing the shape using the gradient space. Even in this result, there exists a distortion with curves crossing each other. In (3) in FIG. 81, the constraint is imposed on the surface by introducing stereo control points. In (4) in FIG. 81, a surface shape is generated by optimizing a surface that passes through the stereo control points introduced in (3) and also satisfies the condition of the gradient space from the normal. It can be seen that a curved surface is generated at a correct 3-dimensional position even though there exists a slight distortion. (5) in FIG. 81 shows a surface generated under such conditions that put priority on smoothness, and there is a divergence from the correct shape. However, it can be seen that the smoothness is increased.

Figure 82:
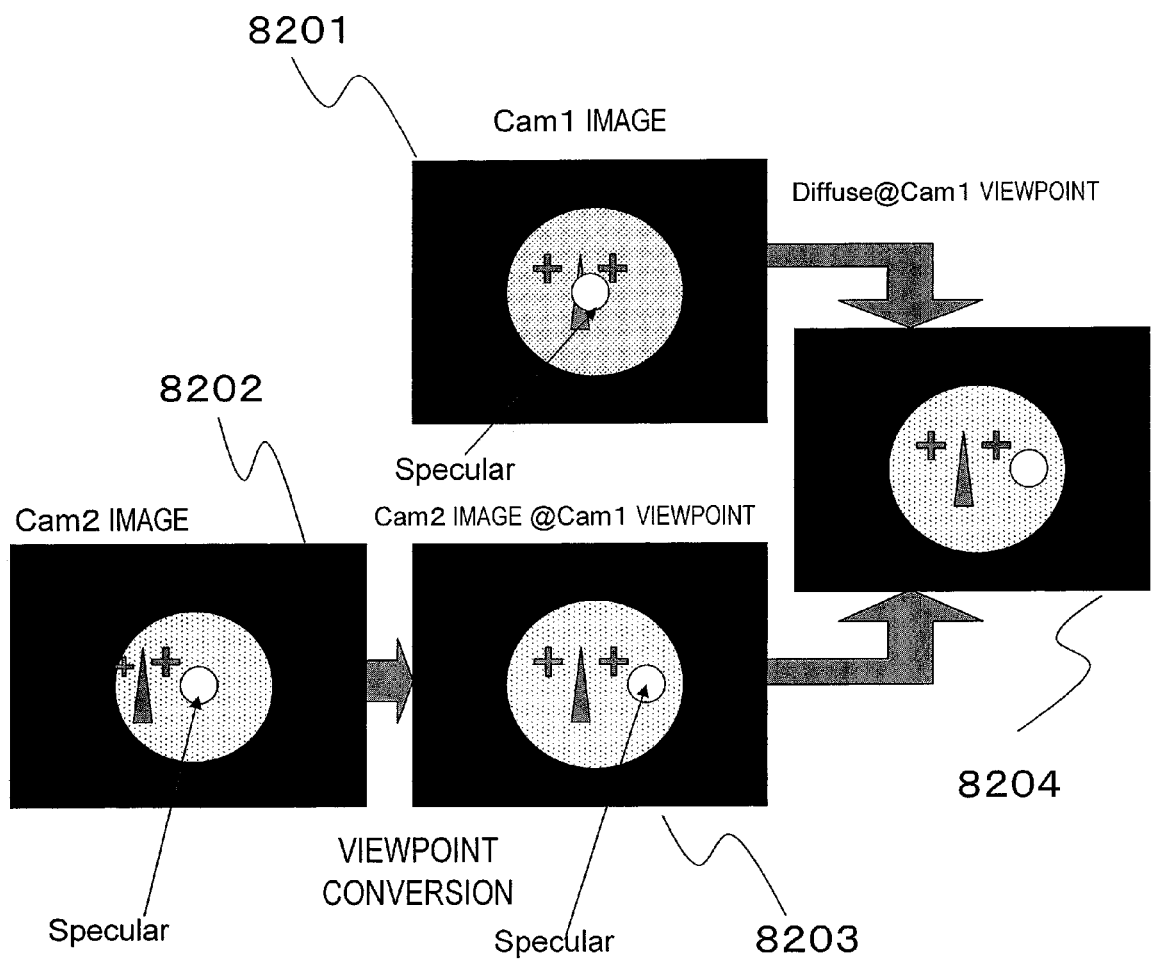
[FIG. 82] A diagram showing the process performed by a DS separation section.

A DS separation section 7506 (FIG. 75) separates the surface intensity into the diffuse reflection component and the specular reflection component. This is for reproducing the phenomenon that as a subject is observed from different viewpoints, the diffuse reflection component (Lambert reflection) of the surface reflection intensity is invariant whereas the specular reflection component moves around and the intensity varies substantially with the viewpoint. The present invention employs a method in which two viewpoints of binocular stereo vision are used. The principle is as shown in FIG. 82 and is as follows.
  (1) Obtain images 8201 and 8202 of the subject as viewed from two viewpoint positions of Cam1 and Cam2.
  (2) Generate an image 8203 through a viewpoint conversion of the Cam2 image. The image 8203 is an image of Cam2 as viewed from the viewpoint position of Cam1 (designated in FIG. 82 as "Cam2 image @ Cam1 viewpoint").
  (3) Generate a diffuse reflection component image 8204 by comparing the same captured pixel coordinates between 8201 and 8203 and using the one with a smaller intensity as the diffuse reflection component.

A viewpoint conversion section 7506 performs a free viewpoint conversion only the diffuse reflection image component of Cam1 or Cam2 by using the camera parameters. This process is based on a 3D shape data structure. First, the 3D shape data structure will be described below.

Figure 83:
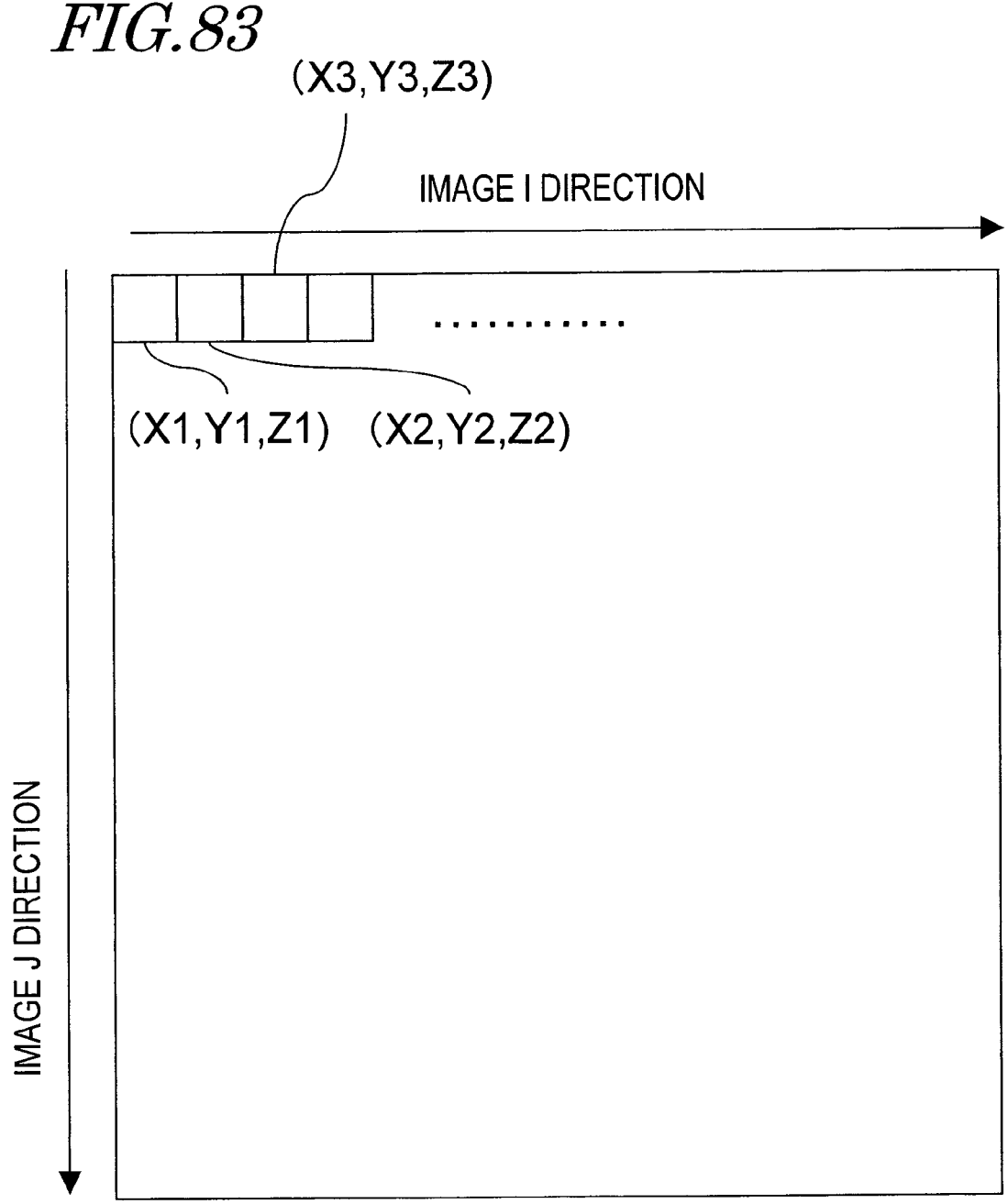
[FIG. 83] A diagram showing a 3D shape data structure.

FIG. 83 shows a subject 3D shape data structure restored by the shape restoring section 7505. The shape restoring section 7505 stores the 3D shape data structure after converting it to a data format of pixel-based 3D position coordinates (camera coordinate system). Specifically, in Camera 1, 3D position coordinates (Xc1,Yc1,Zc1) are stored in a text format for the 2D pixel coordinate system of the image-capturing coordinate system (X,Y). This structure can only model a portion that can be seen from the camera viewpoint. However, a viewpoint conversion of the simplest form can be realized.

The 3D position coordinates (−1,−1,−1) are filled in the background portion other than the subject.

Figure 84:
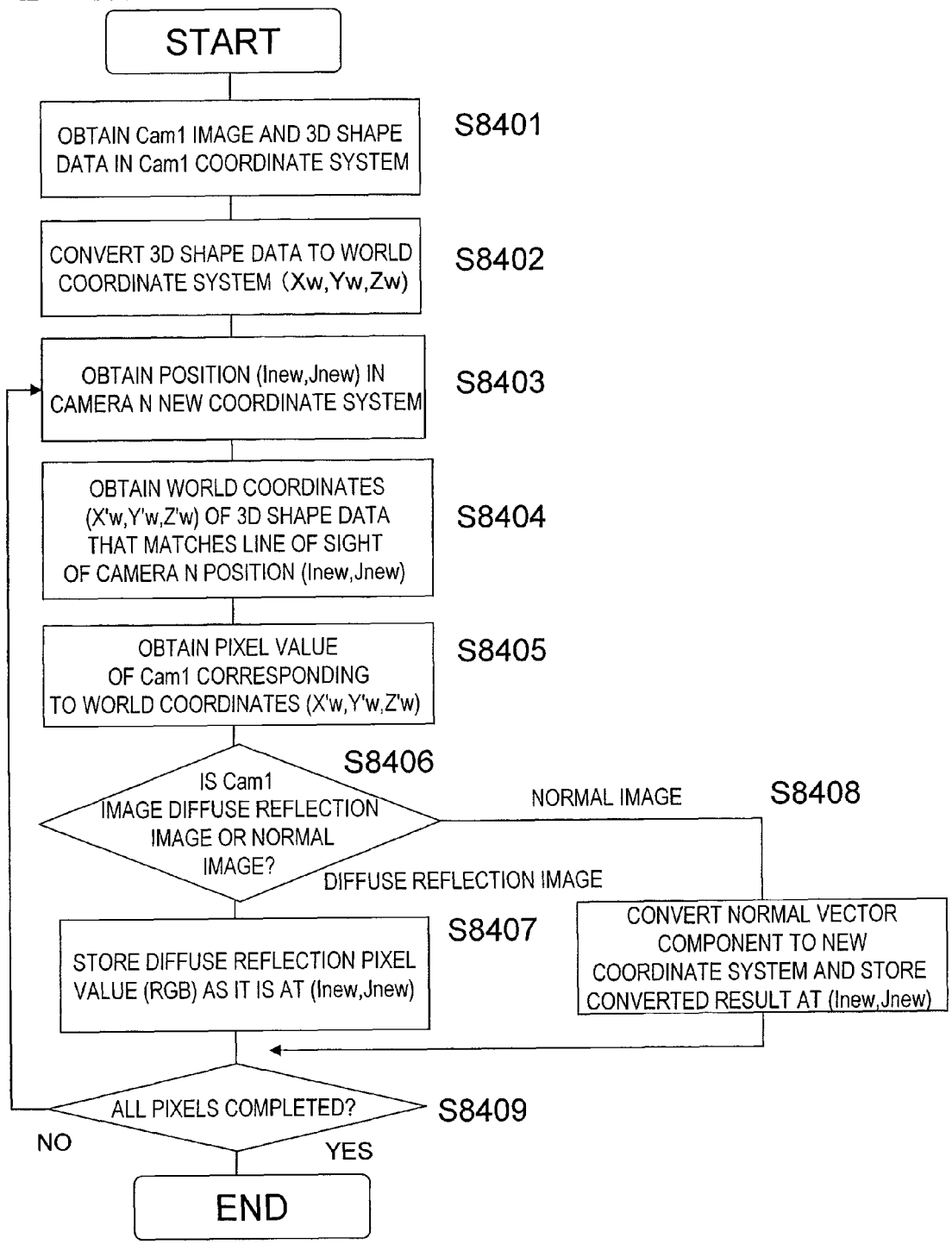
[FIG. 84] A flow chart illustrating a viewpoint conversion process.

FIG. 84 is a flow chart illustrating the process of performing a viewpoint conversion by using the 3D shape data structure and the camera parameters. Note that this flow chart illustrates both the case where the Cam1 image to be viewpoint-converted is a diffuse reflection image and the case where it is a normal image. This is indicated by the configuration of the viewpoint conversion section 7507 in FIG. 75 where two different images, i.e., the diffuse reflection image and the normal image, are input.

First, in step S8401, the viewpoint conversion section 7507 obtains the Cam1 image and the 3D shape data in the Cam1 coordinate system.

In step S8402, the viewpoint conversion section 7507 converts the 3D position coordinates stored in the 3D shape data from the Cam1 coordinate system to the world coordinate system (Xw,Yw,Zw). This conversion is made possible by using camera parameters.

In step S8403, the viewpoint conversion section 7507 starts the actual process by obtaining the pixel position (Inew,Jnew) on the image of the new point to be obtained.

In step S8404, the viewpoint conversion section 7507 searches for the point (X'w,Y'w,Z'w) at which the line of sight of the camera corresponding to the pixel position (Inew,Jnew) is closest to the 3D shape data in the world coordinate system, again using the camera parameters.

In step S8405, the viewpoint conversion section 7507 obtains the pixel value of the original Cam1 image corresponding to the obtained world coordinate system. In step S8406, the viewpoint conversion section 7507 determines whether the Cam1 image is a diffuse reflection image or a normal image. The process proceeds to step S8407 when it is determined that the image is a diffuse reflection image. The process proceeds to step S8408 when it is determined that the image is a normal image.

In step S8407, the viewpoint conversion section 7507 stores the (RGB) value, which is the Cam1 pixel value, as it is in the pixel position (Inew,Jnew) of the pixel for the new viewpoint. This is because of the characteristic that the intensity value of a diffuse reflection image is invariant to a viewpoint conversion, and a monochrome pixel value is to be stored when the image is not a color image. Then, the process proceeds to step S8409.

In step S8408, the viewpoint conversion section 7507 performs a coordinate system conversion to a new viewpoint on the normal vector component using camera parameters and similarly stores the converted result at the pixel position (Inew,Jnew), generating a normal image at the new viewpoint. Then, the process proceeds to step S8409.

In step S8409, the process examines whether or not all pixels have been generated. If all pixels have not been generated, the process returns to step S8403 to repeat the process.

Figure 85:
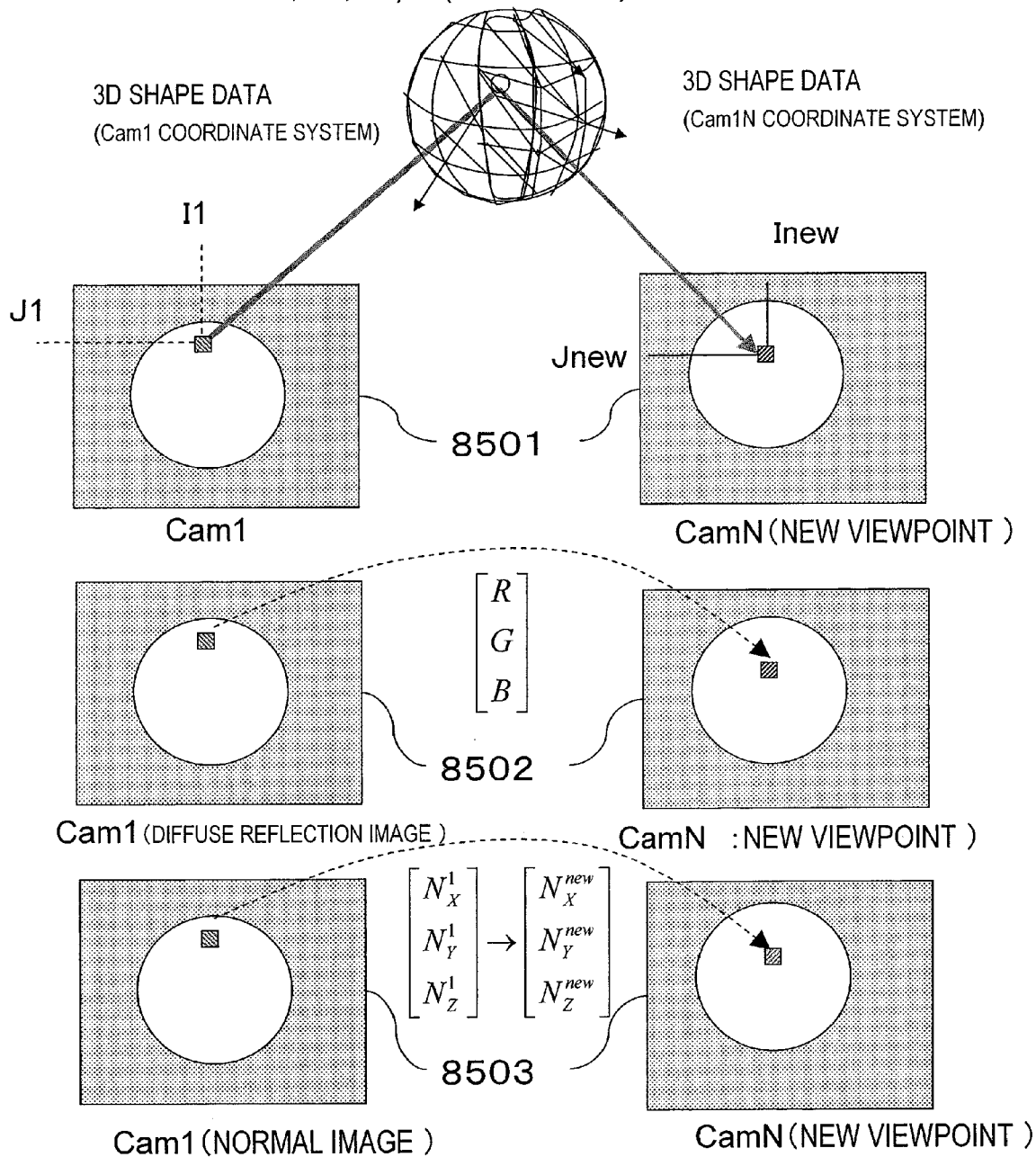
[FIG. 85] A schematic diagram illustrating a viewpoint conversion process.

FIG. 85 shows the result of the process performed in accordance with the flow chart of FIG. 84. This figure shows the process of producing an image from the new viewpoint for CamN from the Cam1 image, side by side with each other.

Correspondence 8501 illustrates the relationship on the image surface between the coordinates (I1,J1) of the Cam1 image and the coordinates (Inew,Jnew) of the CamN image, which is the image from the new viewpoint. Correspondence 8502 indicates that where the Cam1 image is a diffuse reflection image, the (RGB) color pixel values are stored as they are at the two pixel positions above. Correspondence 8503 indicates that where the Cam1 image is a normal image, the normal vector components (N1x,N1y,N1z), which are the pixel values, are stored while being coordinate-converted to (Nnewx,Nnewy,Nnewz) at two pixel positions.

A specular reflection image generating section 7508 (FIG. 75) generates and synthesizes a physical-based specular reflection image that is viewpoint-converted as is the viewpoint-converted image of the diffuse reflection image. Through the process up to this point, a viewpoint conversion has already been performed on the diffuse reflection image obtained by removing the actual specular reflection component from the subject. This process is performed for the purpose of then reproducing specular reflection by using a physical reflection model based on the geometrical relationship between the light source, the viewpoint and the subject normal, and surface reflection characteristics. This process can be said to be a model-based, original viewpoint conversion function such as the present method.

In order to perform a viewpoint conversion on the specular reflection, it is first necessary to obtain the normal image and the light source vector in the camera coordinate system of the new viewpoint. For the normal image, the process has already been performed by the viewpoint conversion section 7507. Therefore, the specular reflection image generating section 7508 only needs to perform the coordinate conversion of the light source vector by using camera parameters.

Next, the specular reflection image generating section 7508 obtains the reflection intensity value from the normal vector, the viewing vector, the light source vector and the surface reflection characteristic by using a physical reflection model.

The model used is a Cook-Torrance model represented by the following expression. Using the normal vector N, the viewpoint vector V, and the angle α between the half vector and the normal, the distribution function D is represented by a Beckmann function as follows. This model may be a different specular reflection model such as a Torrance-Sparrow model.

$$\begin{cases} I = \dfrac{k}{\pi} \dfrac{D}{N \cdot V} \\ D = \dfrac{1}{4m^2 \cos^4 \alpha} \exp\left(-\dfrac{\tan^2 \alpha}{m^2}\right) \end{cases} \quad \text{[Expression 53]}$$

Figure 86:
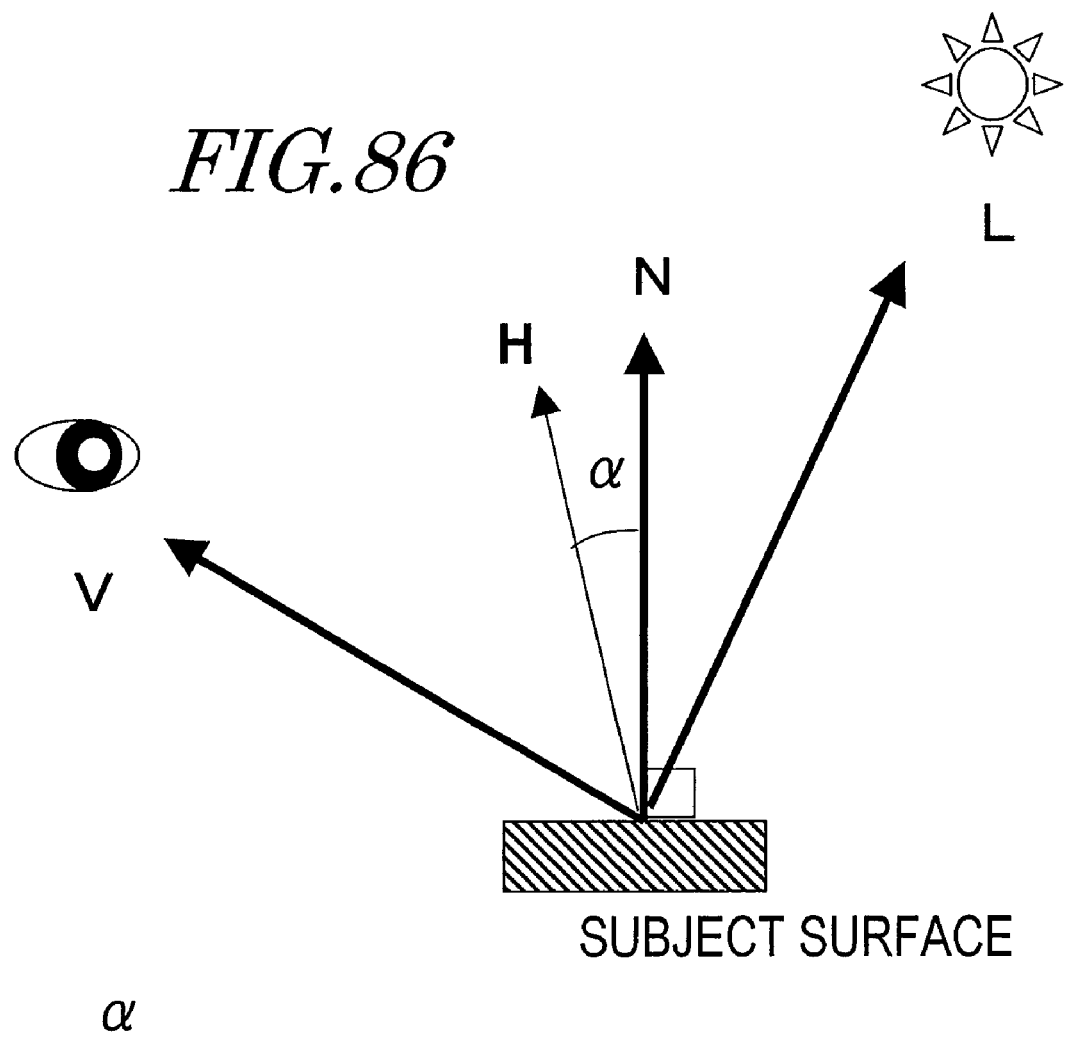
[FIG. 86] A diagram illustrating a specular reflection model.

FIG. 86 shows the geometric relationship. FIG. 86 illustrates the angle α between the half vector H between the light source vector L and the viewing vector V, and the normal vector N. At an angle where α=0, D in Expression 53 takes the maximum value and the intensity is maximized. While what represents the surface reflection characteristic is the roughness coefficient m and the intensity weighting coefficient K, they may be obtained from the subject when actually capturing an image thereof, or parameters optimized in a previous experiment for the same subject (globe) may be used. Herein, values (m=0.083, k=6415.795) obtained in a previous experiment for the same subject are used. Note that the parameters are stored in a reflection parameter database 7509.

Finally, a DS combining section 7510 completes a viewpoint-converted image by adding together a viewpoint-converted diffuse reflection image and a similarly viewpoint-converted specular reflection image, which have been generated through the process described above.

A 2D/3D image presentation section 7511 is, for example, a display for displaying the generated free viewpoint-converted image. The display may be a 2D (planar) display, or is sometimes a 3D (stereoscopic) display.

Where it is a 2D display, as the user specifies a viewpoint position with a known interface such as a joy stick or a viewpoint input device, the 2D/3D image presentation section 7511 displays a 2D image for the viewpoint position.

The 3D (stereoscopic) display includes both a fixed-viewpoint display for stereoscopic view with glasses, and a multi-viewpoint stereoscopic display for naked eyes. In the former case, it is possible to observe a stereoscopic image with the viewpoint being freely varied by the same interface as that for the 2D display. In the latter case, the observer can observe a stereoscopic image while freely moving around the viewpoint. Thus, when an observer views from a certain viewpoint, it is possible to view a stereoscopic vision while freely moving the viewpoint around, by combining together the two viewpoint images for the left and right eyes and presenting the obtained image in that direction.

FIG. 87 shows examples where viewpoint-converted images are displayed. Images 8701 and 8702 show left and right input images, respectively, which are captured with polarization. Images 8703, 8704 and 8705 each show an image synthesized for a viewpoint using the left input image 8701, and show an intermediate viewpoint image between the input images, a viewpoint-moved image at 45 degrees to the left, and a viewpoint-moved image at 45 degrees to the right, respectively. In the reproduction, the position of the specular reflection portion is varied with the movement of the viewpoint of the observer, indicating that there is an advantage that the level of reality is improved.

Figure 88:
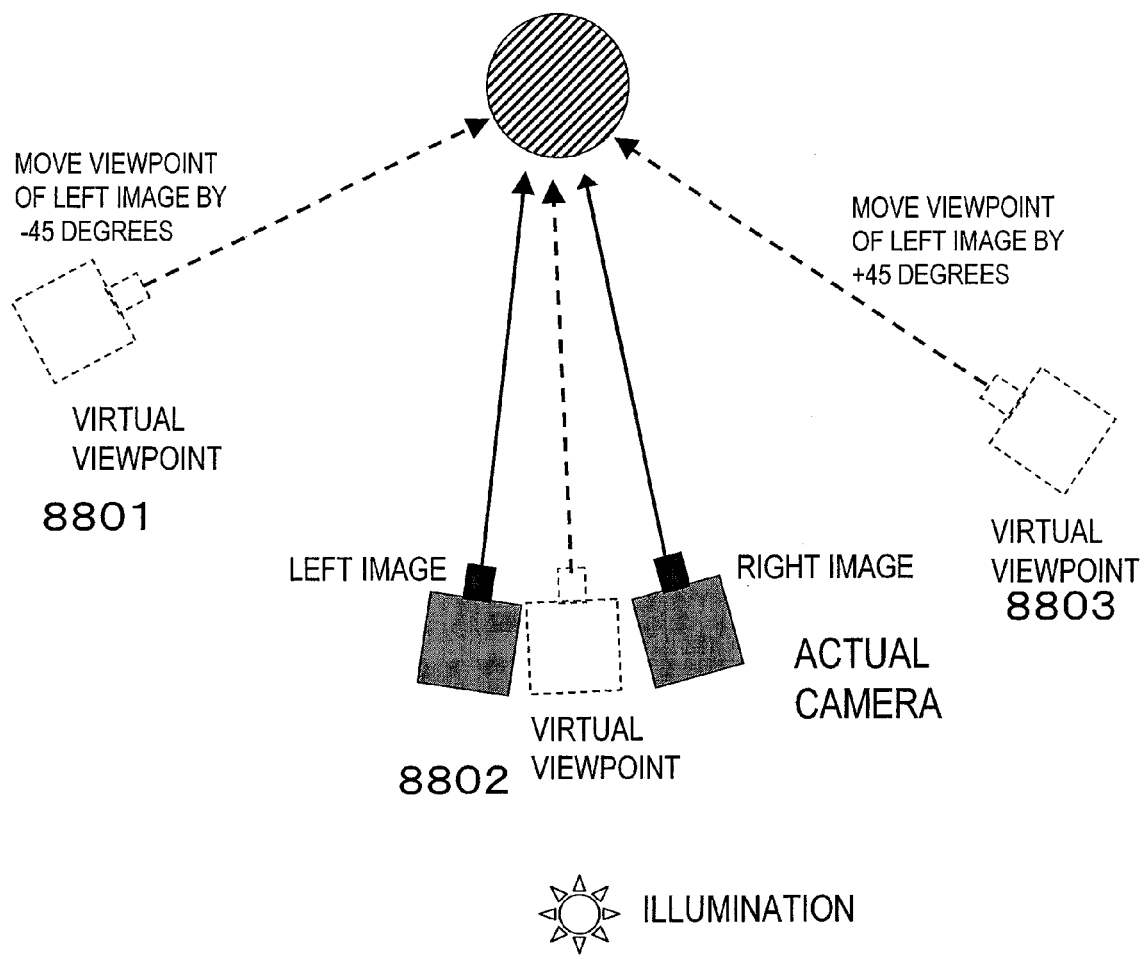
[FIG. 88] A diagram showing a geometric relationship between synthesized viewpoints (for a 2D display).

FIG. 88 shows a geometric relationship between the actual camera viewpoint and the synthesized virtual viewpoint for a 2D display. For the input images of the left image and the right image captured with an actual camera arrangement, images from three virtual viewpoints 8801, 8802 and 8803 are generated from the left image, and they correspond to the images of FIG. 87.

Figure 89:
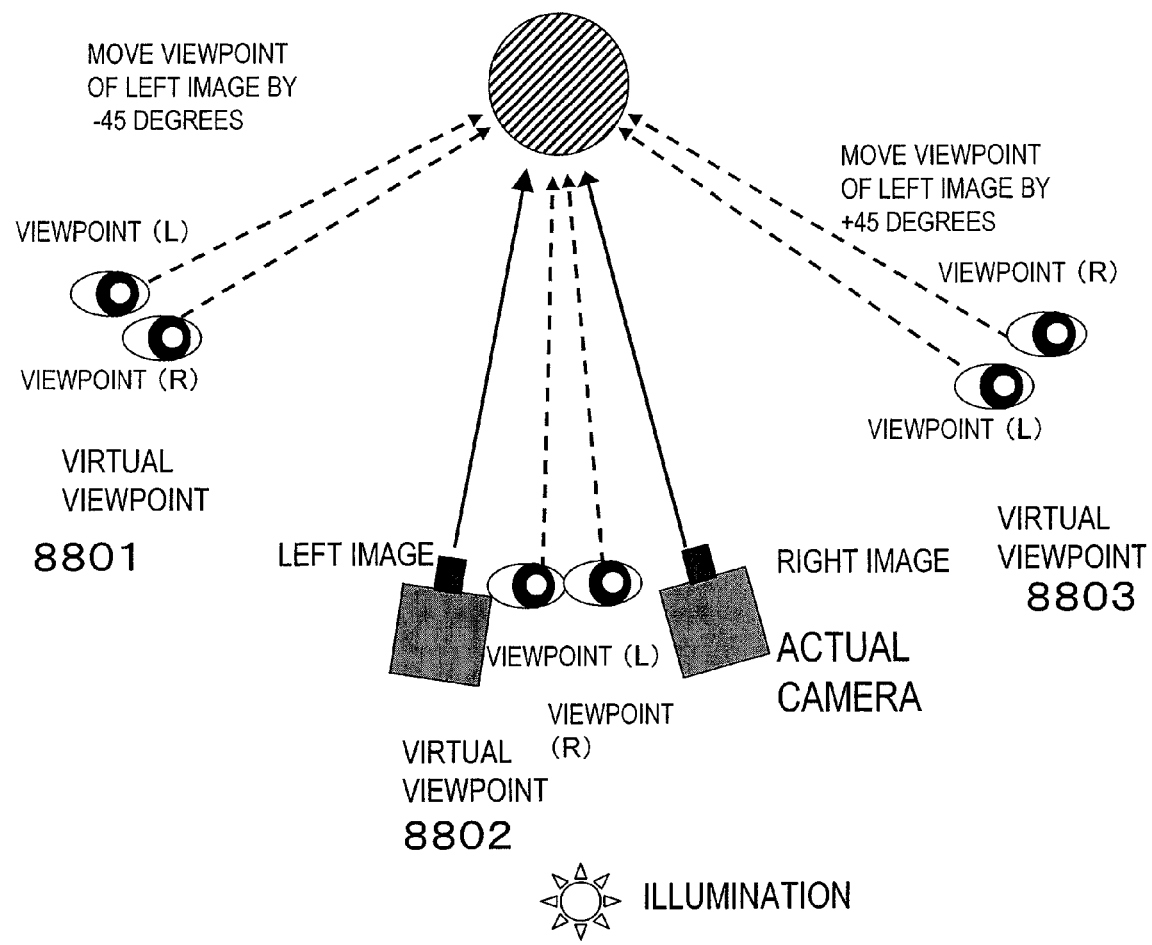
[FIG. 89] A diagram showing a geometric relationship between synthesized viewpoints (for a 3D display).

FIG. 89 shows a geometric relationship between viewpoints where the same viewpoint conversion is presented in a 3D display. For each of the virtual viewpoints 8801, 8802 and 8803, a pair of two different virtual-viewpoint images is further generated for the left eye and the right eye of the observer. These images can be displayed on an existing multi-viewpoint 3D (stereoscopic) display. Therefore the observer can observe the stereoscopic image of the subject from multiple viewpoints while freely moving around the line of sight.

INDUSTRIAL APPLICABILITY

As a normal information generating device for generating normal information on the surface of a subject by capturing images of the subject, the normal information generating device of the present invention is useful as, for example, a device for generating 3-dimensional shape information of a subject or a device for increasing the definition of the image by using the information, specifically, a digital still camera, a digital camcorder, a surveillance camera, etc. The present invention has a very high significance in practical use today, where optical systems and image sensors have been downsized, whereby portable-type image capture devices such as camera-equipped mobile telephones, digital cameras and digital camcorders have been widespread, for which the image resolution matters.

The viewpoint-converted image generating apparatus of the present invention can restore the shape of a subject by using the normal image, which is the output of the normal information generating device above, and generate a synthesized image from an arbitrary viewpoint. Therefore, it is applicable to techniques over a wide range of applications, including the medical endoscopy field, the ITS field, the surveillance field, and other fields such as 3D movies and e-commerce.

REFERENCE SIGNS LIST

101 stereo polarization image capturing section
102 polarization image capturing section
103 polarization information obtaining section
104 stereo correspondence obtaining section
105 segmentation section
106 normal's one-degree-of-freedom estimating section
107 normal information generating section
108 optimal normal selection section
109 reliability estimating section

The invention claimed is:

1. An image processing apparatus for capturing an image of a subject and thereby passively generating normal information on a surface of the subject, comprising:
a stereo polarization image capturing section for receiving a plurality of polarized light of different polarization directions at different viewpoint positions and obtaining a plurality of polarization images of different viewpoint positions;
a normal information generating section for estimating a normal direction vector of the subject based on the plurality of polarization images of different viewpoint positions;
a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light;
a stereo correspondence obtaining section for estimating pixel-by-pixel correspondence between the plurality of polarization images of different viewpoint positions;
a segmentation section for dividing a polarization image into areas each having a common optical property based on similarity in at least one of the intensity information of the polarization image and the polarization information regarding the plurality of polarized light; and
a normal's one-degree-of-freedom estimating section for estimating a normal's one degree of freedom on the surface of the subject corresponding to each area divided by the segmentation section based on the polarization information, for each of the plurality of polarization images,
wherein the normal information generating section estimates a normal direction vector based on the normal's one-degree-of-freedoms estimated by the normal's one-degree-of-freedom estimating section and the correspondence between the plurality of polarization images obtained by the stereo correspondence obtaining section.

2. The image processing apparatus according to claim 1, further comprising:
- a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light;
- a stereo correspondence obtaining section for identifying a feature point contained in any of the plurality of polarization images of different viewpoint positions and searching through the other polarization images based on the feature point, thereby identifying feature points corresponding to each other between the plurality of polarization images, so as to estimate pixel-by-pixel correspondence between the plurality of polarization images based on the feature points;
- a segmentation section for dividing a polarization image into areas each having a common optical property based on similarity in at least one of the intensity information of the polarization image and the polarization information regarding the plurality of polarized light beams; and
- a normal's one-degree-of-freedom estimating section for estimating a normal's one degree of freedom on the surface of the subject corresponding to each area divided by the segmentation section based on the polarization information, for each of the plurality of polarization images,
- wherein the normal information generating section estimates a normal direction vector based on the normal's one-degree-of-freedoms estimated by the normal's one-degree-of-freedom estimating section and the correspondence between the plurality of polarization images obtained by the stereo correspondence obtaining section.

3. The image processing apparatus according to claim 2, wherein the polarization information obtaining section generates, as the polarization information, at least one of a degree of polarization, a polarization phase, a polarization estimation error, a polarization maximum intensity value, and a polarization minimum intensity value.

4. The image processing apparatus according to claim 3, wherein the segmentation section divides the surface of the subject into a diffuse reflection area and a specular reflection area.

5. The image processing apparatus according to claim 3, wherein the segmentation section divides the surface of the subject into a diffuse reflection area, a specular reflection area and a shaded area.

6. The image processing apparatus according to claim 3, wherein the segmentation section divides the surface of the subject into a diffuse reflection area, a specular reflection area, an attached shadow area and a cast shadow area.

7. The image processing apparatus according to claim 3, wherein the segmentation section divides the surface of the subject into a diffuse reflection area, a specular reflection area, a stereo unmatched area and an occlusion area.

8. The image processing apparatus according to claim 4, wherein for the diffuse reflection area, the normal's one-degree-of-freedom estimating section generates a polarization main axis angle, at which the intensity takes a maximum value according to the correspondence, as normal information of an emittance plane of the subject corresponding to the area.

9. The image processing apparatus according to claim 7, wherein for the stereo unmatched area and the occlusion area, the normal's one-degree-of-freedom estimating section generates a normal direction vector based on a fact that a normal direction vector exists on a plane perpendicular to an optical axis.

10. The image processing apparatus according to claim 4, wherein for the specular reflection area and the attached shadow area, the normal's one-degree-of-freedom estimating section generates a polarization main axis angle, at which the intensity takes a minimum value according to the correspondence, as normal information of an incident plane of the subject corresponding to the area.

11. The image processing apparatus according to claim 8, wherein for a plurality of polarization images of different viewpoint positions, the normal information generating section generates a normal direction vector by obtaining a line of intersection between incident planes or emittance planes estimated by the normal's one-degree-of-freedom estimating section.

12. The image processing apparatus according to claim 11, wherein the normal information generating section removes ambiguity of the generated normal direction vector by evaluating a correlation between the generated normal direction vector and a viewing direction.

13. The image processing apparatus according to claim 3, wherein the stereo correspondence obtaining section obtains correspondence between stereo images by using the polarization minimum intensity value obtained by the polarization information obtaining section.

14. The image processing apparatus according to claim 7, wherein for an occlusion area, the normal information generating section generates, as the normal direction vector, a vector perpendicular to a viewing vector on an incident plane or an emittance plane estimated by the normal's one-degree-of-freedom estimating section based on a fact that a normal direction vector is perpendicular to a viewing vector.

15. An image processing apparatus for capturing an image of a subject and thereby generating normal information on a surface of the subject, comprising:
- a stereo polarization image capturing section for receiving a plurality of polarized light of different polarization directions at different viewpoint positions and obtaining a plurality of polarization images of different viewpoint positions;
- a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light;
- a stereo correspondence obtaining section for estimating pixel-by-pixel correspondence between the plurality of polarization images of different viewpoint positions;
- a normal's one-degree-of-freedom estimating section for estimating a plurality of normal's one-degree-of-freedom candidates on a corresponding subject surface by switching between a process assuming a specular reflection component and a process assuming a diffuse reflection component, based on the polarization information, for each of the plurality of polarization images;
- a normal information generating section for generating a plurality of normal direction vector candidates based on the normal's one-degree-of-freedoms estimated by the normal's one-degree-of-freedom estimating section and the correspondence between the plurality of polarization images obtained by the stereo correspondence obtaining section; and an optimal normal selection section for selecting one of the plurality of normal direction vector candidates generated by the normal information generating section as an optimal normal direction vector.

16. The image processing apparatus according to claim 15, wherein the normal information generating section selects the optimal normal direction vector based on at least one of a continuity of a normal direction vector, a spatial continuity of the specular reflection component and the diffuse reflection component, polarization information, a normal direction vector in an area near an occluding edge, normal information, and depth information.

17. The image processing apparatus according to claim 2, further comprising a reliability estimating section for estimating reliability of the normal direction vector generated by the normal information generating section and discarding the normal direction vector depending on how low the reliability is.

18. The image processing apparatus according to claim 17, wherein the normal information generating section replaces the normal direction vector with a normal direction vector obtained based on depth information, depending on how low the reliability is.

19. The image processing apparatus according to claim 17, wherein the normal information generating section replaces the normal direction vector with a normal direction vector obtained by performing an interpolation process for nearby normal direction vectors, depending on how low the reliability is.

20. The image processing apparatus according to claim 17, wherein the reliability estimating section estimates reliability of a normal direction vector based on at least one of the polarization information obtained by the polarization information obtaining section, an area division result from the segmentation section, the normal's one-degree-of-freedom information estimated by the normal's one-degree-of-freedom estimating section, and the normal direction vector generated by the normal information generating section.

21. The image processing apparatus according to claim 20, wherein the reliability estimating section varies a magnitude of the reliability of the normal direction vector estimated depending on a magnitude of an angle between incident planes or emittance planes, which are the normal's one-degree-of-freedom information estimated by the normal's one-degree-of-freedom estimating section, for a plurality of polarization images of different viewpoint positions.

22. The image processing apparatus according to claim 20, wherein:
the segmentation section divides the surface of the subject as a shaded area; and
the reliability estimating section estimates the reliability of the normal direction vector to be relatively low in an area divided as a shaded area by the segmentation section.

23. The image processing apparatus according to claim 20, wherein:
the segmentation section divides the surface of the subject as a cast shadow area; and
the reliability estimating section estimates the reliability of the normal direction vector to be relatively low in an area divided as a cast shadow area by the segmentation section.

24. The image processing apparatus according to claim 20, wherein the reliability estimating section calculates normal information from the polarization information obtained by the polarization information obtaining section and an area division result from the segmentation section, and compares the calculated normal information with the normal direction vector generated by the normal information generating section, so as to vary the reliability of the normal direction vector according to a difference therebetween.

25. An image processing apparatus for capturing an image of a subject and thereby generating normal information on a surface of the subject, comprising:
a stereo polarization image capturing section for receiving a plurality of polarized light of different polarization directions at different viewpoint positions and obtaining three or more polarization images of different viewpoint positions of the subject;
a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light;
a stereo correspondence obtaining section for estimating pixel-by-pixel correspondence between the plurality of polarization images of different viewpoint positions;
a segmentation section for dividing a polarization image into areas each having a common optical property based on similarity in at least one of the intensity information of the polarization image and the polarization information regarding the plurality of polarized light;
a normal's one-degree-of-freedom estimating section for estimating a normal's one degree of freedom on a corresponding subject surface by switching processes from one to another for each of areas divided by the segmentation section, based on the polarization information;
a normal information generating section for estimating a plurality of normal direction vectors based on correspondence between the normal's one-degree-of-freedoms estimated by the normal's one-degree-of-freedom estimating section and the plurality of polarization images obtained by the stereo correspondence obtaining section; and
an optimal normal selection section for selecting one of the plurality of normal direction vector candidates generated by the normal information generating section as an optimal normal direction vector.

26. The image processing apparatus according to claim 25, wherein the normal information generating section generates a plurality of normal direction vector candidates for each set of two polarization images from the three or more polarization images of different viewpoint positions.

27. The image processing apparatus according to claim 26, wherein the optimal normal selection section selects one of the plurality of normal direction vector candidates as an optimal normal direction vector, based on at least one of the polarization image captured by the stereo polarization image capturing section, the polarization information obtained by the polarization information obtaining section, an area division result from the segmentation section, the normal's one-degree-of-freedom information estimated by the normal's one-degree-of-freedom estimating section, and the normal direction vector generated by the normal information generating section.

28. The image processing apparatus according to claim 27, wherein the optimal normal selection section estimates, as the optimal normal direction vector, a normal direction vector candidate for which an angle is largest between incident planes or emittance planes, which are the normal's one-degree-of-freedom information estimated by the normal's one-degree-of-freedom estimating section, for the three or more polarization images of different viewpoint positions.

29. The image processing apparatus according to claim 27, wherein the optimal normal selection section calculates normal information based on degree-of-polarization information estimated by the reliability estimating section and an area division result from the segmentation section, and compares the calculated normal information with the normal direction vector generated by the normal information generating section, so as to estimate, as the optimal normal direction vector, a normal direction vector candidate for which a difference therebetween is minimum.

30. An image processing apparatus for capturing an image of a subject and thereby generating normal information on a surface of the subject;
a stereo polarization image capturing section for receiving a plurality of polarized light of different polarization directions at different viewpoint positions and obtaining three or more polarization images of different viewpoint positions of the subject;
a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light;
a stereo correspondence obtaining section for estimating pixel-by-pixel correspondence between the plurality of polarization images of different viewpoint positions;
a segmentation section for dividing a polarization image into areas each having a common optical property based on similarity in at least one of the intensity information of the polarization image and the polarization information regarding the plurality of polarized light;
a normal's one-degree-of-freedom estimating section for estimating a normal's one degree of freedom on a corresponding subject surface by switching processes from one to another for each of areas divided by the segmentation section, based on the polarization information; and
a normal information generating section for estimating a plurality of normal direction vectors based on correspondence between the normal's one-degree-of-freedoms estimated by the normal's one-degree-of-freedom estimating section and the plurality of polarization images obtained by the stereo correspondence obtaining section.

31. The image processing apparatus according to claim 30, wherein the normal information generating section generates, as a normal information vector, a direction vector for which an angle is largest between a plurality of incident planes or emittance planes estimated by the normal's one-degree-of-freedom estimating section.

32. The image processing apparatus according to claim 31, wherein the normal information generating section selects a normal direction vector by using, as a constraint, at least one of a continuity of a normal direction vector, a spatial continuity of the specular reflection component and the diffuse reflection component, polarization information, a normal direction vector in an area near an occluding edge, normal information, and depth information.

33. The image processing apparatus according to claim 1, wherein the stereo polarization image capturing section receives, at the different viewpoint positions, light from the subject having passed through a plurality of polarizers of different polarization main axis angles, as a plurality of polarized light of different polarization directions.

34. The image processing apparatus according to claim 1, wherein a polarizer whose polarization main axis angle can be varied by rotating the polarizer is rotated, whereby the stereo polarization image capturing section receives, at the different viewpoint positions, light from the subject having passed through the polarizer, as a plurality of polarized light of different polarization directions.

35. A normal information generating method for capturing an image of a subject and thereby generating normal information on a surface of the subject, comprising:
a step of receiving a plurality of polarized light of different polarization directions at different viewpoint positions and obtaining a plurality of polarization images of different viewpoint positions;
a step of generating polarization information regarding the plurality of polarized light, wherein the polarization information obtaining section generates the polarization information, for each of unit images of each of the plurality of polarization images, based on correspondence between polarization angles and intensities of the plurality of polarized light;
a step of estimating pixel-by-pixel correspondence between the plurality of polarization images of different viewpoint positions;
a step of estimating a plurality of normal's one-degree-of-freedom candidates on a corresponding subject surface by switching between a process assuming a specular reflection component and a process assuming a diffuse reflection component, based on the polarization information, for each of the plurality of polarization images;
a step of dividing a polarization image into areas each having a common optical property based on similarity in at least one of the intensity information of the polarization image and the polarization information regarding the plurality of polarized light beams;
a step of estimating a normal's one degree of freedom on a corresponding subject surface by switching processes from one to another for each of areas divided by the segmentation section, based on the polarization information;
a step of estimating a plurality of normal direction vectors based on the pixel-by-pixel correspondence between the estimated normal's one degree of freedom and the plurality of polarization images; and
a step of selecting one of the plurality of normal direction vector candidates generated as an optimal normal direction vector.

36. A storage medium having stored thereon a computer program for an image processing apparatus for capturing an image of a subject and thereby generating normal information on a surface of the subject, the computer program instructing a computer of the image processing apparatus to perform the steps of the method according to claim 35.

37. A viewpoint-converted image generating apparatus for capturing an image of a subject from a plurality of different viewpoint positions to thereby synthesize an image of the subject as viewed from an arbitrary viewpoint position that is different from the viewpoint positions from which the image of the subject is captured, comprising:

a stereo polarization image capturing section for receiving a plurality of polarized light of different polarization directions at the plurality of different viewpoint positions and obtaining a plurality of polarization images of different viewpoint positions;

a normal information generating section for estimating, as normal information, a normal direction vector of the subject based on the plurality of polarization images of different viewpoint positions;

a shape restoring section for restoring a 3-dimensional shape of the subject from the normal information;

a viewpoint conversion section for converting a viewpoint position of the captured image of the subject based on the 3-dimensional shape;

a specular reflection image generating section for generating a specular reflection image from a viewpoint-converted image by a predetermined reflection model;

a combining section for combining a plurality of images together to thereby generate a single image; and a presentation section for presenting an image, wherein:

the viewpoint conversion section viewpoint-converts both a diffuse reflection image obtained by separating a diffuse reflection component and a specular reflection component from an image of the subject and a normal image obtained from the normal information generating section;

the specular reflection image generating section generates a specular reflection image from the viewpoint-converted normal image;

the combining section combines together the viewpoint-converted diffuse reflection image and the generated specular reflection image; and the presentation section presents the combined image.

38. The viewpoint-converted image generating apparatus according to claim 37, further comprising:

a stereo correspondence obtaining section for estimating pixel-by-pixel correspondence between the plurality of polarization images of different viewpoint positions, wherein the shape restoring section restores a 3-dimensional shape of the subject by using a normal image obtained from the normal information generating section, and a 3-dimensional position corresponding to a feature point of a corresponding pixel between the plurality of polarization images obtained from the stereo correspondence obtaining section.

39. The viewpoint-converted image generating apparatus according to claim 37, comprising a presentation section for sequentially displaying a viewpoint-converted 2-dimensional image on a 2-dimensional screen according to a viewpoint position of an observer.

40. The viewpoint-converted image generating apparatus according to claim 37, comprising a presentation section for realizing a multi-viewpoint stereoscopic display by generating two parallactic images at a viewpoint position of an observer.

41. An image generating device for capturing an image of a subject and thereby restoring a shape of the subject, comprising:

a stereo polarization image capturing section for receiving a plurality of polarized light of different polarization directions at different viewpoint positions and obtaining a plurality of polarization images of different viewpoint positions;

a normal information generating section for estimating, as normal information, a normal direction vector of the subject based on the plurality of polarization images of different viewpoint positions;

a shape restoring section for restoring a 3-dimensional shape of the subject from the normal information;

a polarization information obtaining section for generating polarization information regarding the plurality of polarized light, wherein the polarization information obtaining section generates the polarization information, for each of unit images of each of the plurality of polarization images, based on correspondence between polarization angles and intensities of the plurality of polarized light;

a stereo correspondence obtaining section for estimating pixel-by-pixel correspondence between the plurality of polarization images of different viewpoint positions;

a segmentation section for dividing a polarization image into areas each having a common optical property based on similarity in at least one of the intensity information of the polarization image and the polarization information regarding the plurality of polarized light; and a normal's one-degree-of-freedom estimating section for estimating a normal's one degree of freedom on the surface of the subject corresponding to each area divided by the segmentation section based on the polarization information, for each of the plurality of polarization images, wherein the normal information generating section estimates a normal direction vector based on the normal's one-degree-of-freedoms estimated by the normal's one-degree-of-freedom estimating section and the correspondence between the plurality of polarization images obtained by the stereo correspondence obtaining section.

* * * * *